US012627724B2

(12) United States Patent　　　(10) Patent No.:　US 12,627,724 B2
　　Ingel et al.　　　　　　　　　　(45) **Date of Patent:　　*May 12, 2026**

(54) SYSTEMS AND METHODS FOR ARTIFICIAL DUBBING

(71) Applicant: VIDUBLY LTD, Binyamina (IL)

(72) Inventors: Ben Avi Ingel, Binyamina (IL); Ron Zass, Kiryat Tivon (IL)

(73) Assignee: VIDUBLY LTD, Binyamina (IL)

( * ) Notice: Subject to any disclaimer, the term of this patent is extended or adjusted under 35 U.S.C. 154(b) by 609 days.

This patent is subject to a terminal disclaimer.

(21) Appl. No.: 17/467,236

(22) Filed: Sep. 5, 2021

(65) Prior Publication Data

US 2021/0400101 A1　　Dec. 23, 2021

Related U.S. Application Data

(63) Continuation of application No. 16/777,097, filed on Jan. 30, 2020, now Pat. No. 11,159,597.

(60) Provisional application No. 62/822,856, filed on Mar. 23, 2019, provisional application No. 62/799,970, (Continued)

(51) Int. Cl.
　　*H04L 65/75*　　　(2022.01)
　　*G10L 13/00*　　　(2006.01)
　　*G10L 17/00*　　　(2013.01)

(52) U.S. Cl.
　　CPC ............ *H04L 65/765* (2022.05); *G10L 13/00* (2013.01); *G10L 17/00* (2013.01)

(58) Field of Classification Search
　　None
　　See application file for complete search history.

(56) References Cited

U.S. PATENT DOCUMENTS

| | | | |
|---|---|---|---|
| 4,305,131 A | 12/1981 | Best | |
| 6,021,387 A * | 2/2000 | Mozer ..................... G10L 15/16 |
| | | | 704/240 |
| 6,077,085 A | 6/2000 | Parry | |

(Continued)

FOREIGN PATENT DOCUMENTS

| | | |
|---|---|---|
| CN | 102422639 A | 4/2012 |
| EP | 1928189 A1 | 6/2008 |

(Continued)

*Primary Examiner* — Pierre Louis Desir
*Assistant Examiner* — Keisha Y. Castillo-Torres
(74) *Attorney, Agent, or Firm* — The Roy Gross Law Firm, LLC; Roy D. Gross

(57)　　　　　ABSTRACT

Methods, systems, and computer-readable media for artificially generating a revoiced media stream are provided. In one implementation, a system may receive a media stream including an individual with particular voice speaking in an origin language. The system may obtain a transcript of the media stream including utterances spoken in the origin language and translate the transcript to a target language. The translated transcript may include a set of words in the target language for each of at least some of the utterances spoken in the origin language. The system may analyze the media stream to determine a voice profile for the individual. Thereafter, the system may determine a synthesized voice for a virtual entity intended to dub the individual that is similar to the particular voice. Then, the system may generate a revoiced media stream in which the translated transcript in the target language is spoken by the virtual entity.

20 Claims, 56 Drawing Sheets

Related U.S. Application Data filed on Feb. 1, 2019, provisional application No. 62/816,137, filed on Mar. 10, 2019.

(56) References Cited

U.S. PATENT DOCUMENTS

| | | | |
|---|---|---|---|
| 6,778,252 B2 | 8/2004 | Moulton et al. | |
| 8,140,322 B2 | 3/2012 | Simonsen et al. | |
| 9,280,973 B1 | 3/2016 | Soyannwo et al. | |
| 9,747,282 B1* | 8/2017 | Baker | G06F 40/58 |
| 10,360,716 B1 | 7/2019 | van der Meulen et al. | |
| 10,827,024 B1 | 11/2020 | Schissel et al. | |
| 2002/0087317 A1* | 7/2002 | Lee | G10L 15/183 |
| | | | 704/E15.044 |
| 2002/0161578 A1 | 10/2002 | Saindon et al. | |
| 2002/0161579 A1 | 10/2002 | Saindon et al. | |
| 2004/0068410 A1* | 4/2004 | Mohamed | G06F 40/30 |
| | | | 704/E21.02 |
| 2004/0172257 A1 | 9/2004 | Liqin et al. | |
| 2004/0186712 A1 | 9/2004 | Coles et al. | |
| 2005/0255431 A1 | 11/2005 | Baker | |
| 2005/0272013 A1* | 12/2005 | Knight | G09B 19/00 |
| | | | 434/156 |
| 2006/0285654 A1* | 12/2006 | Nesvadba | H04N 21/440236 |
| | | | 348/E5.122 |
| 2007/0130529 A1 | 6/2007 | Shrubsole | |
| 2007/0208569 A1* | 9/2007 | Subramanian | G10L 19/0018 |
| | | | 704/E19.007 |
| 2007/0220575 A1 | 9/2007 | Cooper et al. | |
| 2008/0195386 A1 | 8/2008 | Proidl | |
| 2008/0295130 A1 | 11/2008 | Worthen | |
| 2009/0037179 A1 | 2/2009 | Liu et al. | |
| 2009/0175596 A1 | 7/2009 | Hirai | |
| 2010/0082326 A1 | 4/2010 | Bangalore | |
| 2011/0064388 A1 | 3/2011 | Brown et al. | |
| 2012/0054619 A1 | 3/2012 | Spooner et al. | |
| 2013/0038737 A1 | 2/2013 | Yehezkel et al. | |
| 2013/0110513 A1* | 5/2013 | Jhunja | G06F 16/685 |
| | | | 704/270.1 |
| 2014/0142918 A1* | 5/2014 | Dotterer | G06F 40/47 |
| | | | 704/2 |
| 2014/0164507 A1 | 6/2014 | Tesch et al. | |
| 2014/0303958 A1 | 10/2014 | Lee et al. | |
| 2014/0358518 A1 | 12/2014 | Wu et al. | |
| 2015/0092007 A1 | 4/2015 | Koborita et al. | |
| 2015/0319518 A1 | 11/2015 | Wilson | |
| 2016/0005436 A1 | 1/2016 | Axen et al. | |
| 2016/0021334 A1 | 1/2016 | Rossano et al. | |
| 2016/0042766 A1 | 2/2016 | Kummer | |
| 2016/0049146 A1 | 2/2016 | Chang | |
| 2016/0254795 A1 | 9/2016 | Ballard | |
| 2016/0328391 A1 | 11/2016 | Choi | |
| 2016/0365087 A1 | 12/2016 | Freud | |
| 2017/0004820 A1 | 1/2017 | Lv et al. | |
| 2017/0076749 A1 | 3/2017 | Kanevsky | |
| 2017/0255616 A1 | 9/2017 | Yun et al. | |
| 2018/0143809 A1 | 5/2018 | Zang et al. | |
| 2018/0174595 A1* | 6/2018 | Dirac | G10L 21/013 |
| 2018/0253992 A1 | 9/2018 | Koul et al. | |
| 2018/0260448 A1 | 9/2018 | Osotio et al. | |
| 2018/0322875 A1 | 11/2018 | Adachi | |
| 2018/0357215 A1 | 12/2018 | Austin et al. | |
| 2018/0374461 A1 | 12/2018 | Serletic | |
| 2019/0065478 A1* | 2/2019 | Tsujikawa | G06F 3/167 |
| 2019/0069023 A1* | 2/2019 | Thomas | H04N 21/83 |
| 2019/0114302 A1 | 4/2019 | Bequet | |
| 2019/0164533 A1 | 5/2019 | Lawrenson et al. | |
| 2019/0250891 A1 | 8/2019 | Kumar et al. | |
| 2019/0317739 A1 | 10/2019 | Turek et al. | |
| 2020/0005796 A1 | 1/2020 | Ziv et al. | |
| 2020/0042601 A1 | 2/2020 | Doggett | |
| 2020/0051566 A1 | 2/2020 | Shin | |
| 2020/0058289 A1* | 2/2020 | Gabryjelski | G06F 40/58 |
| 2020/0105245 A1 | 4/2020 | Gupta | |
| 2020/0111474 A1* | 4/2020 | Kumar | H04N 21/4398 |
| 2020/0150981 A1 | 5/2020 | Westberg et al. | |
| 2020/0159862 A1 | 5/2020 | Kleiner et al. | |
| 2020/0169591 A1 | 5/2020 | Ingel | |
| 2020/0174776 A1 | 6/2020 | Vinod et al. | |
| 2020/0211530 A1* | 7/2020 | Zass | H04N 21/44008 |
| 2020/0221176 A1 | 7/2020 | Hwang et al. | |
| 2020/0296510 A1 | 9/2020 | Li et al. | |
| 2020/0311120 A1 | 10/2020 | Zhao et al. | |
| 2021/0019373 A1 | 1/2021 | Freitag | |
| 2021/0042110 A1 | 2/2021 | Basyrov et al. | |
| 2021/0081101 A1 | 3/2021 | Speare et al. | |
| 2021/0097976 A1 | 4/2021 | Chicote et al. | |
| 2021/0182468 A1 | 6/2021 | Co et al. | |
| 2021/0224319 A1 | 7/2021 | Ingel | |
| 2021/0225365 A1 | 7/2021 | Sinha et al. | |
| 2021/0271815 A1 | 9/2021 | Li et al. | |
| 2021/0303318 A1 | 9/2021 | Raghavan | |
| 2021/0397418 A1 | 12/2021 | Nikumb et al. | |
| 2022/0382524 A1 | 12/2022 | Ansari et al. | |
| 2023/0095089 A1 | 3/2023 | Kaliyaperumal et al. | |
| 2023/0115185 A1 | 4/2023 | Huang et al. | |

FOREIGN PATENT DOCUMENTS

| | | | |
|---|---|---|---|
| WO | 2017088136 A1 | 6/2017 | |
| WO | 2019169686 A1 | 9/2019 | |

* cited by examiner

430

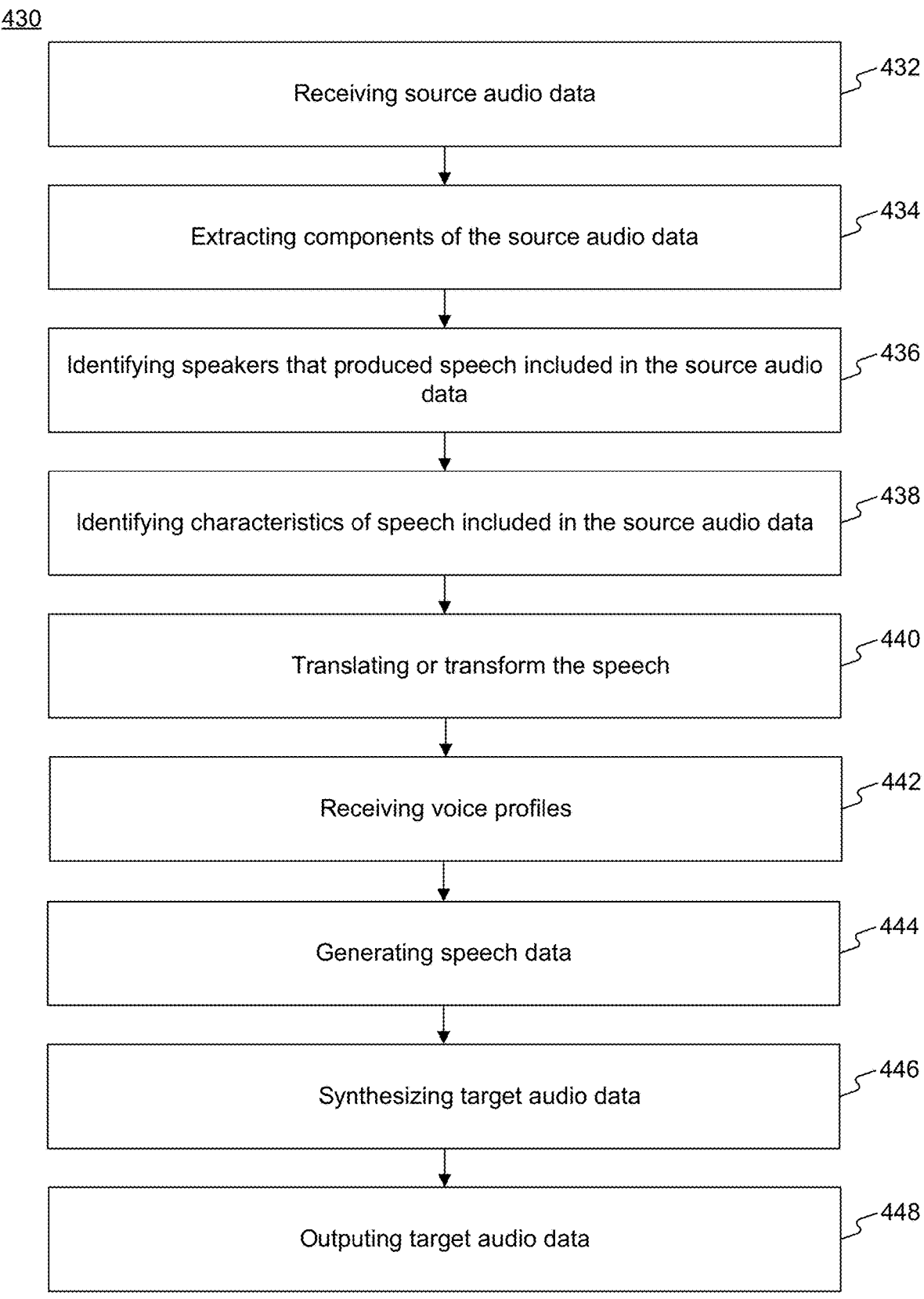

Receiving source audio data                                              432

Extracting components of the source audio data                           434

Identifying speakers that produced speech included in the source audio data          436

Identifying characteristics of speech included in the source audio data          438

Translating or transform the speech                                      440

Receiving voice profiles                                                 442

Generating speech data                                                   444

Synthesizing target audio data                                           446

Outputing target audio data                                              448

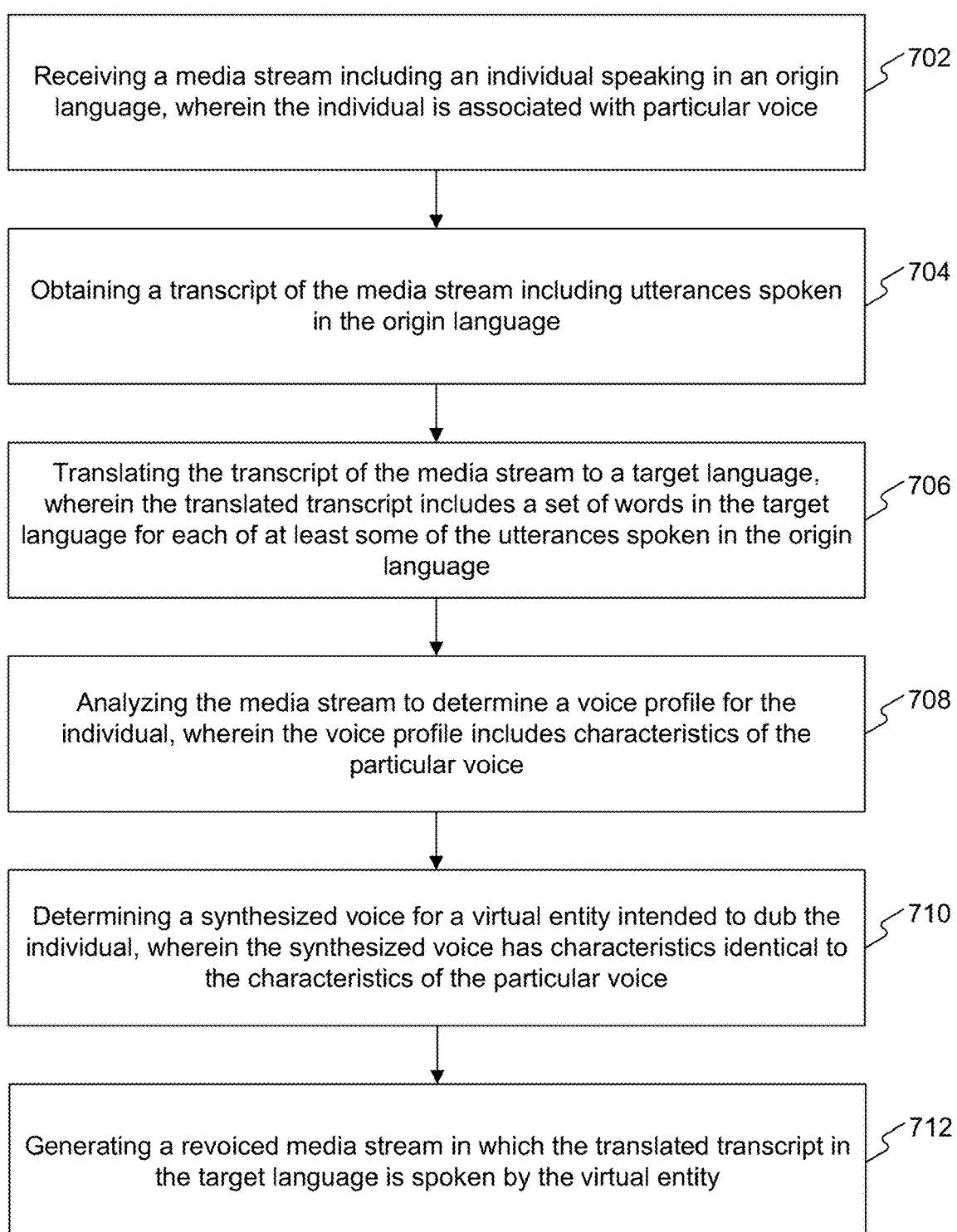

Receiving a media stream including an individual speaking in an origin language, wherein the individual is associated with particular voice ⌐702

Obtaining a transcript of the media stream including utterances spoken in the origin language ⌐704

Translating the transcript of the media stream to a target language, wherein the translated transcript includes a set of words in the target language for each of at least some of the utterances spoken in the origin language ⌐706

Analyzing the media stream to determine a voice profile for the individual, wherein the voice profile includes characteristics of the particular voice ⌐708

Determining a synthesized voice for a virtual entity intended to dub the individual, wherein the synthesized voice has characteristics identical to the characteristics of the particular voice ⌐710

Generating a revoiced media stream in which the translated transcript in the target language is spoken by the virtual entity ⌐712

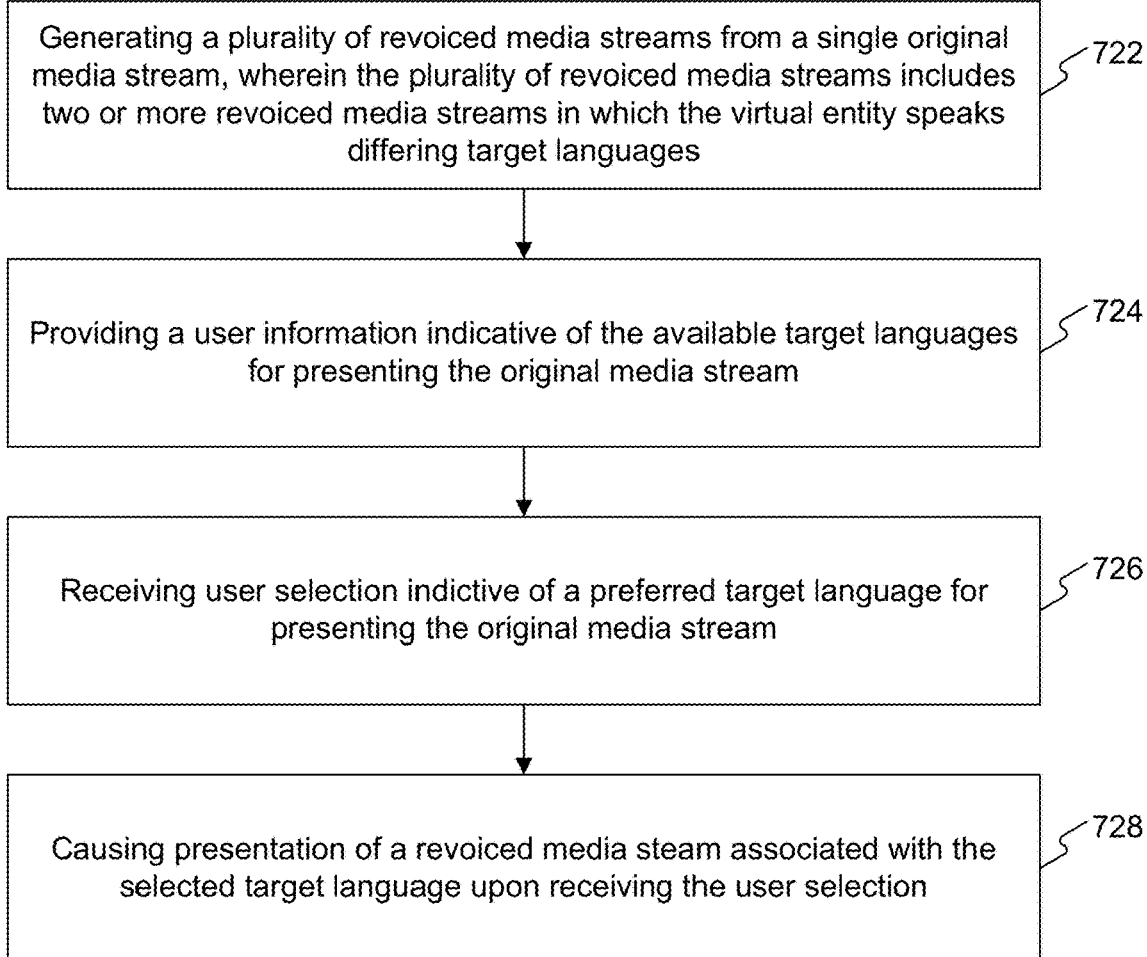

Generating a plurality of revoiced media streams from a single original media stream, wherein the plurality of revoiced media streams includes two or more revoiced media streams in which the virtual entity speaks differing target languages ⟋722

Providing a user information indicative of the available target languages for presenting the original media stream ⟋724

Receiving user selection indictive of a preferred target language for presenting the original media stream ⟋726

Causing presentation of a revoiced media steam associated with the selected target language upon receiving the user selection ⟋728

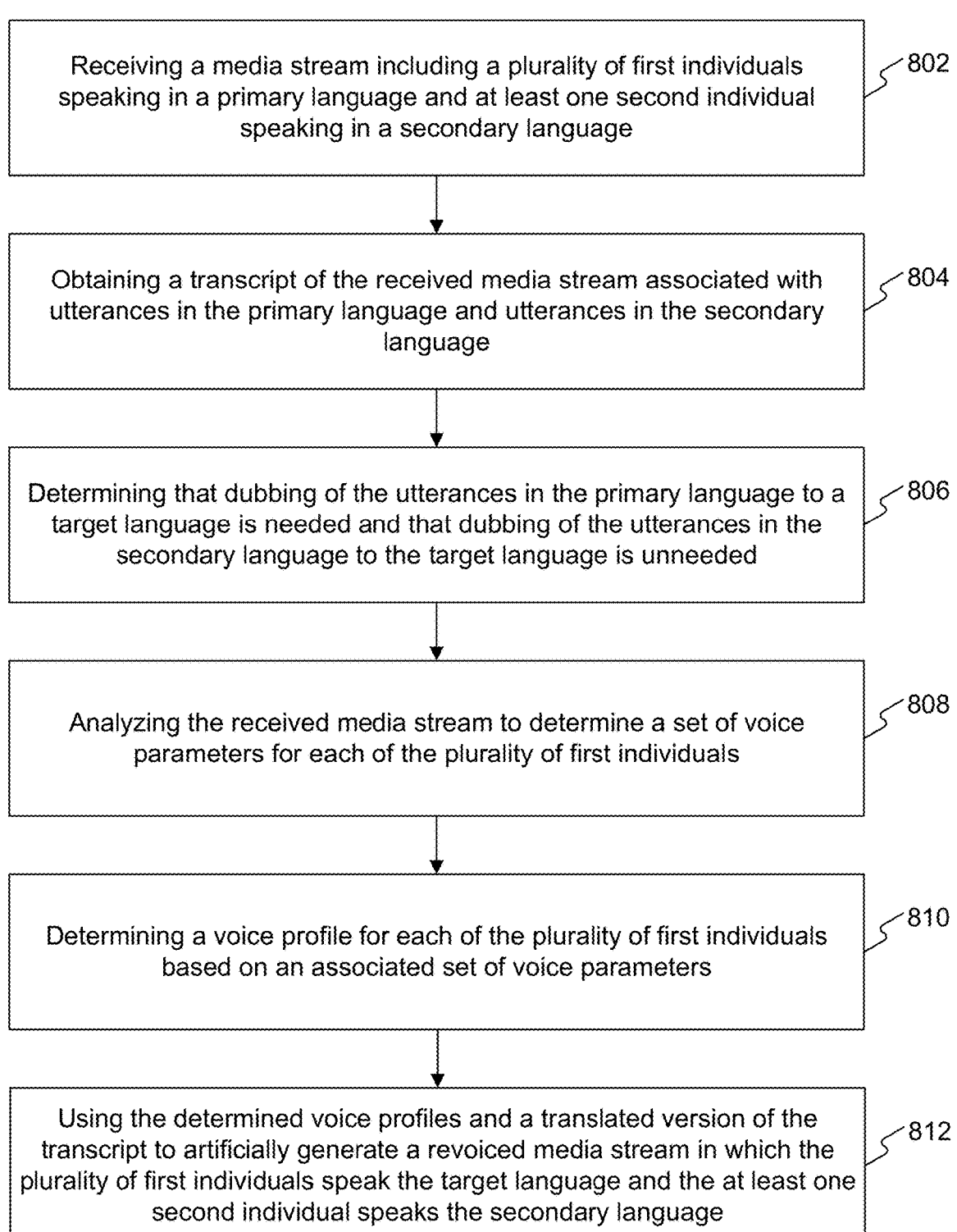

Receiving a media stream including a plurality of first individuals speaking in a primary language and at least one second individual speaking in a secondary language ⟋802

Obtaining a transcript of the received media stream associated with utterances in the primary language and utterances in the secondary language ⟋804

Determining that dubbing of the utterances in the primary language to a target language is needed and that dubbing of the utterances in the secondary language to the target language is unneeded ⟋806

Analyzing the received media stream to determine a set of voice parameters for each of the plurality of first individuals ⟋808

Determining a voice profile for each of the plurality of first individuals based on an associated set of voice parameters ⟋810

Using the determined voice profiles and a translated version of the transcript to artificially generate a revoiced media stream in which the plurality of first individuals speak the target language and the at least one second individual speaks the secondary language ⟋812

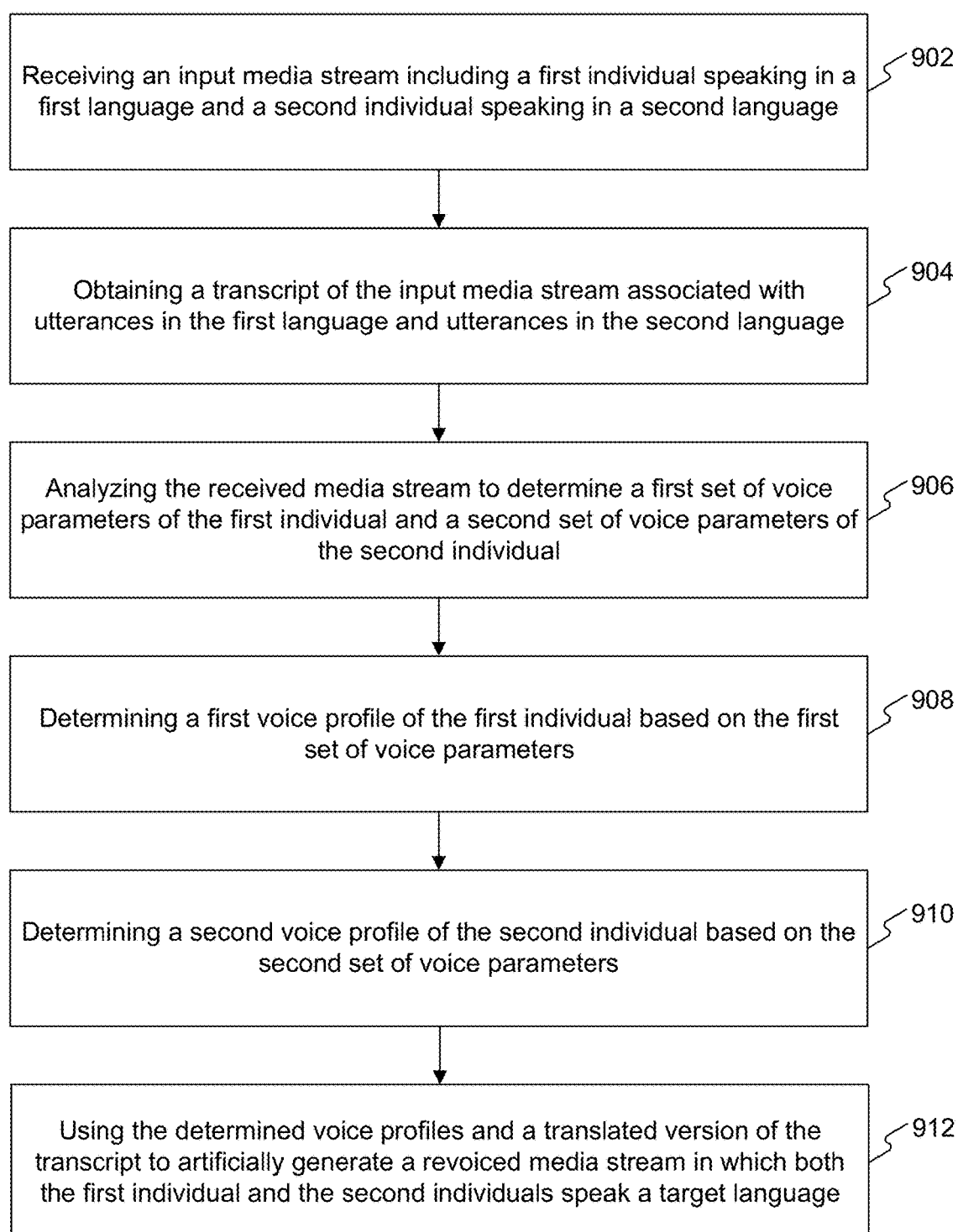

Receiving an input media stream including a first individual speaking in a first language and a second individual speaking in a second language    902

Obtaining a transcript of the input media stream associated with utterances in the first language and utterances in the second language    904

Analyzing the received media stream to determine a first set of voice parameters of the first individual and a second set of voice parameters of the second individual    906

Determining a first voice profile of the first individual based on the first set of voice parameters    908

Determining a second voice profile of the second individual based on the second set of voice parameters    910

Using the determined voice profiles and a translated version of the transcript to artificially generate a revoiced media stream in which both the first individual and the second individuals speak a target language    912

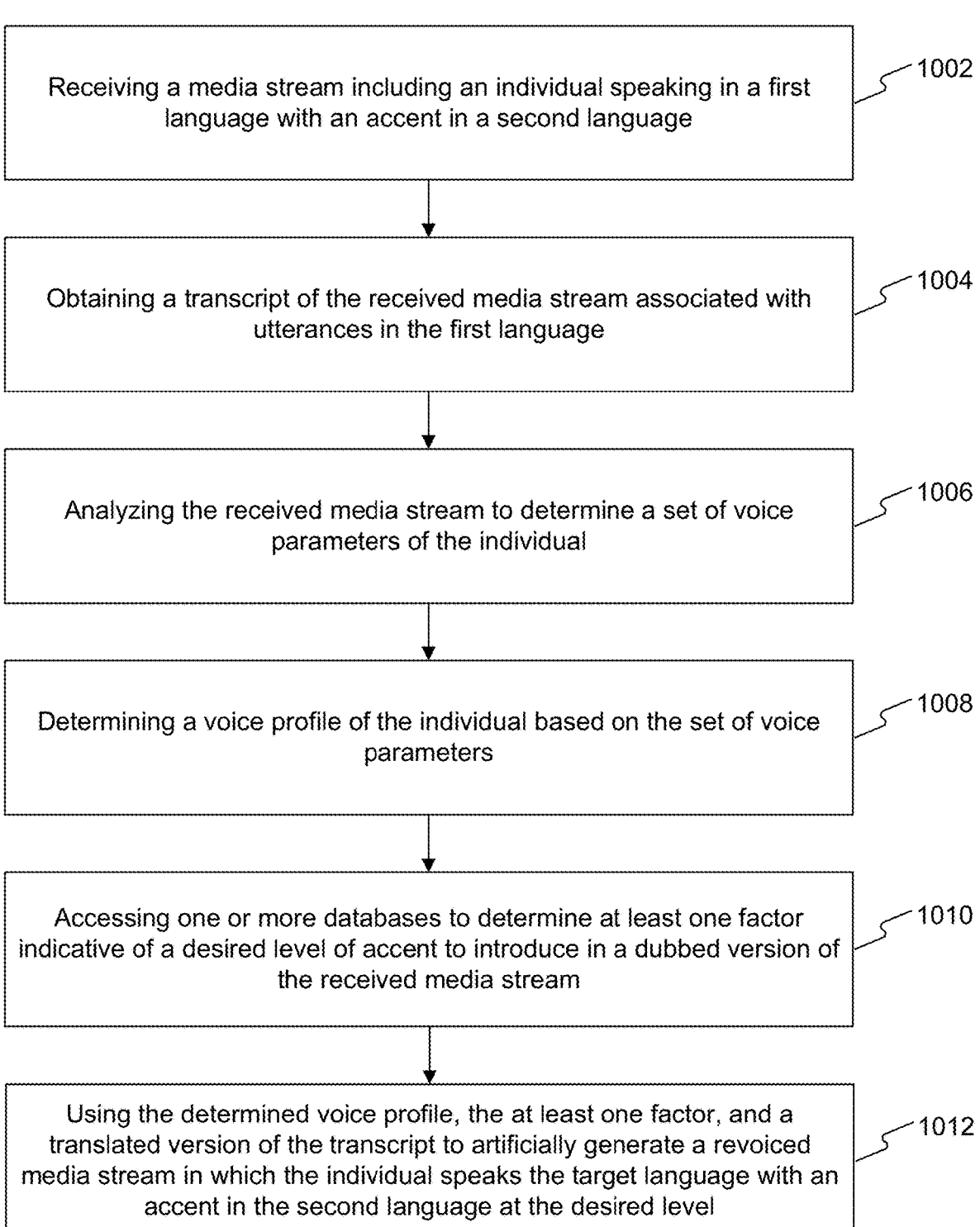

Receiving a media stream including an individual speaking in a first language with an accent in a second language — 1002

Obtaining a transcript of the received media stream associated with utterances in the first language — 1004

Analyzing the received media stream to determine a set of voice parameters of the individual — 1006

Determining a voice profile of the individual based on the set of voice parameters — 1008

Accessing one or more databases to determine at least one factor indicative of a desired level of accent to introduce in a dubbed version of the received media stream — 1010

Using the determined voice profile, the at least one factor, and a translated version of the transcript to artificially generate a revoiced media stream in which the individual speaks the target language with an accent in the second language at the desired level — 1012

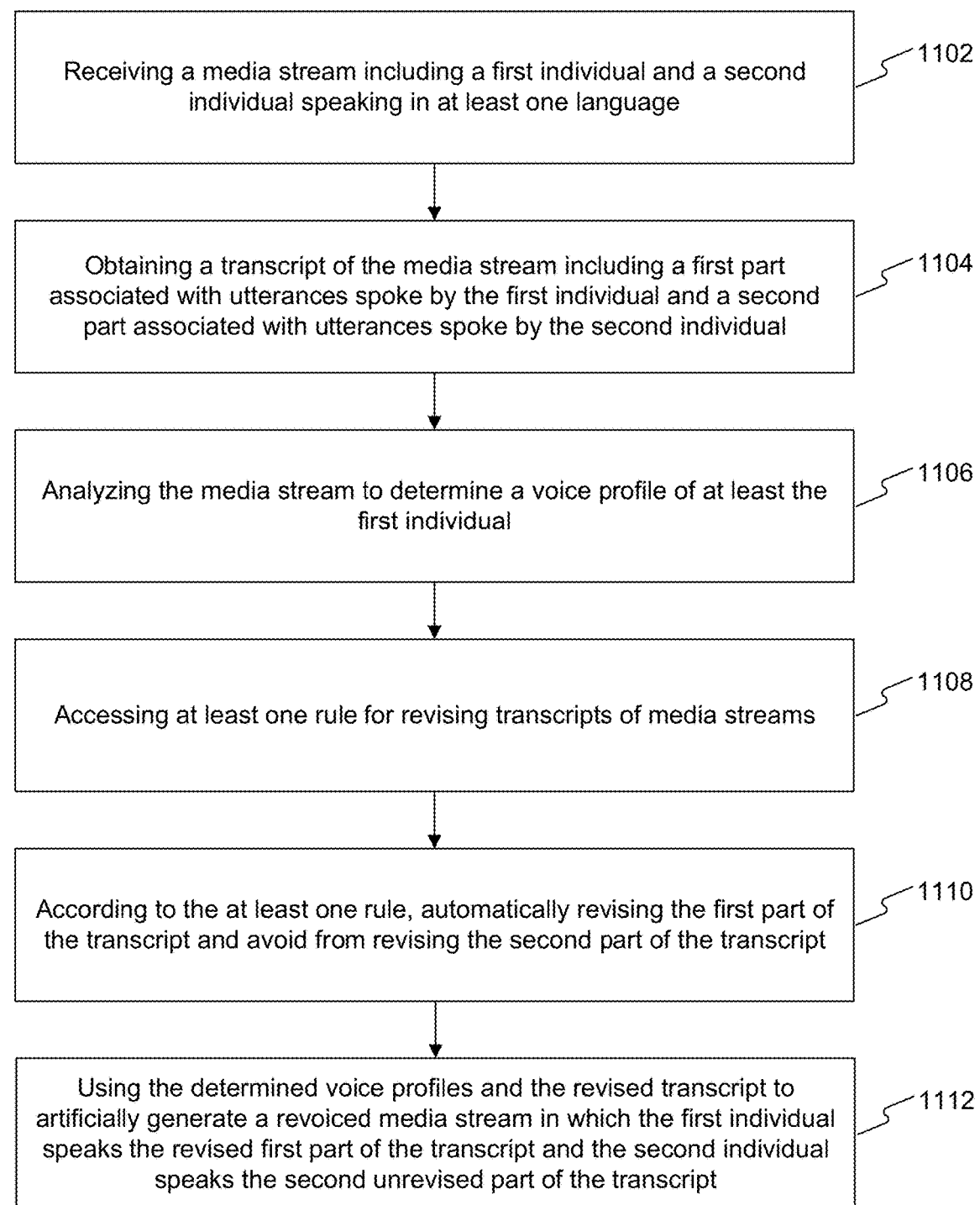

Receiving a media stream including a first individual and a second individual speaking in at least one language                    1102

Obtaining a transcript of the media stream including a first part associated with utterances spoke by the first individual and a second part associated with utterances spoke by the second individual        1104

Analyzing the media stream to determine a voice profile of at least the first individual                    1106

Accessing at least one rule for revising transcripts of media streams        1108

According to the at least one rule, automatically revising the first part of the transcript and avoid from revising the second part of the transcript        1110

Using the determined voice profiles and the revised transcript to artificially generate a revoiced media stream in which the first individual speaks the revised first part of the transcript and the second individual speaks the second unrevised part of the transcript        1112

* The phrase "Aw, shit!" is automatically replaced with the phrase " Aw, shoot"

160

1200

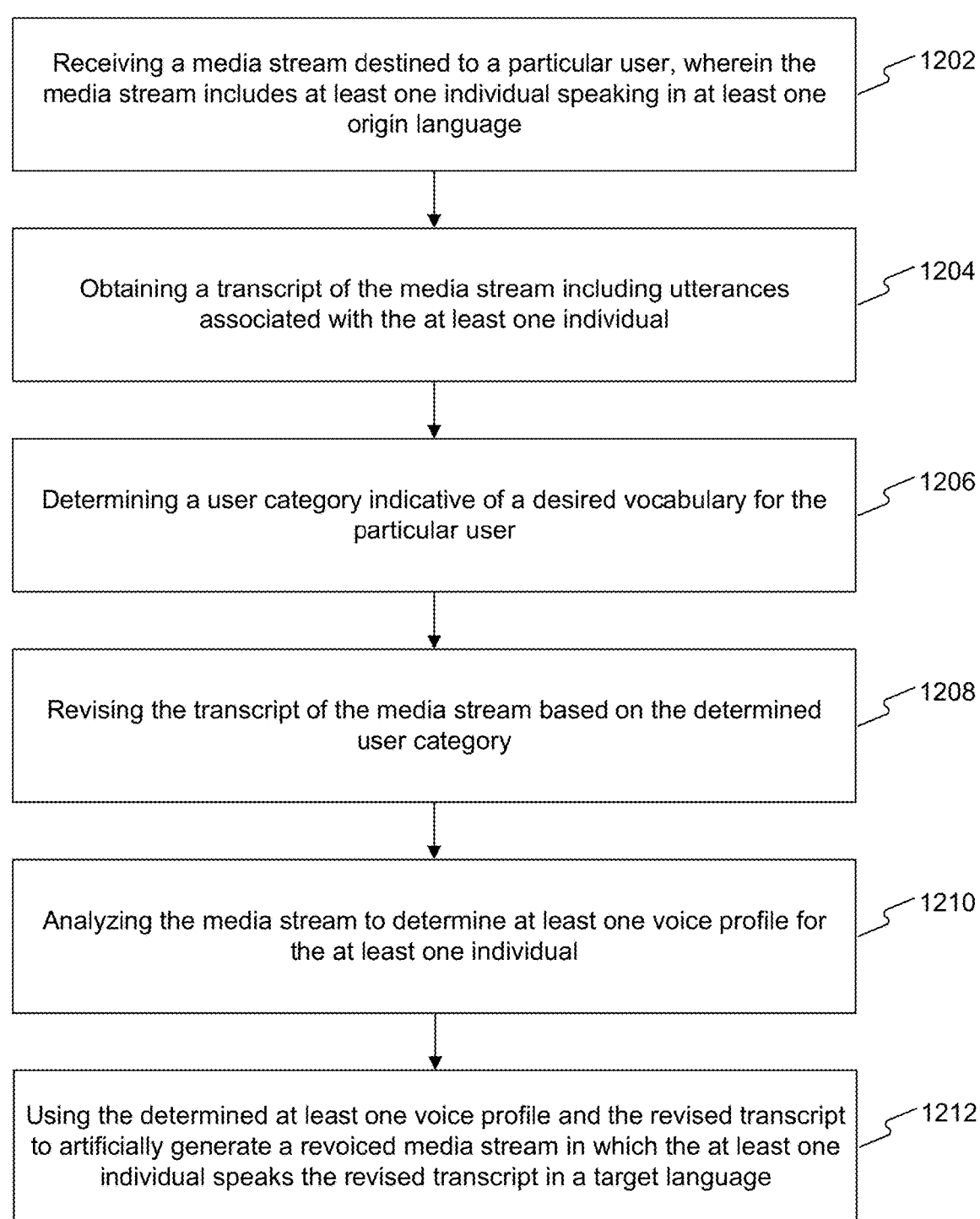

Receiving a media stream destined to a particular user, wherein the media stream includes at least one individual speaking in at least one origin language ⌐1202

Obtaining a transcript of the media stream including utterances associated with the at least one individual ⌐1204

Determining a user category indicative of a desired vocabulary for the particular user ⌐1206

Revising the transcript of the media stream based on the determined user category ⌐1208

Analyzing the media stream to determine at least one voice profile for the at least one individual ⌐1210

Using the determined at least one voice profile and the revised transcript to artificially generate a revoiced media stream in which the at least one individual speaks the revised transcript in a target language ⌐1212

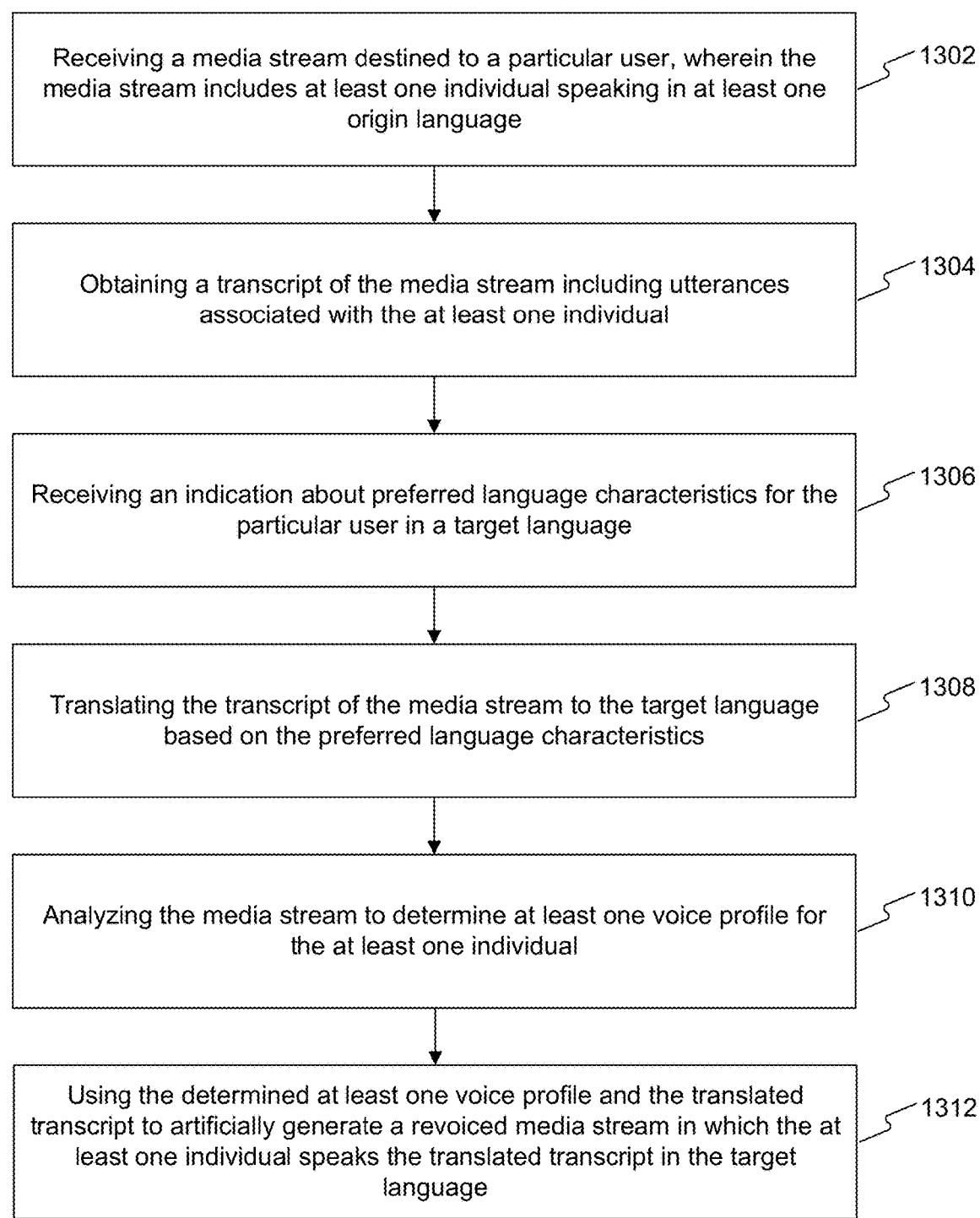

Receiving a media stream destined to a particular user, wherein the media stream includes at least one individual speaking in at least one origin language  —1302

Obtaining a transcript of the media stream including utterances associated with the at least one individual  —1304

Receiving an indication about preferred language characteristics for the particular user in a target language  —1306

Translating the transcript of the media stream to the target language based on the preferred language characteristics  —1308

Analyzing the media stream to determine at least one voice profile for the at least one individual  —1310

Using the determined at least one voice profile and the translated transcript to artificially generate a revoiced media stream in which the at least one individual speaks the translated transcript in the target language  —1312

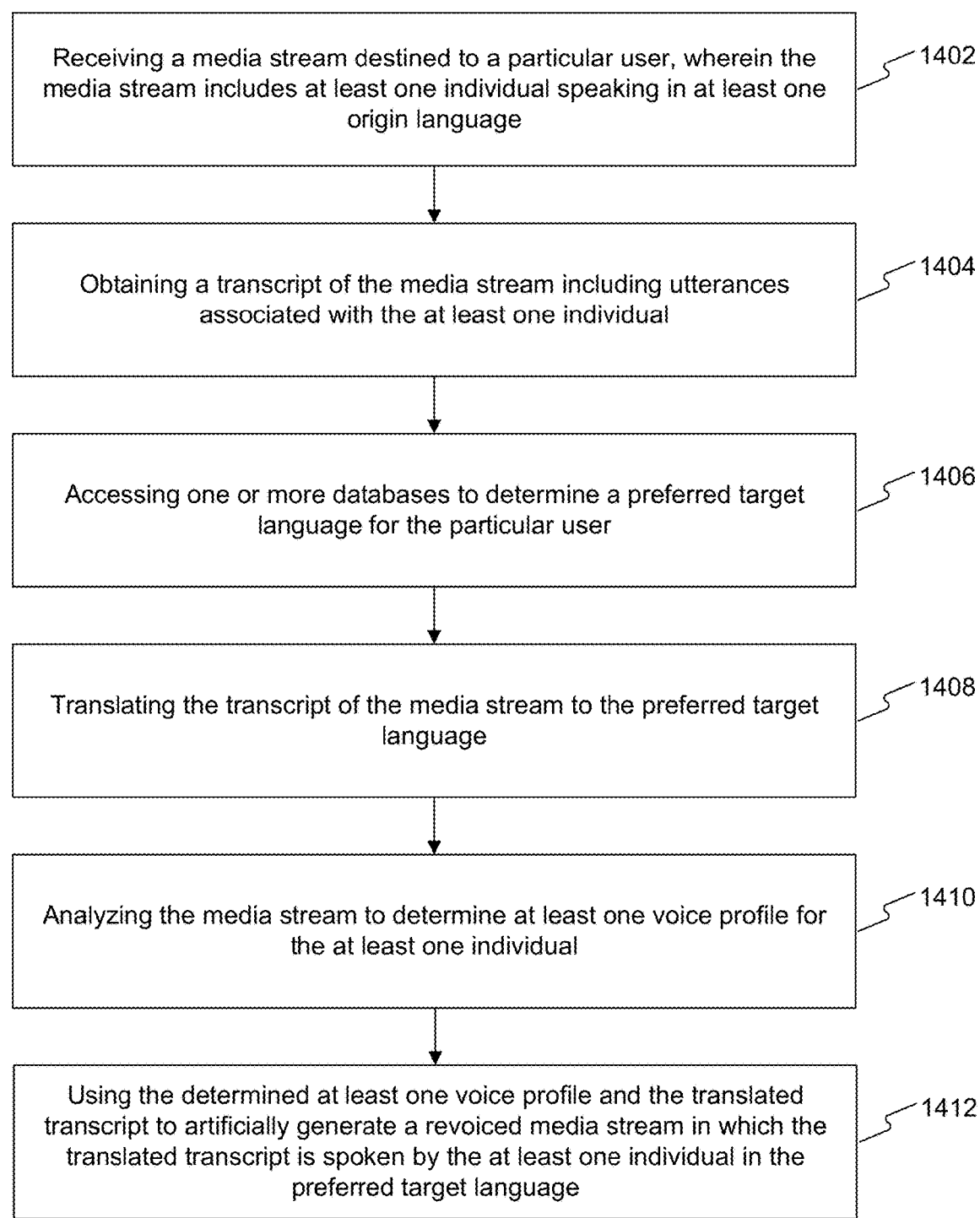

Receiving a media stream destined to a particular user, wherein the media stream includes at least one individual speaking in at least one origin language ⟋1402

Obtaining a transcript of the media stream including utterances associated with the at least one individual ⟋1404

Accessing one or more databases to determine a preferred target language for the particular user ⟋1406

Translating the transcript of the media stream to the preferred target language ⟋1408

Analyzing the media stream to determine at least one voice profile for the at least one individual ⟋1410

Using the determined at least one voice profile and the translated transcript to artificially generate a revoiced media stream in which the translated transcript is spoken by the at least one individual in the preferred target language ⟋1412

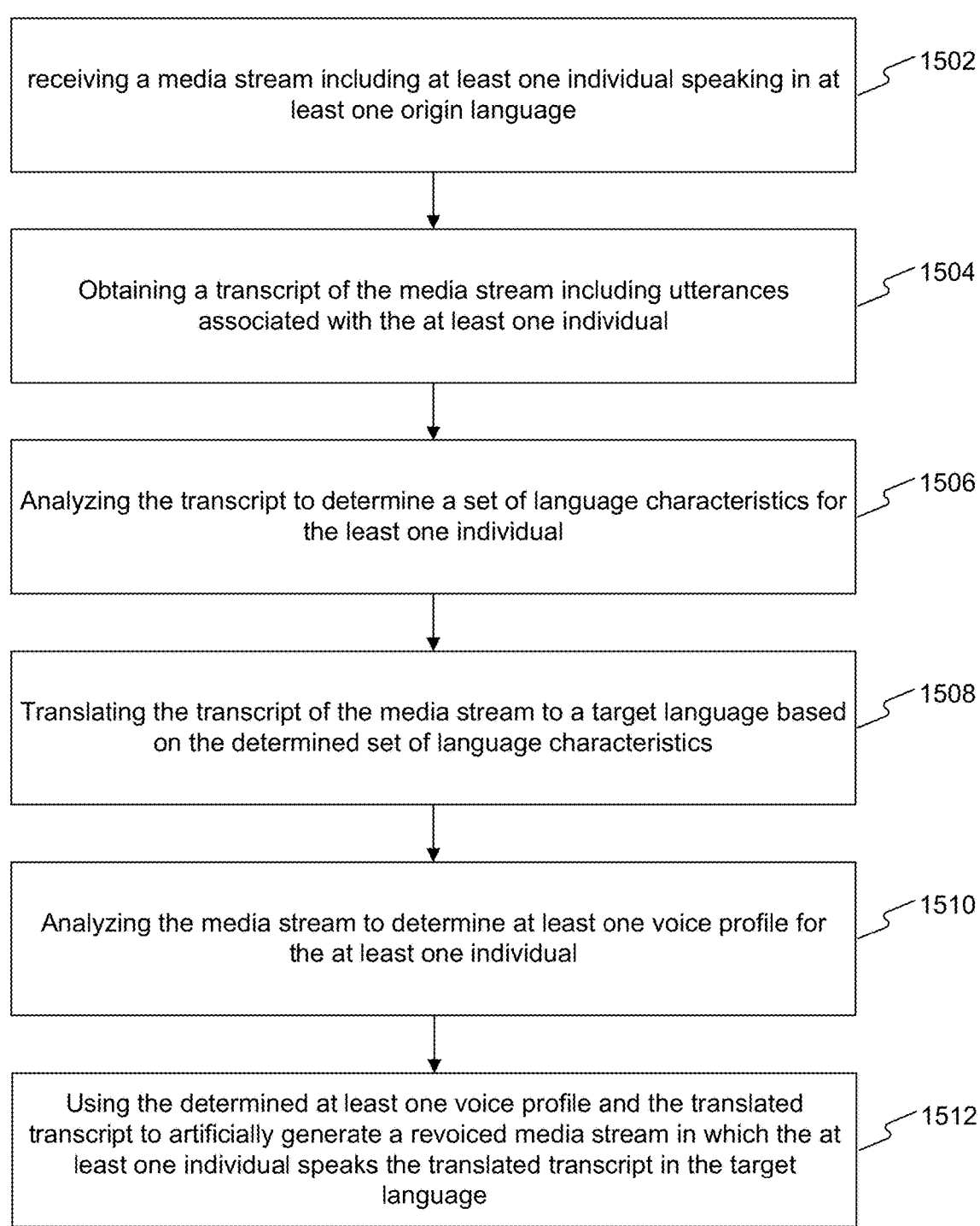

receiving a media stream including at least one individual speaking in at least one origin language — 1502

Obtaining a transcript of the media stream including utterances associated with the at least one individual — 1504

Analyzing the transcript to determine a set of language characteristics for the least one individual — 1506

Translating the transcript of the media stream to a target language based on the determined set of language characteristics — 1508

Analyzing the media stream to determine at least one voice profile for the at least one individual — 1510

Using the determined at least one voice profile and the translated transcript to artificially generate a revoiced media stream in which the at least one individual speaks the translated transcript in the target language — 1512

Original media stream
(in English)

Have a nice day*

Have a nice day, you
too

113

The first individual
determined to speak in
a formal register and
the second individual
determined to speak in
informal register.
Therefore, the
translation is different.

116

Revoiced media stream
(in Spanish)

160

¡"Que usted tenga
un buen día!

Que tengas también
un buen día

1600

1700

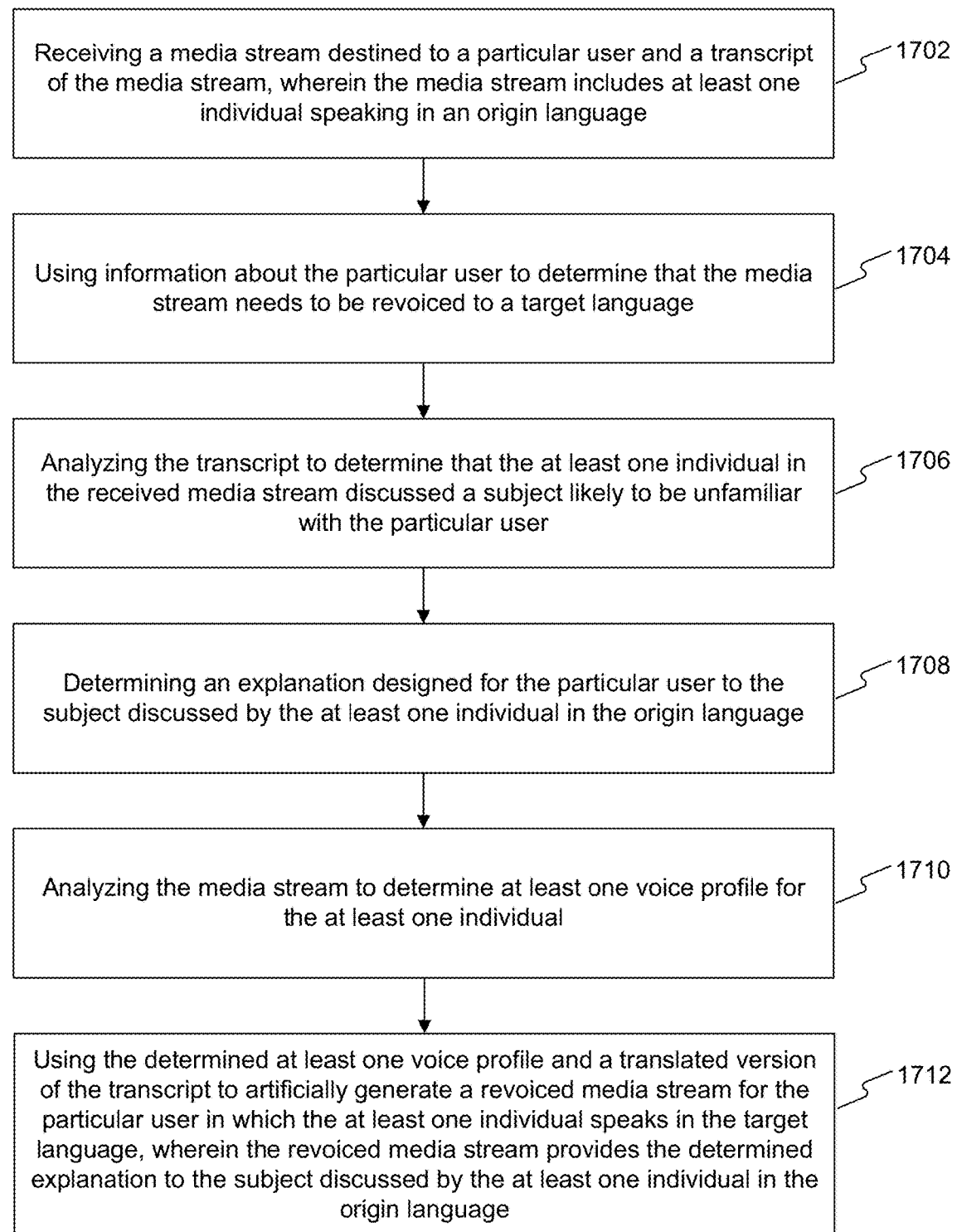

Receiving a media stream destined to a particular user and a transcript of the media stream, wherein the media stream includes at least one individual speaking in an origin language          1702

Using information about the particular user to determine that the media stream needs to be revoiced to a target language          1704

Analyzing the transcript to determine that the at least one individual in the received media stream discussed a subject likely to be unfamiliar with the particular user          1706

Determining an explanation designed for the particular user to the subject discussed by the at least one individual in the origin language          1708

Analyzing the media stream to determine at least one voice profile for the at least one individual          1710

Using the determined at least one voice profile and a translated version of the transcript to artificially generate a revoiced media stream for the particular user in which the at least one individual speaks in the target language, wherein the revoiced media stream provides the determined explanation to the subject discussed by the at least one individual in the origin language          1712

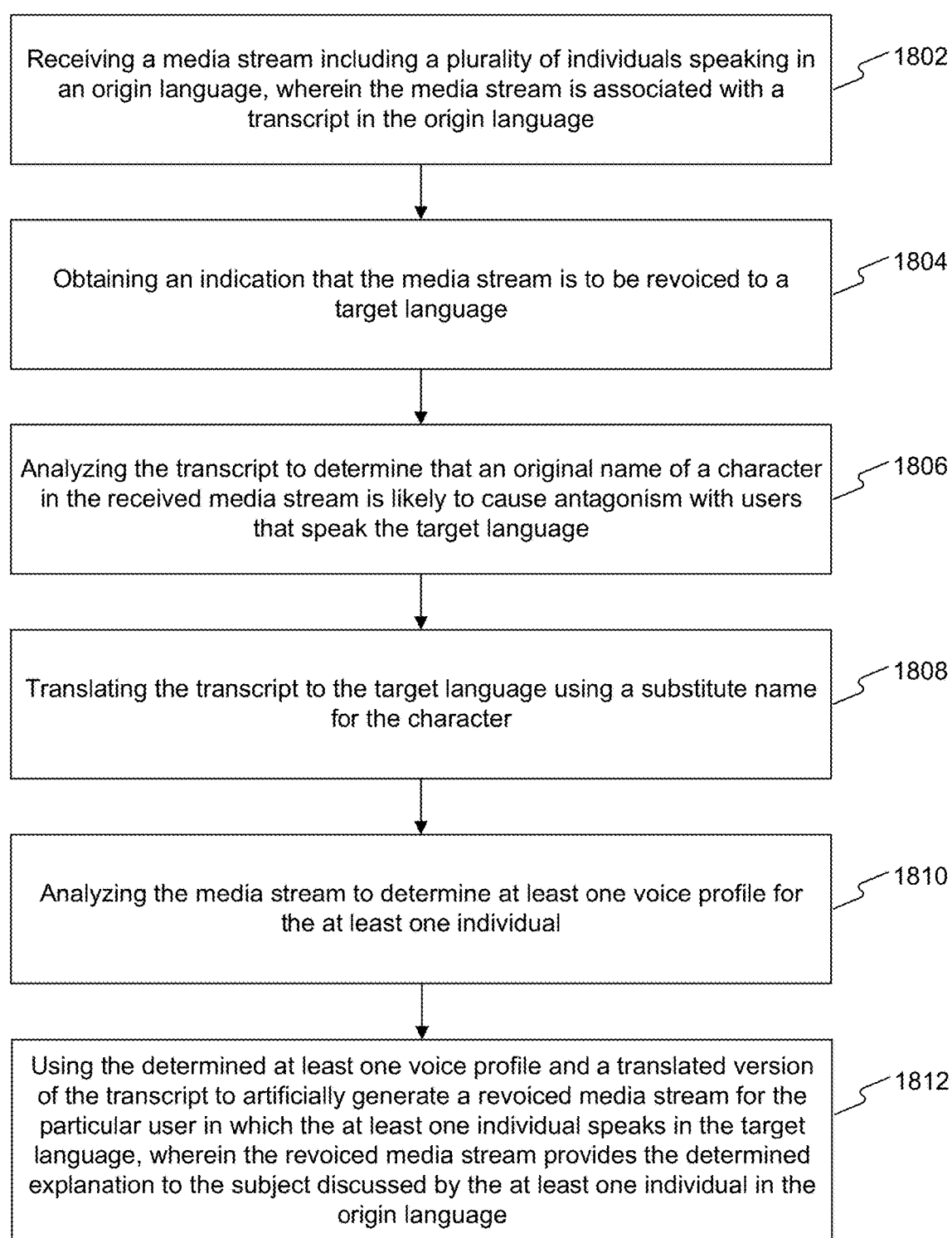

Receiving a media stream including a plurality of individuals speaking in an origin language, wherein the media stream is associated with a transcript in the origin language — 1802

Obtaining an indication that the media stream is to be revoiced to a target language — 1804

Analyzing the transcript to determine that an original name of a character in the received media stream is likely to cause antagonism with users that speak the target language — 1806

Translating the transcript to the target language using a substitute name for the character — 1808

Analyzing the media stream to determine at least one voice profile for the at least one individual — 1810

Using the determined at least one voice profile and a translated version of the transcript to artificially generate a revoiced media stream for the particular user in which the at least one individual speaks in the target language, wherein the revoiced media stream provides the determined explanation to the subject discussed by the at least one individual in the origin language — 1812

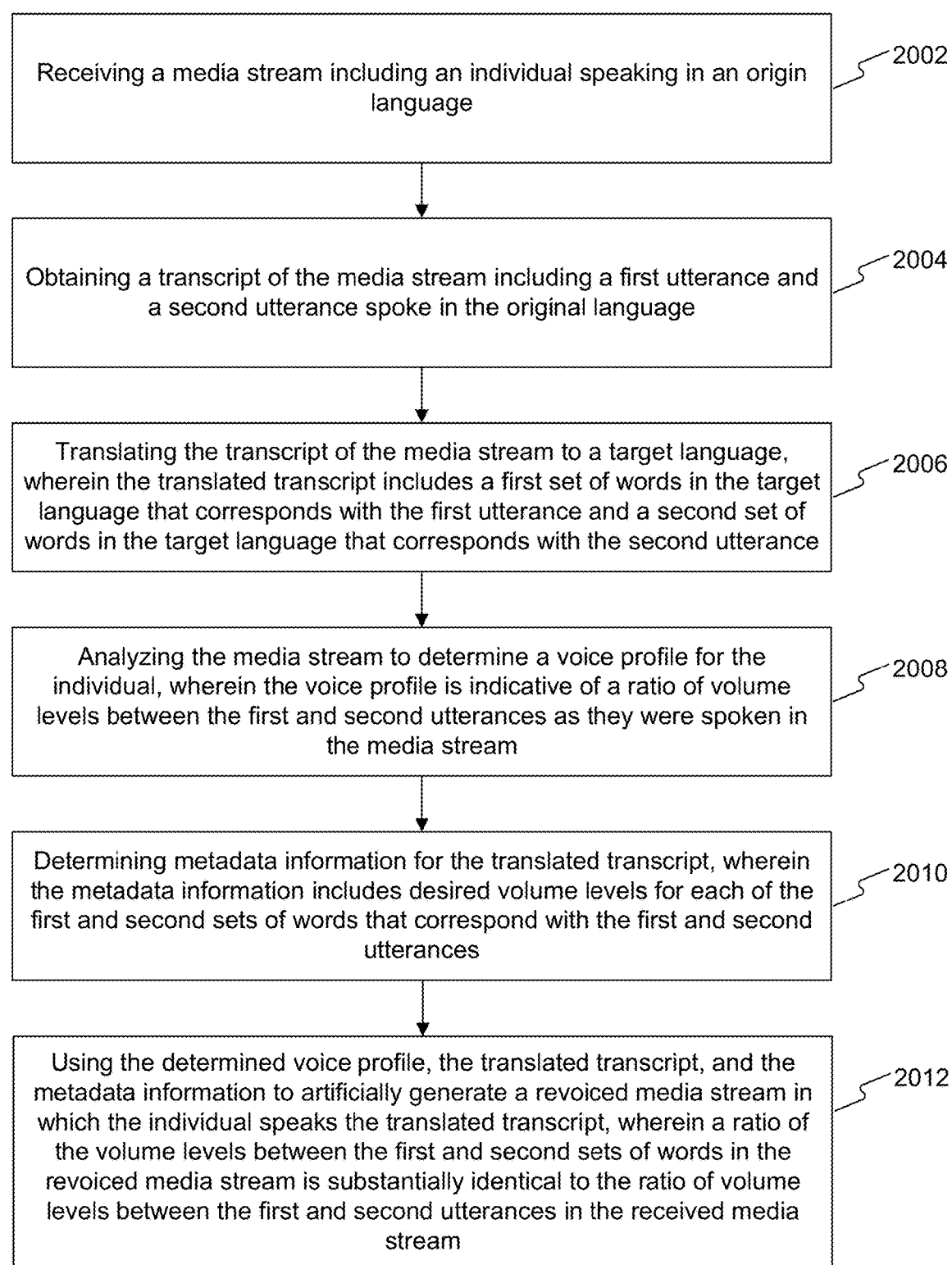

Receiving a media stream including an individual speaking in an origin language ⌐2002

Obtaining a transcript of the media stream including a first utterance and a second utterance spoke in the original language ⌐2004

Translating the transcript of the media stream to a target language, wherein the translated transcript includes a first set of words in the target language that corresponds with the first utterance and a second set of words in the target language that corresponds with the second utterance ⌐2006

Analyzing the media stream to determine a voice profile for the individual, wherein the voice profile is indicative of a ratio of volume levels between the first and second utterances as they were spoken in the media stream ⌐2008

Determining metadata information for the translated transcript, wherein the metadata information includes desired volume levels for each of the first and second sets of words that correspond with the first and second utterances ⌐2010

Using the determined voice profile, the translated transcript, and the metadata information to artificially generate a revoiced media stream in which the individual speaks the translated transcript, wherein a ratio of the volume levels between the first and second sets of words in the revoiced media stream is substantially identical to the ratio of volume levels between the first and second utterances in the received media stream ⌐2012

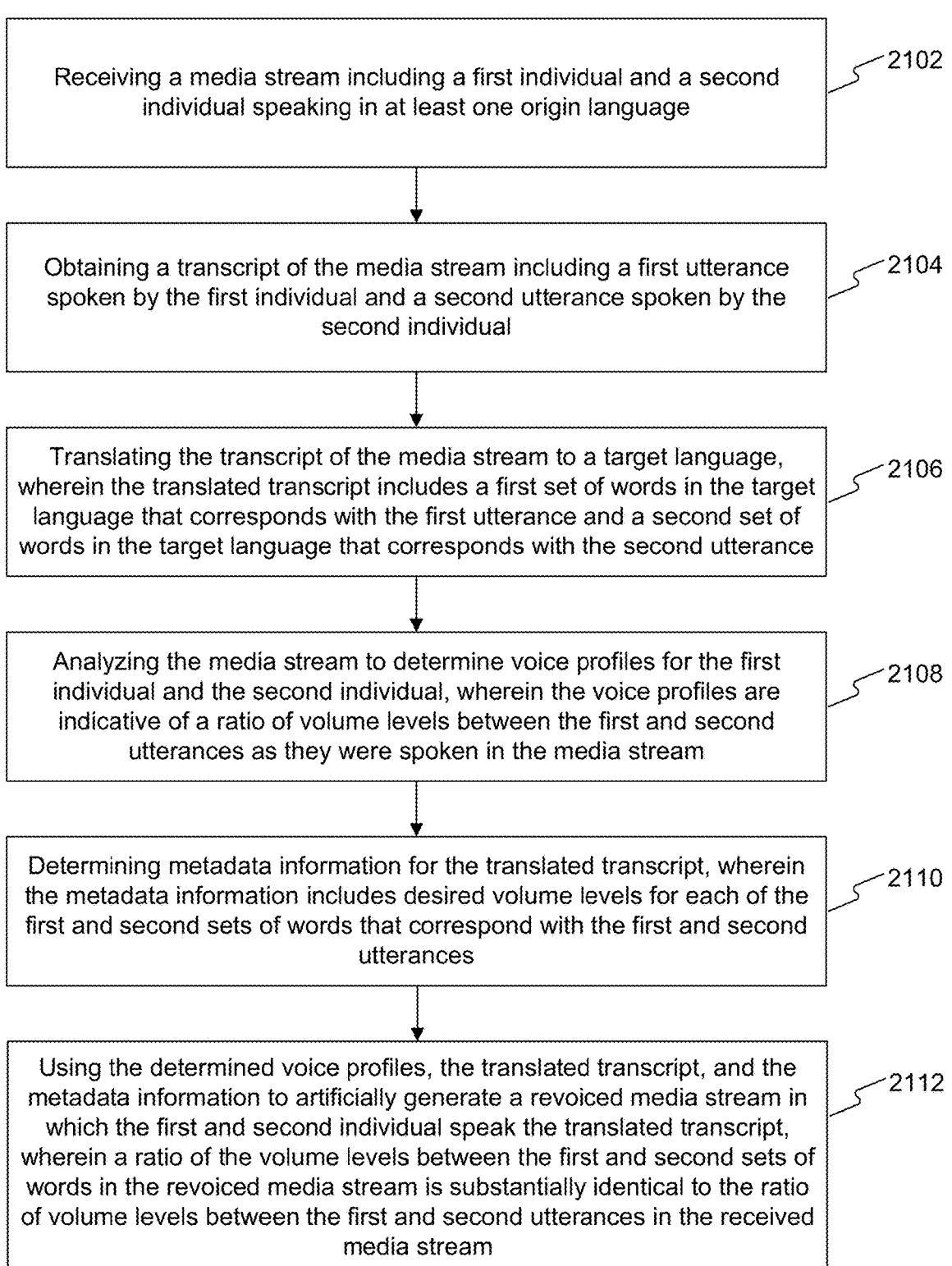

Receiving a media stream including a first individual and a second individual speaking in at least one origin language    2102

Obtaining a transcript of the media stream including a first utterance spoken by the first individual and a second utterance spoken by the second individual    2104

Translating the transcript of the media stream to a target language, wherein the translated transcript includes a first set of words in the target language that corresponds with the first utterance and a second set of words in the target language that corresponds with the second utterance    2106

Analyzing the media stream to determine voice profiles for the first individual and the second individual, wherein the voice profiles are indicative of a ratio of volume levels between the first and second utterances as they were spoken in the media stream    2108

Determining metadata information for the translated transcript, wherein the metadata information includes desired volume levels for each of the first and second sets of words that correspond with the first and second utterances    2110

Using the determined voice profiles, the translated transcript, and the metadata information to artificially generate a revoiced media stream in which the first and second individual speak the translated transcript, wherein a ratio of the volume levels between the first and second sets of words in the revoiced media stream is substantially identical to the ratio of volume levels between the first and second utterances in the received media stream    2112

FIG. 21A

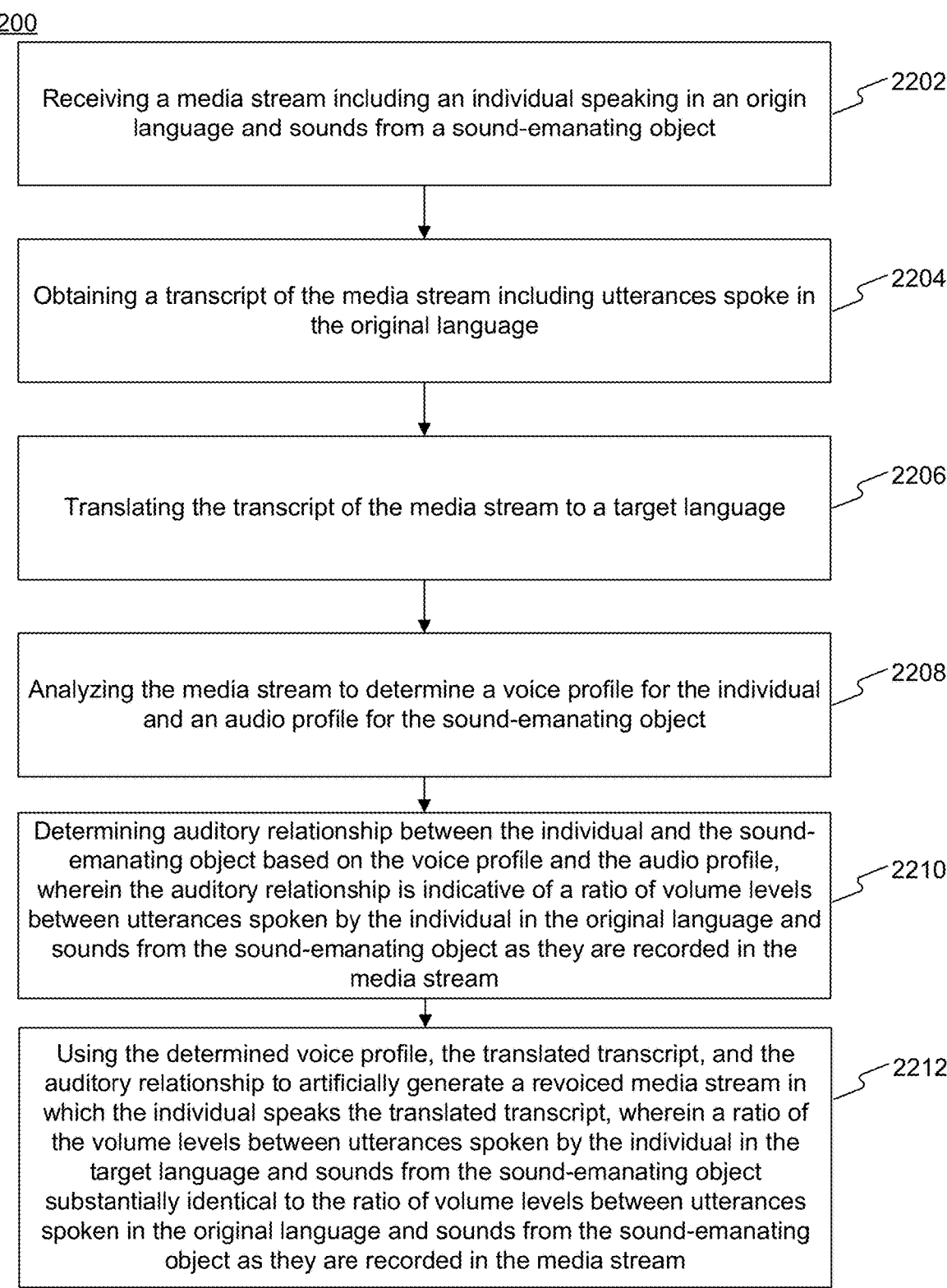

2200

Receiving a media stream including an individual speaking in an origin language and sounds from a sound-emanating object — 2202

Obtaining a transcript of the media stream including utterances spoke in the original language — 2204

Translating the transcript of the media stream to a target language — 2206

Analyzing the media stream to determine a voice profile for the individual and an audio profile for the sound-emanating object — 2208

Determining auditory relationship between the individual and the sound-emanating object based on the voice profile and the audio profile, wherein the auditory relationship is indicative of a ratio of volume levels between utterances spoken by the individual in the original language and sounds from the sound-emanating object as they are recorded in the media stream — 2210

Using the determined voice profile, the translated transcript, and the auditory relationship to artificially generate a revoiced media stream in which the individual speaks the translated transcript, wherein a ratio of the volume levels between utterances spoken by the individual in the target language and sounds from the sound-emanating object substantially identical to the ratio of volume levels between utterances spoken in the original language and sounds from the sound-emanating object as they are recorded in the media stream — 2212

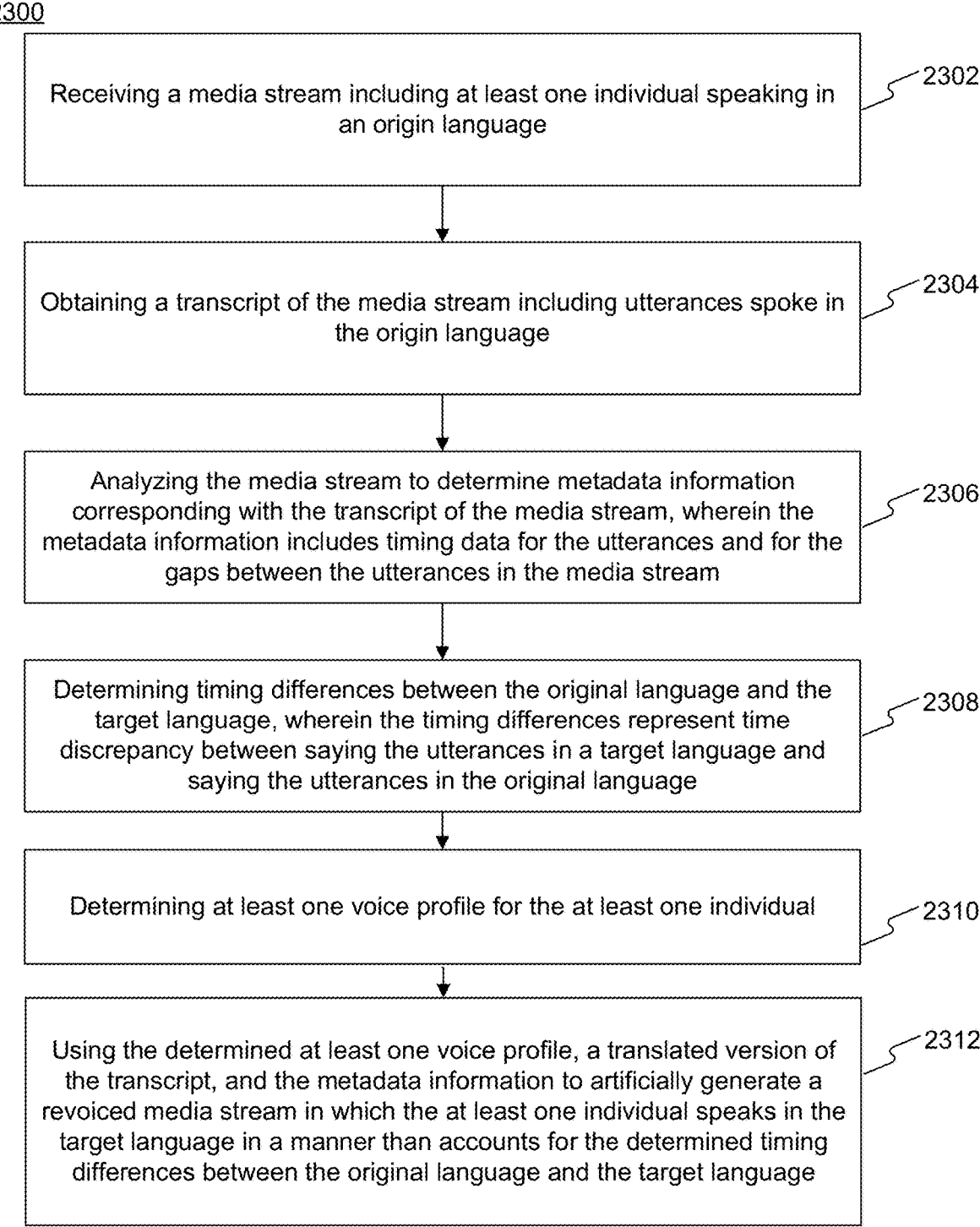

Receiving a media stream including at least one individual speaking in an origin language — 2302

Obtaining a transcript of the media stream including utterances spoke in the origin language — 2304

Analyzing the media stream to determine metadata information corresponding with the transcript of the media stream, wherein the metadata information includes timing data for the utterances and for the gaps between the utterances in the media stream — 2306

Determining timing differences between the original language and the target language, wherein the timing differences represent time discrepancy between saying the utterances in a target language and saying the utterances in the original language — 2308

Determining at least one voice profile for the at least one individual — 2310

Using the determined at least one voice profile, a translated version of the transcript, and the metadata information to artificially generate a revoiced media stream in which the at least one individual speaks in the target language in a manner than accounts for the determined timing differences between the original language and the target language — 2312

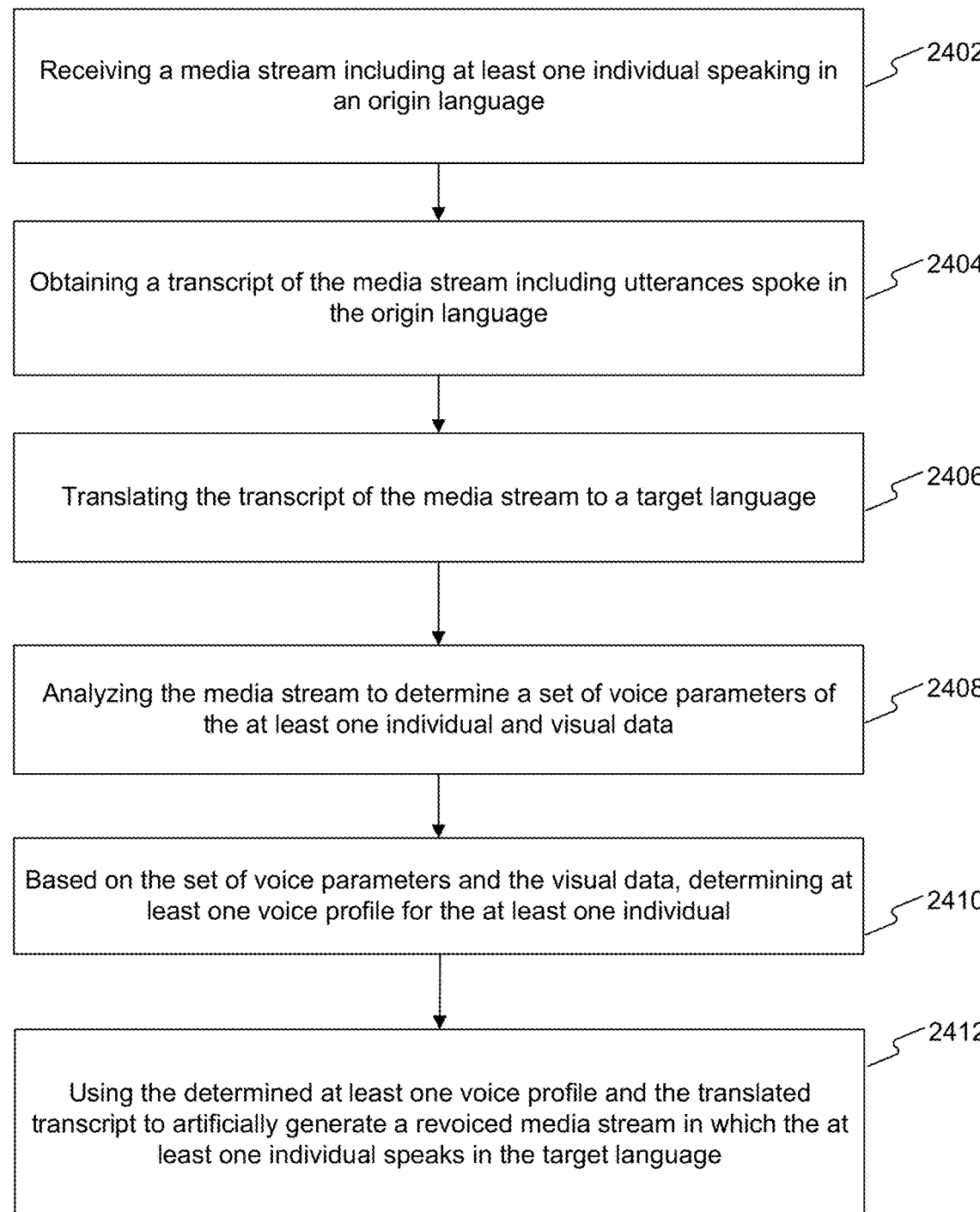

Receiving a media stream including at least one individual speaking in an origin language ⟋2402

Obtaining a transcript of the media stream including utterances spoke in the origin language ⟋2404

Translating the transcript of the media stream to a target language ⟋2406

Analyzing the media stream to determine a set of voice parameters of the at least one individual and visual data ⟋2408

Based on the set of voice parameters and the visual data, determining at least one voice profile for the at least one individual ⟋2410

Using the determined at least one voice profile and the translated transcript to artificially generate a revoiced media stream in which the at least one individual speaks in the target language ⟋2412

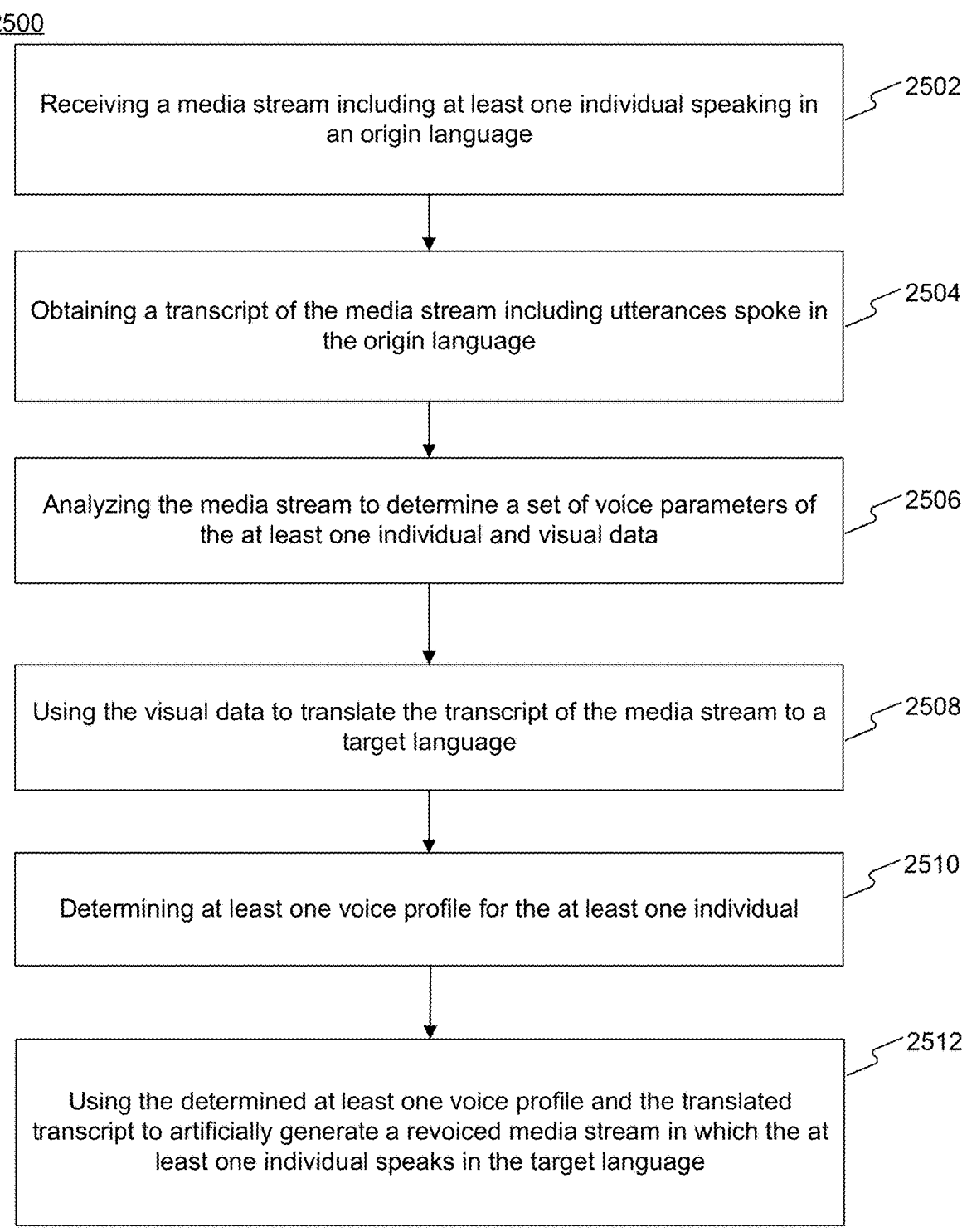

Receiving a media stream including at least one individual speaking in an origin language    2502

Obtaining a transcript of the media stream including utterances spoke in the origin language    2504

Analyzing the media stream to determine a set of voice parameters of the at least one individual and visual data    2506

Using the visual data to translate the transcript of the media stream to a target language    2508

Determining at least one voice profile for the at least one individual    2510

Using the determined at least one voice profile and the translated transcript to artificially generate a revoiced media stream in which the at least one individual speaks in the target language    2512

*FIG. 25A*

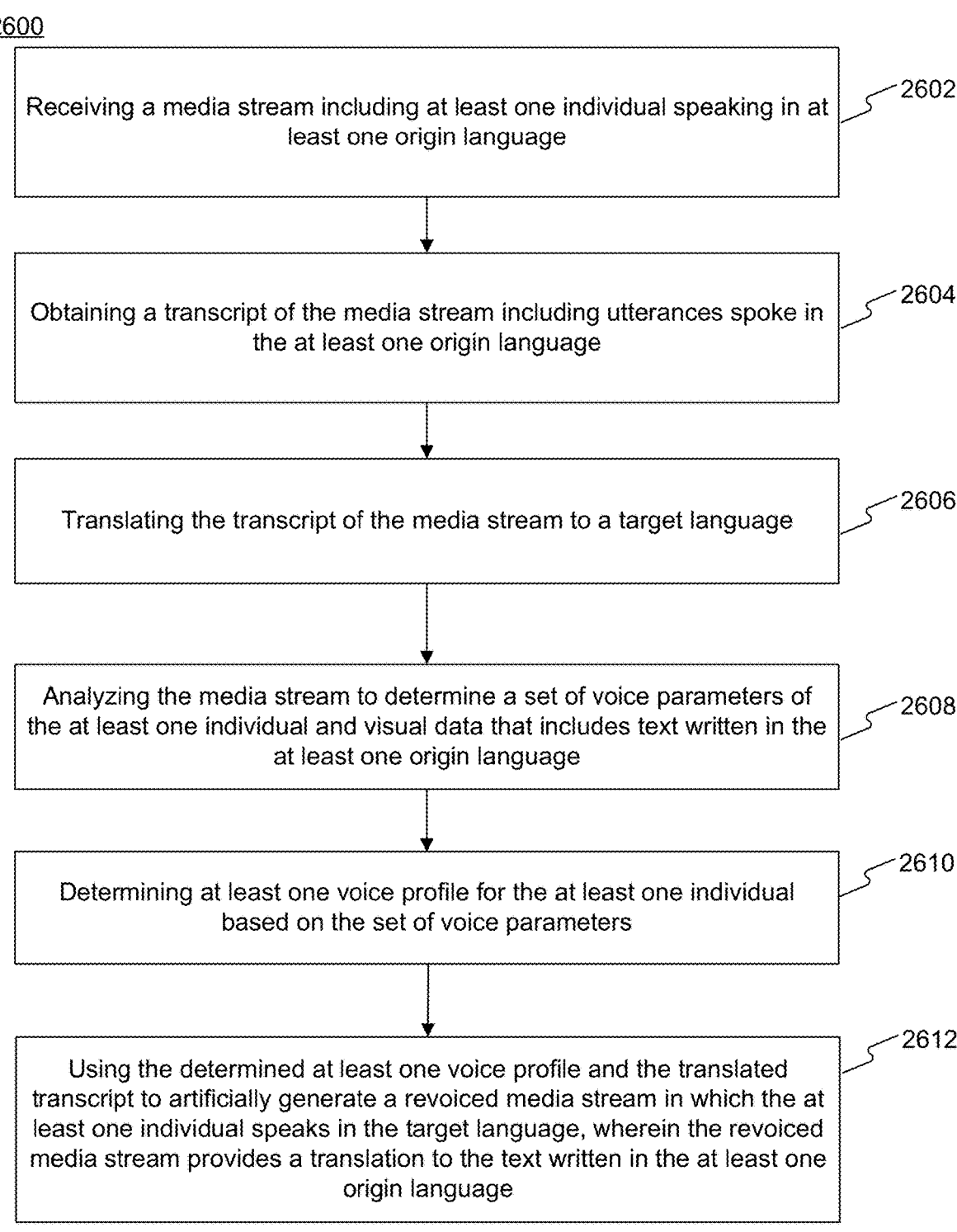

2600

Receiving a media stream including at least one individual speaking in at least one origin language    2602

Obtaining a transcript of the media stream including utterances spoke in the at least one origin language    2604

Translating the transcript of the media stream to a target language    2606

Analyzing the media stream to determine a set of voice parameters of the at least one individual and visual data that includes text written in the at least one origin language    2608

Determining at least one voice profile for the at least one individual based on the set of voice parameters    2610

Using the determined at least one voice profile and the translated transcript to artificially generate a revoiced media stream in which the at least one individual speaks in the target language, wherein the revoiced media stream provides a translation to the text written in the at least one origin language    2612

SYSTEMS AND METHODS FOR ARTIFICIAL DUBBING

CROSS REFERENCE TO RELATED APPLICATIONS

This is a continuation of U.S. patent application Ser. No. 16/777,097, filed Jan. 30, 2020 (pending), which claims the benefit of U.S. Provisional Patent Application No. 62/799,970, filed on Feb. 1, 2019, U.S. Provisional Patent Application No. 62/816,137, filed on Mar. 10, 2019, and U.S. Provisional Patent Application No. 62/822,856, filed on Mar. 23, 2019. The entire contents of all of the above-identified applications are herein incorporated by reference.

BACKGROUND

I. Technical Field

The present disclosure relates generally to the field of audio processing. More specifically, the present disclosure relates to systems, methods, and devices for generating audio streams for dubbing purposes.

II. Background Information

Thousands of original media streams are created for entertainment on a daily basis, such as, personal home videos, vblogs, TV series, movies, podcasts, live radio shows, and more. Without using the long and tedious process of professional dubbing services, the vast majority of these media streams are available for consumption by only a fraction of the world population. Existing technologies, such as neural machine translation services that can deliver real time subtitles, offer a partial solution to overcome the language barrier. Yet for many people consuming content with subtitles is not a viable option and for many others it is considered as less pleasant.

The disclosed embodiments are directed to providing new and improved ways for generating artificial voice for dubbing, and more specifically to systems, methods, and devices for generating revoiced audio streams that sound as the individuals in an original audio stream speak the target language.

SUMMARY

Embodiments consistent with the present disclosure provide systems, methods, and devices for generating media streams for dubbing purposes and for generating personalized media streams.

In one embodiment, a method for artificially generating a revoiced media stream is provided. The method comprising: receiving a media stream including an individual speaking in an origin language, wherein the individual is associated with particular voice; obtaining a transcript of the media stream including utterances spoken in the origin language; translating the transcript of the media stream to a target language, wherein the translated transcript includes a set of words in the target language for each of at least some of the utterances spoken in the origin language; analyzing the media stream to determine a voice profile for the individual, wherein the voice profile includes characteristics of the particular voice; determining a synthesized voice for a virtual entity intended to dub the individual, wherein the synthesized voice has characteristics identical to the characteristics of the particular voice; and generating a revoiced media stream in which the translated transcript in the target language is spoken by the virtual entity.

In another embodiment, a method for artificially generating a revoiced media stream is provided. The method comprising: receiving a media stream including a plurality of first individuals speaking in a primary language and at least one second individual speaking in a secondary language; obtaining a transcript of the received media stream associated with utterances in the primary language and utterances in the secondary language; determining that dubbing of the utterances in the primary language to a target language is needed and that dubbing of the utterances in the secondary language to the target language is unneeded; analyzing the received media stream to determine a set of voice parameters for each of the plurality of first individuals; determining a voice profile for each of the plurality of first individuals based on an associated set of voice parameters; and using the determined voice profiles and a translated version of the transcript to artificially generate a revoiced media stream in which the plurality of first individuals speak the target language and the at least one second individual speaks the secondary language.

In another embodiment, a method for artificially generating a revoiced media stream is provided. The method comprising: receiving an input media stream including a first individual speaking in a first language and a second individual speaking in a second language; obtaining a transcript of the input media stream associated with utterances in the first language and utterances in the second language; analyzing the received media stream to determine a first set of voice parameters of the first individual and a second set of voice parameters of the second individual; determining a first voice profile of the first individual based on the first set of voice parameters; determining a second voice profile of the second individual based on the second set of voice parameters; and using the determined voice profiles and a translated version of the transcript to artificially generate a revoiced media stream in which both the first individual and the second individuals speak a target language.

In another embodiment, a method for artificially generating a revoiced media stream is provided. The method comprising: receiving a media stream including an individual speaking in a first language with an accent in a second language; obtaining a transcript of the received media stream associated with utterances in the first language; analyzing the received media stream to determine a set of voice parameters of the individual; determining a voice profile of the individual based on the set of voice parameters; accessing one or more databases to determine at least one factor indicative of a desired level of accent to introduce in a dubbed version of the received media stream; and using the determined voice profile, the at least one factor, and a translated version of the transcript to artificially generate a revoiced media stream in which the individual speaks the target language with an accent in the second language at the desired level.

In another embodiment, a method for artificially generating a revoiced media stream is provided. The method comprising: receiving a media stream including a first individual and a second individual speaking in at least one language; obtaining a transcript of the media stream including a first part associated with utterances spoke by the first individual and a second part associated with utterances spoke by the second individual; analyzing the media stream to determine a voice profile of at least the first individual; accessing at least one rule for revising transcripts of media streams; according to the at least one rule, automatically revising the first part of the transcript and avoid from revising the second part of the transcript; and using the determined voice profiles and the revised transcript to artificially generate a revoiced media stream in which the first individual speaks the revised first part of the transcript and the second individual speaks the second unrevised part of the transcript.

In another embodiment, a method for artificially generating a revoiced media stream is provided. The method comprising: receiving a media stream destined to a particular user, wherein the media stream includes at least one individual speaking in at least one origin language; obtaining a transcript of the media stream including utterances associated with the at least one individual; determining a user category indicative of a desired vocabulary for the particular user; revising the transcript of the media stream based on the determined user category; analyzing the media stream to determine at least one voice profile for the at least one individual; and using the determined at least one voice profile and the revised transcript to artificially generate a revoiced media stream in which the at least one individual speaks the revised transcript in a target language.

In another embodiment, a method for artificially generating a revoiced media stream is provided. The method comprising: receiving a media stream destined to a particular user, wherein the media stream includes at least one individual speaking in at least one origin language; obtaining a transcript of the media stream including utterances associated with the at least one individual; receiving an indication about preferred language characteristics for the particular user in a target language; translating the transcript of the media stream to the target language based on the preferred language characteristics; analyzing the media stream to determine at least one voice profile for the at least one individual; and using the determined at least one voice profile and the translated transcript to artificially generate a revoiced media stream in which the at least one individual speaks the translated transcript in the target language.

In another embodiment, a method for artificially generating a revoiced media stream is provided. The method comprising: receiving a media stream destined to a particular user, wherein the media stream includes at least one individual speaking in at least one origin language; obtaining a transcript of the media stream including utterances associated with the at least one individual; accessing one or more databases to determine a preferred target language for the particular user; translating the transcript of the media stream to the preferred target language; analyzing the media stream to determine at least one voice profile for the at least one individual; and using the determined at least one voice profile and the translated transcript to artificially generate a revoiced media stream in which the translated transcript is spoken by the at least one individual in the preferred target language.

In another embodiment, a method for artificially generating a revoiced media stream is provided. The method comprising: receiving a media stream including at least one individual speaking in at least one origin language; obtaining a transcript of the media stream including utterances associated with the at least one individual; analyzing the transcript to determine a set of language characteristics for the least one individual; translating the transcript of the media stream to a target language based on the determined set of language characteristics; analyzing the media stream to determine at least one voice profile for the at least one individual; and using the determined at least one voice profile and the translated transcript to artificially generate a revoiced media stream in which the at least one individual speaks the translated transcript in the target language.

In another embodiment, a method for artificially generating a revoiced media stream is provided. The method comprising: receiving a media stream including at least one individual speaking in an origin language, wherein the media stream is associated with a transcript in the origin language; obtaining an indication that the media stream is to be revoiced to a target language; analyzing the transcript to determine that the at least one individual in the received media stream discussed a subject likely to be unfamiliar with users associated with the target language; determine an explanation designed for users associated with the target language to the subject discussed by the at least one individual in the origin language; analyzing the media stream to determine at least one voice profile for the at least one individual; and using the determined at least one voice profile and a translated version of the transcript to artificially generate a revoiced media stream in which the at least one individual speaks in the target language, wherein the revoiced media stream provides the determined explanation to the subject discussed by the at least one individual in the origin language.

In another embodiment, a method for artificially generating a revoiced media stream is provided. The method comprising: receiving a media stream destined to a particular user and a transcript of the media stream, wherein the media stream includes at least one individual speaking in an origin language; use information about the particular user to determine that the media stream needs to be revoiced to a target language; analyzing the transcript to determine that the at least one individual in the received media stream discussed a subject likely to be unfamiliar with the particular user; determine an explanation designed for the particular user to the subject discussed by the at least one individual in the origin language; analyzing the media stream to determine at least one voice profile for the at least one individual; and using the determined at least one voice profile and a translated version of the transcript to artificially generate a revoiced media stream for the particular user in which the at least one individual speaks in the target language, wherein the revoiced media stream provides the determined explanation to the subject discussed by the at least one individual in the origin language.

In another embodiment, a method for artificially generating a revoiced media stream is provided. The method comprising: receiving a media stream including a plurality of individuals speaking in an origin language, wherein the media stream is associated with a transcript in the origin language; obtaining an indication that the media stream is to be revoiced to a target language; analyzing the transcript to determine that an original name of a character in the received media stream is likely to cause antagonism with users that speak the target language; translating the transcript to the target language using a substitute name for the character; analyzing the media stream to determine a voice profile for each of the plurality of individuals; and using the determined voice profiles and the translated transcript to artificially generate a revoiced media stream in which the plurality of individuals speak in the target language and the character is named the substitute name.

In another embodiment, a method for artificially generating a revoiced media stream is provided. The method comprising: receiving a media stream including at least one individual speaking in an origin language; obtaining a transcript of the media stream including utterances spoke in the origin language; determining that the transcript includes a first utterance that rhymes with a second utterance; translating the transcript of the media stream to a target language in a manner that at least partially preserves the rhymes of the transcript in the origin language; analyzing the media stream to determine at least one voice profile for the at least one individual; and using the determined at least one voice profile and the translated transcript to artificially generate a revoiced media stream in which the at least one individual speaks the translated transcript that includes rhymes in the target language.

In another embodiment, a method for artificially generating a revoiced media stream is provided. The method comprising: receiving a media stream including an individual speaking in an origin language; obtaining a transcript of the media stream including a first utterance and a second utterance spoke in the original language; translating the transcript of the media stream to a target language, wherein the translated transcript includes a first set of words in the target language that corresponds with the first utterance and a second set of words in the target language that corresponds with the second utterance; analyzing the media stream to determine a voice profile for the individual, wherein the voice profile is indicative of a ratio of volume levels between the first and second utterances as they were spoken in the media stream; determining metadata information for the translated transcript, wherein the metadata information includes desired volume levels for each of the first and second sets of words that correspond with the first and second utterances; and using the determined voice profile, the translated transcript, and the metadata information to artificially generate a revoiced media stream in which the individual speaks the translated transcript, wherein a ratio of the volume levels between the first and second sets of words in the revoiced media stream is substantially identical to the ratio of volume levels between the first and second utterances in the received media stream.

In another embodiment, a method for artificially generating a revoiced media stream is provided. The method comprising: receiving a media stream including a first individual and a second individual speaking in at least one origin language; obtaining a transcript of the media stream including a first utterance spoken by the first individual and a second utterance spoken by the second individual; translating the transcript of the media stream to a target language, wherein the translated transcript includes a first set of words in the target language that corresponds with the first utterance and a second set of words in the target language that corresponds with the second utterance; analyzing the media stream to determine voice profiles for the first individual and the second individual, wherein the voice profiles are indicative of a ratio of volume levels between the first and second utterances as they were spoken in the media stream; determining metadata information for the translated transcript, wherein the metadata information includes desired volume levels for each of the first and second sets of words that correspond with the first and second utterances; and using the determined voice profile, the translated transcript, and the metadata information to artificially generate a revoiced media stream in which the first and second individual speak the translated transcript, wherein a ratio of the volume levels between the first and second sets of words in the revoiced media stream is substantially identical to the ratio of volume levels between the first and second utterances in as they are recorded the received media stream.

In another embodiment, a method for artificially generating a revoiced media stream is provided. The method comprising: receiving a media stream including an individual speaking in an origin language and sounds from a sound-emanating object; obtaining a transcript of the media stream including utterances spoke in the original language; translating the transcript of the media stream to a target language; analyzing the media stream to determine a voice profile for the individual and an audio profile for the sound-emanating object; determining auditory relationship between the individual and the sound-emanating object based on the voice profile and the audio profile, wherein the auditory relationship is indicative of a ratio of volume levels between utterances spoken by the individual in the original language and sounds from the sound-emanating object as they are recorded in the media stream; and using the determined voice profile, the translated transcript, and the auditory relationship to artificially generate a revoiced media stream in which the individual speaks the translated transcript, wherein a ratio of the volume levels between utterances spoken by the individual in the target language and sounds from the sound-emanating object substantially identical to the ratio of volume levels between utterances spoken in the original language and sounds from the sound-emanating object as they are recorded in the media stream.

In another embodiment, a method for artificially generating a revoiced media stream is provided. The method comprising: receiving a media stream including at least one individual speaking in an origin language; obtaining a transcript of the media stream including utterances spoke in the origin language; analyzing the media stream to determine metadata information corresponding with the transcript of the media stream, wherein the metadata information includes timing data for the utterances and for the gaps between the utterances in the media stream; determining timing differences between the original language and the target language, wherein the timing differences represent time discrepancy between saying the utterances in a target language and saying the utterances in the original language; determining at least one voice profile for the at least one individual; and using the determined at least one voice profile, a translated version of the transcript, and the metadata information to artificially generate a revoiced media stream in which the at least one individual speaks in the target language in a manner than accounts for the determined timing differences between the original language and the target language.

In another embodiment, a method for artificially generating a revoiced media stream is provided. The method comprising: receiving a media stream including at least one individual speaking in an origin language; obtaining a transcript of the media stream including utterances spoke in the origin language; translating the transcript of the media stream to a target language; analyzing the media stream to determine a set of voice parameters of the at least one individual and visual data; based on the set of voice parameters and the visual data, determining at least one voice profile for the at least one individual; and using the determined at least one voice profile and the translated transcript to artificially generate a revoiced media stream in which the at least one individual speaks in the target language.

In another embodiment, a method for artificially generating a revoiced media stream is provided. The method comprising: receiving a media stream including at least one individual speaking in an origin language; obtaining a transcript of the media stream including utterances spoke in the origin language; analyzing the media stream to determine a set of voice parameters of the at least one individual and visual data; using the visual data to translate the transcript of the media stream to a target language; determining at least one voice profile for the at least one individual; and using the determined at least one voice profile and the translated transcript to artificially generate a revoiced media stream in which the at least one individual speaks in the target language.

In another embodiment, a method for artificially generating a revoiced media stream is provided. The method comprising: receiving a media stream including at least one individual speaking in at least one origin language; obtaining a transcript of the media stream including utterances spoke in the at least one origin language; translating the transcript of the media stream to a target language; analyzing the media stream to determine a set of voice parameters of the at least one individual and visual data that includes text written in the at least one origin language; determining at least one voice profile for the at least one individual based on the set of voice parameters; and using the determined at least one voice profile and the translated transcript to artificially generate a revoiced media stream in which the at least one individual speaks in the target language, wherein the revoiced media stream provides a translation to the text written in the at least one origin language.

In some embodiments, systems and methods for selective manipulation of depictions in videos are provided. In some embodiments, a video depicting at least a first item and a second item may be accessed. Further, in some examples, at least part of the video may be presented to a user. Further, in some examples, a user interface enabling the user to manipulate the video may be presented to a user. Further, in some examples, input may be received from the user. Further, in some examples, for example in response to the input received from the user, an aspect of a depiction of an item in the video may be manipulated. For example, in response to a first received input, a first aspect of a depiction of the first item in the video may be manipulated; in response to a second received input, a second aspect of a depiction of the first item in the video may be manipulated; and in response to a third received input, an aspect of a depiction of the second item in the video may be manipulated.

In some embodiments, systems and methods for selective manipulation of voices in videos are provided. In some embodiments, a video depicting at least a first person and a second person may be accessed. Further, in some examples, at least part of the video may be presented to a user. Further, in some examples, a user interface enabling the user to manipulate the video may be presented to a user. Further, in some examples, input may be received from the user. Further, in some examples, for example in response to the received input from the user, an aspect of a voice of a person in the video may be manipulated. For example, in response to a first received input, an aspect of a voice of the first person in the video may be manipulated; and in response to a second received input, an aspect of a voice of the second person in the video may be manipulated.

In some embodiments, systems and methods for selective presentation of videos with manipulated depictions of items are provided. In some embodiments, a video depicting at least a first item and a second item may be accessed. Further, in some examples, at least part of the video may be presented to a user. Further, in some examples, a user interface enabling the user to select a manipulation of the video. Further, in some examples, input may be received from the user. Further, in some examples, for example in response to the received input from the user, a manipulated version of the video with a manipulation to an aspect of a depiction of an item in the video may be presented to the user. For example, in response to a first received input, a manipulated version of the video with a manipulation to a first aspect of a depiction of the first item in the video may be presented to the user; in response to a second received input, a manipulated version of the video with a manipulation to a second aspect of a depiction of the first item in the video may be presented to the user; and in response to a third received input, a manipulated version of the video with a manipulation to an aspect of a depiction of the second item in the video may be presented to the user.

In some embodiments, systems and methods for selective presentation of videos with manipulated voices are provided. In some embodiments, a video depicting at least a first person and a second person may be accessed. Further, in some examples, at least part of the video may be presented to a user. Further, in some examples, a user interface enabling the user to select a manipulation of voices in the video may be presented to a user. Further, in some examples, input may be received from the user. Further, in some examples, for example in response to the received input from the user, a manipulated version of the video with a manipulation to an aspect of a voice of a person in the video may be presented to the user. For example, in response to a first received input, a manipulated version of the video with a manipulation to an aspect of a voice of the first person in the video may be presented to the user; and in response to a second received input, a manipulated version of the video with a manipulation to an aspect of a voice of the second person in the video may be presented to the user.

In some embodiments, methods and systems for generating videos with personalized avatars are provided. In some embodiments, input video including at least a depiction of a person may be obtained. Further, a personalized profile associated with a user may be obtained. The personalized profile may be used to select at least one characteristic of an avatar. Further, an output video may be generated using the selected at least one characteristic of an avatar by replacing at least part of the depiction of the person in the input video with a depiction of an avatar, wherein the depiction of the avatar is according to the selected at least one characteristic. For example, the user may be a photographer of at least part of the input video, may be an editor of at least part of the input video, may be a photographer that captured the input video, and so forth.

In some embodiments, systems and methods for generating personalized videos with selective replacement of characters with avatars are provided. In some embodiments, input video including at least a depiction of two or more persons may be obtained. Moreover, a personalized profile associated with a user may be obtained. The input video may be analyzed to determine at least one property for each person of a group of at least two persons comprising at least part of the two or more persons depicted in the input video. The personalized profile and/or the determined properties may be used to select a first person of the group of at least two persons, where the group of at least two persons may also include a second person. Further, in response to the selection of the first person, the input video may be used to generate an output video including the depiction of the second person and a depiction of an avatar replacing at least part of the depiction of the first person. For example, the user may be a prospective viewer of the output video, may be a photographer of at least part of the input video, may be an editor of at least part of the input video, and so forth.

In some embodiments, systems and methods for generating personalized videos with selective replacement of text are provided. In some embodiments, input video including at least a depiction of a text may be obtained. Further, a personalized profile associated with a user may be obtained. The input video may be analyzed to determine at least one property of the depiction of the text. Further, the personalized profile and/or the at least one property of the depiction of the text may be used to modify the text in the input video and generate an output video. For example, the user may be a prospective viewer of the output video, may be a photographer of at least part of the input video, may be an editor of at least part of the input video, and so forth.

In some embodiments, systems and methods for generating personalized videos with selective background modification are provided. In some embodiments, input video including at least a background may be obtained. Further, a personalized profile associated with a user may be obtained. Further, the input video may be analyzed to identify a portion of the input video depicting the background. Further, the personalized profile may be used to select a modification of the background. Further, the selected modification of the background and/or the identified portion of the input video may be used to modify a depiction of the background in the input video to generate an output video. For example, the user may be a prospective viewer of the output video, may be a photographer of at least part of the input video, may be an editor of at least part of the input video, and so forth.

In some embodiments, systems and methods for generating personalized videos with selective modifications are presented. In some embodiments, input video including two or more parts of frame may be obtained. Further, in some examples, personalized profile associated with a user may be obtained. Further, in some examples, the input video may be analyzed to determine at least one property of each part of frame of a group of at least two parts of frame comprising the two or more parts of frame. Further, in some examples, the personalized profile and/or the determined properties may be used to select a first part of frame of the group of at least two parts of frame, where the group of at least two parts of frame also includes a second part of frame. Further, in some examples, the personalized profile may be used to generate a modified version of a depiction from the first part of frame from the input video. Further, in some examples, in response to the selection of the first part of frame, an output video including an original depiction from the second part of frame from the input video and the generated modified version from the depiction of the first part of frame may be generated. For example, the user may be a prospective viewer of the output video, may be a photographer of at least part of the input video, may be an editor of at least part of the input video, and so forth.

In some embodiments, systems and methods for selectively removing people from videos are provided. In some embodiments, input video including at least a depiction of a first person and a depiction of a second person may be obtained. Further, in some examples, the input video may be analyzed to identify the first person and the second person. Further, in some examples, one person may be selected of the first person and the second person, for example based on the identity of the first person and the identity of the second person. Further, in some examples, for example in response to the selection of the one person, an output video including a depiction of the person not selected of the first person and the second person and not including a depiction of the selected person may be generated.

In some embodiments, systems and methods for selectively removing objects from videos are provided. In some embodiments, input video including at least a depiction of a first object and a depiction of a second object may be obtained. Further, in some examples, the input video may be analyzed to identify the first object and the second object. Further, in some examples, one object may be selected of the first object and the second object, for example based on the identity of the first object and the identity of the second object. Further, in some examples, an output video including a depiction of the object not selected of the first object and the second object and not including a depiction of the selected object may be generated, for example in response to the selection of the one object.

In some embodiments, systems and methods for generating personalized videos from textual information are provided. In some embodiments, textual information may be obtained. Further, in some examples, a personalized profile associated with a user may be obtained. Further, in some examples, the personalized profile may be used to select at least one characteristic of a character. Further, in some examples, the textual information may be used to generate an output video using the selected at least one characteristic of the character. For example, the user may be a prospective viewer of the output video, may be a photographer of at least part of the input video, may be an editor of at least part of the input video, and so forth.

In some embodiments, systems and methods for generating personalized weather forecast videos are provided. In some embodiments, a weather forecast may be obtained. Further, in some examples, a personalized profile associated with a user may be obtained. Further, in some examples, the personalized profile may be used to select at least one characteristic of a character. Further, in some examples, the personalized profile and/or the weather forecast may be used to generate a personalized script related to the weather forecast. Further, in some examples, the selected at least one characteristic of a character and/or the generated personalized script may be used to generate an output video of the character presenting the generated personalized script. For example, the user may be a prospective viewer of the output video, may be a photographer of at least part of an input video, may be an editor of at least part of the output video, and so forth.

In some embodiments, systems and methods for generating personalized news videos are provided. In some embodiments, news information may be obtained. Further, in some examples, a personalized profile associated with a user may be obtained. Further, in some examples, the personalized profile may be used to select at least one characteristic of a character. Further, in some examples, the personalized profile and/or the news information may be used to generate a personalized script related to the news information. Further, in some examples, the selected at least one characteristic of a character and/or the generated personalized script may be used to generate an output video of the character presenting the generated personalized script. For example, the user may be a prospective viewer of the output video, may be a photographer of at least part of an input video, may be an editor of at least part of the output video, and so forth.

In some embodiments, systems and methods for generating videos with a character indicating a region of an image are provided. In some embodiments, an image containing a first region of the image may be obtained. Further, in some examples, at least one characteristic of a character may be obtained. Further, in some examples, a script containing a first segment of the script may be obtained, and the first segment of the script may be related to the first region of the image. Further, in some examples, the selected at least one characteristic of a character and/or the script may be used to generate an output video of the character presenting the script and at least part of the image, where the character visually indicates the first region of the image while presenting the first segment of the script.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 4B is a flowchart of an example method for artificial translation and dubbing, in accordance with some embodiments of the disclosure.

FIG. 7A is a flowchart of an example method for dubbing a media stream using synthesized voice, in accordance with some embodiments of the disclosure.

FIG. 7C is a flowchart of an example method for causing presentation of a revoiced media steam associated with a selected target language, in accordance with some embodiments of the disclosure.

FIG. 8A is a flowchart of an example method for selectively selecting the language to dub in a media stream, in accordance with some embodiments of the disclosure.

FIG. 9A is a flowchart of an example method for revoicing a media stream with multiple languages, in accordance with some embodiments of the disclosure.

FIG. 10A is a flowchart of an example method for artificially generating an accent sensitive revoiced media stream, in accordance with some embodiments of the disclosure.

FIG. 11A is a flowchart of an example method for automatically revising a transcript of a media stream, in accordance with some embodiments of the disclosure.

FIG. 12A is a flowchart of an example method for revising a transcript of a media stream based on user category, in accordance with some embodiments of the disclosure.

FIG. 13A is a flowchart of an example method for translating a transcript of a media stream based on user preferences, in accordance with some embodiments of the disclosure.

FIG. 14A is a flowchart of an example method for automatically selecting the target language for a revoiced media stream, in accordance with some embodiments of the disclosure.

FIG. 15A is a flowchart of an example method for translating a transcript of a media stream based on language characteristics, in accordance with some embodiments of the disclosure.

FIG. 17A is a flowchart of an example method for providing explanations in revoiced media streams based on user profile, in accordance with some embodiments of the disclosure.

FIG. 18A is a flowchart of an example method for renaming characters in revoiced media streams, in accordance with some embodiments of the disclosure.

FIG. 20A is a flowchart of an example method for maintaining original volume changes of a character in revoiced media stream, in accordance with some embodiments of the disclosure.

FIG. 21*a* is a flowchart of an example method for maintaining original volume differences between characters in revoiced media stream, in accordance with some embodiments of the disclosure.

FIG. 22A is a flowchart of an example method for maintaining original volume differences between characters and background noises in revoiced media stream, in accordance with some embodiments of the disclosure.

FIG. 23A is a flowchart of an example method for accounting for timing differences between the original language and the target language, in accordance with some embodiments of the disclosure.

FIG. 24A is a flowchart of an example method for using visual data from media stream to determine the voice profile of the individual in the media stream, in accordance with some embodiments of the disclosure.

FIG. 25A is a flowchart of an example method for using visual data from media stream to translate the transcript to a target language, in accordance with some embodiments of the disclosure.

FIG. 26A is a flowchart of an example method for using visual data from media stream to translate the transcript to a target language, in accordance with some embodiments of the disclosure.

DETAILED DESCRIPTION

Figure 1A:
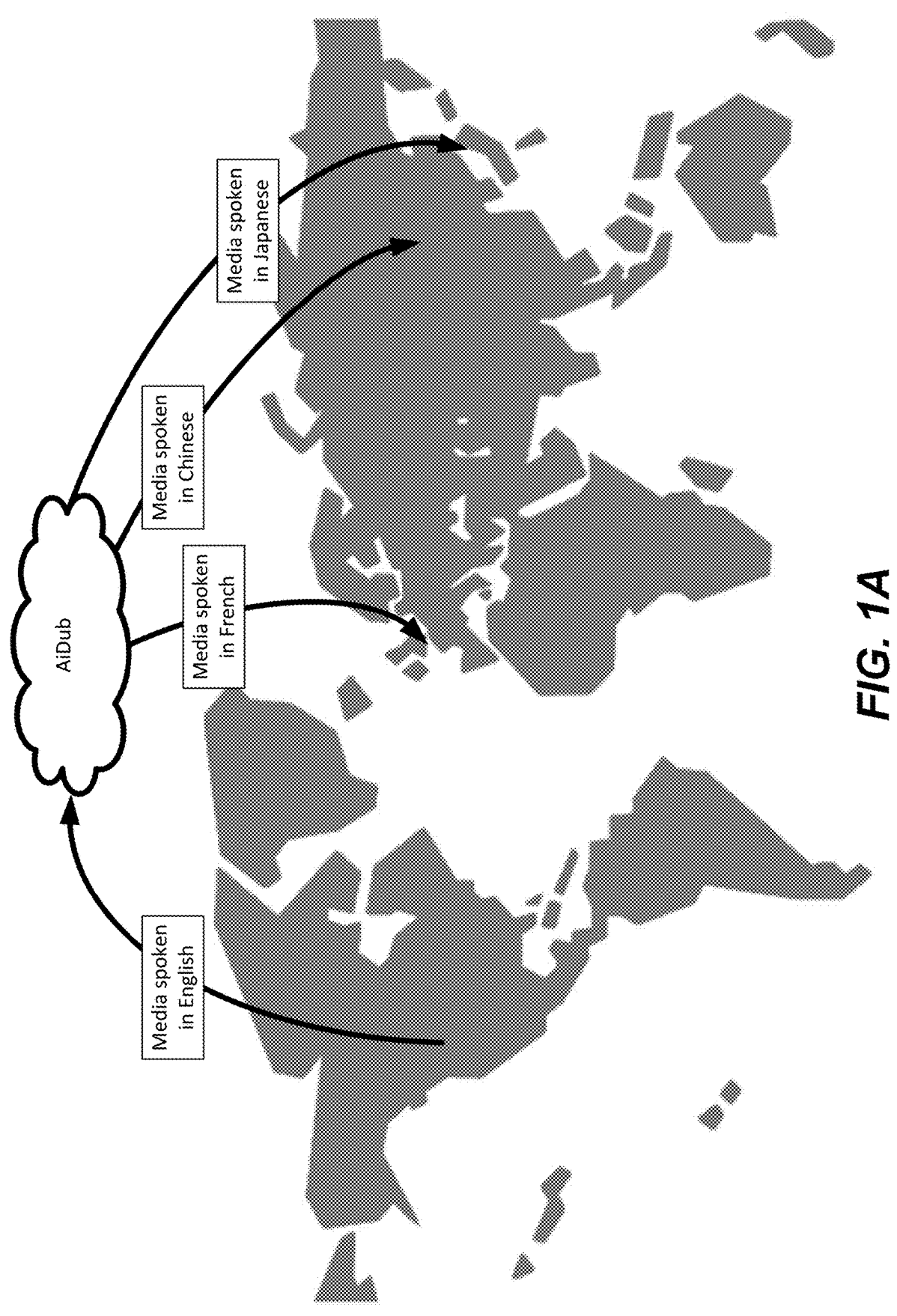
FIG. 1A is a diagram illustrating an example implementation of the first aspect of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples, but is inclusive of general principles described herein in addition to the general principles encompassed by the appended claims.

It is to be understood that whenever data (such as audio data, speech data, etc.) or stream (such as an audio stream) is said to include speech, the data or stream may additionally or alternatively encode the speech or include information that enables a synthesis of the speech. It is to be understood that any discussion of at least one of image, image data, images, video, video data, videos, visual data, and so forth, is not specific limited to the discussed example and may also apply to any one of image, image data, images, video, video data, videos, and visual data, unless specifically stated otherwise.

One aspect of the present disclosure describes methods and systems for dubbing a media stream with voices generated using artificial intelligence technology. FIG. 1A depicts an example implementation of one aspect of the present disclosure. As illustrated, an English media stream generated in the United States may be uploaded to the cloud and thereafter, provided to users in France, China, and Japan in their native language. As a person skilled in the art would recognize, the methods and systems described below may be used for dubbing any type of media stream from any origin language to any target language.

Figure 1B:
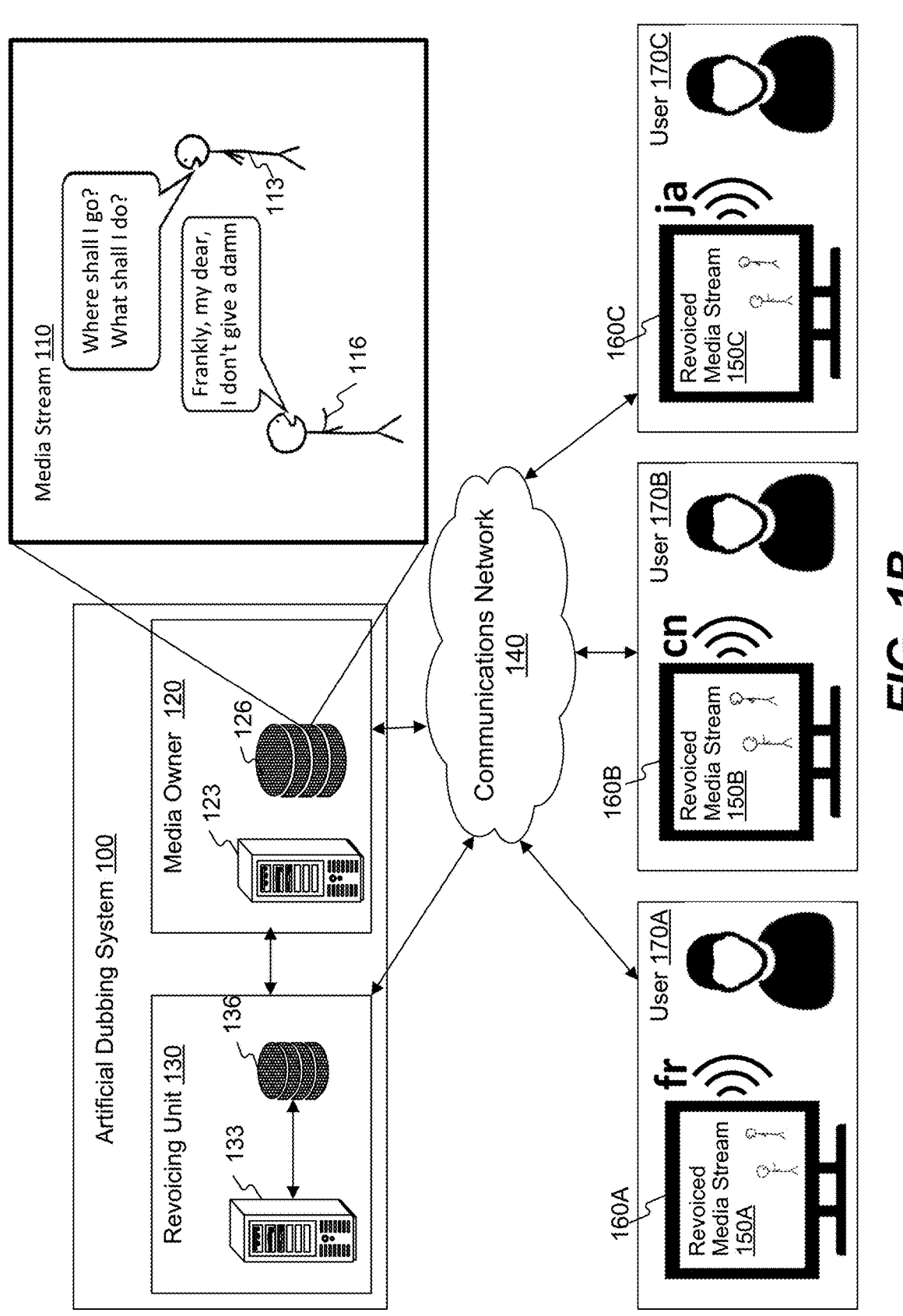
FIG. 1B is a diagram illustrating an artificial dubbing system, in accordance with some embodiments of the present disclosure.

Reference is now made to FIG. 1B, which shows an example of an artificial dubbing system 100 that receives a media stream in a first language, determines one or more voice profiles associated with speakers in the media stream, and outputs a media stream in a second language. System 100 may be computer-based and may include computer system components, desktop computers, workstations, tablets, handheld computing devices, memory devices, and/or internal network(s) connecting the components. System 100 may include or be connected to various network computing resources (e.g., servers, routers, switches, network connections, storage devices, etc.) for supporting services provided by system 100.

Consistent with the present disclosure, system 100 may enable dubbing a media stream 110 to one or more target languages without using human recordings in the target language. In the depicted example, the origin language of media stream 110 is English. System 100 may include a media owner 120 communicating with a revoicing unit 130 over communications network 140 that facilitates communications and data exchange between different system components and the different entities associated with system 100. In one embodiment, revoicing unit 130 may generate revoiced media streams 150 in different languages to be played by a plurality of communications devices 160 (e.g., 160A, 160B, and 160C) associated with different users 170 (e.g., 170A, 170B, and 170C). For example, a revoiced media stream 150A may be a French dubbed version of media stream 110, a revoiced media stream 150B may be a Chinese dubbed version of media stream 110, and a revoiced media stream 150C may be a Japanese dubbed version of media stream 110. In another embodiment, revoicing unit 130 may provide revoiced audio streams to media owner 120, and thereafter media owner 120 may generate the revoiced media streams to be provided to users 170.

Consistent with the present disclosure, system 100 may cause dubbing of a media stream (e.g., media stream 110) from an origin language to one or more target languages. The term "media stream" refers to digital data that includes video frames, audio frames, multimedia, or any combination thereof. The media stream may be transmitted over communications network 140. In general, the media stream may include content, such as user-generated content (e.g., content that a user captures using a media capturing device such as a smart phone or a digital camera) as well as industry-generated media (e.g., content generated by professional studios or semi-professional content creators). Examples of media streams may include video streams such as camera-recorded streams, audio streams such as microphone-recorded streams, and multimedia streams comprising different types of media streams. In one embodiment, media stream 110 may include one or more individuals (e.g., individual 113 and individual 116) speaking in the origin language. The term "origin language" or "first language" refers to the primary language spoken in a media stream (e.g., media stream 110). Typically, the first language would be the language originally recoded when the media stream was created. The term "target language" or "second language" refers to the primary language spoken in revoiced media stream 150. In some specific cases discussed below, the target language may be the origin language.

In some embodiments, media stream 110 may be managed by media owner 120. Specifically, media owner 120 may be associated with a server 123 coupled to one or more physical or virtual storage devices such as a data structure 126. Media stream 110 may be stored in data structure 126 and may be accessed using server 123. The term "media owner" may refer to any person, entity, or organization and such that has rights for media stream 110 by creating the media stream or by licensing the media stream. Alternatively, a media owner may refer to any person, entity, or organization that has unrestricted access to the media stream. Examples of media owners may include, film studios and production companies, media-services providers, companies that provide video-sharing platform, and personal users. Consistent with the present disclosure, server 123 may access data structure 126 to determine, for example, the original language of media stream 110. Data structures 126 may utilize a volatile or non-volatile, magnetic, semiconductor, tape, optical, removable, non-removable, other type of storage device or tangible or non-transitory computer-readable medium, or any medium or mechanism for storing information. Data structure 126 (and data structure 136 mutatis mutandis) may be part of server 123 or separate from server 123 as shown. When data structure 126 is not part of server 123, server 123 may exchange data with data structure 126 via a communication link. Data structure 126 may include one or more memory devices that store data and instructions used to perform one or more features of the disclosed embodiments. In one embodiment, data structure 126 may include any of a plurality of suitable data structures, ranging from small data structures hosted on a workstation to large data structures distributed among data centers. Data structure 126 may also include any combination of one or more data structures controlled by memory controller devices (e.g., server(s), etc.) or software.

In some embodiments, media owner 120 may transmit media stream 110 to revoicing unit 130. Revoicing unit 130 may include a server 133 coupled to one or more physical or virtual storage devices such as a data structure 136. Initially, revoicing unit 130 may determine a voice profile for each individual speaking on media stream 110. Revoicing unit

130 may also obtain a translation of the transcript of the media stream in a target language. Thereafter, revoicing unit 130 may use the translated transcript and the voice profile to generate an output audio stream. Specifically, revoicing unit 130 may output an audio stream that sounds as if individuals 113 and individual 116 are speaking in the target language. The output audio stream may be used to generate revoiced media stream 150. In some embodiments, revoicing unit 130 may be part of the system of media owner 120. In other embodiments, revoicing unit 130 may be separated from the system of media owner 120. Additional details on the operation of revoicing unit 130 are discussed below in detail with reference to FIG. 3 and FIG. 4A.

According to embodiments of the present disclosure, communications network 140 may be any type of network (including infrastructure) that supports exchanges of information, and/or facilitates the exchange of information between the components of system 100. For example, communications network 140 may include or be part of the Internet, a Local Area Network, wireless network (e.g., a Wi-Fi/302.11 network), or other suitable connections. In other embodiments, one or more components of system 100 may communicate directly through dedicated communication links, such as, for example, a telephone network, an extranet, an intranet, the Internet, satellite communications, off-line communications, wireless communications, transponder communications, a local area network (LAN), a wide area network (WAN), a virtual private network (VPN), or any other mechanism or combinations of mechanism that enable data transmission.

According to embodiments of the present disclosure, revoiced media stream 150 may be played on a communications device 160. The term "communications device" is intended to include all possible types of devices capable of receiving and playing different types of media streams. In some examples, the communication device may include a set-top box, a television, a smartphone, a tablet, a desktop, a laptop, an IoT device, and any other device that enables user 170 to consume the original media stream in the target language.

The components and arrangements of system 100 shown in FIG. 1B are intended to be exemplary only and are not intended to limit the disclosed embodiments, as the system components used to implement the disclosed processes and features may vary.

Communications device 160 includes a memory interface 202, one or more processors 204 such as data processors, image processors and/or central processing units and a peripherals interface 206. Memory interface 202, one or more processors 204, and/or peripherals interface 206 can be separate components or can be integrated in one or more integrated circuits. The various components in communications device 160 may be coupled by one or more communication buses or signal lines.

Sensors, devices, and subsystems can be coupled to peripherals interface 206 to facilitate multiple functionalities. For example, a motion sensor 210, a light sensor 212, and a proximity sensor 214 may be coupled to peripherals interface 206 to facilitate orientation, lighting, and proximity functions. Other sensors 216 may also be connected to peripherals interface 206, such as a positioning system (e.g., GPS receiver), a temperature sensor, a biometric sensor, or other sensing device to facilitate related functionalities. A GPS receiver may be integrated with, or connected to, communications device 160. For example, a GPS receiver may be included in mobile telephones, such as smartphone devices. GPS software may allow mobile telephones to use an internal or external GPS receiver (e.g., connecting via a serial port or Bluetooth). Input from the GPS receiver may be used to determine the target language. A camera subsystem 220 and an optical sensor 222, e.g., a charged coupled device ("CCD") or a complementary metal-oxide semiconductor ("CMOS") optical sensor, may be used to facilitate camera functions, such as recording photographs and video streams.

Communication functions may be facilitated through one or more wireless/wired communication subsystems 224, which includes an Ethernet port, radio frequency receivers and transmitters and/or optical (e.g., infrared) receivers and transmitters. The specific design and implementation of wireless/wired communication subsystem 224 may depend on the communication networks over which communications device 160 is intended to operate (e.g., communications network 140). For example, in some embodiments, communications device 160 may include wireless/wired communication subsystems 224 designed to operate over a GSM network, a GPRS network, an EDGE network, a Wi-Fi or WiMax network, and a Bluetooth® network. An audio subsystem 226 may be coupled to a speaker 228 and a microphone 230 to facilitate voice-enabled functions, such as voice recognition, voice replication, digital recording, and telephony functions. In some embodiments, microphone 230 may be used to record an audio stream in a first language and speaker 228 may be configured to output a dubbed version of the captured audio stream in a second language.

Figure 2:
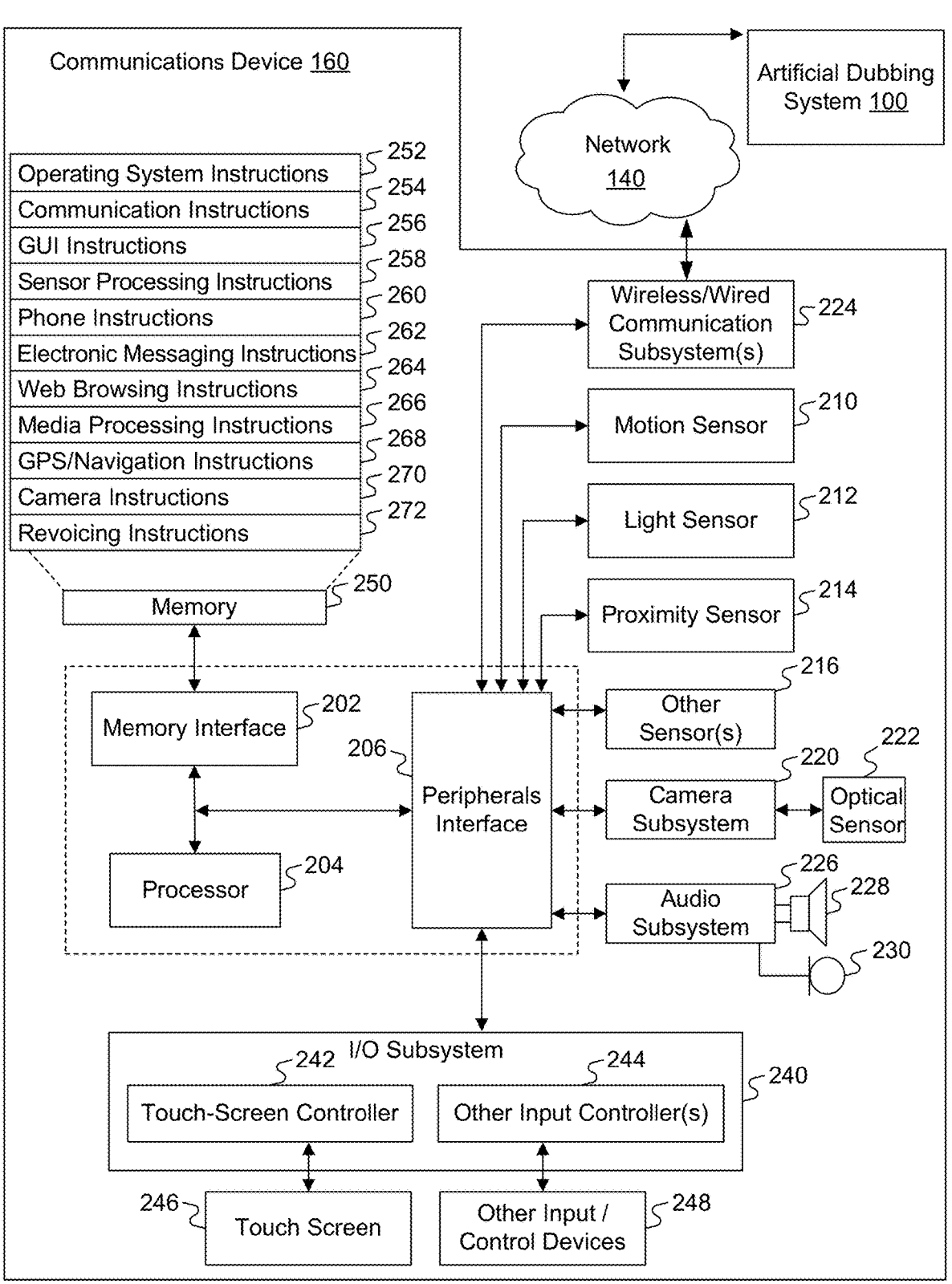
FIG. 2 is a diagram illustrating the components of an example communications device associated with an artificial dubbing system, in accordance with some embodiments of the present disclosure.

I/O subsystem 240 may include touch screen controller 242 and/or other controller(s) 244. Touch screen controller 242 may be coupled to touch screen 246. Touch screen 246 and touch screen controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 246. While touch screen 246 is shown in FIG. 2, I/O subsystem 240 may include a display screen (e.g., CRT or LCD) in place of touch screen 246.

Other input controller(s) 244 may be coupled to other input/control devices 248, such as one or more buttons, rocker switches, thumb-wheel, infrared port, USB port, and/or a pointer device such as a stylus. Touch screen 246 may, for example, also be used to implement virtual or soft buttons and/or a keyboard.

Memory interface 202 may be coupled to memory 250. Memory 250 includes high-speed random access memory and/or non-volatile memory, such as one or more magnetic disk storage devices, one or more optical storage devices, and/or flash memory (e.g., NAND, NOR). Memory 250 may store an operating system 252, such as DRAWIN, RTXC, LINUX, iOS, UNIX, OS X, WINDOWS, or an embedded operating system such as VXWorkS. Operating system 252 may include instructions for handling basic system services and for performing hardware dependent tasks. In some implementations, operating system 252 can be a kernel (e.g., UNIX kernel).

Memory 250 may also store communication instructions 254 to facilitate communicating with one or more additional devices, one or more computers and/or one or more servers. Memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; and/or camera instructions 270 to facilitate camera-related processes and functions.

Memory 250 may also store revoicing instructions 272 to facilitate artificial dubbing of a media stream (e.g. an audio stream in a first language captured by microphone 230). In some embodiments, graphical user interface instructions 256 may include a software program that facilitates user 170 to capture a media stream, select a target language, provide user input, and so on. Revoicing instructions 272 may cause processor 204 to generate a revoiced media stream in a second language. In other embodiments, communication instructions 254 may include software applications to facilitate connection with a server that provides a revoiced media stream 150. For example, user 170 may browse a streaming service and select for a first program a first target language and for a second program a second target language. Each of the above identified instructions and applications may correspond to a set of instructions for performing one or more functions described above. These instructions need not be implemented as separate software programs, procedures, or modules. Memory 250 may include additional instructions or fewer instructions. Furthermore, various functions of may be implemented in hardware and/or in software, including in one or more signal processing and/or application specific integrated circuits.

In FIG. 2, communications device 160 is illustrated as a smartphone. However, as will be appreciated by a person skilled in the art having the benefit of this disclosure, numerous variations and/or modifications may be made to communications device 160. Not all components are essential for the operating communications device 160 according to the present disclosure. Moreover, the depicted components of communications device 160 may be rearranged into a variety of configurations while providing the functionality of the disclosed embodiments. Therefore, the foregoing configuration is to be considered solely as an example, and communications device 160 may be any type of device configured to play a revoiced media stream. For example, a TV set, a smart headphone, and any other device with a speaker (e.g., speaker 228).

Figure 3:
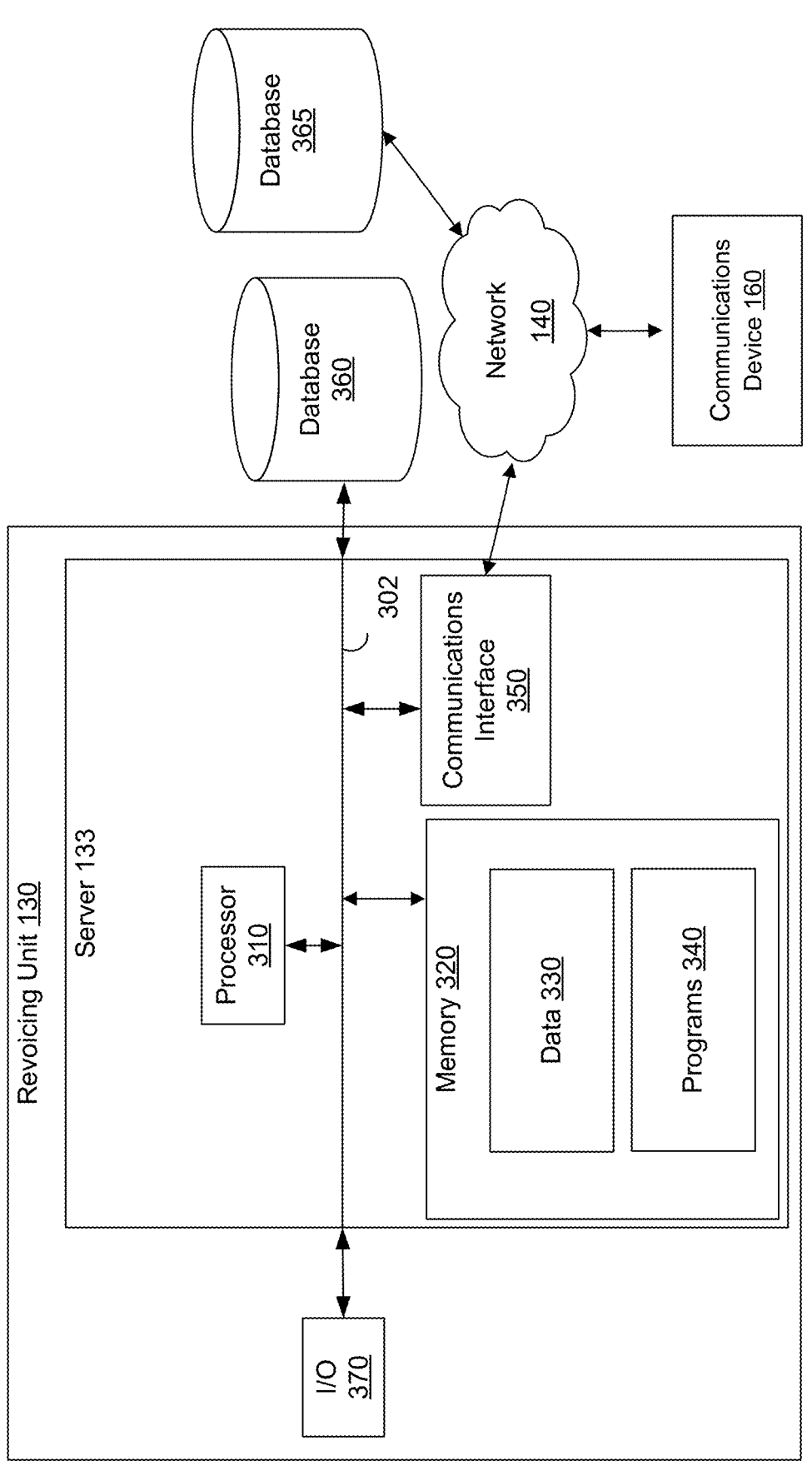
FIG. 3 is a diagram illustrating the components of an example server associated with an artificial dubbing system, in accordance with some embodiments of the present disclosure.

FIG. 3 is a diagram illustrating the components of an example revoicing unit 130 associated with artificial dubbing system 100, in accordance with some embodiments of the present disclosure. As depicted in FIG. 1B, revoicing unit 130 may include server 133 and data structure 136. Server 133 may include a bus 302 (or other communication mechanism), which interconnects subsystems and components for transferring information within server 133. Revoicing unit 130 may also include one or more processors 310, one or more memories 320 storing programs 340 and data 330, and a communications interface 350 (e.g., a modem, Ethernet card, or any other interface configured to exchange data with a network, such as communications network 140 in FIG. 1B) for transmitting revoiced media streams 150 to communications device 160. Revoicing unit 130 may communicate with an external database 360 (which, for some embodiments, may be included within revoicing unit 130), for example, to obtain a transcript of media stream 110.

In some embodiments, revoicing unit 130 may include a single server (e.g., server 133) or may be configured as a distributed computer system including multiple servers, server farms, clouds, or computers that interoperate to perform one or more of the processes and functionalities associated with the disclosed embodiments. The term "cloud server" refers to a computer platform that provides services via a network, such as the Internet. When server 133 is a cloud server it may use virtual machines that may not correspond to individual hardware. Specifically, computational and/or storage capabilities may be implemented by allocating appropriate portions of desirable computation/storage power from a scalable repository, such as a data center or a distributed computing environment.

Processor 310 may be one or more processing devices configured to perform functions of the disclosed methods, such as a microprocessor manufactured by Intel™ or manufactured by AMD™. Processor 310 may comprise a single core or multiple core processors executing parallel processes simultaneously. For example, processor 310 may be a single core processor configured with virtual processing technologies. In certain embodiments, processor 310 may use logical processors to simultaneously execute and control multiple processes. Processor 310 may implement virtual machine technologies, or other technologies to provide the ability to execute, control, run, manipulate, store, etc. multiple software processes, applications, programs, etc. In some embodiments, processor 310 may include a multiple-core processor arrangement (e.g., dual, quad core, etc.) configured to provide parallel processing functionalities to allow server 133 to execute multiple processes simultaneously. It is appreciated that other types of processor arrangements could be implemented that provide for the capabilities disclosed herein.

Server 133 may include one or more storage devices configured to store information used by processor 310 (or other components) to perform certain functions related to the disclosed embodiments. For example, server 133 may include memory 320 that includes data and instructions to enable processor 310 to execute any other type of application or software known to be available on computer systems. Memory 320 may be a volatile or non-volatile, magnetic, semiconductor, tape, optical, removable, non-removable, or other type of storage device or tangible or non-transitory computer-readable medium that stores data 330 and programs 340. Common forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Consistent with the present disclosure, memory 320 may include data 330 and programs 340. Data 330 may include media streams, reference voice samples, voice profiles, user-related information, and more. For example, the user-related information may include a preferred target language for each user. Programs 340 include operating system apps performing operating system functions when executed by one or more processors such as processor 310. By way of example, the operating system apps may include Microsoft Windows™, Unix™, Linux™ Apple™ operating systems, Personal Digital Assistant (PDA) type operating systems, such as Apple iOS, Google Android, Blackberry OS, Microsoft CE™, or other types of operating systems. Accordingly, the disclosed embodiments may operate and function with computer systems running any type of operating systems. In addition, programs 340 may include one or more software modules causing processor 310 to perform one or more functions of the disclosed embodiments. Specifically, programs 340 may include revoicing instructions. A detailed disclosure on example software modules that enable the disclosed embodiments is described below with reference to FIG. 4A, FIG. 4B and FIG. 4C.

In some embodiments, data 330 and programs 340 may be stored in an external database 360 or external storage communicatively coupled with server 133, such as one or more data structure accessible over communications network 140. Specifically, server 133 may access one or more remote programs that, when executed, perform functions related to disclosed embodiments. For example, server 133 may access a remote translation program that will translate the transcript into a target language. Database 360 or other external storage may be a volatile or non-volatile, magnetic, semiconductor, tape, optical, removable, non-removable, or other type of storage device or tangible or non-transitory computer-readable medium. Memory 320 and database 360 may include one or more memory devices that store data (e.g., media streams) and instructions used to perform one or more features of the disclosed embodiments. Memory 320 and database 360 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, server 133 may be communicatively connected to one or more remote memory devices (e.g., remote databases (not shown)) through communications network 140 or a different network. The remote memory devices can be configured to store data (e.g., media streams) that server 133 can access and/or obtain. By way of example, the remote memory devices may include document management systems, Microsoft SQL database, SharePoint databases, Oracle™ databases, Sybase™ databases, or other relational databases. Systems and methods consistent with disclosed embodiments, however, are not limited to separate databases or even to the use of a database.

Revoicing unit 130 may also include one or more I/O devices 370 having one or more interfaces for receiving signals or input from devices and providing signals or output to one or more devices that allow data to be received and/or transmitted by revoicing unit 130. For example, revoicing unit 130 may include interface components for interfacing with one or more input devices, such as one or more keyboards, mouse devices, and the like, that enable revoicing unit 130 to receive input from an operator or administrator (not shown).

Figure 4A:
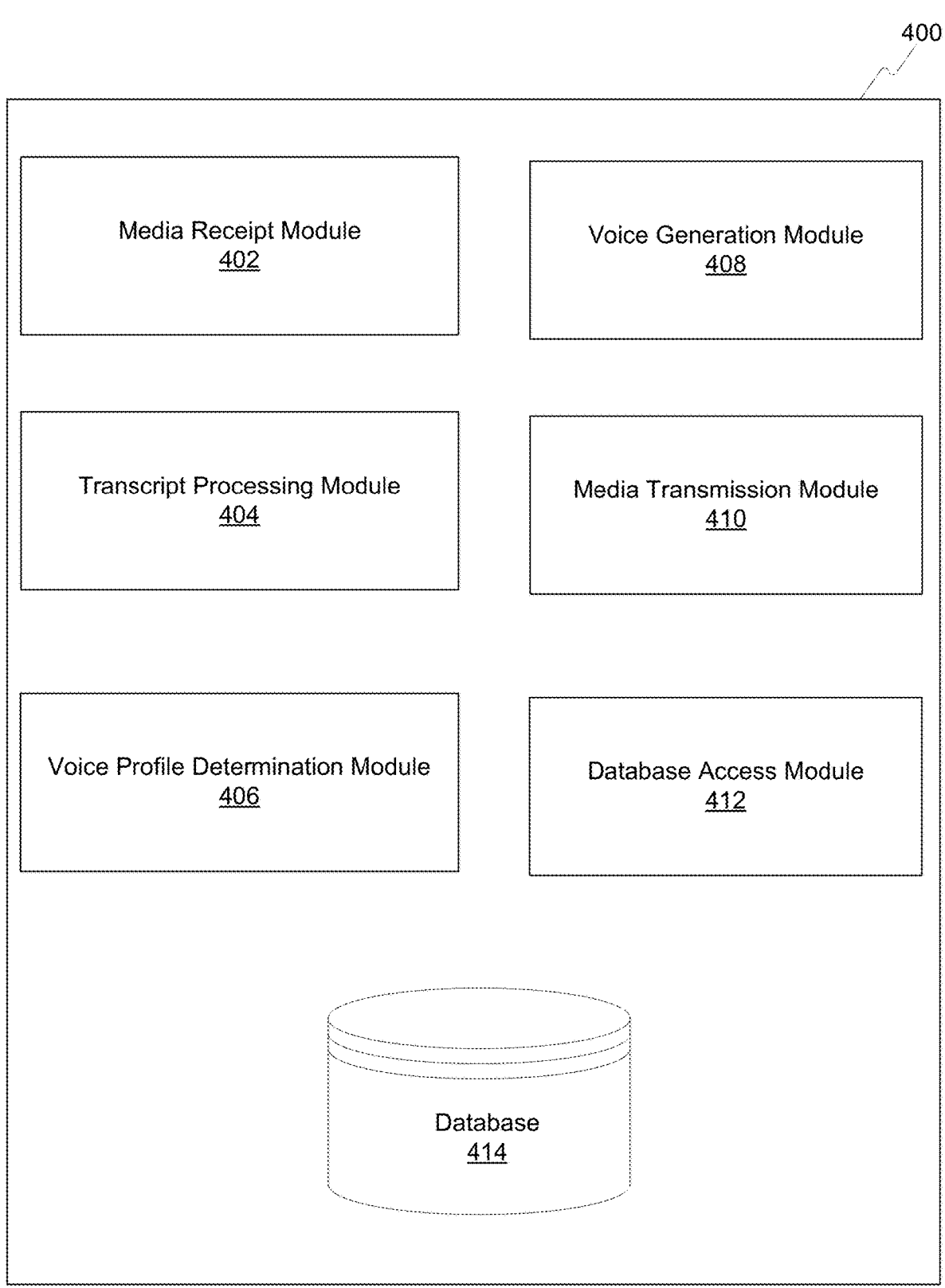
FIG. 4A is a block chart illustrating an exemplary embodiment of a memory containing software modules consistent with some embodiments of the present disclosure.

FIG. 4A illustrates an exemplary embodiment of a memory 400 containing software modules consistent with the present disclosure. In particular, as shown, memory 400 may include a media receipt module 402, a transcript processing module 404, a voice profile determination module 406, a voice generation module 408, a media transmission 410, a database access module 412, and a database 414. Modules 402, 404, 406, 408, 410, and 412 may contain software instructions for execution by at least one processing device, e.g., processor 204 included with communications device 160 or processor 310 included with server 133. Media receipt module 402, transcript processing module 404, voice profile determination module 406, voice generation module 408, media transmission 410, database access module 412, and database 414 may cooperate to perform multiple operations. For example, media receipt module 402 may receive a media stream in a first language. Transcript processing module 404 may obtain a transcript of the received media stream. Voice profile determination module 406 may use deep learning algorithms or neural embedding models to determine one or more voice profiles associated with speakers in the media stream. Voice generation module 408 may generate a revoiced media stream in second language based on the determined voice profile. The revoiced media stream may be a dubbed version of media stream 110 where the voice of each speaker sounds as he or she speaks the second language. Media transmission 410 may use a communications interface for providing the revoiced media stream to a communication device associated the user. Database access module 412 may interact with database 414 which may store a plurality of rules for determining the voice profile, generating the revoiced media streams, and any other information associated with the functions of modules 402-412.

In some embodiments, memory 400 may be included in, for example, memory 320 or memory 250. Alternatively or additionally, memory 400 may be stored in an external database 360 (which may also be internal to server 133) or external storage communicatively coupled with server 133, such as one or more database or memory accessible over communications network 140. Further, in other embodiments, the components of memory 400 may be distributed in more than one computing devices. For example, in one implementation, some modules of memory 400 may be included in memory 320 and other modules of memory 400 may be included in memory 250.

In some embodiments, media receipt module 402 may include instructions to receive a media stream. In one embodiment, media receipt module 402 may receive a media stream from media owner 120. In another embodiment, media receipt module 402 may receive a media stream captured by user 170. The received media stream may include one or more individuals speaking in a first language. For example, the media stream may include a dialogue between two animated characters. In one example, media receipt module 402 may use step 432 (described below) and/or step 462 (described below) to receive the media stream.

In some embodiments, transcript processing module 404 may include instructions to obtain a transcript of the received media stream. In one embodiment, transcript processing module 404 may determine the transcript of the received media stream using any suitable voice-to-text algorithm. The voice-to-text algorithm may transform the audio data of the media stream into a plurality of words or textual information that represent the speech data. Transcript processing module 404 may estimate which one of the plurality of word strings more accurately represents the received audio data. In one use case, the transcript of the received media stream may be determined in real time. In another embodiment, transcript processing module 404 may receive the transcript of the received media stream from an associate database (e.g., data structure 126 or an online database). Is some embodiments, transcript processing module 404 may also determine a metadata transcript information that include details on one or words of the transcript, for example, the intonation the word was spoken, the person speaking the word, the person the word was addressed to, etc. Additionally, transcript processing module 404 may include instructions to translate the transcript of the received media stream to the target language using any suitable translation algorithm. The translation algorithm may identify words and phrases within the transcript and then maps the words to corresponding words in a translated version of the transcript in the target language. Transcript processing module 404 may use the metadata transcript information to translate the transcript to the target language. In some examples, transcript processing module may include instructions for analyzing audio data to identify nonverbal sounds in the audio data. In some examples, transcript processing module may include instructions for analyze the audio data (for example using acoustic fingerprint based algorithms, using a machine learning model trained using training examples to identify items in the audio data, etc.) to identify items in the audio data, such as songs, melodies, tunes, sound effects, and so forth. Some other non-limiting examples of techniques for receiving the transcript are described below.

In some embodiments, voice profile determination module 406 may determine a voice profile for each one or more individuals speaking in the received media stream. The term "voice profile" also known as "audioprint," "acoustic fingerprint," and "voice signature," refers to a condensed digital summary of the specific acoustic features of a sound-emanating object (e.g., individuals and also inanimate objects) deterministically generated from a reference audio signal. Accordingly, a voice profile of an individual may be represented by a set of voice parameters of the individual associated with prosody properties of the individual. A common technique for determining a voice profile from a reference media stream is using a time-frequency graph called a spectrogram. Specifically, voice profile determination module 406 may determine the voice profile for each one or more individuals speaking in the received media stream by extracting spectral features, also referred to as spectral attributes, spectral envelope, or spectrogram from an audio sample of a single individual. The audio sample may include a short sample (e.g., one second long, two seconds long, and the like) of the voice of the individual isolated from any other sounds such as background noises or other voices, or a long sample of the voice of the individual capturing different intonations of the individual. The audio sample may be input into a computer-based model such as a pre-trained neural network, which outputs a voice profile of each individual speaking in the received media stream based on the extracted features. In some embodiments, various machine learning or deep learning techniques may be implemented to determine the voice profile from the received media stream.

Consistent with embodiments of the present disclosure, the output voice profile may be a vector of numbers. For example, for each audio sample associated with a single individual submitted to a computer-based model (e.g., a trained neural network), the computer-based model may output a set of numbers forming a vector. Any suitable computer-based model may be used to process the audio data associated with the received media stream. In a first example embodiment, the computer-based model may detect and output various statistical characteristics of the captured audio such as average loudness or average pitch of the audio, spectral frequencies of the audio, variation in the loudness, or the pitch of the audio, rhythm pattern of the audio, and the like. Such parameters may be used to form an output voice profile comprising a set of numbers forming a vector. In a second example embodiment, the computer-based model may detect explicit characteristics of the captured audio associated specific spoken words, such as relative loudness, rhythm pattern, or pitch. Accordingly, voice profile determination module 406 may determine a voice profile that describes the explicit characteristics. Thereafter, the system may confirm that such characteristics are conveyed to dubbed version. For example, in one media stream a character has a unique manner of saying "Hello," in the dubbed version of the media stream, the word "Hello" is pronounced in the target language in a similar manner.

The output voice profile may be a first vector representing the individual's voice, such that the distance between the first vector and another vector (i.e., another output voice profile) extracted from the voice of the same individual is typically smaller than the distance between the output voice profile of the individual's voice and the output voice profile extracted from a voice of another individual. In some embodiments, the output voice profile of the individual's voice may include a sound spectrogram, such as a graph that shows a sound's frequency on the vertical axis and time on the horizontal axis. The time may correspond with all the time the individual speaks in the media stream. Different speech sounds may create different shapes within the graph. The voice profile may be represented visually and may include colors or shades of grey to represent the acoustical qualities of a sound of the individual's voice. Consistent with the present disclosure, voice profile determination module 406 may be used to generate, store, or retrieve a voiceprint, using, for example, wavelet transform or any other attributes of the voice of one or more individuals in the received media stream. In one embodiment, a plurality of voice profiles may be extracted from single media stream using one or more neural networks. For example, if there are two individuals speaking in the media stream, two neural networks may be activated.

In some embodiments, voice generation module 408 may include instructions to use the translated transcript and the determined voice profile to generate artificial dubbed version of the received media stream. Voice generation module 408 may use any suitable text-to-speech (TTS) algorithm to generate an audio stream from the translated transcript. Consistent with the present disclosure, voice generation module 408 may divide the translated transcript to text segments in a sequential order. In some cases, voice generation module 408 may divide the translated transcript to text segments based on the voice profile. For example, assuming the movie Braveheart (1995) is the original media stream 110. The sentence "they may take our lives, but they'll never take our freedom!" has three distinct parts "they may take our lives," "but they'll never take," and "our freedom." The specific manner in which Mel Gibson said this sentence in media stream 110 may be represented in the determined voice profile. Accordingly, voice generation module 408 may divide this sentence to three text segments "they may take our lives," "but they'll never take," and "our freedom." The generated dubbed version of this sentence (i.e., revoiced media stream 150) will have Mel Gibson's voice speaking in the selected target language (e.g., Japanese) and will maintain the manner this sentence was said in the original movie. Specifically, the words "our freedom" will be emphasized the most.

In one embodiment, voice generation module 408 may include one or more TTS engines for receiving text segments and for converting the text document segments into speech segments. Several text segments may be converted into a speech segment by different TTS engine. Voice generation module 408 may be associated with a buffer that receives the generated dubbed speech segments and corresponding sequence numbers from the TTS engines. The buffer uses the corresponding sequence numbers to reassemble the dubbed speech segments in the proper order to generate an audio stream. Additionally, in case original media stream 110 includes a video stream and an audio stream in a first language, voice generation module 408 may use the generated audio stream in a second language and the video stream to generate revoiced media stream 150.

In some embodiments, media transmission module 410 may communicate with server 133 to send, via a communications interface, revoiced media stream 150 in the target language. As discussed above, communications interface 350 may include a modem, Ethernet card, or any other interface configured to exchange data with a network, such as communications network 140 in FIG. 1B. For example, server 133 may include software that, when executed by a processor, provides communications with communications network 140 through communications interface 350 to one or more communications devices 160A-C. In some embodiments, media transmission module 410 may provide revoiced media streams 150 to communications devices 160. In other embodiments, media transmission 410 may provide revoiced audio streams to media owner 120, and thereafter media owner 120 may generate the revoiced media streams. The revoiced media streams sounds as if the individuals are speaking in the target language. For example, assuming original media stream 110 in an episode from the TV series "The Simpsons" and the target language is Chinese. Revoiced media stream 150 would be the same episode but the same voices recognized with Homer, Marge, Bart, Lisa would speak Chinese.

In some embodiments, database access module 412 may cooperate with database 414 to retrieve voice samples of associated media streams, transcripts, voice profiles, and more. For example, database access module 412 may send a database query to database 414 which may be associated with database 360. Database 414 may be configured to store any type of information to be used by modules 402-412, depending on implementation-specific considerations. For example, database access module 412 may cause the output voice profile determined by voice profile determination module 406 to be stored in database 414. In some embodiments, database 414 may include separate databases, including, for example, a vector database, raster database, tile database, viewport database, and/or a user input database, configured to store data. The data stored in database 414 may be received from modules 402-412, server 133, from communications devices 160 and/or may be provided as input using data entry, data transfer, or data uploading.

Modules 402-412 may be implemented in software, hardware, firmware, a mix of any of those, or the like. For example, if the modules are implemented in software, the modules may be stored in a computing device (e.g., server 133 or communications device 160) or distributed over a plurality of computing devices. Consistent with the present disclosure, processing devices of server 133 and communications device 160 may be configured to execute the instructions of modules 402-412. In some embodiments, aspects of modules 402-412 may include software, hardware, or firmware instructions (or a combination thereof) executable by one or more processors, alone or in various combinations with each other. For example, modules 402-412 may be configured to interact with each other and/or other modules of server 133, communications device 160, and/or artificial dubbing system 100 to perform functions consistent with disclosed embodiments.

FIG. 4B is a flowchart of an example method 430 for artificial translation and dubbing In this example, method 430 may comprise: receiving source audio data (step 432); extracting components of the source audio data (step 434); identifying speakers that produced speech included in the source audio data (step 436); identifying characteristics of speech included in the source audio data (step 438); translating or transforming the speech (step 440); receiving voice profiles (step 442); generating speech data (step 444); synthesizing target audio data (step 446); and outputting target audio data (step 448). In some implementations, method 430 may comprise one or more additional steps, while some of the steps listed above may be modified or excluded. In some implementations, one or more steps illustrated in FIG. 4B may be executed in a different order and/or one or more groups of steps may be executed simultaneously and vice versa.

In some embodiments, step 432 may comprise receiving source audio data. In some examples, step 432 may read source audio data from memory (for example, from data structure 126, from data structure 136, from memory 250, from memory 320, from memory 400, etc.), may receive source audio data from an external device (for example through communications network 140), may receive source audio data using media receipt module 402, may extract source audio data from video data (for example from media stream 110), may capture source audio data using one or more audio sensors (for example, using audio subsystem 226 and/or microphone 230), and so forth. In some examples, the source audio data may be received in any suitable format. Some non-limiting examples of such formats may include uncompressed audio formats, lossless compressed audio formats, lossy compressed audio formats, and so forth. In one example, step 432 may receive source audio data that is recorded from an environment. In another example, step 432 may receive source audio data that is artificially synthesized. In one example, step 432 may receive the source audio data after the recording of the source audio data was completed. In another example, step 432 may receive the source audio data in real-time, while the source audio data is being produced and/or recorded. In some examples, step 432 may use one or more of step 702, step 902, step 802, step 1002, step 1102, step 1202, 1302, step 1402, step 1502, step 1602, step 1702, step 1802, step 1902, step 2002, step 2102, step 2202, step 2302, step 2402, step 2502 and step 2602 to obtain the source audio data.

In some embodiments, step 434 may comprise analyzing source audio data (such as the source audio data received by step 432) to extract different components of the source audio data from the source audio data. For example, extracting a component by step 434 may include creation of a new audio data with the extracted component. In another example, extracting a component by step 434 may include creation of a metadata indicating the portion including the component in the source audio data (for example, the metadata may include beginning and ending times for the component, pitch range for the component, and so forth). In some examples, a component of the source audio data extracted by step 434 may include a continuous part of the audio data or a non-continuous part of the audio data. In some examples, the components of the source audio data extracted by step 434 may overlap in time or may be distinct in time. Some non-limiting examples of such components may include background noises, sounds produced by particular sources, speech, speech produced by particular speaker, a continuous part of the source audio data, a non-continuous part of the source audio data, a silent part of the audio data, a part of the audio data that does not contain speech, a single utterance, a single phoneme, a single syllable, a single morpheme, a single word, a single sentence, a single conversation, a number of phonemes, a number of syllables, a number of morphemes, a number of words, a number of sentences, a number of conversations, a continuous part of the audio data corresponding to a single speaker, a non-continuous part of the audio data corresponding to a single speaker, a continuous part of the audio data corresponding to a group of speakers, a non-continuous part of the audio data corresponding to a group of speakers, and so forth. For example, step 434 may analyze the source audio data using source separation algorithms to separate the source audio data into components of two or more audio streams produced by different sources. In another example, step 434 may extract audio background from the source audio data, for example using background/foreground audio separation algorithms, or by removing all other extracted sources from the source audio data to obtain the background audio. In yet another example, step 434 may use audio segmentation algorithms to segment the source audio data into segments. In an additional example, step 434 may use speech detection algorithms to analyze the source audio data to detect segments of the source audio data that contains speech, and extract the detected segments from the source audio data. In yet another example, step 434 may use speaker diarization algorithms and/or speaker recognition algorithms to analyze the source audio data to detect segments of the source audio data that contains speech produced by particular speakers, and extract speech that was produced by particular speakers from the source audio data. In some examples, a machine learning model may be trained using training examples to extract segments from audio data, and step 434 may use the trained machine learning model to analyze the source audio data and extract the components. An example of such training example may include audio data together with a desired extraction of segments from the audio data. In another example, an artificial neural network (such as a recurrent neural network, a long short-term memory neural network, a deep neural network, etc.) may be configured to extract segments from audio data, and step 434 may use the artificial neural network to analyze the source audio data and extract the components. In yet another example, step 434 may analyze the source audio data to obtain textual information (for example using speech recognition algorithms), and may analyze the obtained textual information to extract the components (for example using Natural Language Processing algorithms, using text segmentation algorithms, and so forth). In one example, step 434 may be performed in parallel to step 432, for example while the source audio data is being received and/or captured and/or generated. In another example, step 434 may be performed after step 432 is completed, for example after the complete source audio data was received and/or captured and/or generated.

In some embodiments, step 436 may comprise analyzing source audio data (such as the source audio data received by step 432 or components of the source audio data extracted by step 434) to identify speakers that produced speech included in the source audio data. For example, step 436 may identify names or other unique identifiers of speakers, for example using a database of voice profiles linked to particular speaker identities. In another example, step 436 may assign unique identifiers to particular speakers that produced speech included in the source audio data. In yet another example, step 436 may identify demographic characteristics of speakers, such as age, gender, and so forth. In some examples, step 436 may identify portions of the source audio data (which may correspond to components of the audio data extracted by step 434) that correspond to speech produced by a single speaker. This single speaker may be recognized (e.g., by name, by a unique identifier, etc.) or unrecognized. For example, step 436 may use speaker diarization algorithms and/or speaker recognition algorithms to identify when a particular speaker talks in the source audio data. In one example, step 436 may be performed in parallel to previous steps of method 430 (such as step 434 and/or step 432), for example while the source audio data is being received and/or captured and/or generated and/or analyzed by previous steps of method 430. In another example, step 436 may be performed after previous steps of method 430 are completed, for example after the complete source audio data was analyzed by previous steps of method 430.

In some embodiments, step 438 may comprise analyzing source audio data (such as the source audio data received by step 432 or components of the source audio data extracted by step 434) to identify characteristics of speech included in the source audio data. Some non-limiting examples of such characteristics of speech may include characteristics of the voice of the speaker while producing the speech or parts of the speech (such as prosodic characteristics of the voice, characteristics of the pitch of the voice, characteristics of the loudness of the voice, characteristics of the intonation of the voice, characteristics of the stress of the voice, characteristics of the timbre of the voice, characteristics of the flatness of the voice, etc.), characteristics of the articulation of at least part of the speech, characteristics of speech rhythm, characteristics of speech tempo, characteristics of a linguistic tone of the speech, characteristics of pauses within the speech, characteristics of an accent of the speech (such as type of accent), characteristics of a language register of the speech, characteristics of a language of the speech, and so forth. Some additional non-limiting examples of such characteristics of speech may include a form of the speech (such as a command, a question, a statement, etc.), characteristics of the emotional state of the speaker while producing the speech, whether the speech includes one or more of irony, sarcasm, emphasis, contrast, focus, and so forth. For example, step 438 may identify characteristics of speech for speech produced by a particular speaker, such as a particular speaker identified by step 436. Further, step 438 may be repeated for a plurality of speakers (such as a plurality of speakers identified by step 436), each time identifying characteristics of speech for speech produced by one particular speaker of the plurality of speakers. In another example, step 438 may identify characteristics of speech for speech included in a particular component of the source audio data, for example in a component of the source audio data extracted by step 434. Further, step 438 may be repeated for a plurality of components of the source audio data, each time identifying characteristics of speech for speech included in one particular component of the plurality of components. In one example, a machine learning model may be trained using training examples to identify characteristics of speech (such as the characteristics listed above) from audio data, and step 438 may use the trained machine learning model to analyze the source audio data (such as the source audio data received by step 432 or components of the source audio data extracted by step 434) to identify characteristics of speech included in the source audio data. An example of such training example may include audio data including a speech together with a label indicating the characteristics of speech of the speech included in the audio data. In another example, an artificial neural network (such as a recurrent neural network, a long short-term memory neural network, a deep neural network, etc.) may be configured to identify characteristics of speech (such as the characteristics listed above) from audio data, and step 438 may use the artificial neural network to analyze the source audio data (such as the source audio data received by step 432 or components of the source audio data extracted by step

434) to identify characteristics of speech included in the source audio data. In one example, step 438 may be performed in parallel to previous steps of method 430 (such as step 436 and/or step 434 and/or step 432), for example while the source audio data is being received and/or captured and/or generated and/or analyzed by previous steps of method 430. In another example, step 438 may be performed after previous steps of method 430 are completed, for example after the complete source audio data was analyzed by previous steps of method 430.

In some examples, step 438 may identify characteristics of speech included in the source audio data including a rhythm of the speech. For example, duration of speech sounds may be measured. Some examples of such speech sounds may include: vowels, consonants, syllables, utterances, and so forth. In some cases, statistics related to the duration of speech sounds may be gathered. In some examples, the variance of vowel duration may be calculated. In some examples, the percentage of speech time dedicated to one type of speech sounds may be measured. In some examples, contrasts between durations of neighboring vowels may be measured.

In some examples, step 438 may identify characteristics of speech included in the source audio data including a tempo of speech. For example, speaking rate may be measured. For example, articulation rate may be measured. In some cases, the number of syllables per a unit of time may be measured, where the unit of time may include and/or exclude times of pauses, hesitations, and so forth. In some cases, the number of words per a unit of time may be measured, where the unit of time may include and/or exclude times of pauses, hesitations, and so forth. In some cases, statistics related to the rate of syllables may be gathered. In some cases, statistics related to the rate of words may be gathered.

In some examples, step 438 may identify characteristics of speech included in the source audio data including a pitch of a voice. For example, pitch may be measured at specified times, randomly, continuously, and so forth. In some cases, statistics related to the pitch may be gathered. In some cases, pitch may be measured at different segments of speech, and statistics related to the pitch may be gathered for each type of segment separately. In some cases, the average speaking pitch over a time period may be calculated. In some cases, the minimal and/or maximal speaking pitch in a time period may be found.

In some examples, step 438 may identify characteristics of speech included in the source audio data including loudness of the voice. For example, the loudness may be measured as the intensity of the voice. For example, loudness may be measured at specified times, randomly, continuously, and so forth. In some cases, statistics related to the loudness may be gathered. In some cases, loudness may be measured at different segments of speech, and statistics related to the loudness may be gathered for each type of segment separately. In some cases, the average speaking loudness over a time period may be calculated. In some cases, the minimal and/or maximal speaking loudness in a time period may be found.

In some examples, step 438 may identify characteristics of speech included in the source audio data including intonation of the voice. For example, the pitch of the voice may be analyzed to identify rising and falling intonations. In another example, rising intonation, falling intonation, dipping intonation, and/or peaking intonation may be identified. For example, intonation may be identified at specified times, randomly, continuously, and so forth. In some cases, statistics related to the intonation may be gathered.

In some examples, step 438 may identify characteristics of speech included in the source audio data including linguistic tone associated with a portion of the audio data. For example, the usage of pitch to distinguish and/or inflect words, to express emotional and/or paralinguistic information, to convey emphasis, contrast, and so forth, may be identified.

In some examples, step 438 may identify characteristics of speech included in the source audio data including stress of the voice. For example, loudness of the voice and/or vowels length may be analyzed to identify an emphasis given to a specific syllable. In another example, loudness of the voice and pitch may be analyzed to identify emphasis on specific words, phrases, sentences, and so forth. In an additional example, loudness, vowel length, articulation of vowels, pitch, and so forth may be analyzed to identify emphasis associated with a specific time of speaking, with specific portions of speech, and so forth.

In some examples, step 438 may identify characteristics of speech included in the source audio data including characteristics of pauses within the speech. For example, length of pauses may be measured. In some cases, statistics related to the length of pauses may be gathered.

In some examples, step 438 may identify characteristics of speech included in the source audio data including timbre of the voice. For example, voice brightness may be identified. As another example, formant structure associated with the pronunciation of the different sounds may be identified.

In some embodiments, step 440 may comprise transforming at least part of the speech from source audio data (such as the source audio data received by step 432). For example, step 440 may translate the speech. In another example, step 440 may transform the speech to a speech in another language register. For example, step 440 may transform all speech produced by particular one or more speakers (such as one or more speakers of the speakers identified by step 436) in the source audio data. In another example, step 440 may transform all speech included in one or more particular components (such as one or more particular components extracted by step 434) of the source audio data. In some examples, step 440 may obtain textual or other representation of speech to be transformed (for example, using transcript processing module 404), analyze the obtained textual or other representation, and transform at least part of the textual or other representation. Some non-limiting examples of such representation of speech may include textual representation, digital representations, representations created by artificial intelligent, and so forth. For example, step 440 may translate the at least part of the textual or other representation. In another example, step 440 may transform the at least part of the textual or other representation to another language register. For example, step 440 may transform portions of the obtained textual or other representation that corresponds to one or more particular speakers, may transform the entire obtained textual or other representation, and so forth. In some examples, step 440 may transform speech or representation of speech, for example step 440 may take as input any type of representation of speech (including audio data, textual information, or other kind of representation of speech), and may output any type of representation of speech (including audio data, textual information, or other kind of representation of speech). The types of representation of the input and output of step 440 may be identical or different. In one example, step 440 may analyze the source audio data to obtain textual information (for example using speech recognition algorithms, using transcript processing module 404, etc.), and transform the obtained textual information. In another example, step 440 may analyze the source audio data to obtain any kind of representation of the speech included in the source audio data (for example using speech recognition algorithms), and transform the speech represented by the obtained representation. In yet another example, step 440 may analyze the textual information to obtain any kind of representation of the textual information (for example using Natural Language Processing algorithms), and transform the textual information represented by the obtained representation. In one example, step 440 may be performed in parallel to previous steps of method 430 (such as step 438 and/or step 436 and/or step 434 and/or step 432), for example while the source audio data is being received and/or captured and/or generated and/or analyzed by previous steps of method 430. In another example, step 440 may be performed after previous steps of method 430 are completed, for example after the complete source audio data was analyzed by previous steps of method 430.

In some examples, step 440 may base the transformation of the at least part of the speech and/or the at least part of the textual or other representation on additional information, for example based on breakdown of the source audio data to different components (for example, by step 434), based on identity of speakers that produced the speech (for example, based on speakers identified by step 436), based on characteristics of the speech (for example, based on characteristics identified by step 438), and so forth. Some non-limiting examples of such characteristics of speech may include characteristics of the voice of the speaker while producing the speech or parts of the speech (such as prosodic characteristics of the voice, characteristics of the pitch of the voice, characteristics of the loudness of the voice, characteristics of the intonation of the voice, characteristics of the stress of the voice, characteristics of the timbre of the voice, characteristics of the flatness of the voice, etc.), characteristics of the articulation of at least part of the speech, characteristics of speech rhythm, characteristics of speech tempo, characteristics of a linguistic tone of the speech, characteristics of pauses within the speech, characteristics of an accent of the speech (such as type of accent), characteristics of a language register of the speech, characteristics of a language of the speech, and so forth. Some additional non-limiting examples of such characteristics of speech may include a form of the speech (such as a command, a question, a statement, etc.), characteristics of the emotional state of the speaker while producing the speech, whether the speech includes one or more of irony, sarcasm, emphasis, contrast, focus, and so forth. For example, step 440 may transform the speech corresponding to a first component of the source audio data using a first transformation and/or a first parameter, and may transform the speech corresponding to a second component of the source audio data using a second transformation and/or a second parameter (the first transformation may differ from the second transformation, and the first parameter may differ from the second parameter). In another example, in response to a portion of speech being associated with a first identity of a speaker, step 440 may transform the portion of speech using a first transformation and/or a first parameter, and may in response to the portion of speech being associated with a second identity of a speaker, step 440 may transform the portion of speech using a second transformation and/or a second parameter (the first transformation may differ from the second transformation, and the first parameter may differ from the second parameter). In yet another example, in response to a portion of speech being associated with a first characteristic of the speech (for example, as identified by step 438), step 440 may transform the portion of speech using a first transformation and/or a first parameter, and may in response to the portion of speech being associated with a second characteristic of the speech, step 440 may transform the portion of speech using a second transformation and/or a second parameter (the first transformation may differ from the second transformation, and the first parameter may differ from the second parameter).

In some examples, step 440 may use Natural Language Processing (NLP) algorithms to transform the at least part of the speech and/or the at least part of the textual or other representation. For example, such algorithm may include one or more parameters to control the transformation. In some examples, a machine learning model may be trained using training examples to transform speech and/or textual information and/or other representations of speech, and step 440 may use the trained machine learning model to transform the at least part of the speech from the source audio data and/or the at least part of the textual or other representation. One example of such training example may include audio data that includes speech, together with a desired transformation of the included speech. Another example of such training example may include textual information, together with a desired transformation of the textual information. Yet another example of such training example may include other representation of speech, together with a desired transformation of the represented information. Some non-limiting examples of such desired transformations may include translation, changing of language register, and so forth. In some examples, an artificial neural network (such as recurrent neural network, a long short-term memory neural network, a deep neural network, etc.) may be configured to transform speech and/or textual information and/or other representations of speech, and step 440 may use the artificial neural network to transform the at least part of the speech from the source audio data and/or the at least part of the textual or other representation. In some examples, step 440 may use one or more of step 706, step 1110, step 1208, step 1308, step 1408, step 1508, step 1808, step 1908, step 2006, step 2106, step 2206, step 2406, step 2508 and step 2606 to transform speech and/or textual information and/or other representations of speech. Additionally or alternatively, step 440 may receive a translated and/or transformed version of the speech and/or textual information and/or other representations of speech, for example by reading the translated and/or transformed version from memory, by receiving the translated and/or transformed version from an external device, by receiving the translated and/or transformed version from a user, and so forth.

In some embodiments, step 442 may comprise receiving voice profiles. For example, the received voice profiles may correspond to particular speakers and/or particular audio data components (for example, to particular components of the source audio data and/or to particular desired components of a desired target audio data). For example, step 442 may read voice profiles from memory (for example, from data structure 126, from data structure 136, from memory 250, from memory 320, from memory 400, etc.), may receive voice profiles from an external device (for example through communications network 140), may generate voice profiles based on audio data (for example, based on audio data including speech produced by particular speakers, based on the source audio data, based on components of the source audio data), and so forth. In some examples, step 442 may select the voice profiles from a plurality of alternative voice profiles. For example, step 442 may analyze a component of the source audio data to select a voice profile of the plurality of alternative voice profiles that is most compatible to the voice profile of a speaker in the component of the source audio data. In another example, step 442 may receive an indication from a user or from another process, and may select a voice profile of the plurality of alternative voice profiles based on the received indication. Such indication may include an indication of a particular voice profile of the plurality of alternative voice profiles to be selected, may include an indication of a desired characteristic of the selected voice profile and step 442 may select a voice profile of the plurality of alternative voice profiles that is most compatible to the desired characteristic, and so forth.

In some examples, step 442 may analyze audio data (such as the source audio data or a component of the source audio data) to generate the voice profiles. For example, step 442 may analyze the source audio data or the component of the source audio data to determine characteristics of a voice of a speaker producing speech in the source audio data or the component of the source audio data, and the voice profile may be based on the determined characteristics of the voice. In another example, step 442 may analyze the historic audio recordings or components of historic audio recordings to determine characteristics of a voice of a speaker producing speech in the historic audio data or the component of the historic audio data, and the voice profile may be based on the determined characteristics of the voice. In some examples, step 442 may mix a plurality of voice profiles to generate a new voice profile. For example, a first characteristic in the new voice profile may be taken from a first voice profile of the plurality of voice profiles, and a second characteristic in the new voice profile may be taken from a second voice profile (different from the first voice profile) of the plurality of voice profiles. In another example, a characteristic in the new voice profile may be a function of characteristics in the plurality of voice profiles. Some non-limiting examples of such functions may include mean, median, mode, sum, minimum, maximum, weighted average, a polynomial function, and so forth. In some examples, step 442 may receive an indication of a desired value of at least one characteristic in the voice profile from a user, from a different process, from an external device, and so forth, and set the value of at least one characteristic in the voice profile based on the received indication. In some examples, step 442 may use one or more of step 708, step 810, step 908, step 910, step 1004, step 1006, step 1108, step 1210, step 1310, step 1410, step 1510, step 1610, step 1710, step 1810, step 1910, step 2008, step 2108, step 2208, step 2308, step 2410, step 2510 and step 2610 to obtain voice profiles.

In some embodiments, a voice profile (such as a voice profile received and/or selected and/or generated by step 442, a voice profile received and/or selected and/or generated by step 2208) may include typical characteristics of a voice (such as characteristics of a voice of a speaker), may include different characteristics of a voice in different contexts, and so forth. For example, a voice profile may specify first characteristics of a voice of a speaker for a first context, and second characteristics of the voice of the speaker for a second context, the first characteristics differ from the second characteristics. Some non-limiting examples of such contexts may include particular emotional states of the speaker, particular form of speech (such as a command, a question, a statement, etc.), particular linguistic tones, particular topics of speech or conversation, particular conversation partners, characteristics of conversation partners, number of participants in a conversation, geographical location, time in day, particular social activities, context identified using step 468 (described below), and so forth. Some non-limiting examples of such characteristics of a voice that may be specified in a voice profile may include prosodic characteristics of the voice, characteristics of the pitch of the voice, characteristics of the loudness of the voice, characteristics of the intonation of the voice, characteristics of the stress of the voice, characteristics of the timbre of the voice, characteristics of the flatness of the voice, characteristics of the articulation of words and utterances, characteristics of speech rhythm, characteristics of speech tempo, characteristics of pauses within the speech, characteristics of an accent of the speech (such as type of accent), and so forth. In one example, a voice profile may specify first characteristics of a voice of a speaker for a first emotional state of the speaker, and second characteristics of the voice of the speaker for a second emotional state of the speaker, the first characteristics differ from the second characteristics. In one example, a voice profile may specify first characteristics of a voice of a speaker for a first form of speech, and second characteristics of the voice of the speaker for a second form of speech, the first characteristics differ from the second characteristics. In one example, a voice profile may specify first characteristics of a voice of a speaker for a first topic of speech or conversation, and second characteristics of the voice of the speaker for a second topic of speech or conversation, the first characteristics differ from the second characteristics. In one example, a voice profile may specify first characteristics of a voice of a speaker for a first linguistic tone, and second characteristics of the voice of the speaker for a second linguistic tone, the first characteristics differ from the second characteristics. In one example, a voice profile may specify first characteristics of a voice of a speaker for a first group of conversation partners, and second characteristics of the voice of the speaker for a second group of conversation partners, the first characteristics differ from the second characteristics. In one example, a voice profile may specify first characteristics of a voice of a speaker for a first number of participants in a conversation, and second characteristics of the voice of the speaker for a second number of participants in a conversation, the first characteristics differ from the second characteristics. In one example, a voice profile may specify first characteristics of a voice of a speaker for a first geographical location, and second characteristics of the voice of the speaker for a second geographical location, the first characteristics differ from the second characteristics. In one example, a voice profile may specify first characteristics of a voice of a speaker for a first time in day, and second characteristics of the voice of the speaker for a second time in day, the first characteristics differ from the second characteristics. In one example, a voice profile may specify first characteristics of a voice of a speaker for a first social activity, and second characteristics of the voice of the speaker for a second social activity, the first characteristics differ from the second characteristics.

In some embodiments, step 444 may comprise generating speech data. In some examples, step 444 may obtain audible, textual or other representation of speech, and generate speech data corresponding to the obtained audible, textual or other representation of speech. For example, step 444 may generate audio data including the generated speech data. In another example, step 444 may generate speech data in any format that is configured to enable step 446 to synthesis target audio data that includes the speech. In one example, step 444 may obtain the audible, textual or other representation of speech from step 440. In another example, step 444 may read the audible, textual or other representation of speech from memory (for example, from data structure 126, from data structure 136, from memory 250, from memory 320, from memory 400, etc.), may receive the audible, textual or other representation of speech from an external device (for example through communications network 140), and so forth.

In some examples, step 444 may use any Text To Speech (TTS) or speech synthesis algorithm or system to generate the speech data. Some non-limiting examples of such algorithms may include concatenation synthesis algorithms (such as unit selection synthesis algorithms, diphone synthesis algorithms, domain-specific synthesis algorithms, etc.), formant algorithms, articulatory algorithms, Hidden Markov Models algorithms, Sinewave synthesis algorithms, deep learning based synthesis algorithms, and so forth. In one example, step 444 may be performed in parallel to previous steps of method 430 (such as step 440 and/or step 438 and/or step 436 and/or step 434 and/or step 432), for example while the source audio data is being received and/or captured and/or generated and/or analyzed by previous steps of method 430. In another example, step 444 may be performed after previous steps of method 430 are completed, for example after the complete source audio data was analyzed by previous steps of method 430.

In some examples, step 444 may base the generation of speech data on a voice profile (such as a voice profile received and/or selected and/or generated by step 442). For example, the generated speech data may include speech in a voice corresponding to the voice profile (for example, a voice having at least one characteristic specified in the voice profile). For example, the voice profile may include typical characteristics of a voice, and step 444 may generate speech data that includes speech in a voice corresponding to these typical characteristics. In another example, the voice profile may include different characteristics of a voice for different contexts, step 444 may select characteristics of a voice corresponding to a particular context corresponding to the speech, and step 444 may further generate speech data that includes speech in a voice corresponding to the selected characteristics. Some non-limiting examples of such selected characteristics or typical characteristics may include prosodic characteristics of a voice, characteristics of a pitch of a voice, characteristics of a loudness of a voice, characteristics of an intonation of a voice, characteristics of a stress of a voice, characteristics of a timbre of a voice, characteristics of a flatness of a voice, characteristics of an articulation, characteristics of a speech rhythm, characteristics of a speech tempo, characteristics of a linguistic tone, characteristics of pauses within a speech, characteristics of an accent (such as type of accent), and so forth.

In some examples, step 444 may base the generation of speech data on desired voice characteristics and/or desired speech characteristics. For example, the desired voice characteristics and/or desired speech characteristics may be based on characteristics identified by step 438, on characteristics provided by a user, on characteristics provided by an external device, on characteristics read from memory, determined based on the content of the speech, determined based on context, and so forth. For example, step 444 may generate speech data that includes speech in a voice corresponding to the desired characteristics. Some non-limiting examples of such voice characteristics may include prosodic characteristics of a voice, characteristics of a pitch of a voice, characteristics of a loudness of a voice, characteristics of an intonation of a voice, characteristics of a stress of a voice, characteristics of a timbre of a voice, characteristics of a flatness of a voice, characteristics of an articulation, characteristics of an accent (such as type of accent), and so forth. Some non-limiting examples of such speech characteristics may include characteristics of a speech rhythm, characteristics of a speech tempo, characteristics of a linguistic tone, characteristics of pauses within a speech, and so forth.

In some examples, a machine learning model may be trained using training example to generate speech data (or generate audio data including the speech data) from textual or other representations of speech and/or voice profiles and/or desired voice characteristics and/or desired speech characteristics, and step 444 may use the trained machine learning model to generate the speech data (or audio data including the speech data) based on the voice profile and/or on the desired voice characteristics and/or on the desired speech characteristics. An example of such training example may include textual or other representations of speech and/or a voice profile and/or desired voice characteristics and/or desired speech characteristics, together with desired speech data (or audio data including the desired speech data). For example, the desired speech data may include data of one or more utterances. In some examples, an artificial neural network may be configured to generate speech data (or generate audio data including the speech data) from textual or other representations of speech and/or voice profiles and/or desired voice characteristics and/or desired speech characteristics, and step 444 may use the artificial neural network to generate the speech data (or audio data including the speech data) based on the voice profile and/or on the desired voice characteristics and/or on the desired speech characteristics. In some examples, Generative Adversarial Networks (GAN) may be used to train an artificial neural network configured to generate speech data (or generate audio data including the speech data) corresponding to voice profiles and/or desired voice characteristics and/or desired speech characteristics, for example from textual or other representations of speech, and step 444 may use the trained artificial neural network to generate the speech data (or audio data including the speech data) based on the voice profile and/or on the desired voice characteristics and/or on the desired speech characteristics.

Additionally or alternatively, step 444 may generate non-verbal audio data, for example audio data of non-verbal vocalizations (such as laughter, giggling, sobbing, crying, weeping, cheering, screaming, inhalation noises, exhalation noises, and so forth). For example, the voice profile and/or the desired voice characteristics may include characteristics of such non-verbal vocalizations, and step 444 may generate non-verbal audio data corresponding to the included characteristics of non-verbal vocalizations.

In some examples, a machine learning model may be trained using training example to generate speech data (or generate audio data including the speech data) from source audio data including speech and voice profiles, and step 444 may use the trained machine learning model to generate the speech data (or different audio data including the speech data) in a voice corresponding to the voice profile. An example of such training example may include source audio data including speech and a voice profile, together with desired speech data (or different audio data including the desired speech data). In some examples, an artificial neural network may be configured to generate speech data (or generate audio data including the speech data) from source audio data including speech and voice profiles, and step 444 may use the artificial neural network to generate the speech data (or different audio data including the speech data) a voice corresponding to the voice profile. For example, step 444 may use the trained machine learning model and/or the artificial neural network to transform source audio data (or components of source audio data) from original voice to a voice corresponding to the voice profile.

In some embodiments, step 446 may comprise synthesizing target audio data. For example, step 446 may synthesize target audio data from speech data (or audio data including the speech data) generated by step 444, from non-verbal audio data generated by step 444, from components of the source audio data extracted by step 434, from audio streams obtained from other sources, and so forth. For example, step 446 may mix, merge, blend and/or stitch different sources of audio into a single target audio data, for example using audio mixing algorithms and/or audio stitching algorithms. In some examples, step 446 may mix, merge, blend and/or stitch the different sources of audio in accordance to a particular arrangement of the different sources of audio. For example, the particular arrangement may be specified by a user, may be read from memory, may be received from an external device, may be selected (for example, may be selected to correspond to an arrangement of sources and/or information in the source audio data received by step 432), and so forth. In one example, step 446 may be performed in parallel to previous steps of method 430 (such as step 444 and/or step 440 and/or step 438 and/or step 436 and/or step 434 and/or step 432), for example while the source audio data is being received and/or captured and/or generated and/or analyzed by previous steps of method 430. In another example, step 446 may be performed after previous steps of method 430 are completed, for example after the complete source audio data was analyzed by previous steps of method 430.

Additionally or alternatively to step 444 and/or step 446, method 430 may use one or more of step 710, step 712, step 812, step 912, step 1012, step 1112, step 1212, step 1312, step 1412, step 1512, step 1612, step 1712, step 1812, step 1912, step 2012, step 2112, step 2212, step 2312, 2412, step 2512 and step 2612 to generate the target audio data.

In some embodiments, step 448 may comprise outputting audio data, for example outputting the target audio data synthesized by step 446. For example, step 448 may use the audio data to generate sounds that corresponds to the audio data, for example using audio subsystem 226 and/or speaker 228. In another example, step 448 may store the audio data in memory (for example, in data structure 126, in data structure 136, in memory 250, in memory 320, in memory 400, etc.), may provide the audio data to an external device (for example through communications network 140), may provide the audio data to a user, may provide the audio data to another process (for example, to a process implementing any of the methods and/or steps and/or techniques described herein), and so forth. In yet another example, step 448 may insert the audio data to a video.

Figure 4C:
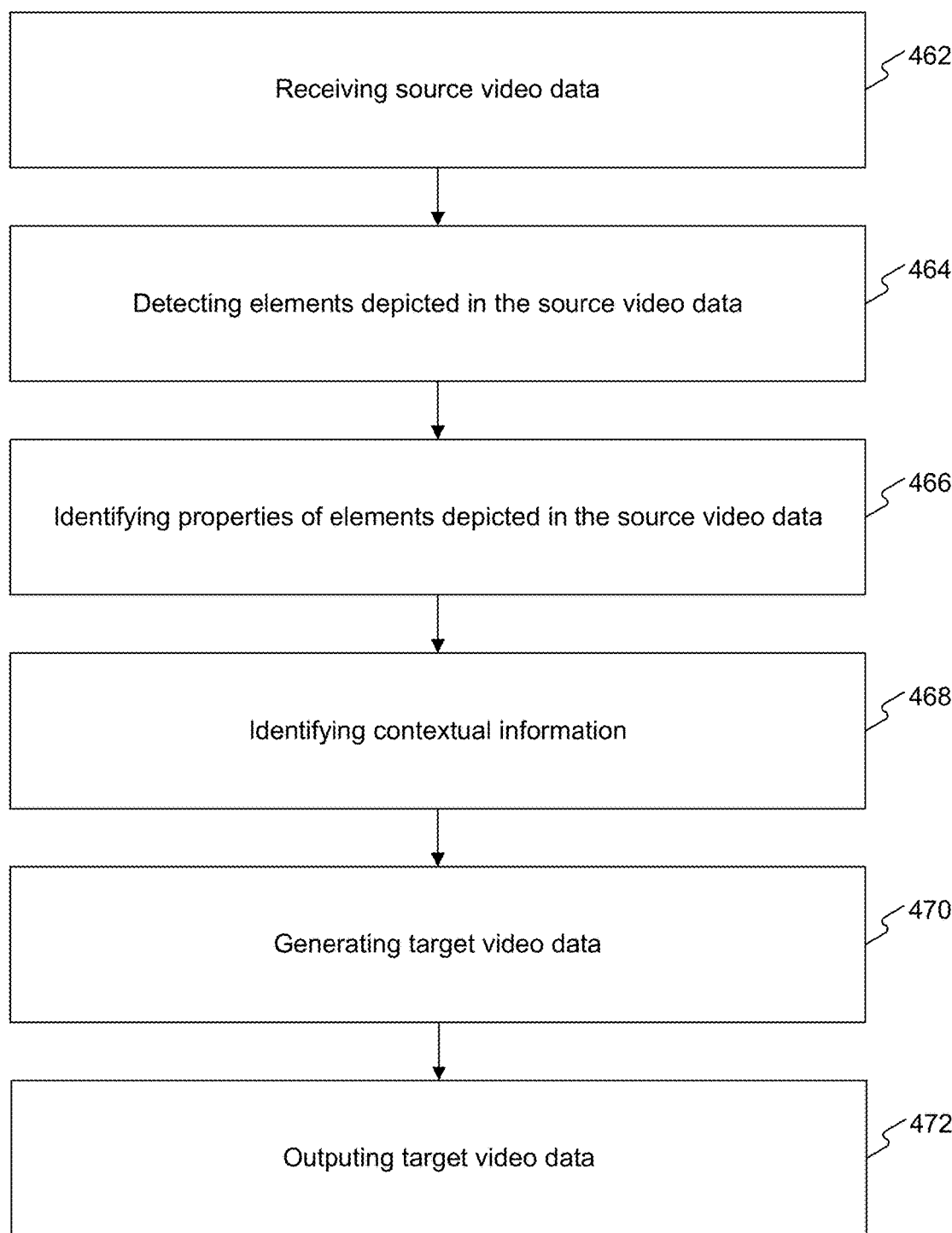
FIG. 4C is a flowchart of an example method for video manipulation, in accordance with some embodiments of the disclosure.

FIG. 4C is a flowchart of an example method 430 for video manipulation. In this example, method 460 may comprise: receiving source video data (step 462); detecting elements depicted in the source video data (step 464); identifying properties of elements depicted in the source video data (step 466); identifying contextual information (step 468); generating target video (step 470); and outputting target video (step 472). In some implementations, method 460 may comprise one or more additional steps, while some of the steps listed above may be modified or excluded. In some implementations, one or more steps illustrated in FIG. 4C may be executed in a different order and/or one or more groups of steps may be executed simultaneously and vice versa.

In some embodiments, step 462 may comprise receiving source video data. In some examples, step 462 may read source video data from memory (for example, from data structure 126, from data structure 136, from memory 250, from memory 320, from memory 400, etc.), may receive source video data from an external device (for example through communications network 140), may receive source video data using media receipt module 402, may capture source video data using one or more image sensors (for example, using camera subsystem 220 and/or optical sensor 222), and so forth. In some examples, the source video data may be received in any suitable format. Some non-limiting examples of such formats may include uncompressed video formats, lossless compressed video formats, lossy compressed video formats, and so forth. In one example, the received source video data may include audio data. In another example, the received source video data may include no audio data. In one example, step 462 may receive source video data that is recorded from an environment. In another example, step 462 may receive source video data that is artificially synthesized. In one example, step 462 may receive the source video data after the recording of the source video data was completed. In another example, step 462 may receive the source video data in real-time, while the source video data is being produced and/or recorded. In some examples, step 462 may use one or more of step 702, step 902, step 802, step 1002, step 1102, step 1202, step 1302, step 1402, step 1502, step 1602, step 1702, step 1802, step 1902, step 2002, step 2102, step 2202, step 2302, step 2402, step 2502 and step 2602 to obtain the source video data.

In some embodiments, step 464 may comprise detecting elements depicted in video data, for example detecting elements depicted in the source video data received by step 462. For example, step 464 may determine whether an element of a particular type is depicted in the video data. In another example, step 464 may determine the number of elements of a particular type that are depicted in the video data. In some examples, step 464 may identify a position of an element of a particular type is depicted in the video data. For example, step 464 may identify one or more frames of the video data that depicts the element. In another example, step 464 may identify position of the element in a frame of the video data. For example, step 464 may identify a bounding shape (such as a bounding box, a bounding polygon, etc.) corresponding to the position of the element in the frame, a position corresponding to the depiction of the element in the frame (for example, a center of the depiction of the element, a pixel within the depiction of the element, etc.), the pixels comprising the depiction of the element in the frame, and so forth. Some non-limiting examples of such elements may include objects, animals, persons, faces, body parts, actions, events, and so forth. Some non-limiting examples of such types of elements may include particular types of objects, particular types of animals, persons, faces, particular body parts, a particular person (or a particular body part of a particular person, such as face of the a particular person), particular types of actions, particular types of events, and so forth. In some examples, to detect elements depicted in the video data (or to detect elements of a particular type in the video data), step 464 may analyze the video data using object detection algorithms, face detection algorithms, pose estimation algorithms, person detection algorithms, action detection algorithms, event detection algorithms, and so forth. In some examples, a machine learning model may be trained using training examples to detect elements of particular types in videos, and step 464 may use the trained machine learning model to analyze the video data and detect the elements. An example of such training example may include video data, together with an indication of the elements depicted in the video data and/or the position of the elements in the video data. In some examples, an artificial neural network (such as convolutional neural network, deep neural network, etc.) may be configured to detect elements of particular types in videos, and step 464 may use the artificial neural network to analyze the video data and detect the elements. In one example, step 464 may be performed in parallel to previous steps of method 460 (such as step 462), for example while the source video data is being received and/or captured and/or generated and/or analyzed by previous steps of method 460. For example, step 464 may analyze some frames of the source video data before other frames of the source video data are received and/or captured and/or generated and/or analyzed. In another example, step 464 may be performed after previous steps of method 460 are completed, for example after the complete source video data was received and/or captured and/or generated and/or analyzed by previous steps of method 460.

In some embodiments, step 466 may comprise identifying properties of elements depicted in video data, for example identify properties of elements depicted in the source video data received by step 462. For example, step 466 may identify properties of elements detected by step 464 in the video data. In some examples, step 466 may identify visual properties of the elements. Some non-limiting examples of such visual properties may include dimensions (such as length, height, width, size, in pixels, in real world, etc.), color, texture, and so forth. For example, to determine the visual properties, step 466 may analyze the pixel values of the depiction of the element in the video data, may count pixels within the depiction of the element in the video data, may analyze the video data using filters, and so forth. In some examples, step 466 may identify whether an element belong to a particular category of elements. For example, the element may be an animal and the particular category may include a taxonomy category of animals, the element may be a product and the particular category may include a particular brand, the element may be a person and the particular category may include a demographic group of people, the element may include an event and the particular category may include a severity group for the event, and so forth. For example, to identify whether the element belong to a particular category of elements, step 466 may use classification algorithms to analyze the depiction of the element in the video data. In some examples, step 466 may identify a pose of an element, for example using a pose estimation algorithm to analyze the depiction of the element in the video data. In some examples, step 466 may identify identities of the elements. For example, the element may be a person or associated with a particular person and step 466 may identify a name or a unique identifier of the person, the element may be an object and step 466 may identify a serial number or a unique identifier of the object, and so forth. For example, to identify an identity of an element, step 466 may analyze the video data using face recognition algorithms, object recognition algorithms, serial number and/or visual codes reading algorithms, and so forth. In some examples, step 466 may identify numerical properties of the elements. Some non-limiting examples of such numerical properties may include estimated weight of an object, estimated volume of an object, estimated age of a person or an animal, and so forth. For example, to identify numerical properties of an element, step 466 may use regression algorithms to analyze the depiction of the element in the video data. In one example, a machine learning model may be trained using training examples to identify properties of elements from video data, and step 466 may use the trained machine learning model to analyze the video data and identify properties of an element. An example of such training example may include video data depicting an element, together with an indication of particular properties of the depicted element. In another example, an artificial neural network (such as convolutional neural network, deep neural network, etc.) may be configured to identify properties of elements from video data, and step 466 may use the artificial neural network to analyze the video data and identify properties of an element. In one example, step 466 may be performed in parallel to previous steps of method 460 (such as step 464 and/or step 462), for example while the source video data is being received and/or captured and/or generated and/or analyzed by previous steps of method 460. For example, step 466 may analyze some frames of the source video data before other frames of the source video data are received and/or captured and/or generated and/or analyzed. In another example, step 466 may be performed after previous steps of method 460 are completed, for example after the complete source video data was received and/or captured and/or generated and/or analyzed by previous steps of method 460. In some examples, steps 464 and 466 may be performed together as a single step, while in other examples steps 466 may be performed separately from step 464.

In some embodiments, step 468 may comprise identifying contextual information. In some examples, step 468 may analyze video data (such as the source video data received by step 462) and/or audio data (such as the source audio data received by step 432) and/or data captured using other sensors to identify the contextual information. For example, a machine learning model may be trained using training examples to identify contextual information from video data and/or audio data and/or data from other sensors, and step 468 may use the trained machine learning model to analyze the video data and/or audio data and/or the data captured using other sensors to identify the contextual information. An example of such training example may include video data and/or audio data and/or data from other sensors, together with corresponding contextual information. In one example, the audio data may include speech (such as one or more conversation), step 468 may analyze the speech (for example using NLP algorithms) to determine one or more topics and/or one or more keywords, and the contextual information may include and/or be based on the determined one or more topics and/or one or more keywords. In one example, step 468 may analyze the video data to determine a type of cloths wore by people in the scene, and the contextual information may include and/or be based on the determined type of cloths. In one example, step 468 may determine a location (for example, based on input from a positioning sensor, based on an analysis of video data, etc.), and the contextual information may include and/or be based on the determined location. In one example, step 468 may determine a time (for example, based on input from a clock, based on an analysis of video data to determine part of day, etc.), and the contextual information may include and/or be based on the determined time. In one example, step 468 may analyze the video data to determine presence of objects in an environment and/or to determine the state of objects in an environment, and the contextual information may be based on the objects and/or a state of the objects. In one example, step 468 may analyze the video data and/or the audio data to identify people in an environment, and the contextual information may be based on the identified persons. In one example, step 468 may analyze the video data and/or the audio data to detect actions and/or events occurring in an environment, and the contextual information may be based on the detected actions and/or events. For example, the contextual information may include information related to location, time, settings, topics, objects, state of objects, people, actions, events, type of scene, and so forth.

In some embodiments, step 470 may comprise generating target video data. In some examples, step 470 may manipulate source video data (such as the source video data received by step 462) to generate the target video data. In some examples, step 470 may generate target video data in any suitable format. Some non-limiting examples of such formats may include uncompressed video formats, lossless compressed video formats, lossy compressed video formats, and so forth. In some examples, step 470 may generate target video data that may include audio data. For example, step 470 may use method 430 to generate the included audio data, for example based on audio data included in the source audio data received by step 462. In another example, step 470 may generate target video data that may include no audio data.

In some examples, step 470 may generate the target video data (or manipulate the source video data) based on elements detected in the source video data (for example, based on the elements detected by step 464). For example, step 470 may manipulate the depiction of a detect element to transform the source video data to the target video data. In another example, in response to a detection of an element of a particular type in the source video data, step 470 may generate first target video data, and in response to a failure to detect elements of the particular type, step 470 may generate second target video data, the second video data may differ from the first video data. In yet another example, in response to a detection of a first number of elements of a particular type in the source video data, step 470 may generate first target video data, and in response to a detection of a second number of elements of the particular type, step 470 may generate second target video data, the second video data may differ from the first video data. In an additional example, in response to a detection of an element of a particular type at a first particular time within the source video data and/or at a first particular position within a frame of the source video data, step 470 may generate first target video data, and in response to a detection of the element of the particular type at a second particular time within the source video data and/or at a second particular position within a frame of the source video data, step 470 may generate second target video data, the second video data may differ from the first video data.

In some examples, step 470 may generate the target video data (or manipulate the source video data) based on properties of elements identified from the source video data (for example, based on the properties identified by step 466). For example, in response to a first property of an element, step 470 may generate first target video data, and in response to a second property of the element, step 470 may generate second target video data, the second video data may differ from the first video data. In an additional example, in response to a first property of an element, step 470 may apply a first manipulation function to the source video data to generate a first target video data, and in response to a second property of the element, step 470 may apply a second manipulation function to the source video data to generate a second target video data, the second manipulation function may differ from the first manipulation function, and the second target video data may differ from the first target video data. Some non-limiting examples of such properties are described above.

In some examples, step 470 may generate the target video data (or manipulate the source video data) based on contextual information (for example, based on the contextual information identified by step 468). For example, in response to first contextual information, step 470 may generate a first target video data, and in response to second contextual information, step 470 may generate a second target video data, the second target video data may differ from the first target video data. In another example, in response to first contextual information, step 470 may apply a first manipulation function to the source video data to generate a first target video data, and in response to second contextual information, step 470 may apply a second manipulation function to the source video data to generate a second target video data, the second manipulation function may differ from the first manipulation function, and the second target video data may differ from the first target video data.

In some example, Generative Adversarial Networks (GAN) may be used to train an artificial neural network configured to generate visual data (or generate video data including the visual data) depicting items (such as background, objects, animals, characters, people, etc.) corresponding to desired characteristics, and step 470 may use the trained artificial neural network to generate the target video or portions of the target video.

In some embodiments, step 472 may comprise outputting video data, for example outputting the target video data generated by step 470. For example, step 472 may use the video data to generate visualizations that corresponds to the video data, for example using a display device, using a virtual reality system, using an augmented reality system, and so forth. In another example, step 472 may store the video data in memory (for example, in data structure 126, in data structure 136, in memory 250, in memory 320, in memory 400, etc.), may provide the video data to an external device (for example through communications network 140), may provide the video data to a user, may provide the video data to another process (for example, to a process implementing any of the methods and/or steps and/or techniques described herein), and so forth.

Figure 5:
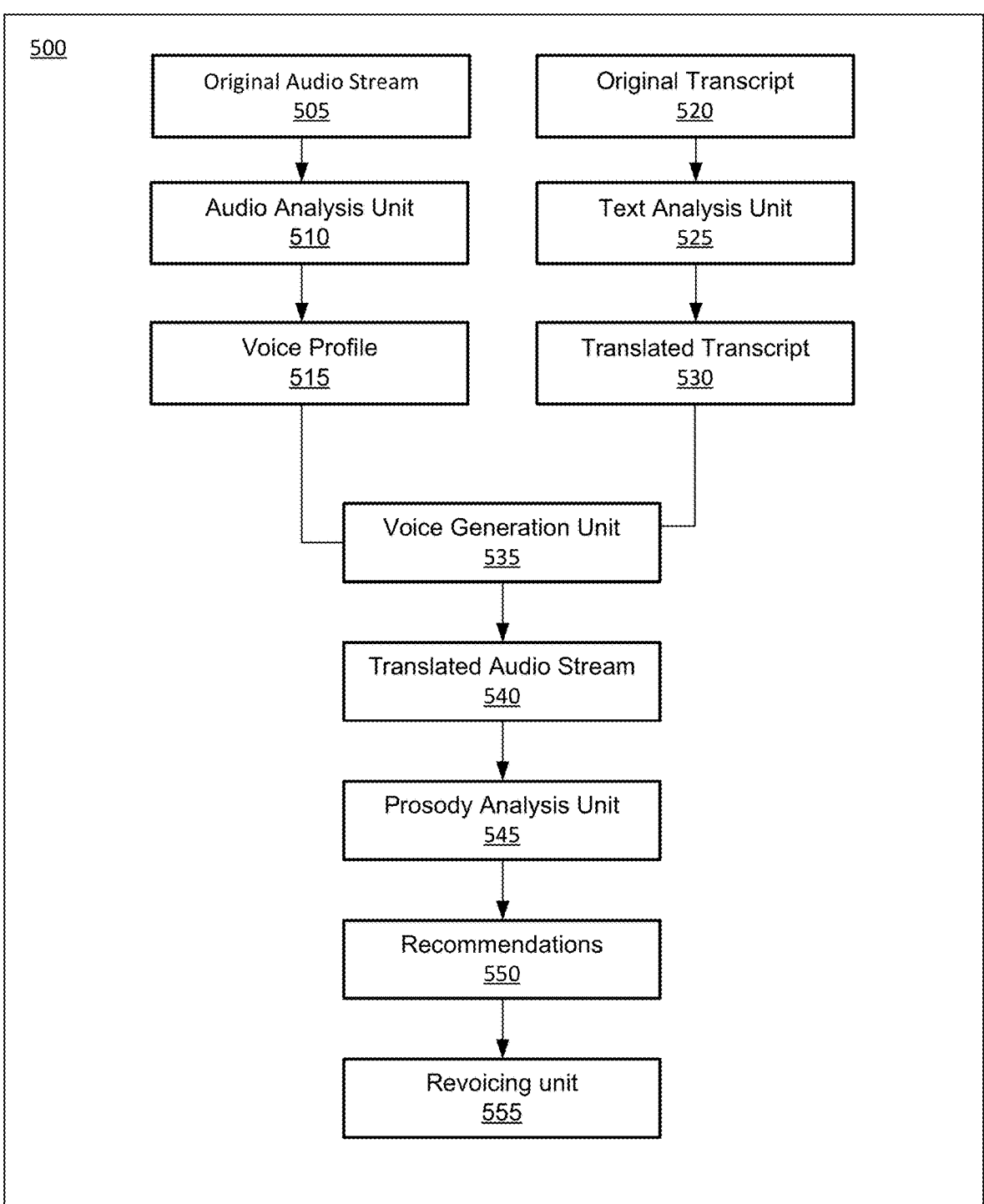
FIG. 5 is a block diagram illustrating the operation of an example artificial dubbing system, in accordance with some embodiments of the disclosure.

FIG. 5 is a block diagram illustrating the operation of an example system 500 (e.g., artificial dubbing system 100) configured to generate artificial voice for a media stream. In this example, the media stream includes an audio stream (e.g., a podcast, a phone call, etc.). In some embodiments, system 500 may be suitable for real time application running on low-resource devices (e.g., communications device 160), where the audio is received in streaming mode and the transcript of the audio stream is being determined in real time.

System 500 may include an audio analysis unit 510 for receiving the original audio stream 505 and analyzing the audio stream to determine a set of voice parameters of at least one individual that speak in the audio stream. Audio analysis unit 510 may also determine a voice profile 515 of the individual based on the set of voice properties. The voice profile 515 is then passed to voice generation unit 535. System 500 further includes a text analysis unit 525 for obtaining the original transcript 520 and receiving from the user a target language selection. In one embodiment, text analysis unit 525 may determine original transcript 520 from original audio stream 505 and automatically determine the target language selection based on user profile.

Text analysis unit 525 may translate the original transcript into the target language (e.g. using online translation services) and pass a translated transcript 530 to voice generation unit 535. Voice generation unit 535 may generate a translated audio stream 540 that sounds as if the individual speaking in the target language using the translated transcript 530 and the voice profile 515. Translated audio stream 540 may then by passed to a prosody analysis unit 545. Prosody analysis unit 545 may use the timing of translated audio stream 540, and the received timing of the original transcript to recommend adjustments 550 that should be done to the final dubbed voice in terms of stretching/shrinking and speed of dubbing. These adjustment recommendations are passed to a revoicing unit 555. Revoicing unit 555 may implement the recommendations 550 on translated audio stream 540.

Figure 6:
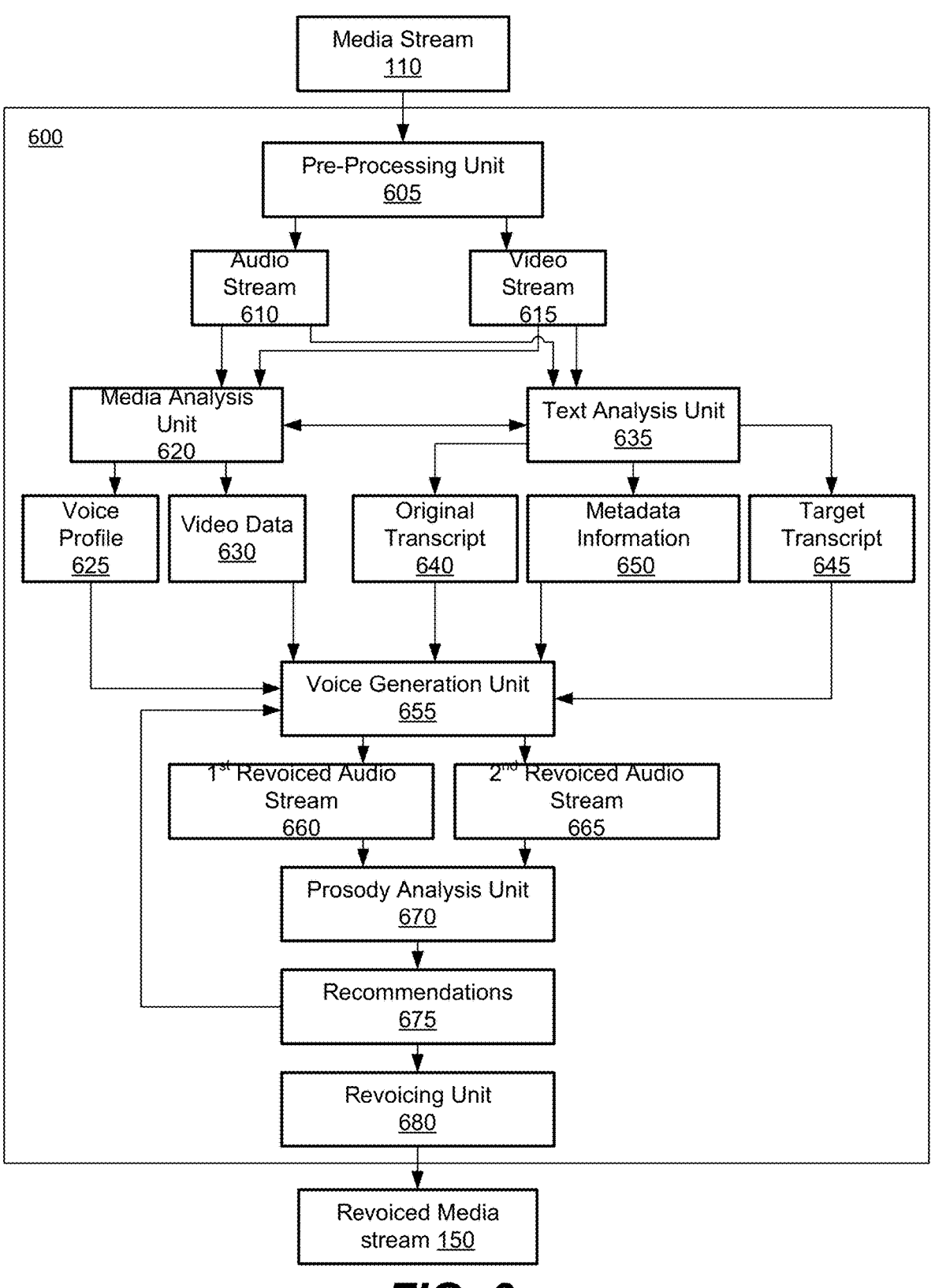
FIG. 6 is a block diagram illustrating the operation of another artificial dubbing system, in accordance with some embodiments of the disclosure.

FIG. 6 is a block diagram illustrating the operation of an example system 600 (e.g., artificial dubbing system 100) configured to generate artificial voice for a media stream. In this example, the media stream includes an audio stream and a video stream (e.g., YouTube, Netflix).

Consistent with the present disclosure, system 600 may include a pre-processing unit 605 for separating media stream 110 into separated audio stream 610 and video stream 615. System 600 may include a media analysis unit 620 configured to receive an audio stream 610 and a video stream 615. In another example, audio stream 610 may be received using step 432, using media receipt module 402, and so forth. In one embodiment, media analysis unit 620 is configured to analyze audio stream 610 to identify a set of voice properties of each individual speaking in audio stream 610 and output a unique voice profile 625 of for each individual based on the set of voice properties. In other embodiments, media analysis unit 620 is configured to analyze video stream 615 to determine video data 630 such as, characteristics of the individual, a gender of the individual, and/or a gender of a person that the individual is speaking to. In addition, system 600 may include a text analysis unit 635 for obtaining an original transcript 640 in the original language of the media stream and a target transcript 645 in the target language to which the video should be dubbed. Text analysis unit 635 may also analyze the audio stream 610 and a video stream 615 to and metadata transcript information 650. As mentioned above, text analysis unit 635 may receive original transcript 640 and target transcript 650 from separate entity (e.g., media owner 120). Alternatively, text analysis unit 635 may also determine original transcript 640 and target transcript 650 from media stream 110.

Voice generation unit 655 may generate a first revoiced audio stream 660 in the original language based on original transcript 640. First revoiced audio stream 660 is artificially generated using voice profile 625, video data 630, and metadata transcript information 650. Voice generation unit 655 may use machine learning modules to test the artificially generated audio stream and to improve voice profile 625 such that first revoiced audio stream 660 will sound similar to audio stream 610. When the similarity between first revoiced audio stream 660 and audio stream 610 is greater than a similarity threshold, voice generation unit 655 may generate a second revoiced audio stream 665 in the target language based on target transcript 645. Second revoiced audio stream 665 is artificially generated using the updated voice profile 625, video data 630, and metadata transcript information 650.

Thereafter, voice generation unit 655 may pass the first and second revoiced audio streams to a prosody analysis unit 670. Prosody analysis unit 670 may performs comparison of the properties of the second revoiced audio stream 665 to the properties of the first revoiced audio stream 660. Using this comparison, prosody analysis unit 670 may recommend adjustments 675 that should be done to the final dubbed voice, including the right volume (to mimic a specific emphasis, or the overall volume of the spoken sentence), intonation (the trend of the pitch), speed, distribution of the audio (e.g., on the 5.1, or more, channels of surround audio), gender, exact speech beginning timing, etc. The intonation (speed, volume, pitch, etc.) in the original language TTS voice sound segment generated from the original language sentence may be compared to an original language's feeling intonations library and if there is a high level of confidence of a match, a 'feeling descriptor' may be attached to the recommendations, in order to render the sentence with a pre-set intonation, which is based on the localized feeling/ intonation library. These adjustment recommendations are passed to a revoicing unit 680.

In one embodiment, prosody analysis unit 670 may suggests adjustments that should be made to the final dubbed voice, e.g. the appropriate local voice gender that should be used, the speed of speech (based on the length of the resulting audio from the local language voice audio segment compared to the timing mentioned in the transcript file and the next transcript's timing that should not be overlapped, and/or the actual timing of the original voice in the video's audio track, etc.), the trend of volume within the sentence (for emphasis), the trend of pitch within the sentence (for intonation), etc. It could also decide if it needs to merge a line or two (or three, etc.), based on the punctuation within the text, the timing between the lines, the switching between one actor's voice to another, etc. Revoicing unit 680 waits until it's the right time to 'speak' based on the transcript's timing and video data 630. For example, when translating a movie from a short duration language to a long duration language (e.g. an English movie dubbed to German) or from long to short (e.g. German to English), the target language speech audio usually needs to be time adjusted (stretched or shrunk) to fit in with the original movie's timing. Simple homogeneous time stretching or shrinking isn't usually good enough, and when squeezed or stretched to more than 20% from the original audio stream, distortions and artifacts might appear in the revoiced audio stream. In order to minimize these distortions, the adjustments should not be homogeneous, but rather manipulate the gaps between words on a different scale than that used on the actual said words made with voice generation unit 655. This can be done by directing the voice generation engine to shorten or widen the gaps before pronouncing the sentence, and/or it can be done in the post process phase (by analyzing the resulting target language's audio track signal for segments with volume lower than −60 dB, and minimizing, eliminating or widening their length by a major factor, e.g. by 80%) and then time adjusting (stretching or shrinking) the resulting audio track by a lower factor (e.g. only 10%), because the overall audio now needs less squeezing in order to fit the available movie timing.

Consistent with the present disclosure, revoicing unit 680 may merge the new created audio track into the original movie to create revoiced media stream 150. In yet another embodiment of the present invention, as used for live TV broadcasts with pre-translated closed transcript, the video playback may be continuously delayed for approximately one minute, during the entire broadcast. During the delay, a standard Speech-to-Text module is run, to regenerate the text lines from audio stream 610, and compare with the translated closed transcript. Once the original language transcript line is generated, the analysis is performed and the delayed video is dubbed. In yet another embodiment, the pre-translated transcript may be replaced by sending the closed transcript to a local translation unit, or by using a remote translation unit (e.g. online translation services). In addition, the original language transcript file may be determined by a speech recognition module that transcribes the video segment from the beginning of the timing of the next transcript till the end of it (as marked in the translated language transcript file). In yet another embodiment, the local language transcript file may be replaced by closed captions 'burned' on the video. The captions are provided to an OCR engine to recognize the text on the screen, which is then transcribed and time-stamped. In yet another embodiment, the video may comprises 'burned' closed captions in a language other than the local language. The captions are provided to an OCR engine to recognize the text on the screen, which is then transcribed, time-stamped, translated and dubbed.

In some embodiments, a method (such as methods 430, 460, 700, 800, 900, 1000, 1100, 1200, 1300, 1400, 1500, 1600, 1700, 1800, 1900, 2000, 2100, 2200, 2300, 2400, 2500, 2600, 2900, etc.) may comprise of one or more steps. In some examples, a method, as well as all individual steps therein, may be performed by various aspects of revoicing unit 130, server 123, server 133, communications devices 160, and so forth. For example, the method may be performed by processing units (such as processors 204) executing software instructions stored within memory units (such as memory 250). In some examples, a method, as well as all individual steps therein, may be performed by a dedicated hardware. In some examples, computer readable medium (such as a non-transitory computer readable medium) may store data and/or computer implementable instructions for carrying out a method. Some non-limiting examples of possible execution manners of a method may include continuous execution (for example, returning to the beginning of the method once the method normal execution ends), periodically execution, executing the method at selected times, execution upon the detection of a trigger (some non-limiting examples of such trigger may include a trigger from a user, a trigger from another method, a trigger from an external device, etc.), and so forth.

In some embodiments, machine learning algorithms (also referred to as machine learning models in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear algorithms, non-linear algorithms, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by an process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some embodiments, trained machine learning algorithms (also referred to as trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may comprise shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the an artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

In some embodiments, analyzing audio data (for example, by the methods, steps and modules described herein) may comprise analyzing the audio data to obtain a preprocessed audio data, and subsequently analyzing the audio data and/or the preprocessed audio data to obtain the desired outcome. One of ordinary skill in the art will recognize that the followings are examples, and that the audio data may be preprocessed using other kinds of preprocessing methods. In some examples, the audio data may be preprocessed by transforming the audio data using a transformation function to obtain a transformed audio data, and the preprocessed audio data may comprise the transformed audio data. For example, the transformation function may comprise a multiplication of a vectored time series representation of the audio data with a transformation matrix. For example, the transformation function may comprise convolutions, audio filters (such as low-pass filters, high-pass filters, band-pass filters, all-pass filters, etc.), nonlinear functions, and so forth. In some examples, the audio data may be preprocessed by smoothing the audio data, for example using Gaussian convolution, using a median filter, and so forth. In some examples, the audio data may be preprocessed to obtain a different representation of the audio data. For example, the preprocessed audio data may comprise: a representation of at least part of the audio data in a frequency domain; a Discrete Fourier Transform of at least part of the audio data; a Discrete Wavelet Transform of at least part of the audio data; a time/frequency representation of at least part of the audio data; a spectrogram of at least part of the audio data; a log spectrogram of at least part of the audio data; a Mel-Frequency Cepstrum of at least part of the audio data; a sonogram of at least part of the audio data; a periodogram of at least part of the audio data; a representation of at least part of the audio data in a lower dimension; a lossy representation of at least part of the audio data; a lossless representation of at least part of the audio data; a time order series of any of the above; any combination of the above; and so forth. In some examples, the audio data may be preprocessed to extract audio features from the audio data. Some examples of such audio features may include: auto-correlation; number of zero crossings of the audio signal; number of zero crossings of the audio signal centroid; MP3 based features; rhythm patterns; rhythm histograms; spectral features, such as spectral centroid, spectral spread, spectral skewness, spectral kurtosis, spectral slope, spectral decrease, spectral roll-off, spectral variation, etc.; harmonic features, such as fundamental frequency, noisiness, inharmonicity, harmonic spectral deviation, harmonic spectral variation, tristimulus, etc.; statistical spectrum descriptors; wavelet features; higher level features; perceptual features, such as total loudness, specific loudness, relative specific loudness, sharpness, spread, etc.; energy features, such as total energy, harmonic part energy, noise part energy, etc.; temporal features; and so forth.

In some embodiments, analyzing audio data (for example, by the methods, steps and modules described herein) may comprise analyzing the audio data and/or the preprocessed audio data using one or more rules, functions, procedures, artificial neural networks, speech recognition algorithms, speaker recognition algorithms, speaker diarization algorithms, audio segmentation algorithms, noise cancelling algorithms, source separation algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth.

In some embodiments, analyzing one or more images (for example, by the methods, steps and modules described herein) may comprise analyzing the one or more images to obtain a preprocessed image data, and subsequently analyzing the one or more images and/or the preprocessed image data to obtain the desired outcome. One of ordinary skill in the art will recognize that the followings are examples, and that the one or more images may be preprocessed using other kinds of preprocessing methods. In some examples, the one or more images may be preprocessed by transforming the one or more images using a transformation function to obtain a transformed image data, and the preprocessed image data may comprise the transformed image data. For example, the transformed image data may comprise one or more convolutions of the one or more images. For example, the transformation function may comprise one or more image filters, such as low-pass filters, high-pass filters, band-pass filters, all-pass filters, and so forth. In some examples, the transformation function may comprise a nonlinear function. In some examples, the one or more images may be preprocessed by smoothing at least parts of the one or more images, for example using Gaussian convolution, using a median filter, and so forth. In some examples, the one or more images may be preprocessed to obtain a different representation of the one or more images. For example, the preprocessed image data may comprise: a representation of at least part of the one or more images in a frequency domain; a Discrete Fourier Transform of at least part of the one or more images; a Discrete Wavelet Transform of at least part of the one or more images; a time/frequency representation of at least part of the one or more images; a representation of at least part of the one or more images in a lower dimension; a lossy representation of at least part of the one or more images; a lossless representation of at least part of the one or more images; a time ordered series of any of the above; any combination of the above; and so forth. In some examples, the one or more images may be preprocessed to extract edges, and the preprocessed image data may comprise information based on and/or related to the extracted edges. In some examples, the one or more images may be preprocessed to extract image features from the one or more images. Some non-limiting examples of such image features may comprise information based on and/or related to: edges; corners; blobs; ridges; Scale Invariant Feature Transform (SIFT) features; temporal features; and so forth.

In some embodiments, analyzing one or more images (for example, by the methods, steps and modules described herein) may comprise analyzing the one or more images and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth.

In some embodiments, analyzing one or more images (for example, by the methods, steps and modules described herein) may comprise analyzing pixels, voxels, point cloud, range data, etc. included in the one or more images.

1. Dubbing a Media Stream Using Synthesized Voice

FIG. 7A is a flowchart of an example method 700 for artificially generating a revoiced media stream (i.e., a dubbed version of an original media stream) in which a translated transcript is spoken by a virtual entity. In one example the virtual entity sounds similar to the individual in the original media stream. The method includes determining a synthesized voice for a virtual entity intended to dub the individual in the original media stream. The synthesized voice may have one or more characteristics identical to the characteristics of the particular voice. Consistent with the present disclosure, method 700 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 700, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream including an individual speaking in an origin language, wherein the individual is associated with particular voice. As described above, media receipt module 402 may receive a media stream from media owner 120 or a media stream captured by user 170. According to step 702, the processing device may receive a media stream including an individual speaking in an origin language, wherein the individual is associated with particular voice. For example, step 702 may use step 432 and/or step 462 to receive the media stream. The disclosed embodiment may further include obtaining a transcript of the media stream including utterances spoken in the origin language. As described above, transcript processing module 404 may receive the transcript from media owner 120 or determine the transcript of the received media stream using any suitable voice-to-text algorithm. According to step 704, the processing device may obtain a transcript of the media stream including utterances spoken in the origin language.

The disclosed embodiment may further include translating the transcript of the media stream to a target language, wherein the translated transcript includes a set of words in the target language for each of at least some of the utterances spoken in the origin language. As mentioned above, transcript processing module 404 may include instructions to translate the transcript of the received media stream to the target language using any suitable translation algorithm. According to step 706, the processing device may translate the transcript of the media stream to a target language, wherein the translated transcript may include a set of words in the target language for each of at least some of the utterances spoken in the origin language. For example, step 706 may use step 440 to translate or otherwise transform the transcript. In one example, step 706 may translate or transformed speech directly from the media stream received by step 702, for example as described above in relation to step 440, and step 704 may be excluded from method 700. Additionally or alternatively, step 706 may receive a translated transcript, for example by reading the translated transcript from memory, by receiving the translated transcript from an external device, by receiving the translated transcript from a user, and so forth.

The disclosed embodiment may further include analyzing the media stream to determine a voice profile for the individual, wherein the voice profile includes characteristics of the particular voice, or obtaining voice profile for the individual in a different way. For example, voice profile for the individual may be received using step 442. The characteristics of the particular voice may be uniquely related to the individual and may be used for identifying the individual. Alternatively, the characteristics of the particular voice may be generally related to the individual and may be used for distinguishing one individual included in the media stream from another individual included in the media stream. Consistent with the present disclosure, the voice profile may further include data indicative of a manner in which the utterances spoken in the origin language are pronounced by the individual in the received media stream. Some other non-limiting examples of voice profiles are described above, for example in relation to step 442. In another embodiment, the method executable by the processing device may further include determining how to pronounce each set of words in the translated transcript in the target language based on the manner in which the utterances spoken in the origin language are pronounced in the received media stream. According to step 708, the processing device may analyze the media stream to determine a voice profile for the individual, wherein the voice profile includes characteristics of the particular voice. Additionally or alternatively, step 708 may obtain the voice profile for the individual in other ways, for example using step 442.

The disclosed embodiment may further include determining a synthesized voice for a virtual entity intended to dub the individual, wherein the synthesized voice has characteristics identical to the characteristics of the particular voice. The term "synthesized voice" refers to a voice that was generated by any algorithm that converts the transcript text into speech, such as TTS algorithms. Consistent with the present disclosure, the virtual entity may be generated for revoicing the media stream. In one embodiment, the virtual entity may be deleted after the media stream is revoiced. Alternatively, the virtual entity may be stored for future dubbing of other media streams. The term "virtual entity" may refer to any type computer-generated entity that can be used for audibly reading text such as the translated transcript. The virtual entity may be associated with a synthesized voice than may be determined based on the voice profile of an individual speaking in the original media stream. According to step 710, the processing device may determine a synthesized voice for a virtual entity intended to dub the individual, wherein the synthesized voice has characteristics identical to the characteristics of the particular voice. The disclosed embodiment may further include generating a revoiced media stream in which the translated transcript in the target language is spoken by the virtual entity. Consistent with the present disclosure, the term "an individual [that] speaks the target language" as used below with reference to the revoiced media stream means that a virtual entity with synthesized voice that has one or more characteristics identical to the voice characteristics of the individual in the original media stream is used to say the transcript translated to the target language. In one embodiment, the synthesized voice may sound substantially identical to the particular voice, such that when the virtual entity utters the original transcript in the origin language, the result is indistinguishable from the audio of the original media stream to a human ear. In another embodiment, the synthesized voice may sound similar to but distinguishable from the particular voice, for example, the virtual entity may sound like a young girl with French accent or an elderly man with a croaky voice. According to step 712, the processing device may generate a revoiced media stream in which the translated transcript in the target language is spoken by the virtual entity. For example, steps 710 and 712 may use steps 444 and/or 446 to determine the synthesized voice and generate the revoiced media stream.

Consistent with the present disclosure, the media stream may include a plurality of first individuals speaking in a primary language and at least one second individual speaking in a secondary language. In one embodiment, the method executable by the processing device may include using determined voice profiles for the plurality of first individuals to artificially generate a revoiced media stream in which a plurality of virtual entities associated with the plurality of first individuals speak the target language and at least one virtual entity associated the at least one second individual speaks the secondary language. Additional information on this embodiment is discussed below with reference to FIGS. 8A and 8B. Consistent with the present disclosure, the media stream may include a first individual speaking in a first origin language and a second individual speaking in a second origin language. In another embodiment, the method executable by the processing device may include using determined voice profiles for the first and second individual to artificially generate a revoiced media stream in which virtual entities associated with both the first individual and the second individuals speak the target language. Additional information on this embodiment is discussed below with reference to FIGS. 9A and 9B. Consistent with the present disclosure, the media stream may include at least one individual speaking in a first origin language with an accent in a second language. In another embodiment, the method executable by the processing device may include: determining a desired level of accent in the second language to introduce in a dubbed version of the received media stream; and using determined at least one voice profile for the at least one individual to artificially generate a revoiced media stream in which at least one virtual entity associated with the at least one individual speaks the target language with an accent in the second language at the desired level. Additional information on this embodiment is discussed below with reference to FIGS. 10A and 10B.

Consistent with the present disclosure, the media stream may include at a first individual and a second individual speaking the origin language. In another embodiment, the method executable by the processing device may include: based on at least one rule for revising transcripts of media streams, automatically revising a first part of the transcript associated with the first individual and avoid from revising a second part of the transcript associated with the second individual; and using determined voice profiles for the first and second individuals to artificially generate a revoiced media stream in which a first virtual entity associated with the first individual speaks the revised first part of the transcript and a second virtual entity associated with the second individual speaks the second unrevised part of the transcript. Additional information on this embodiment is discussed below with reference to FIGS. 11A and 11B. Consistent with the present disclosure, the media stream may be destined to a particular user. In another embodiment, the method executable by the processing device may include: based on a determined user category indicative of a desired vocabulary for the particular user, revising the transcript of the media stream; and using determined voice profile for the individual to artificially generate a revoiced media stream in which the virtual entity associated with the individual speaks the revised transcript in the target language. Additional information on this embodiment is discussed below with reference to FIGS. 12A and 12B. Consistent with the present disclosure, the media stream may be destined to a particular user. In another embodiment, the method executable by the processing device may include: translating the transcript of the media stream to the target language based on received preferred language characteristics; and using determined voice profile for the individual to artificially generate a revoiced media stream in which the virtual entity associated with the individual speaks in the target language according to the preferred language characteristics of the particular user. Additional information on this embodiment is discussed below with reference to FIGS. 13A and 13B.

Consistent with the present disclosure, the media stream may be destined to a particular user. In another embodiment, the method executable by the processing device may include: determining a preferred target language for the particular user; and using the determined voice profile for the individual to artificially generate a revoiced media stream in which the translated transcript is spoken by the virtual entity associated with the individual in the preferred target language. Additional information on this embodiment is discussed below with reference to FIGS. 14A and 14B. Consistent with another embodiment, the method executable by the processing device may include: analyzing the transcript to determine a set of language characteristics for the individual; and using the determined voice profile for the individual to artificially generate a revoiced media stream in which the translated transcript is spoken by the virtual entity associated with the individual, wherein the transcript is translated to the target language based on the determined set of language characteristics. Additional information on this embodiment is discussed below with reference to FIGS. 7A and 7B. Consistent with another embodiment, the method executable by the processing device may include: analyzing the transcript to determine that the individual discussed a subject likely to be unfamiliar with users associated with the target language; and using the determined voice profile for the individual to artificially generate a revoiced media stream in which the translated transcript is spoken by the virtual entity associated with the individual, wherein the revoiced media stream provides explanation to the subject discussed by the individual in the origin language. Additional information on this embodiment is discussed below with reference to FIGS. 16A and 16B.

Consistent with the present disclosure, the media stream may be destined to a particular user. In another embodiment, the method executable by the processing device may include: analyzing the transcript to determine that the individual in the received media stream discussed a subject likely to be unfamiliar with the particular user; and using the determined voice profile for the individual to artificially generate a revoiced media stream in which the translated transcript is spoken by the virtual entity associated with the individual, wherein the revoiced media stream provides the determined explanation to the subject discussed by the at least one individual in the origin language. Additional information on this embodiment is discussed below with reference to FIGS. 17A and 17B. Consistent with another embodiment, the method executable by the processing device may include: analyzing the transcript to determine that an original name of a character in the received media stream is likely to cause antagonism with users that speak the target language; and using the determined voice profile for the individual to artificially generate a revoiced media stream in which the translated transcript is spoken by the virtual entity associated with the individual and the character has a substitute name. Additional information on this embodiment is discussed below with reference to FIGS. 18A and 18B. Consistent with another embodiment, the method executable by the processing device may include: determining that the transcript includes a first utterance that rhymes with a second utterance; and using the determined voice profile for the individual to artificially generate a revoiced media stream in which the translated transcript is spoken by the virtual entity associated with the individual, wherein the transcript is translated in a manner that at least partially preserves the rhymes of the transcript in the origin language. Additional information on this embodiment is discussed below with reference to FIGS. 19A and 19B.

Consistent with the present disclosure, the voice profile may be indicative of a ratio of volume levels between different utterances spoken by the individual in the origin language. In one embodiment, the method executable by the processing device may include: determining metadata information for the translated transcript, wherein the metadata information includes desired volume levels for different words; and using the determined voice profile for the individual to artificially generate a revoiced media stream in which the translated transcript is spoken by the virtual entity associated with the individual, wherein a ratio of the volume levels between utterances spoken by the virtual entity in the target language are substantially identical to the ratio of volume levels between different utterances spoken by the individual in the origin language. Additional information on this embodiment is discussed below with reference to FIGS. 20A and 20B. Consistent with the present disclosure, the media stream may include at a first individual and a second individual speaking the origin language. In another embodiment, the method executable by the processing device may include: analyzing the media stream to determine voice profiles for the first individual and the second individual, wherein the voice profiles are indicative of a ratio of volume levels between utterances spoken by each individual as they were recorded in the media stream; and using the determined voice profiles for the first individual and the second individual to artificially generate a revoiced media stream in which the translated transcript is spoken by a first virtual entity associated with the first individual and a second virtual entity associated with the second individual, wherein a ratio of the volume levels between utterances spoken by the first virtual entity and the second virtual entity in the target language are substantially identical to the ratio of volume levels between utterances spoken by the first individual and the second individual in the origin language. Additional information on this embodiment is discussed below with reference to FIGS. 21A and 21B.

Consistent with the present disclosure, the media stream may include at least one individual speaking the origin language and sounds from a sound-emanating object. In another embodiment, the method executable by the processing device may include: determining auditory relationship between the at least one individual and the sound-emanating object, wherein the auditory relationship is indicative of a ratio of volume levels between utterances spoken by the at least one individual in the original language and sounds from the sound-emanating object as they are recorded in the media stream; and using determined voice profiles for the at least one individual and the sound-emanating object to artificially generate a revoiced media stream in which the translated transcript is spoken by at least one virtual entity associated with the at least one individual, wherein a ratio of the volume levels between utterances spoken by the at least one virtual entity in the target language and sounds from the sound-emanating object substantially identical to the ratio of volume levels between utterances spoken by the individual in the original language and sounds from the sound-emanating object as they are recorded in the media stream. Additional information on this embodiment is discussed below with reference to FIGS. 22A and 22B. Consistent with another embodiment, the method executable by the processing device may include: determining timing differences between the original language and the target language, wherein the timing differences represent time discrepancy between saying the utterances in a target language and saying the utterances in the original language; and using determined voice profile for the individual to artificially generate a revoiced media stream in which the translated transcript is spoken by the virtual entity associated with the individual in a manner than accounts for the determined timing differences between the original language and the target language. Additional information on this embodiment is discussed below with reference to FIGS. 23A and 23B.

Consistent with another embodiment, the method executable by the processing device may include: analyzing the media stream to determine a set of voice parameters of the individual and visual data; and using a voice profile for the individual determined based on the set of voice parameters and visual data to artificially generate a revoiced media stream in which the translated transcript is spoken by the virtual entity associated with the individual. Additional information on this embodiment is discussed below with reference to FIGS. 24A and 24B. Consistent with another embodiment, the method executable by the processing device may include: analyzing the media stream to determine visual data; and using the voice profile for the individual to artificially generate a revoiced media stream in which the translated transcript is spoken by the virtual entity associated with the individual, wherein the translation of the transcript to the target language is based on the visual data. Additional information on this embodiment is discussed below with reference to FIGS. 25A and 25B. Consistent with another embodiment, the method executable by the processing device may include: analyzing the media stream to determine visual data that includes text written in the origin language; and using the voice profile for the individual to artificially generate a revoiced media stream in which the translated transcript is spoken by the virtual entity associated with the individual, wherein the revoiced media stream provides a translation to the text written in the origin language. Additional information on this embodiment is discussed below with reference to FIGS. 26A and 26B.

Figure 7B:
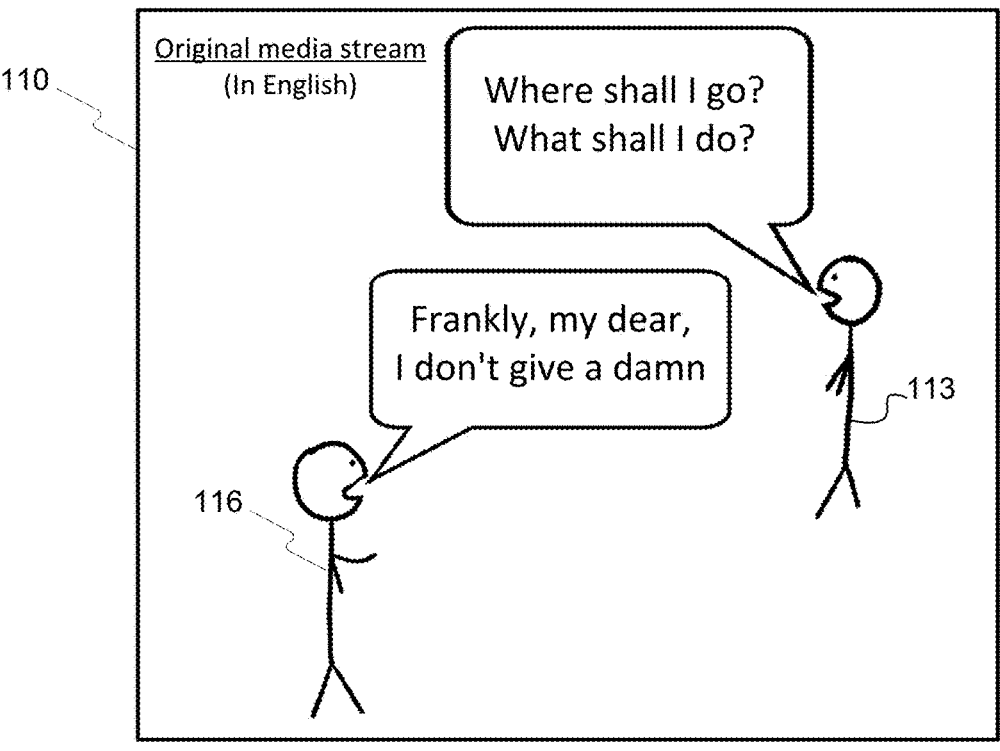
FIG. 7B is a schematic illustration depicting an example of revoicing a media stream using the method described in FIG. 7A.
Figure 7B:

FIG. 7B is a schematic illustration depicting an implementation of method 700. In the figure, original media stream 110 is the 1939 film "Gone with the Wind" that includes individual 113 (e.g., "Scarlett O'Hara" played by Vivien Leigh) and individual 116 (e.g., "Rhett Butler" played by Clark Gable) that speak in English. Consistent with disclosed embodiments, the system may analyze the media stream to determine a voice profile for Scarlett O'Hara and Rhett Butler, wherein each voice profile includes characteristics of the particular voice for the related individual. The system may determine a synthesized voice for a first virtual entity intended to dub Scarlett O'Hara and for a second virtual entity intended to dub Rhett Butler. In some example, the synthesized voices have characteristics identical to the characteristics of the particular voices. Specifically, when first virtual entity audibly reads text it sounds like Vivien Leigh reads the transcript and when second virtual entity audibly reads text it sounds like Clark Gable reads the transcript. The system may generate a revoiced media stream in which the translated transcript in Spanish is spoken by the first and second virtual entities. In one example, the revoiced media stream sounds as if Vivien Leigh and Clark Gable spoke Spanish.

FIG. 7C is a flowchart of an example method 720 for causing presentation of a revoiced media steam associated with a selected target language. In one example, the revoiced media steam was generated before the user selected the target language. Consistent with the present disclosure, method 720 may be executed by a processing device of system 100. The processing device of system 100 may include a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 720, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, or further include additional steps.

The disclosed embodiment may further include generating a plurality of revoiced media streams from a single original media stream, wherein the plurality of revoiced media streams includes two or more revoiced media streams in which the virtual entity speaks differing target languages. For example, a first revoiced media stream where at least one virtual entity associated with the at least one individual in the original media stream speaks a first language, a second revoiced media stream where the at least one virtual entity speaks a second language, and a third revoiced media stream where the at least one virtual entity speaks a third language. In some embodiments, the plurality of revoiced media streams may include revoiced media streams in more than three languages, more than five languages, or more than ten languages. In other embodiments, the plurality of revoiced media streams may include revoiced media streams in different language registers, associated with different age of the target users, different versions in the same target language (e.g., with accent or without accent), and more. At step 722, the processing device may generate a plurality of revoiced media streams from a single original media stream, wherein the plurality of revoiced media streams may include two or more revoiced media streams in which the virtual entity speaks differing target languages. For example, step 722 may use steps 444 and/or 446 to determine synthesized voices at a plurality of languages and generate the plurality of revoiced media streams.

The disclosed embodiment may further include providing user information indicative of the available target languages for presenting the original media stream. For example, the information indicative of the available target languages may be provided through a view on a display element of a graphical user interface (GUI) of communications device 160 of the user. Alternatively, the information indicative of the available target languages may be provided through a view on a display element of GUI of a dedicated streaming application for consuming media content installed in communications device 160 of the user (e.g., Hulu, Netflix, Sling TV, YouTube TV, and more. The dedicated application may be available for most popular mobile operating systems, such as iOS, Android, and Windows, and deployed from corresponding application stores. At step 724, the processing device may provide a specific user information indicative of the available target languages for presenting the original media stream.

The disclosed embodiment may further include receiving user selection indictive of a preferred target language for presenting the original media stream. The selection can be made, for example, by the user touching the display of communications device 160 at a location where an indicator (e.g. icon) of the preferred language is displayed, such as with a finger, a pointer, or any other suitable object. Alternatively, the selection can be automatically made based on previous input from the user. Consistent with the present disclosure, the user selection may be received after the plurality of revoiced media streams were generated. For example, the user selection may be received at least a day after the plurality of revoiced media streams were generated, received at least a week after the plurality of revoiced media streams were generated, or received at least a month after the plurality of revoiced media streams were generated. At step 726, the processing device may receive user selection indicative of a preferred target language for presenting the original media stream.

The disclosed embodiment may further include causing presentation of a revoiced media steam associated with the selected target language upon receiving the user selection. The term "causing presentation of a revoiced media stream" may include delivering (e.g., transmitting) the revoiced media stream associated with the selected target language to communications device 160 or enabling communications device 160 to download the revoiced media stream associated with the selected target language. For example, the plurality of revoiced media streams associated with the original media stream may be stored in database 126 of media owner 120 and the selected revoiced media stream may be provided to communications device 160 on demand. At step 728, the processing device cause presentation of a revoiced media steam associated with the selected target language upon receiving the user selection.

The following concepts are arranged under separate headings for ease of discussion only. It is to be understood that each element and embodiment described under any heading may be independently considered a separate embodiment of the invention when considered alone or in combination with any other element or embodiment described with reference to the same or other concepts. Therefore, the embodiments are not limited to the precise combinations presented below and any description of an embodiment with regard to one concept may be relevant for a different concept. For example, the plurality of media stream in method 720 may be generated according to method 800, method, 900, method 1000, method 1100, method 1200, method 1300, method 1400, method 1500, method 1600, method 1700, method 1800, method 1900, method 2000, method 2100, method 2200, method 2300, method 2400, method 2500, method 2600, and method 2900.

2. Selectively Selecting the Language to Dub in a Media Stream

FIG. 8A is a flowchart of an example method 800 for revoicing a media stream that includes individuals speaking in multiple origin languages, such that only individuals speaking the primary (original) language will speak the target language in the revoiced media stream. Consistent with the present disclosure, method 800 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. Consistent with disclosed embodiments, a non-transitory computer-readable storage media is provided. The non-transitory computer-readable storage media may store program instructions that when executed by a processing device of the disclosed system cause the processing device to perform method 800, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream including a plurality of first individuals speaking in a primary language and at least one second individual speaking in a secondary language. As described above, media receipt module 402 may receive a media stream from media owner 120 or a media stream captured by user 170. According to step 802, the processing device may receive a media stream including a plurality of first individuals speaking in a primary language (e.g., English) and at least one second individual speaking in a secondary language (e.g., Russian). For example, step 802 may use step 432 and/or step 462 to receive the media stream. The disclosed embodiment may further include obtaining a transcript of the received media stream associated with utterances in the first language and utterances in the second language. As described above, transcript processing module 404 may receive the transcript from media owner 120 or determine the transcript of the received media stream using any suitable voice-to-text algorithm. According to step 804, the processing device may obtain a transcript of the received media stream associated with utterances in the first language and utterances in the second language.

The disclosed embodiment may further include determining that dubbing of the utterances in the primary language to a target language is needed and that dubbing of the utterances in the secondary language to the target language is unneeded. Consistent with the present disclosure, the processing device may identify cases where the dubbing of the utterances in the secondary language to the target language are needed and cases where the dubbing of the utterances in the secondary language to the target language are unneeded. In some examples, the identification of the cases may be based on the significant of the at least one second individual in the received media stream. For example, a main character or a supporting character. According to step 806, the processing device may determine that dubbing of the utterances in the primary language to a target language (e.g., French) is needed and that dubbing of the utterances in the secondary language to the target language is unneeded. For example, a machine learning model may be trained using training example to determine whether dubbing of utterances is need in different languages, and step 806 may use the trained machine learning model to analyze the transcript and determining whether dubbing is needed in the primary language and/or in the secondary language. An example of such training example may include a transcript, an indication of a particular utterance and an indication of a particular language, together with an indication of whether dubbing of the utterance is needed in the particular language. In another example, an artificial neural network (such as a recurrent neural network, a long short-term memory neural network, a deep neural network, etc.) may be configured to determine whether dubbing of utterances is need in different languages, and step 806 may use the artificial neural network to analyze the transcript and determining whether dubbing is needed in the primary language and/or in the secondary language.

The disclosed embodiment may further include analyzing the received media stream to determine a set of voice parameters for each of the plurality of first individuals. In one example, each set of voice parameters associated with each of the plurality of first individuals may be different in at least one voice parameter. According to step 818, the processing device may analyze the received media stream to determine a set of voice parameters for each of the plurality of first individuals. The disclosed embodiment may further include determining a voice profile for each of the plurality of first individuals based on an associated set of voice parameters. As described above, voice profile determination module 406 may determine a voice profile for each one or more individuals speaking in the received media stream. According to step 810, the processing device may determine a voice profile for each of the plurality of first individuals based on an associated set of voice parameters, or obtaining the voice profiles for the individuals in a different way. For example, voice profiles for the individuals may be received using step 442. Some other non-limiting examples of voice profiles are described above, for example in relation to step 442.

The disclosed embodiment may further include using the determined voice profiles and a translated version of the transcript to artificially generate a revoiced media stream in which the plurality of first individuals speak the target language and the at least one second individual speaks the secondary language. In one embodiment, revoicing unit 680 may use an artificial revoiced version (in the secondary language) of the utterances spoken by the at least one second individual to generate the revoiced media stream. Alternatively, revoicing unit 680 may use the original version of the utterances spoken by the at least one second individual to generate the revoiced media stream. According to step 812, the processing device may use the determined voice profiles and a translated version of the transcript to artificially generate a revoiced media stream in which the plurality of first individuals speak the target language and the at least one second individual speaks the secondary language. For example, step 812 may use steps 444 and/or 446 to generate the revoiced media stream.

In one embodiment, the target language is the secondary language. For example, when revoicing a movie in English to Russian where the movie includes a specific character that speaks Russian, the specific character may not be revoiced. Consistent with the one embodiment, the revoiced media stream may be played to a user fluent in two or more languages. The disclosed embodiment may include determining to generate a revoiced media stream in which the at least one second individual speaks the secondary language (and not the target language) based on stored preferences of the user. The preferences of the user may be included in a user profile and stored in database 414. For example, when the user is fluent in French and Russian, utterances in the primary language (e.g., English) may be dubbed into the target language (e.g., French) and utterances in the secondary language (e.g., Russian) may not be dubbed.

Disclosed embodiments may include identifying the first language spoken by the plurality of first individuals as a primary language of the received media stream and the second language spoken by the at least one second individual as a secondary language of the received media stream. The artificially generated revoiced media stream may take into account which language is the primary language and which language is the secondary language. For example, when most of the characters in the received media stream speak English and only one speaks Russian, the primary language would be English. Disclosed embodiments may include performing image analysis on the received media stream to determine that the at least one second individual said a certain utterance in the secondary language excluded from a dialogue with any of the plurality of the first individuals speaking the primary language. For example, media analysis unit 620 may distinguish between utterances included in a dialogue with one of plurality of first individuals speaking in the primary language and utterances excluded from a dialogue with any of the plurality of the first individuals.

Disclosed embodiments may include performing text analysis on the transcript to determine that the at least one second individual said a certain utterance in the secondary language excluded from a dialogue with any of the plurality of the first individuals speaking the primary language. For example, text analysis unit 635 may distinguish between utterances included in a dialogue with one of plurality of first individuals speaking in the primary language and utterances excluded from a dialogue with any of the plurality of the first individuals. Disclosed embodiments may include that the at least one second individual said a first utterance in the secondary language excluded from a dialogue with any of the plurality of the first individuals speaking the primary language, and artificially generating a revoiced media stream in which the first utterance is spoken in the secondary language. For example, the first utterance may be generated using voice generation unit 655 in the second language or included in its original version in the revoiced media stream. Disclosed embodiments may include determining that the at least one second individual said a second utterance in the secondary language included in a dialogue with one of the plurality of the first individuals speaking the primary language, and artificially generating a revoiced media stream in which the second utterance is spoken in the target language. For example, the second utterance may be generated using voice generation unit 655 in the target language.

Disclosed embodiments may include analyzing the received media stream to identify a third individual speaking in the secondary language, determining a voice profile of the third individual; and artificially generating a revoiced media stream in which the plurality of first individuals and the third individual speak in the target language and the at least one second individual speaks in the secondary language. For example, the third individual may be an important character in the media stream and the at least one second individual may be a supporting character. Disclosed embodiments may include identifying that the plurality of first individual speak the first language and that the at least one second individual speaks the second language. For example, audio analysis unit 510 or text analysis unit 525 may include instructions to determine which origin language is being used by each individual in the received media stream. Consistent with the present disclosure, the received media stream may be a real-time conversation (e.g., a phone call or a recorded physical conversation) between the first individual and a user. Disclosed embodiments may reduce the value of the at least one second individual in the revoiced media stream compared to the dubbed voiced of a first individual. Disclosed embodiments may include identifying background chatter in the second language and avoid from determining voice profiles to individuals associated with the background chatter.

Figure 8B:
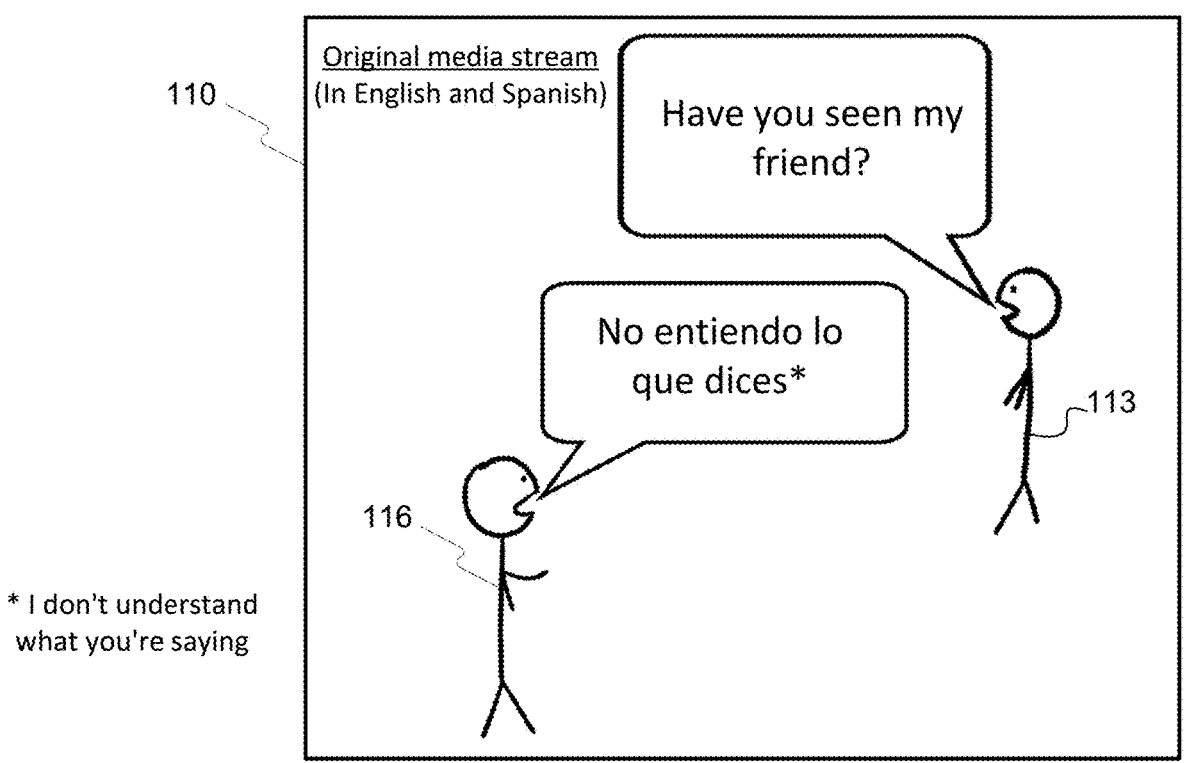
FIG. 8B is a schematic illustration depicting an example of revoicing a media stream using the method described in FIG. 8A.
Figure 8B:

FIG. 8B is a schematic illustration depicting an implementation of method 900. In the figure, original media stream 110 includes individual 113 that speaks in English (which is the primary language in media stream 110) and individual 116 that speaks in Spanish (which is the secondary language in media stream 110. Consistent with disclosed embodiments, the system may artificially generate revoiced media stream 150 in which individual 113 speaks the target language (German) and individual 116 will continue to speak the secondary language.

3. Revoicing a Media Stream with Multiple Languages

FIG. 9A is a flowchart of an example method 900 for revoicing a media stream that includes individuals speaking in multiple origin languages, such that at least some of the individuals (e.g., all of the individuals) in the revoiced media stream will speak a single target language. Consistent with the present disclosure, method 900 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 900, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving an input media stream including a first individual speaking in a first language and a second individual speaking in a second language. As described above, media receipt module 402 may receive a media stream from media owner 120 or a media stream captured by user 190. According to step 902, the processing device may receive an input media stream including a first individual speaking in a first language (e.g., English) and a second individual speaking in a second language (e.g., Russian). For example, step 902 may use step 432 and/or step 462 to receive the media stream. The disclosed embodiment may further include obtaining a transcript of the input media stream associated with utterances in the first language and utterances in the second language. As described above, transcript processing module 404 may receive the transcript from media owner 120 or determine the transcript of the received media stream using any suitable voice-to-text algorithm. According to step 904, the processing device may obtain a transcript of the input media stream associated with utterances in the first language and utterances in the second language.

The disclosed embodiment may further include analyzing the received media stream to determine a first set of voice parameters of the first individual and a second set of voice parameters of the second individual. The voice parameters may include various statistical characteristics of the first and second individuals such as average loudness or average pitch of the utterances in the first and second languages, spectral frequencies of the utterances in the first and second languages, variation in the loudness of the utterances in the first and second languages, the pitch of the utterances in the first and second languages, rhythm pattern of the utterances in the first and second languages, and the like. The voice parameters may also include specific characteristics of the first and second individuals such as specific utterances in the first and second languages pronounced in a certain manner. According to step 906, the processing device may analyze the received media stream to determine a first set of voice parameters of the first individual and a second set of voice parameters of the second individual.

The disclosed embodiment may further include determining a first voice profile of the first individual based on the first set of voice parameters. As described above, voice profile determination module 406 may determine the voice profiles for each one or more individuals speaking in the received media stream. According to step 908, the processing device may determine a first voice profile of the first individual based on the first set of voice parameters. Similarly, at step 910, the processing device may determine a second voice profile of the second individual based on the second set of voice parameters. Additionally or alternatively, step 908 may obtain the first voice profile of the first individual in other ways, for example using step 442. Additionally or alternatively, step 910 may obtain the first voice profile of the first individual in other ways, for example using step 442. The disclosed embodiment may further include using the determined voice profiles and a translated version of the transcript to artificially generate a revoiced media stream in which both the first individual and the second individuals speak a target language. As described above, voice generation module 408 may generate artificial dubbed version of the received media stream. According to step 912, the processing device may use the determined voice profiles and a translated version of the transcript to artificially generate a revoiced media stream in which both the first individual and the second individuals speak a target language (e.g., French). For example, step 912 may use steps 444 and/or 446 to generate the revoiced media stream.

In one embodiment, the target language is the first language. For example, a movie in English that a specific character that speaks Russian may be revoiced such that the specific character will also speak English. In another embodiment, the target language is a language other than the first and the second languages. For example, a movie in English that one character speaks Russian may be revoiced such that all the characters will speak French.

Disclosed embodiments may include identifying that the first individual speaks the first language and that the second individual speaks the second language. For example, audio analysis unit 510 or text analysis unit 525 may include instructions to determine which origin language is being used by each individual in the received media stream. Related embodiments may include identifying that the first individual speaks the first language during a first segment of the received media stream and the second language during a second segment of the received media stream. The processing device may generate a revoiced media stream in which the first individual speaks the target language during both the first segment of the received media stream and during the second segment of the received media stream. For example, when the first individual in a movie mainly speaks English but answers in Russian to the second individual's questions, the answers in Russian (as well as the second individual's questions) will also be revoiced into the target language. Related embodiments may include identifying that the first individual speaks the first language during a first segment of the received media stream and a language other than the second language during a second segment of the received media stream. The processing device may generate a revoiced media stream in which the first individual speaks the target language during the first segment of the received media stream and keeps the language other than the second language during a second segment of the received media stream. For example, when the first individual in a movie mainly speaks English but reads a text in Spanish, the text will not be revoiced into the target language, instead it will be kept in Spanish.

Disclosed embodiments may include identifying the first language spoken by the first individual as a primary language of the received media stream and the second language spoken by the second individual as a secondary language of the received media stream. The artificially generated revoiced media stream may take into account which language is the primary language and which language is the secondary language. For example, when most of the characters in the received media stream speak English and only one speaks Russian, the primary language would be English. Related embodiments may include purposely generating a revoiced media stream in which the second individual speaks the target language with an accent associated with the secondary language. With reference to the example above, the one character that speaks Russian may be revoiced such that the character will speak the target language in a Russian accent. Related embodiments may include purposely generating a revoiced media stream in which the second individual speaks at least one word in the secondary language and most of the words in the target language. For example, words such as "Hello," "Thank you," "Goodbye," and more may be spoken in the original secondary language and not be translated and dubbed into the target language.

Disclosed embodiments may include determining the transcript from the received media stream. For example, as discussed above, transcript processing module 404 may determine the transcript of the received media stream using any suitable voice-to-text algorithm. Disclosed embodiments may include determining the transcript from the received media stream. For example, as discussed above, transcript processing module 404 may include instructions to translate the transcript of the received media stream to the target language using any suitable translation algorithm. Disclosed embodiments may include playing the revoiced media stream to a user and wherein determining the target language may be based on stored preferences of the user. The preferences of the user may be included in a user profile and stored in database 414. Consistent with the present disclosure, the received media stream may be a real-time conversation (e.g., a phone call or a recorded physical conversation) between the first individual, the second individual, and a user. Disclosed embodiments may include improving the first voice profile and the second voice profile during the real-time conversation and changing a dubbed voice of the first individual and the second individual as the real-time conversation progress. For example, in the beginning of the real-time conversation the voice of the first individual may sound as a generic young woman and later in the conversation the voice of the first individual may sounds as if the first individual speaks the target language.

Figure 9B:
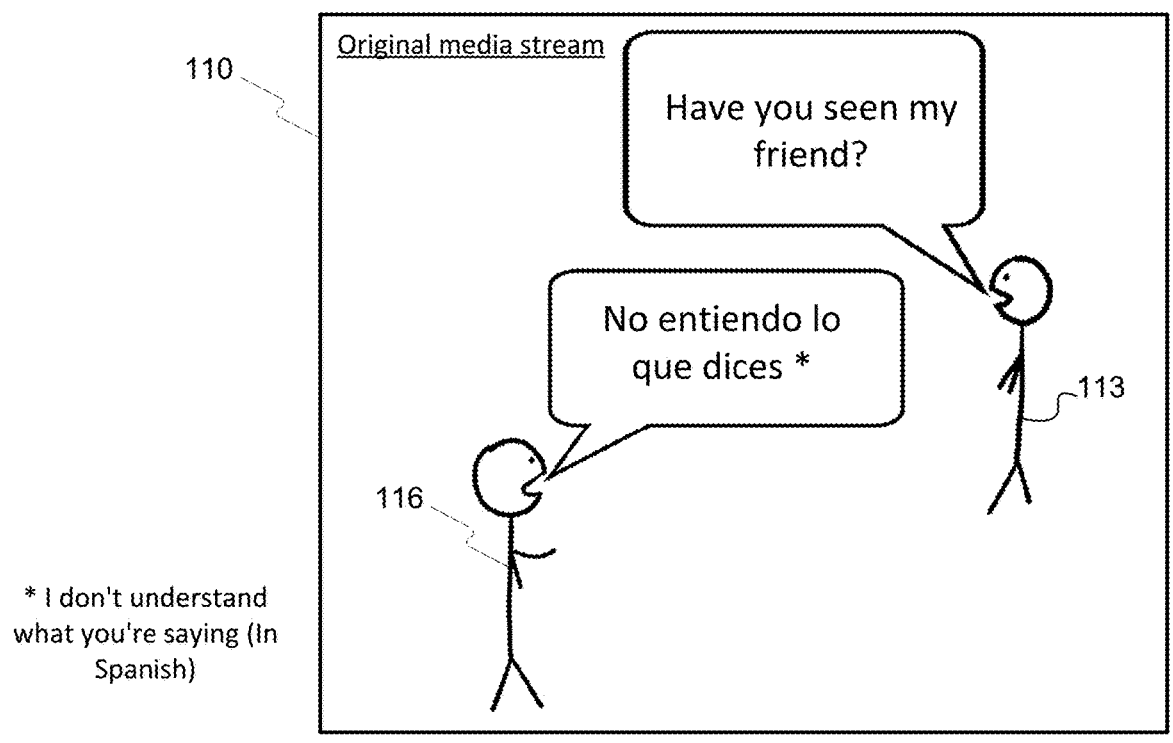
FIG. 9B is a schematic illustration depicting an example of revoicing a media stream using the method described in FIG. 9A.
Figure 9B:

FIG. 9B is a schematic illustration depicting an implementation of method 900. In the figure, original media stream 110 includes individual 113 that speaks in English (which is the primary language in media stream 110) and individual 116 that speaks in Spanish (which is the secondary language in media stream 110). Consistent with disclosed embodiments, the system may artificially generate revoiced media stream 150 in which both individual 113 and individual 116 speak the target language (German).

4. Artificially Generating an Accent Sensitive Revoiced Media Stream

FIG. 10A is a flowchart of an example method 1000 for revoicing a media stream that includes an individual speaking a first language with an accent in a second language, such that the individual will speak the target language in the revoiced media stream with a desired amount of accent in a second language. Consistent with the present disclosure, method 1000 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. Consistent with disclosed embodiments, a non-transitory computer-readable storage media is provided. The non-transitory computer-readable storage media may store program instructions that when executed by a processing device of the disclosed system cause the processing device to perform method 1000, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream including an individual speaking in a first language with an accent in a second language. As described above, media receipt module 402 may receive a media stream from media owner 120 or a media stream captured by user 170. According to step 1002, the processing device may receive a media stream including an individual speaking in a first language (e.g., English) with an accent in a second language (e.g., Russian). For example, step 1002 may use step 432 and/or step 462 to receive the media stream. The disclosed embodiment may further include obtaining a transcript of the received media stream associated with utterances in the first language. As described above, transcript processing module 404 may receive the transcript from media owner 120 or determine the transcript of the received media stream using any suitable voice-to-text algorithm. According to step 1004, the processing device may obtain a transcript of the received media stream associated with utterances in the first language.

The disclosed embodiment may further include analyzing the received media stream to determine a set of voice parameters of the individual. In one example, the set of voice parameters may include a level of accent in the second language. According to step 1006, the processing device may analyze the received media stream to determine a set of voice parameters of the individual. Some non-limiting examples of such analysis are described herein, for example in relation to step 442. The disclosed embodiment may further include determining a voice profile of the individual based on the set of voice parameters. As described above, voice profile determination module 406 may determine the voice profile for the individual. The voice profile may identify specific utterances in the first language that are pronounced with accent in the second language and other utterances in the first language that are not pronounced with accent in the second language. Some other non-limiting examples of voice profiles are described above, for example in relation to step 442. According to step 1008, the processing device may determine a voice profile of the individual based on the set of voice parameters, or obtaining voice profile for the individual in a different way. For example, step 1008 may receive a voice profile for the individual using step 442.

The disclosed embodiment may further include accessing one or more databases to determine at least one factor indicative of a desired level of accent to introduce in a dubbed version of the received media stream. The one or more databases may include data structure 126, data structure 136, database 360, or database 400. The at least one factor may be specific to the target language, to the second language, to the user, to the individual, etc. According to step 1010, the processing device may access one or more databases to determine at least one factor indicative of a desired level of accent to introduce in a dubbed version of the received media stream. In another example, at least one factor indicative of a desired level of accent to introduce in a dubbed version of the received media stream may be determined based on an analysis of the media stream received using step 1002, may be determined based on user input, may be read from memory, and so forth.

The disclosed embodiment may further include using the determined voice profile, the at least one factor, and a translated version of the transcript to artificially generate a revoiced media stream in which the individual speaks the target language with an accent in the second language at the desired level. In one case, the revoiced media stream may include the individual speaking the target language without accent. In other case, the revoiced media stream may include the individual speaking the target language with an accent in the second language. According to step 1012, the processing device may use the determined voice profile, the at least one factor, and a translated version of the transcript to artificially generate a revoiced media stream in which the individual speaks the target language with an accent in the second language at the desired level. In one example, step 1012 may use step 444 and/or step 446 to artificially generate the revoiced media stream. In another example, a machine learning model may be trained using training examples to generate media streams from voice profiles, factors indicative of desired levels of accent, and transcript, and step 1012 may use the trained machine learning model to generate the revoiced media stream from the determined voice profile, the at least one factor, and a translated version of the transcript. An example of such training example may include a voice profile, a factor, and a transcript, together with the desired media stream to be generated.

In one embodiment, the target language is a language other than the second language. For example, when revoicing a movie in English to French where the movie includes a specific character that speaks English with a Russian accent, the specific character may be revoiced to speak French with a Russian accent. In some cases, the processing device may artificially generate the revoiced media stream such that the individual would speak the target language without an accent associated with the second language. For example, when the at least one factor indicate that the desired level of accent is no accent. Disclosed embodiments may include determining a level of the accent associated with second language that the individual has in the received media stream, and artificially generating the revoiced media stream such that the individual would speak the target language with an accent in the second language at the determined level of accent. For example, the determined level of accent may be on a scale of zero to ten where "ten" is a heavy accent and "zero" is no accent.

Related embodiments may include determining that, in the received media stream, the individual used an accent associated with the second language for satiric purposes; and maintaining a similar level of accent in the artificially generated revoiced media stream. For example, in some cases characters in a movie use fake accent, the processing device will maintain the fake accent when dubbing the media stream to the target language. Alternatively, when accent associated with the second language for satiric purposes is identified the processing device may determine to remove it from the revoiced media stream. In related embodiments, the level of the accent in the second language that the individual has in the received media stream may be included in the determined voice profile and may be associated with specific utterances in the first language. For example, the voice profile may indicate that some words are pronounced with accent in the second language while other words are not pronounced with accent.

Consistent with the present disclosure, the revoiced media stream may be played to a user (e.g. user 170). Disclosed embodiments may include determining the at least one factor indicative of the desired level of accent to introduce in the revoiced media stream based on information associated with stored preferences of a user. The preferences of the user may be included in a user profile and stored in database 414. Alternative embodiments may include determining the at least one factor indicative of the desired level of accent to introduce in the revoiced media stream based on information associated with system settings. For example, the system may have rules regarding which languages to dub with an accent and which languages to dub without an accent (even if the original voice in the received media stream had an accent). Example embodiments may include determining the at least one factor indicative of the desired level of accent to introduce in the revoiced media stream based on the second language. For example, the system may have a rule not to generate voice with Russian accent.

Other embodiments may include determining the at least one factor indicative of the desired level of accent to introduce in the revoiced media stream based on the target language. For example, the system may have a rule not to generate voice with any accent when dubbing the media stream to Chinese. Consistent with the present disclosure, the received media stream may be a real-time conversation (e.g., a phone call or a recorded physical conversation) between the first individual and a user. In some cases, the target language may be the first language that the user understands (e.g., English). Disclosed embodiments may include identifying a first part of the conversation that the individual speaks the second language (e.g., French) and a second part of the conversation that the individual speaks the first language (e.g., English) with an accent associated with the second language. Related embodiments may include artificially generating the revoiced media stream such that the individual would speak in both the first part of the conversation and the second part of the conversation the target language (i.e., the first language) without an accent associated with the second language.

Figure 10B:
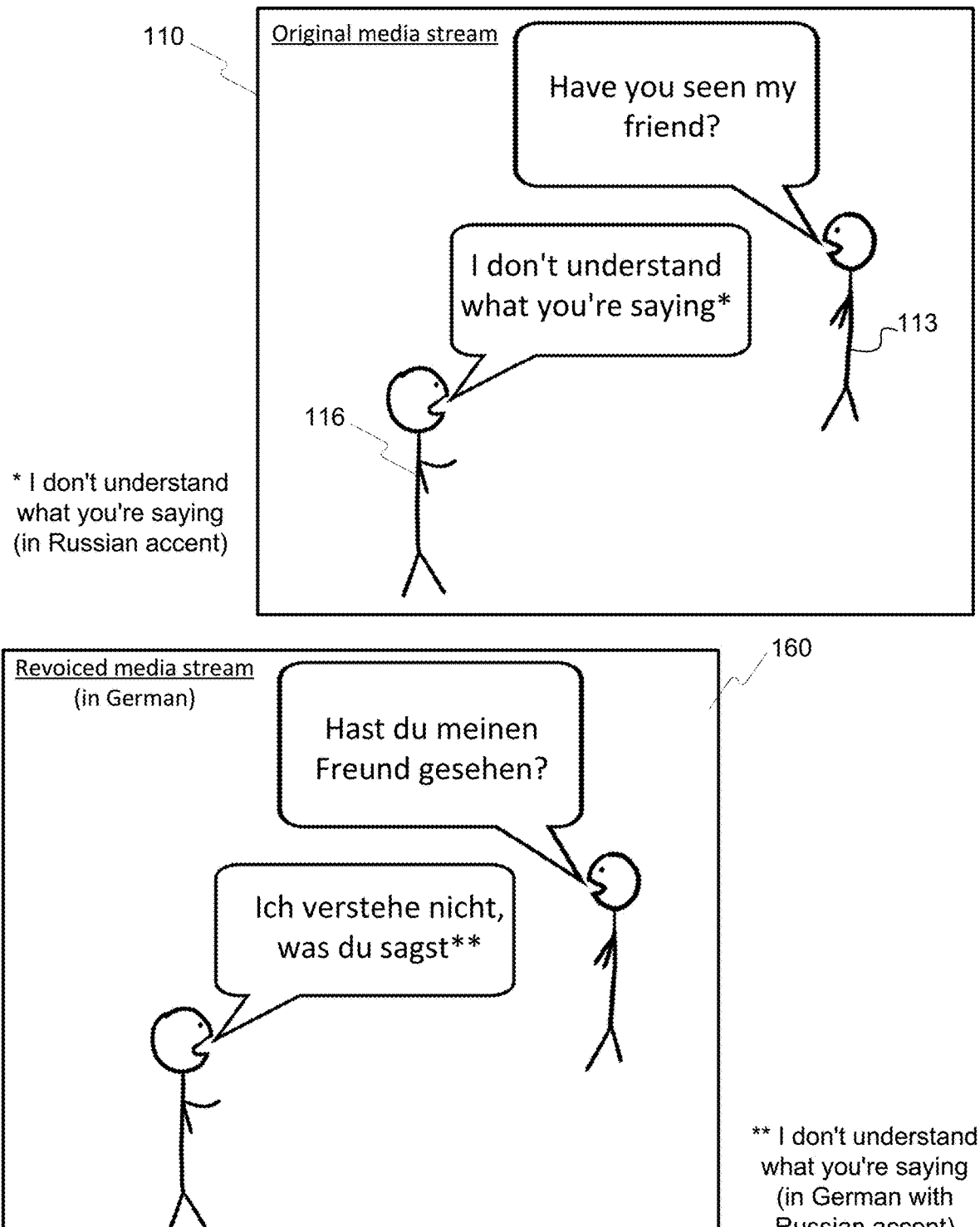
FIG. 10B is a schematic illustration depicting an example of revoicing a media stream using the method described in FIG. 10A.

FIG. 10B is a schematic illustration depicting an implementation of method 1000. In the figure, original media stream 110 includes individual 113 that speaks in English (without accent) and individual 116 that speaks in English with an accent (e.g., Russian accent). Consistent with disclosed embodiments, the system may artificially generate revoiced media stream 150 in which both individual 113 and individual 116 speak the target language (German), but individual 116 speaks in the target language with an accent as in the original media stream (e.g., also the Russian accent).

5. Automatically Revising a Transcript of a Media Stream

FIG. 11A is a flowchart of an example method 1100 for artificially generating a revoiced media stream in which a transcript of one the individuals speaking in the media stream is revised. Consistent with the present disclosure, method 1100 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 1100, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream including a first individual and a second individual speaking in at least one language. As described above, media receipt module 402 may receive a media stream from media owner 120 or a media stream captured by user 170. According to step 1102, the processing device may receive a media stream including a first individual and a second individual speaking in at least one language. For example, step 1102 may use step 432 and/or step 462 to receive the media stream. The disclosed embodiment may further include obtaining a transcript of the media stream including a first part associated with utterances spoke by the first individual and a second part associated with utterances spoke by the second individual. As described above, transcript processing module 404 may receive the transcript from media owner 120 or determine the transcript of the received media stream using any suitable voice-to-text algorithm. According to step 1104, the processing device may obtain a transcript of the media stream including a first part associated with utterances spoke by the first individual and a second part associated with utterances spoke by the second individual.

The disclosed embodiment may further include analyzing the media stream to determine a voice profile of at least the first individual. In one example, the voice profile may be determined based on an identified set of voice parameters associated with the first individual. In another example, the voice profile may be determined using a machine learning algorithm without identifying the set of voice parameters. According to step 1106, the processing device may analyze the media stream to determine a voice profile of at least the first individual. Additionally or alternatively, step 1106 may obtain the voice profile of the at least one individual in other ways, for example using step 442. The disclosed embodiment may further include accessing at least one rule for revising transcripts of media streams. The at least one rule for revising transcripts of media streams may be stored in database 414. One example of the rules may include automatically replacing vulgar or offensive words. According to step 1108, the processing device may access at least one rule for revising transcripts of media streams.

The disclosed embodiment may further include according to the at least one rule, automatically revising the first part of the transcript and avoid from revising the second part of the transcript. As described above, transcript processing module 404 may revise the transcript, wherein revising the transcript may include translating the transcript, replacing words in the transcript while keeping the meaning of the sentences, updating the jargon of transcript, and more. According to step 1110, according to the at least one rule, the processing device may automatically revise the first part of the transcript and avoid from revising the second part of the transcript. For example, step 1110 may use step 440 to revise the first part of the transcript. In one example, step 1110 may translate or transformed speech directly from the media stream received by step 1102, for example as described above in relation to step 440, and step 1104 may be excluded from method 1100. Additionally or alternatively, step 1110 may receive such a revised segment of the transcript, for example by reading the revised segment of the transcript from memory, by receiving the revised segment of the transcript from an external device, by receiving the revised segment of the transcript from a user, and so forth.

The disclosed embodiment may further include using the determined voice profiles and the revised transcript to artificially generate a revoiced media stream in which the first individual speaks the revised first part of the transcript and the second individual speaks the second unrevised part of the transcript. In one case, the processing device may use the original voice of the second individual in the revoiced media stream. Alternatively, the processing device may use an artificially generated voice of the second individual. According to step 1112, the processing device may use the determined voice profiles and the revised transcript to artificially generate a revoiced media stream in which the first individual speaks the revised first part of the transcript and the second individual speaks the second unrevised part of the transcript. For example, steps 1112 may use steps 444 and/or 446 to generate the revoiced media stream.

In one embodiment, both the first individual and the second individual speak a same language. Alternatively, the first individual speaks a first language and the second individual speaks a second language. Related embodiment includes artificially generating a revoiced media stream in which both the first individual and the second individual speak a target language. The target language may be the first language, the second language, or a different language. Disclosed embodiments may include determining that a revision of the first part of the transcript associated with the first individual is needed and that a revision of the second part of the transcript associated with the second individual is unneeded. In some cases, the determination which parts of the transmittal needs to be revised is based on identities of the first individual and the second individual. For example, the first individual may be a government official that should not said certain things and the second individual may be a reporter. In other cases, the determination which parts of the transmittal needs to be revised is based on the language spoken by the first individual and by the second individual. For example, when the first individual speaks a first language and the second individual speaks a second language, the processing device may determine to revise the part of the transcript associated with the first language. In one case, revising the first part of the transcript includes translating it to the second language.

In addition, the determination which parts of the transmittal needs to be revised is based on the utterances spoken by the first individual and the utterances spoken by the second individual the second individual. For example, the first individual uses vulgar or offensive words. Consistent with some embodiments, the at least one rule for revising transcripts is based on a detail about a user listing to the media stream. For example, the processing device may determine the age of the user based on information from the media player (e.g., communications device 160). Alternatively, the processing device may estimate the age of the user based on the hour the day. For example, revising the transcript in hours in which the media stream is more likely to be viewed by young users. The detail about the user may also gender, ethnicity, and more. Disclosed embodiments may include revising the first part of the transcript includes automatically replacing predefined words. For example the phrase "Aw, shit!" may be replace with the "Aw, shoot!," the phrase "damn it" may be replace with "darn it," and so on.

Additionally, revising the first part of the transcript may be based on a jargon associated with a time period. For example, remake the audio of an old movie to match the current jargon. In a specific case, the media stream is a song and disclosed embodiments may include artificially generating a revoiced song in which the first individual sings the revised first part of the transcript and the second individual sings the second unrevised part of the transcript. According to some embodiments, the processing device may use the original voice of the second individual in the revoiced media stream or an artificially generated voice of the second individual. Consistent with the present disclosure, the received media stream may be a real-time conversation (e.g., a phone call or a recorded physical conversation) between the first individual and the second individual. In some cases, the first individual speaks a first language (e.g., French) or a first dialect of a language (Scottish English) and the second individual speaks a second language (e.g., English) or a second dialect of the language (American English). In these cases, revising the first part of the transcript may include translating the first part from the first language to the second language. In some cases, both the first individual and the second individual speak a same language (e.g., English). In these cases, revising the first part of the transcript may include changing or deleting certain utterances spoke by the first individual. For example, deleting sounds that the first individual made to clears his/her throat before talking.

Figure 11B:
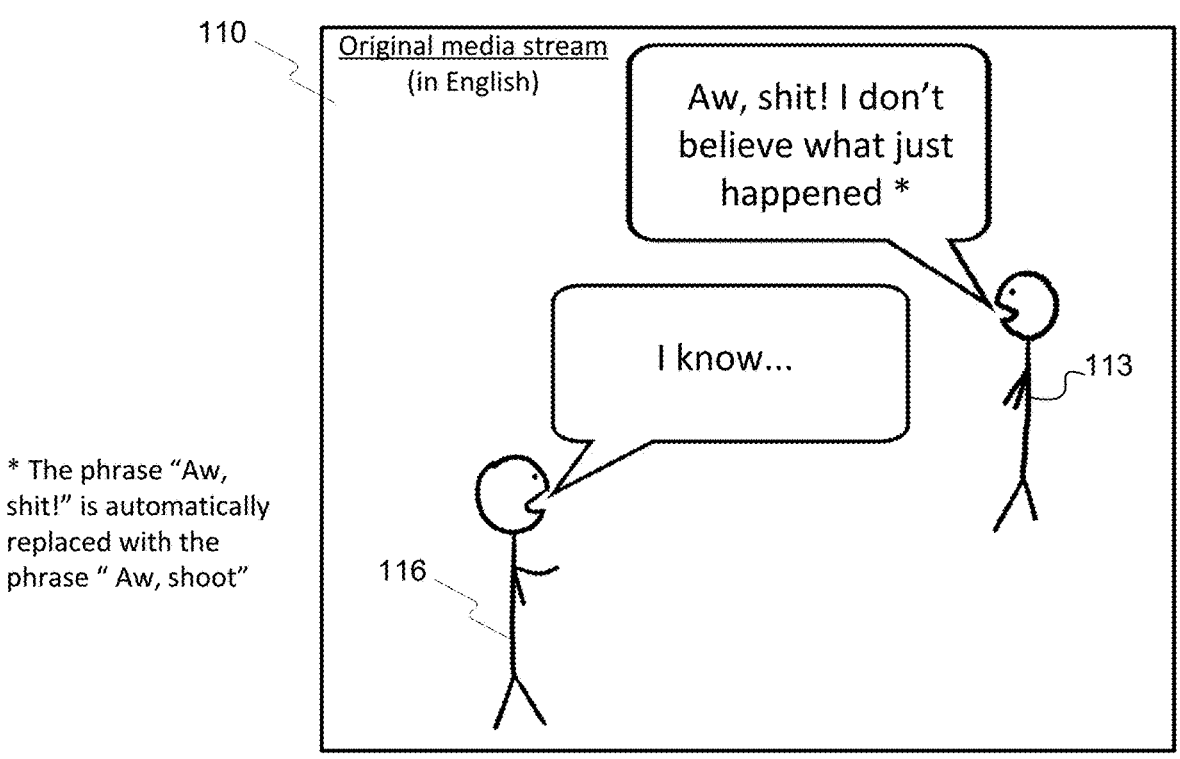
FIG. 11B is a schematic illustration depicting an example of revoicing a media stream using the method described in FIG. 11A.
Figure 11B:

FIG. 11B is a schematic illustration depicting an implementation of method 1100. In the figure, original media stream 110 includes individual 113 and individual 116 that speak in English. Consistent with disclosed embodiments, the transcript of the individual 113 is revised due to the use of restricted words. In this case, the system may artificially generate revoiced media stream 150 in which the target language is the origin language (but obviously it can be any other language). In the revoiced media stream, individual 116 says the revised transcript.

6. Revising a Transcript of a Media Stream Based on User Category

FIG. 12A is a flowchart of an example method 1200 for artificially generating a revoiced media stream in which a transcript of one the individuals speaking in the media stream is revised based on a user category. Consistent with the present disclosure, method 1200 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 1200, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream destined to a particular user, wherein the media stream includes at least one individual speaking in at least one origin language. As described above, media receipt module 402 may receive a media stream from media owner 120 or a media stream captured by user 170. According to step 1202, the processing device may receive a media stream destined to a particular user, wherein the media stream includes at least one individual speaking in at least one origin language. For example, step 1202 may use step 432 and/or step 462 to receive the media stream. The disclosed embodiment may further include obtaining a transcript of the media stream including utterances associated with the at least one individual. As described above, transcript processing module 404 may receive the transcript from media owner 120 or determine the transcript of the received media stream using any suitable voice-to-text algorithm. According to step 1204, the processing device may obtain a transcript of the media stream including utterances associated with the at least one individual.

The disclosed embodiment may further include determining a user category indicative of a desired vocabulary for the particular user. The user category may be determined based on data about the particular user. In one example, the user category may be associated with the age of the particular user and the desired vocabulary is excluded of censored words. In another example, the user category may be based on a nationality of the particular user and the desired vocabulary includes different names for the same object. According to step 1206, the processing device may determine a user category indicative of a desired vocabulary for the particular user. For example, the user category may be read from memory, received from an external device, received from a user, and so forth. In another example, a machine learning model may be trained using training examples to determine user categories for users from user information, and step 1206 may use the trained machine learning model to analyze user information of the particular user and determine the user category indicative of the desired vocabulary for the particular user. An example of such training example may include user information corresponding to a user, together with a user category for the user. Some non-limiting examples of such user information may include images of the user, voice recordings of the user, demographic information of the user, information based on past behavior of the user, and so forth. For example, the user information may be obtained using step 436, may be read from memory, may be received from an external device, may be received from a user (the same user or a different user), and so forth. In yet another example, an artificial neural network (such as a deep neural network) may be configured to determine user categories for users from user information, and step 1206 may use the artificial neural network to analyze user information of the particular user and determine the user category indicative of the desired vocabulary for the particular user.

The disclosed embodiment may further include revising the transcript of the media stream based on the determined user category. As described above, transcript processing module 404 may revise the transcript, wherein revising the transcript may include translating the transcript, replacing words in the transcript while keeping the meaning of the sentences, updating the jargon of transcript, and more. According to step 1208, the processing device may revise the transcript of the media stream based on the determined user category. For example, step 1208 may use step 440 to revise the transcript of the media stream. In another example, step 1208 may use an NLP algorithm to revise the transcript of the media stream. In yet another example, a machine learning model may be trained using training example to revise transcripts based on user categories, and the trained machine learning model may be used to analyze and revise the transcript of the media stream based on the determined user category. An example of such training example may include an original transcript and a user category, together with a desired revision of the transcript for that user category. In yet another example, an artificial neural network (such as recurrent neural network, a long short-term memory neural network, a deep neural network, etc.) may be configured to revise transcripts based on user categories, and the artificial neural network may be used to analyze and revise the transcript of the media stream based on the determined user category. In one example, step 1208 may translate or transformed speech directly from the media stream received by step 1202, for example as described above in relation to step 440. Additionally or alternatively, step 1208 may receive such revised transcript, for example by reading the revised transcript from memory, by receiving the revised transcript from an external device, by receiving the revised transcript from a user, and so forth. For example, step 1208 may select a revised transcript from a plurality of alternative revised transcripts based on the determined user category.

The disclosed embodiment may further include analyzing the media stream to determine at least one voice profile for the at least one individual. In one example, the voice profile may be determined based on an identified set of voice parameters associated with at least one individual. In another example, the voice profile may be determined using a machine learning algorithm without identifying the set of voice parameters. According to step 1210, the processing device may analyze the media stream to determine at least one voice profile for the at least one individual. Additionally or alternatively, step 1210 may obtain the voice profile for the individual in other ways, for example using step 442. The disclosed embodiment may further include using the determined at least one voice profile and the revised transcript to artificially generate a revoiced media stream in which the at least one individual speaks the revised transcript in a target language. The target language may be the origin language or a different language. In some cases, the processing device may revoice only the revised parts of the transcript. Alternatively, the processing device may revoice all the parts of the transcript associated with the at least one individual. According to step 1212, the processing device may use the determined at least one voice profile and the revised transcript to artificially generate a revoiced media stream in which the at least one individual speaks the revised transcript in a target language. For example, steps 1212 may use steps 444 and/or 446 to determine the synthesized voice and generate the revoiced media stream.

In some embodiments, the media stream may include a plurality of individuals speaking a single origin language and the target language is the origin language. Alternatively, the media stream may include a plurality of individuals speaking a single origin language and the target language is a language other than the origin language. In some embodiments, the media stream may include a plurality of individuals speaking a two or more origin languages and the target language is one of the two or more origin languages. Alternatively, the media stream may include a plurality of individuals speaking a two or more origin languages and the target language is a language other than the two or more origin languages.

In disclosed embodiments, revising the transcript of the media stream based on the determined user category may include translating the transcript of the media stream according to rules associated the user category. Additional embodiments include determining the user category based on an age of the particular user, wherein the desired vocabulary is associated with censored words. Additional embodiments include determining the user category based on a nationality of the particular user, wherein the desired vocabulary is associated with different words. For example, in British English the front of a car is called "the bonnet," while in American English, the front of the car is called "the hood." Additional embodiments include determining the user category based on a culture of the particular user, wherein the desired vocabulary is associated with different words. For example, in the western countries someone may be called a cow, which usually means that he/she is fat. In eastern countries such as India, the word cow would not be used as an offensive word. Additional embodiments include determining the user category based on at least one detail about the particular user, wherein the desired vocabulary is associated with brand names more likely to be familiarized by the particular user.

Disclosed embodiment may include receiving data from a player device (e.g., communications device 160) associated with the particular user, and determining the user category based on the received data. The data may be provided to the processing device without intervention of the particular user. For example, the received data may include information about age, gender, nationality etc. Disclosed embodiment may include receiving input from the particular user and determining the user category based on the received input. The input may be indicative of user preferences. For example, a user in U.S. may prefer to listen to media stream in British English. Consistent with the present disclosure, the received media stream may be a real-time conversation (e.g., a phone call or a recorded physical conversation) between the at least one individual and the particular user. In some cases, the origin language (e.g., French) and the target language is a language other than the origin language (e.g., Spanish). In these cases, the processing device may obtain information indicative of a gender of the particular user and determine the user category based on the gender of the particular user. Thereafter, the processing device may translate the transcript in a manner that takes into account the gender of the particular user.

Figure 12B:
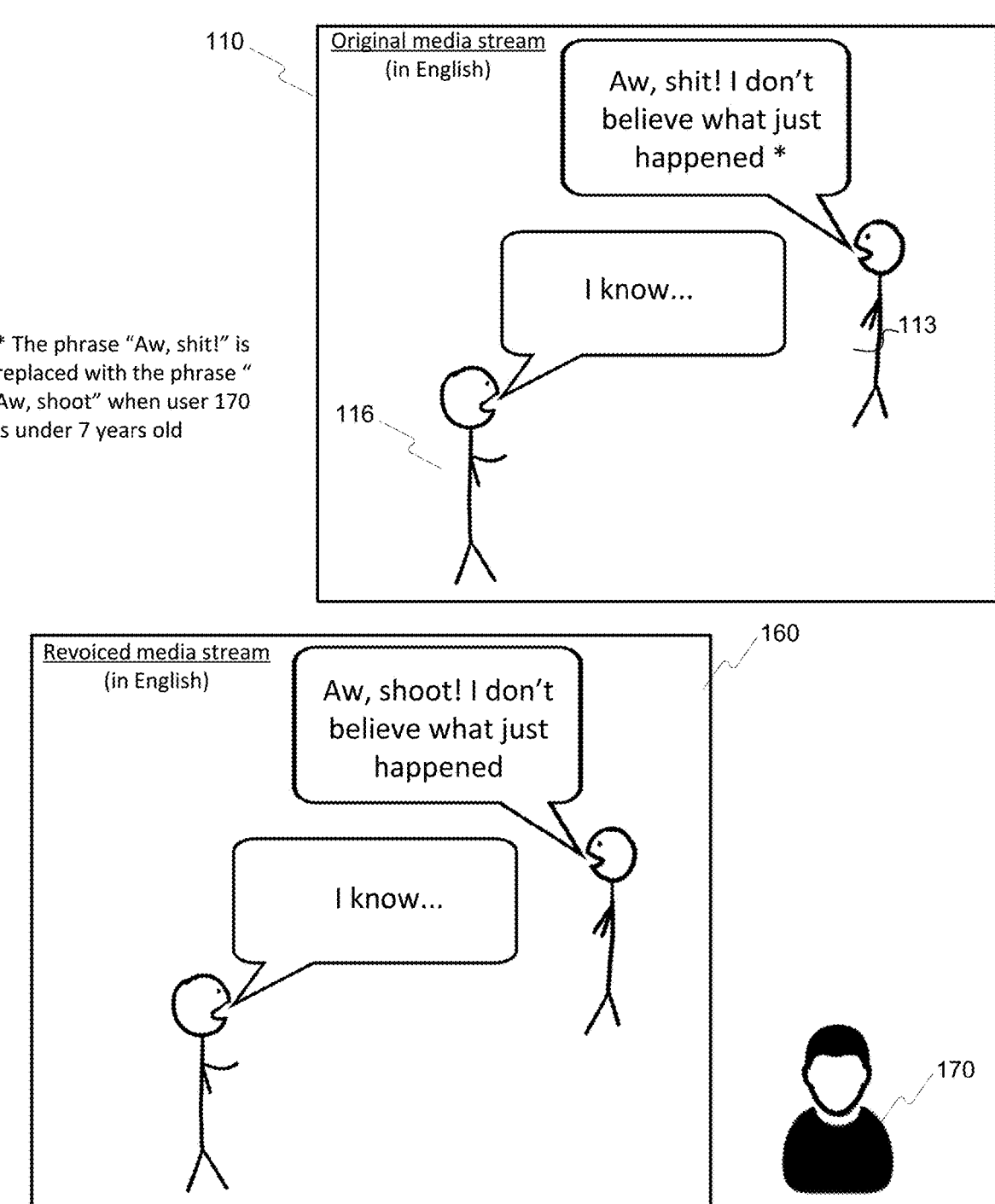
FIG. 12B is a schematic illustration depicting an example of revoicing a media stream using the method described in FIG. 12A.

FIG. 12B is a schematic illustration depicting an implementation of method 1200. In the figure, original media stream 110 destined to a particular user 170 and includes individual 113 and individual 116 that speak in English. Consistent with disclosed embodiments, the transcript of the individual 113 is revised based on a user category associated with the particular user (e.g., user 170 is under 7 years old). In this case, the system may artificially generate revoiced media stream 150 in which the target language is the origin language (but obviously it can be any other language). In the revoiced media stream, individual 116 says the revised transcript.

7. Translating a Transcript of a Media Stream Based on User Preferences

FIG. 13A is a flowchart of an example method 1300 for artificially generating a revoiced media stream in which a transcript of one the individuals speaking in the media stream is translated based on user preferences. Consistent with the present disclosure, method 1300 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 1300, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream destined to a particular user, wherein the media stream includes at least one individual speaking in at least one origin language. As described above, media receipt module 402 may receive a media stream from media owner 120 or a media stream captured by user 170. According to step 1302, the processing device may receive a media stream destined to a particular user, wherein the media stream includes at least one individual speaking in at least one origin language. For example, step 1302 may use step 432 and/or step 462 to receive the media stream. The disclosed embodiment may further include obtaining a transcript of the media stream including utterances associated with the at least one individual. As described above, transcript processing module 404 may receive the transcript from media owner 120 or determine the transcript of the received media stream using any suitable voice-to-text algorithm. According to step 1304, the processing device may obtain a transcript of the media stream including utterances associated with the at least one individual.

The disclosed embodiment may further include receiving an indication about preferred language characteristics for the particular user in a target language. In one example, the preferred language characteristics may include language register, style, dialect, level of slang, and more. The indication about the preferred language characteristics may be received without intervention of the particular user or from direct selection of the particular user. According to step 1306, the processing device may receive an indication about preferred language characteristics for the particular user in a target language. For example, step 1306 may read the indication from memory, may receive the indication from an external device, may receive the indication from a user, may determine the indication based on a user category (for example, based on a user category determined by step 1206), and so forth.

The disclosed embodiment may further include translating the transcript of the media stream to the target language based on the preferred language characteristics. As mentioned above, transcript processing module 404 may include instructions to translate the transcript of the received media stream to the target language using any suitable translation algorithm. Transcript processing module 404 may receive as an input the indication about preferred language characteristics to translate the transcript of the media stream accordingly. According to step 1308, the processing device may translate the transcript of the media stream to the target language based on the preferred language characteristics. For example, step 1308 may use step 440 to translate or otherwise transform the transcript. In one example, step 1308 may translate or transformed speech directly from the media stream received by step 1302, for example as described above in relation to step 440, and step 1304 may be excluded from method 1300. Additionally or alternatively, step 1308 may receive such translated transcript, for example by reading the translated transcript from memory, by receiving the translated transcript from an external device, by receiving the translated transcript from a user, and so forth. For example, step 1308 may select a translated transcript of a plurality of alternative translated transcripts based on the preferred language characteristics.

The disclosed embodiment may further include analyzing the media stream to determine at least one voice profile for the at least one individual. In one example, the voice profile may be determined based on an identified set of voice parameters associated with at least one individual. In another example, the voice profile may be determined using a machine learning algorithm without identifying the set of voice parameters. According to step 1310, the processing device may analyze the media stream to determine at least one voice profile for the at least one individual. Additionally or alternatively, step 1310 may obtain the voice profile for the at least one individual in other ways, for example using step 442.

The disclosed embodiment may further include using the determined at least one voice profile and the translated transcript to artificially generate a revoiced media stream in which the at least one individual speaks the translated transcript in the target language. In some cases, the indication about the preferred language characteristics may also include details on preferred voice characteristics and voice generation module 408 take into consideration the user preferences when it artificially generates the revoiced media stream. According to step 1312, the processing device may use the determined at least one voice profile and the translated transcript to artificially generate a revoiced media stream in which the at least one individual speaks the translated transcript in the target language. For example, steps 1312 may use steps 444 and/or 446 to determine the synthesized voice and generate the revoiced media stream.

Disclosed embodiment may include receiving the indication about the preferred language characteristics from a player device (e.g., communications device 160) associated with the particular user. The indication about the preferred language characteristics may be provided to the processing device without intervention of the particular user. For example, the indication about preferred language characteristics may include information about age, gender, nationality etc. Disclosed embodiment may include presenting to the particular user a plurality of options for personalizing the translation of the transcript, wherein the indication about the preferred language characteristics may be based on an input indicative of user selection. For example, a user in U.S. may prefer to listen to media stream in British English rather than American English and the transcript will be translated accordingly. In some embodiments, the preferred language characteristics may include language register, and the processing device is configured to translate the transcript of the media stream to the target language according to the preferred language register. For example, frozen register, formal register, consultative register, casual (informal) register, and intimate register.

In other embodiments, the preferred language characteristics may include style, and the processing device is configured to translate the transcript of the media stream to the target language according to the preferred style. For example, legalese, journalese, economese, archaism, and more. In other embodiments, the preferred language characteristics may include dialect, and the processing device is configured to translate the transcript of the media stream to the target language according to the preferred dialect. For example, a user in the U.S. may select that a media stream originally in German will be dubbed into English with one of the following dialects: Eastern New England, Boston Urban, Western New England, Hudson Valley, New York City, Inland Northern, San Francisco Urban, and Upper Midwestern. In other embodiments, the preferred language characteristics may include a level of slang, and the processing device is configured to translate the transcript of the media stream to the target language according to the preferred level of slang.

Consistent with the present disclosure, the indication about preferred language characteristics may further include details about preferred voice characteristics. In one embodiment, the processing device is configured to determine a preferred version of the at least one voice profile for the at least one individual; and use the preferred version of the at least one voice profile to artificially generate the revoiced media stream. In related embodiments, the details about the preferred voice characteristics may include at least one of: volume profile, type of accent, accent level, speech speed, and more. In one example, some users prefer that the individuals in the revoiced media stream will speak slower than in the original media stream. In another example, some users may prefer that the individuals in the revoiced media stream will speak with an accent associated with a specific dialect. In related embodiments, the details about the preferred voice characteristics may include a preferred gender. For example, when the original media stream is a podcast some user prefers to listen to a woman rather than a man. The processing device may use the determined voice profile (with all the changes in the intonations during the podcast) but replace the man voice with a woman voice.

In some embodiments, the media stream may include a plurality of individuals speaking a single origin language and the target language is a language other than the origin language. In other embodiments, the media stream may include a plurality of individuals speaking two or more origin languages and the target language is one of the two or more origin languages. In other embodiments, the media stream may include a plurality of individuals speaking a two or more origin languages and the target language is a language other than the two or more origin languages. Consistent with the present disclosure, the received media stream may be a real-time conversation (e.g., a phone call or a recorded physical conversation) between the at least one individual and the particular user. In some embodiments, the processing device may obtain information indicative of language characteristics of the particular user (e.g., dialect, style, level of slang) and determine the preferred language characteristics based on the language characteristics of the particular user. Thereafter, the processing device may translate the transcript of the at least one individual in a manner similar to the language characteristics of the particular user. For example, if the user speaks with a certain style the dubbed version of the at least one individual will be artificially generated with a similar style.

Figure 13B:
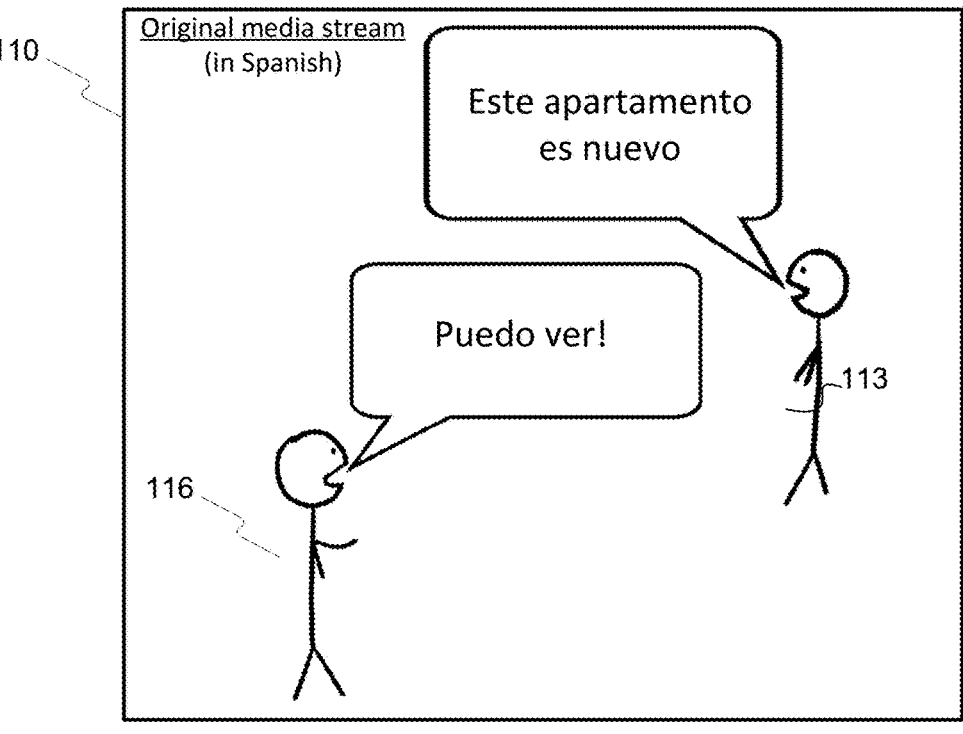
FIG. 13B is a schematic illustration depicting an example of revoicing a media stream using the method described in FIG. 13A.
Figure 13B:
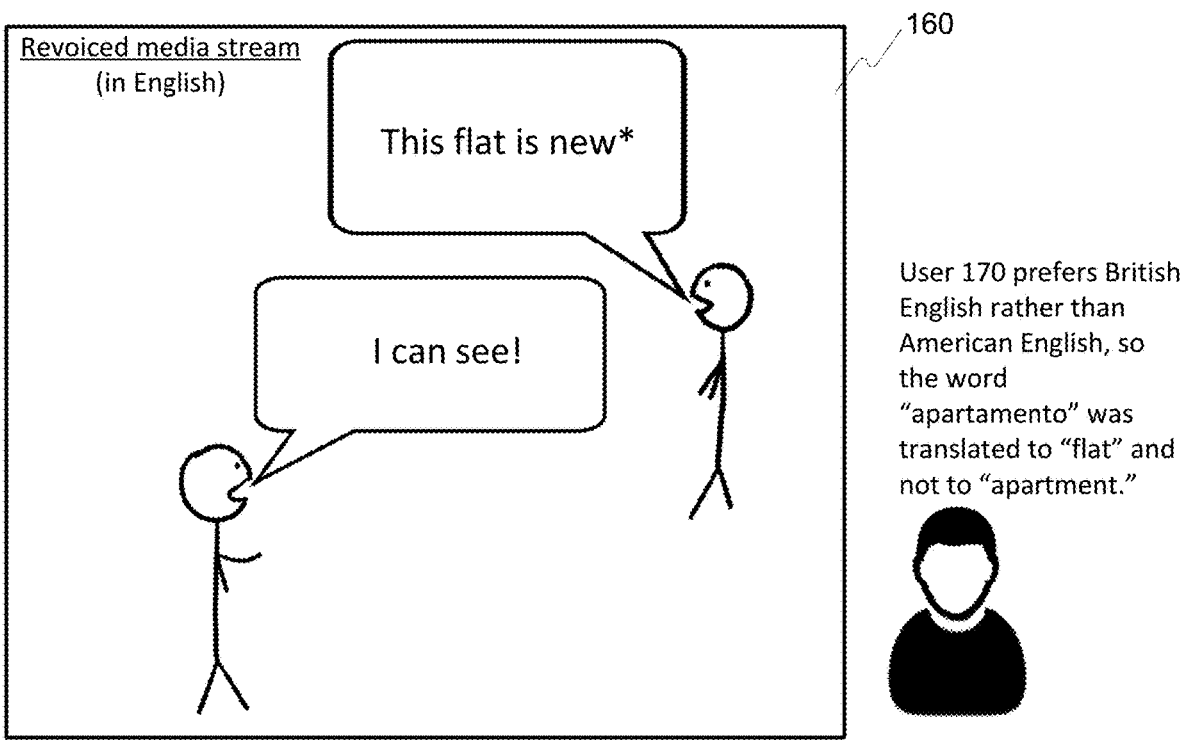

FIG. 13B is a schematic illustration depicting an implementation of method 1300. In the figure, original media stream 110 destined to a particular user 170 and includes individual 113 and individual 116 that speak in Spanish. Consistent with disclosed embodiments, the transcript of the original media stream is revised based on preferred language characteristics for the particular user. In this case, the system may artificially generate revoiced media stream 150 in which the target language is English and because user 170 prefers British English rather than American English, the word "apartamento" is translated to "flat" and not to "apartment."

8. Automatically Selecting the Target Language for a Revoiced Media Stream

FIG. 14A is a flowchart of an example method 1400 for artificially generating a revoiced media stream in which the target language for the revoiced media stream is automatically selected based on information such as user profile. Consistent with the present disclosure, method 1400 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 1400, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream destined to a particular user, wherein the media stream includes at least one individual speaking in at least one origin language. As described above, media receipt module 402 may receive a media stream from media owner 120 or a media stream captured by user 170. According to step 1402, the processing device may receive a media stream destined to a particular user, wherein the media stream includes at least one individual speaking in at least one origin language. For example, step 1402 may use step 432 and/or step 462 to receive the media stream. The disclosed embodiment may further include obtaining a transcript of the media stream including utterances associated with the at least one individual. As described above, transcript processing module 404 may receive the transcript from media owner 120 or determine the transcript of the received media stream using any suitable voice-to-text algorithm. According to step 1404, the processing device may obtain a transcript of the media stream including utterances associated with the at least one individual.

The disclosed embodiment may further include accessing one or more databases to determine a preferred target language for the particular user. In one example, the database may be located in communications device 160. In another example, the database may be associated with server 133 (e.g., database 360). In yet another example, the database may be an online database available over the Internet (e.g., database 365). According to step 1406, the processing device may access one or more databases to determine a preferred target language for the particular user. The disclosed embodiment may further include translating the transcript of the media stream to the preferred target language. Additionally or alternatively, step 1406 may read an indication of the preferred target language for the particular user from memory, may receive an indication of the preferred target language for the particular user from an external device, may receive an indication of the preferred target language for the particular user from a user, and so forth.

As mentioned above, transcript processing module 404 may include instructions to translate the transcript of the received media stream to the preferred target language using any suitable translation algorithm. Transcript processing module 404 may receive as an input the indication about preferred language characteristics to translate the transcript of the media stream accordingly. According to step 1408, the processing device may translate the transcript of the media stream to the preferred target language. For example, step 1408 may use step 440 to translate or otherwise transform the transcript. In one example, step 1408 may translate or transformed speech directly from the media stream received by step 1402, for example as described above in relation to step 440, and step 1404 may be excluded from method 1400. Additionally or alternatively, step 1408 may receive a translated transcript, for example by reading the translated transcript from memory, by receiving the translated transcript from an external device, by receiving the translated transcript from a user, and so forth.

The disclosed embodiment may further include analyzing the media stream to determine at least one voice profile for the at least one individual. In one example, the voice profile may be determined based on an identified set of voice parameters associated with at least one individual. In another example, the voice profile may be determined using a machine learning algorithm without identifying the set of voice parameters. According to step 1410, the processing device may analyze the media stream to determine at least one voice profile for the at least one individual. Additionally or alternatively, step 1410 may obtain the voice profile for the at least one individual in other ways, for example using step 442.

The disclosed embodiment may further include using the determined at least one voice profile and the translated transcript to artificially generate a revoiced media stream in which the translated transcript is spoken by the at least one individual in the preferred target language. In some cases, the determination about the preferred target language may include determination of preferred language characteristics and voice generation module 408 may take into consideration the preferred language characteristics when it artificially generates the revoiced media stream. The preferred language characteristics may include language register, dialect, style, etc. According to step 1412, the processing device may use the determined at least one voice profile and the translated transcript to artificially generate a revoiced media stream in which the translated transcript is spoken by the at least one individual in the preferred target language. For example, step 1412 may use steps 444 and/or 446 to determine the synthesized voice and generate the revoiced media stream.

Disclosed embodiment may include accessing a database located in a player device (e.g., communications device 160) associated with the particular user to retrieve the information indicative of the preferred target language. The information indicative of the preferred target language may be provided to the processing device without intervention of the particular user. For example, the information indicative of the preferred target language may be the language of the operating software of the player device. Disclosed embodiment may include accessing a database associated with an online profile of the particular user to retrieve information indicative of the preferred target language. For example, the online profile may list the languages that the particular user knows. Disclosed embodiment may include accessing a database to retrieve past information indicative of the preferred target language. The past information indicative of the preferred target language may include a past input from the particular user regarding the preferred target language.

Disclosed embodiment may include accessing a database to retrieve information indicative of a nationality of the particular user. Thereafter, the processing device may user the nationality of the particular user to determine the preferred target language. In some embodiments, determining the preferred target language may further include determining the preferred language register associated with the preferred target language. The processing device is configured to translate the transcript of the media stream to the preferred target language based on the preferred language register. In some embodiments, determining the preferred target language may further include determining a preferred style associated with the preferred target language. The processing device is configured to translate the transcript of the media stream to the preferred target language based on the preferred style.

In some embodiments, determining the preferred target language may further include determining a preferred dialect associated with the preferred target language. The processing device is configured to translate the transcript of the media stream to the preferred target language based on the preferred dialect. For example American English vs. British English. In some embodiments, determining the preferred target language may further include determining a preferred level of slang associated with the preferred target language. The processing device is configured to translate the transcript of the media stream to the preferred target language based on the preferred level of slang. In some embodiments, determining the preferred target language may further include determining language characteristics associated with the preferred target language. The preferred language characteristics may include at least one of: language register, style, dialect, a level of slang. In some embodiments, determining the preferred target language may further include determining information for at least one rule for revising the transcript, and wherein translating the transcript to the preferred target language includes revising the transcript based on the at least one rule. An example for information determined may be the age of the particular user and the rule is to automatically replace vulgar or offensive words.

In some embodiments, the preferred target language may be dependent of the origin language. For a first origin language, the preferred target may be a first language and for a second origin language, the preferred target language may be a second language. In other embodiments, the media stream may include a first individual speaking a first origin language (e.g., Spanish) and a second individual speaking in second origin language (e.g., Russian). The processing device may configure to access the one or more databases to determine that the particular user understands the second language and decide to translate the transcript of the first individual to the preferred target language (e.g., English) and to forgo translating the transcript of the second individual. In other embodiments, the media stream may include a first individual speaking a first origin language (e.g., Spanish) and a second individual speaking in second origin language (e.g., Russian). The processing device may configure to access the one or more databases to determine that the particular user does not understand any of the first and the second origin language and decide to translate the transcript of the first individual and the second individual to the preferred target language (e.g., English). Consistent with the present disclosure, the received media stream may be a real-time conversation (e.g., a phone call, a video conference, or a recorded physical conversation) between the at least one individual and the particular user. In some embodiments, the processing device may obtain information indicative of preferred target language and determine the preferred target language prior to the receipt of the media stream.

Figure 14B:
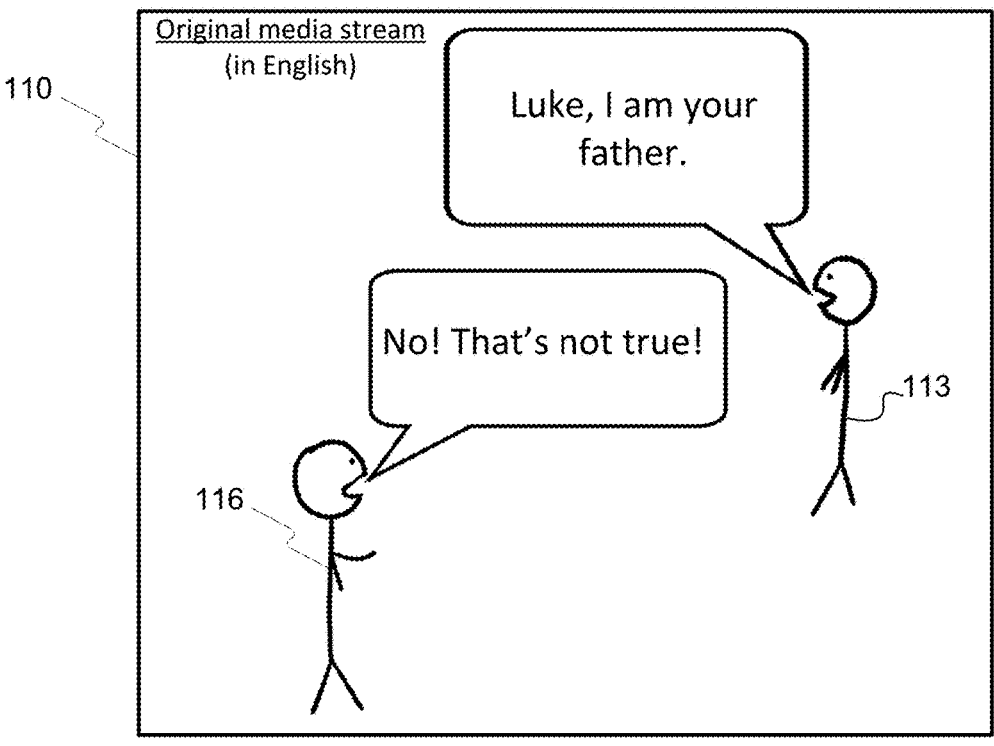
FIG. 14B is a schematic illustration depicting an example of revoicing a media stream using the method described in FIG. 14A.
Figure 14B:
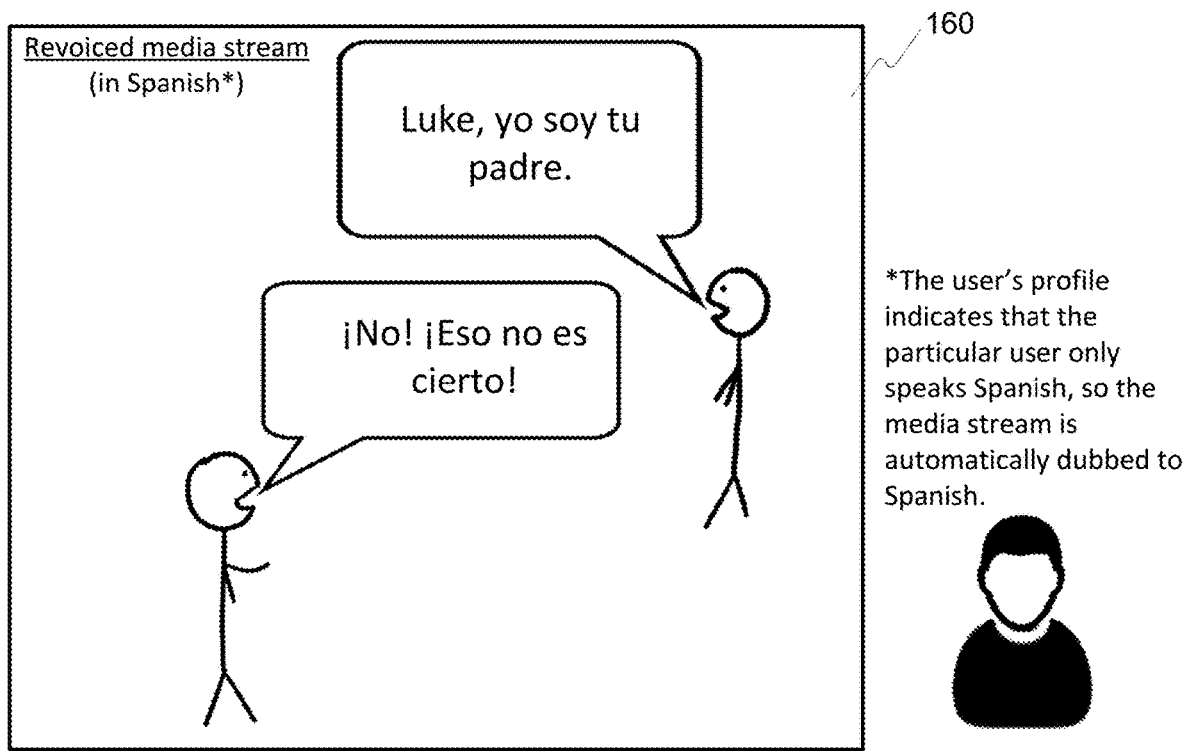

FIG. 14B is a schematic illustration depicting an implementation of method 1400. In the figure, original media stream 110 destined to a particular user 170 and includes individual 113 and individual 116 that speak in English. Consistent with disclosed embodiments, the preferred target language for the particular user is determined based on information from one or more databases. In this case, the system may artificially generate revoiced media stream 150 in Spanish, which is the preferred target language for user 170.

9. Translating a Transcript of a Media Stream Based on Language Characteristics

FIG. 15A is a flowchart of an example method 1500 for artificially generating a revoiced media stream in which a transcript of at least one individual speaking in the media stream is translated based on language characteristics of the at least one individual. Consistent with the present disclosure, method 1500 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 1500, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream including at least one individual speaking in at least one origin language. As described above, media receipt module 402 may receive a media stream from media owner 120 or a media stream captured by user 170. According to step 1502, the processing device may receive a media stream including at least one individual speaking in at least one language. For example, step 1502 may use step 432 and/or step 462 to receive the media stream. The disclosed embodiment may further include obtaining a transcript of the media stream including utterances associated with the at least one individual. As described above, transcript processing module 404 may receive the transcript from media owner 120 or determine the transcript of the received media stream using any suitable voice-to-text algorithm. According to step 1504, the processing device may obtain a transcript of the media stream including utterances associated with the at least one individual.

The disclosed embodiment may further include analyzing the transcript to determine a set of language characteristics for the least one individual. The determined set of language characteristics may include language register, style, dialect, level of slang, and more. The determination of the set of language characteristics may be executed by text analysis unit 525. According to step 1506, the processing device may analyze the transcript to determine a set of language characteristics for the least one individual. For example, a machine learning model may be trained using training examples to determine sets of language characteristics from transcripts, and step 1506 may use the trained machine learning model to analyze the transcript and determine the set of language characteristics for the at least one individual. An example of such training example may include a transcript, together with a set of language characteristics. In another example, an artificial neural network (such as a recurrent neural network, a long short-term memory neural network, a deep neural network, etc.) may be configured to determine sets of language characteristics from transcripts, and step 1506 may use the artificial neural network to analyze the transcript and determine the set of language characteristics for the at least one individual.

The disclosed embodiment may further include translating the transcript of the media stream to a target language based on the determined set of language characteristics. As mentioned above, transcript processing module 404 may include instructions to translate the transcript of the received media stream to the target language using any suitable translation algorithm. Transcript processing module 404 may receive as an input the determined set of language characteristics and translate the transcript of the media stream accordingly. According to step 1508, the processing device may translate the transcript of the media stream to the target language based on the determined set of language characteristics. For example, step 1508 may use step 440 to translate or otherwise transform the transcript. Additionally or alternatively, step 1508 may receive such translated transcript, for example by reading the translated transcript from memory, by receiving the translated transcript from an external device, by receiving the translated transcript from a user, and so forth. For example, step 1508 may select a translated transcript of a plurality of alternative translated transcripts based on the determined set of language characteristics.

In one example, step 1506 may determine the set of language characteristics for the at least one individual directly from the media stream received by step 1502. For example, a machine learning model may be trained using training examples to determine sets of language characteristics from media streams, and step 1506 may use the trained machine learning model to analyze the media stream received by step 1502 and determine the set of language characteristics for the at least one individual. An example of such training example may include a media stream, together with a set of language characteristics. In another example, an artificial neural network (such as a recurrent neural network, a long short-term memory neural network, a deep neural network, etc.) may be configured to determine sets of language characteristics from media streams, and step 1506 may use the artificial neural network to analyze the media stream received by step 1502 and determine the set of language characteristics for the at least one individual. In one example, step 1508 may translate or transformed speech directly from the media stream received by step 1502 (for example as described above in relation to step 440). In some examples, step 1504 may be excluded from method 1500.

The disclosed embodiment may further include analyzing the media stream to determine at least one voice profile for the at least one individual. In one example, the voice profile may be determined based on an identified set of voice parameters associated with at least one individual. In another example, the voice profile may be determined using a machine learning algorithm without identifying the set of voice parameters. According to step 1510, the processing device may analyze the media stream to determine at least one voice profile for the at least one individual. Additionally or alternatively, step 1510 may obtain the voice profile for the individual in other ways, for example using step 442.

The disclosed embodiment may further include using the determined at least one voice profile and the translated transcript to artificially generate a revoiced media stream in which the at least one individual speaks the translated transcript in the target language. In some cases, the processing device may determine that a first individual in the media stream has a first set of language characteristics and a second individual in the media stream has a second set of language characteristics. Thereafter, the processing device may translate differently a same phrase said by the first individual and by the second individual. For example, the phrase "have a nice day" said by the first individual in English may be translated to "¡Que tú tengas un buen dia!" in informal Spanish. In contrast, the phrase "have a nice day" said by the second individual in English may be translated to "¡Que usted tenga un buen dia!" In formal Spanish. According to step 1512, the processing device may use the determined at least one voice profile and the translated transcript to artificially generate a revoiced media stream in which the at least one individual speaks the translated transcript in the target language. For example, step 1512 may use steps 444 and/or 446 to determine the synthesized voice and generate the revoiced media stream.

In some embodiments, obtaining the transcript may include determining the transcript from the received media stream. For example, as discussed above, transcript processing module 404 may determine the transcript of the received media stream using any suitable voice-to-text algorithm. In related embodiments, determining the transcript from the received media stream may include determining metadata transcript information that include details on one or utterances of spoken by the at least one individual. In more related embodiments, determining the set of language characteristics for the least one individual may be based on metadata transcript information. Disclosed embodiments may further include accessing stored information about the at least one individual and determining the set of language characteristics for the least one individual may be based on the stored information. For example, when translating a TV series the processing device may use transcripts of previous chapters to determine the set of language characteristics.

In some embodiments, the determined set of language characteristics may include language register, and the processing device is configured to translate the transcript of the media stream to the target language according to the determined language register of the at least one individual in the at least one origin language. For example, frozen register, formal register, consultative register, casual (informal) register, and intimate register. In other embodiments, the determined set of language characteristics may include style, and the processing device is configured to translate the transcript of the media stream to the target language according to the determined style of the at least one individual in the at least one origin language. For example, legalese, journalese, economese, archaism, and more.

In other embodiments, the determined set of language characteristics may include a level of slang, and the processing device is configured to translate the transcript of the media stream to the target language according to the determined level of slang of the at least one individual in the at least one origin language. In other embodiments, the determined set of language characteristics may include a gender of the at least one individual, and the processing device is configured to translate the transcript of the media stream to the target language according to the determined gender of the at least one individual. In some disclosed embodiments, determining the set of language characteristics for the least one individual may be further based on audio analysis of the media stream. For example, the tune of the at least one individual may affect on the determination of the language register of the at least one individual.

In some embodiments, the media stream may include a plurality of individuals speaking a single origin language and the target language is a language other than the origin language. In other embodiments, the media stream may include a plurality of individuals speaking a two or more origin languages and the target language is one of the two or more origin languages. In other embodiments, the media stream may include a plurality of individuals speaking two or more origin languages and the target language is a language other than the two or more origin languages. Consistent with the present disclosure, the received media stream may be a real-time conversation (e.g., a phone call or a recorded physical conversation) between the at least one individual and the particular user. The processing device may initially translate the transcript of the at least one individual based on a default set of language characteristics, and after a period of time when the real-time conversation continue determine the set of language characteristics. In related embodiments, the processing device may determine that the changes between the default set of language characteristics and the determined set of language characteristics are less than a threshold and decide to keep using the default set of language characteristics.

Figure 15B:
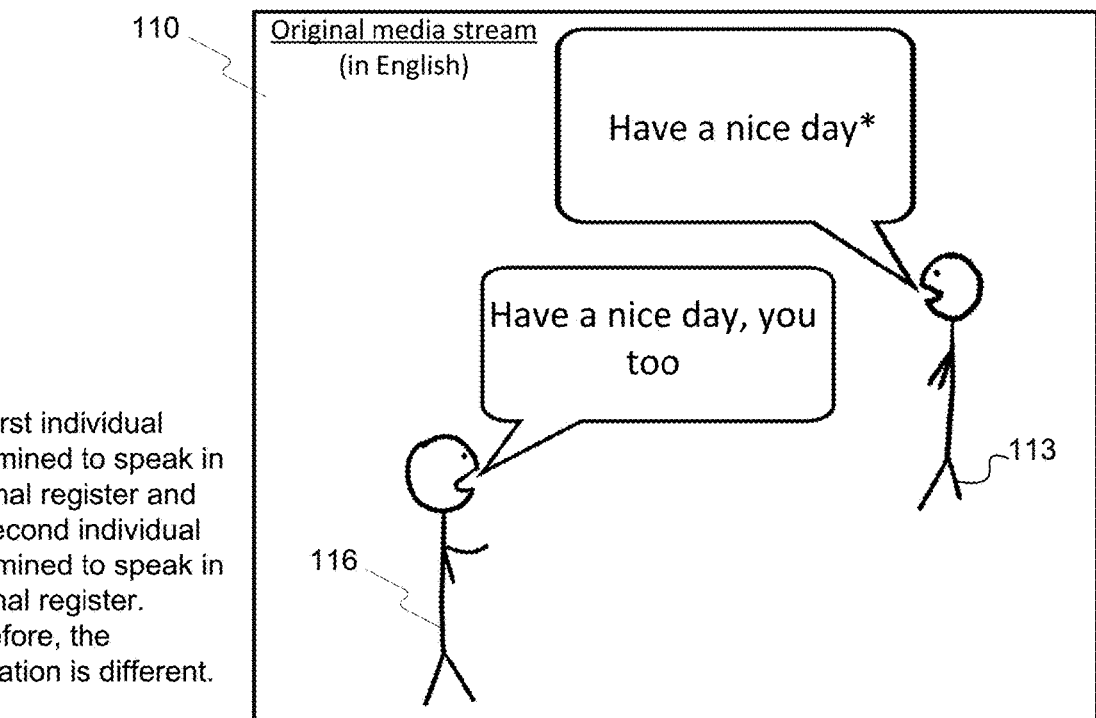
FIG. 15B is a schematic illustration depicting an example of revoicing a media stream using the method described in FIG. 15A.
Figure 15B:

FIG. 15B is a schematic illustration depicting an implementation of method 1500. In the figure, original media stream 110 includes individual 113 and individual 116 that speak in English. Consistent with disclosed embodiments, the system may determine a set of language characteristics for individual 113 and individual 116 and translate the transcript of the media stream to a target language based on the determined set of language characteristics. In this case, the system may artificially generate revoiced media stream 150 in which individual 113 determined to speak in a formal register and individual 116 determined to speak in informal register. Therefore, the translation is different.

10. Providing Explanations in Revoiced Media Streams Based on Target Language

Figure 16A:
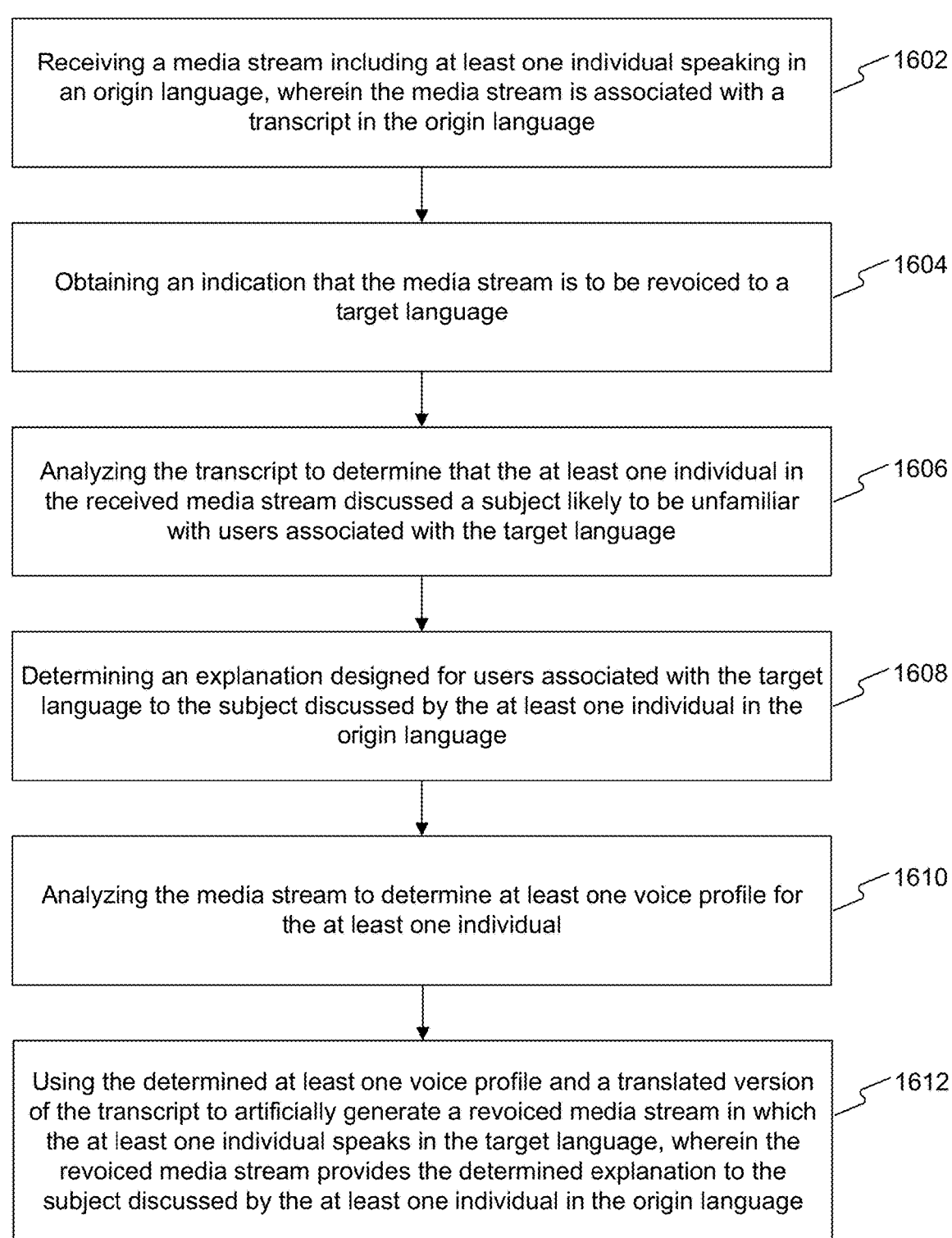
FIG. 16A is a flowchart of an example method for providing explanations in revoiced media streams based on target language, in accordance with some embodiments of the disclosure.

FIG. 16A is a flowchart of an example method 1600 for providing explanations in the revoiced media stream to something that was discussed in the original media stream the origin language but may not be familiar to users that speak the target language. Consistent with the present disclosure, method 1600 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 1600, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream including at least one individual speaking in an origin language, wherein the media stream is associated with a transcript in the origin language. As described above, media receipt module 402 may receive a media stream from media owner 120 or a media stream captured by user 170. According to step 1602, the processing device may receive a media stream including at least one individual speaking in an origin language, wherein the media stream is associated with a transcript in the origin language. For example, step 1602 may use step 432 and/or step 462 to receive the media stream. The disclosed embodiment may further include obtaining an indication that the media stream is to be revoiced to a target language. As described above, the indication may be received from a particular user or determined by a processing device of the suggested system. According to step 1604, the processing device may obtain an indication that the media stream is to be revoiced to a target language.

The disclosed embodiment may further include analyzing the transcript to determine that the at least one individual in the received media stream discussed a subject likely to be unfamiliar with users associated with the target language. The subject likely to be unfamiliar with users associated with the target language may be a name of a local food common in counties speaking the origin language, but less common in countries that speak the target language, an event likely to be unfamiliar with users associated with the target language, a public figure likely to be unfamiliar with users associated with the target language, and more. For example, the public figure may be a politician well known in a country associated with the media stream, but less known in countries that speak the target language. According to step 1606, the processing device may analyze the transcript to determine that the at least one individual in the received media stream discussed a subject likely to be unfamiliar with users associated with the target language. For example, a machine learning model may be trained using training examples to determine whether topics discussed in transcripts are likely to be unfamiliar with users, and step 1606 may use the trained machine learning model to analyze the transcript to determine that the at least one individual in the received media stream discussed a subject likely to be unfamiliar with users associated with the target language. An example of such training example may include a transcript and an indication of a target language, together with an indication of whether the topics discussed in the transcript are likely to be unfamiliar with users associated with the target language. In another example, an artificial neural network (such as a recurrent neural network, a long short-term memory neural network, a deep neural network, etc.) may be configured to determine whether topics discussed in transcripts are likely to be unfamiliar with users, and step 1606 may use the artificial neural network to analyze the transcript to determine that the at least one individual in the received media stream discussed a subject likely to be unfamiliar with users associated with the target language.

The disclosed embodiment may further include determining an explanation designed for users associated with the target language to the subject discussed by the at least one individual in the origin language. As mentioned above, the processing device may determine the explanation using information available in database 360 or database 365. The explanation may be specific for the target language and may include cultural explanations. According to step 1608, the processing device may determine an explanation designed for users associated with the target language to the subject discussed by the at least one individual in the origin language. For example, step 1608 may use step 1708 to determine the explanation. For example, a data structure may include explanations arranged by terms and/or topics, and step 1608 may obtain the explanation by accessing the data structure with a term and/or a topic corresponding to the subject identified as likely to be unfamiliar with users associated with the target language by step 1606. In another example, an artificial neural network (such as a deep neural network, etc.) may be configured to determine explanations to subjects, and step 1608 may use the artificial neural network to obtain the explanation. Additionally or alternatively, an artificial neural network (such as a recurrent neural network, a long short-term memory neural network, a deep neural network, etc.) may be configured to alter transcripts by adding explanations designed for users associated with the target language, and step 1608 may use the artificial neural network to analyze the transcript and generate the explanations.

The disclosed embodiment may further include analyzing the media stream to determine at least one voice profile for the at least one individual. In one example, the voice profile may be determined based on an identified set of voice parameters associated with at least one individual. In another example, the voice profile may be determined using a machine learning algorithm without identifying the set of voice parameters. According to step 1610, the processing device may analyze the media stream to determine at least one voice profile for the at least one individual. Additionally or alternatively, step 1610 may obtain the voice profile for the at least one individual in other ways, for example using step 442.

The disclosed embodiment may further include using the determined at least one voice profile and a translated version of the transcript to artificially generate a revoiced media stream in which the at least one individual speaks in the target language, wherein the revoiced media stream provides the determined explanation to the subject discussed by the at least one individual in the origin language. In some cases, the explanation to the subject discussed by the at least one individual in the origin language may be provided in a text message. Alternatively, the explanation to the subject discussed by the at least one individual in the origin language may be included in the translated transcript and be audibly provided using the voice of the at least one individual. According to step 1612, the processing device may use the determined at least one voice profile and a translated version of the transcript to artificially generate a revoiced media stream in which the at least one individual speaks in the target language, wherein the revoiced media stream provides the determined explanation to the subject discussed by the at least one individual in the origin language. For example, steps 1612 may use steps 444 and/or 446 to determine the synthesized voice and generate the revoiced media stream.

Disclosed embodiments may include receiving the indication that the media stream is to be revoiced to a target language from a player device (e.g., communications device 160) associated with a particular user that the media stream is destined to. The indication may be provided to the processing device without intervention of the particular user. For example, the indication may include information about the language of the operating software of the player device. Disclosed embodiments may include receiving the indication that the media stream is to be revoiced to a target language from an owner of the media stream (e.g., media owner 120). For example, a media owner wishes to have the media stream available in a target language. Disclosed embodiments may include determining that that the media stream is to be revoiced to the target language based on information about a particular user that the media stream is destined to, wherein the indication is based on the determination. Disclosed embodiments include determining that the at least one individual in the received media stream discussed about an object likely to be unfamiliar with users associated with the target language. For example, the object may be a name of a local food common in counties speaking the origin language, but less common in countries that speak the target language.

Disclosed embodiments include determining that the at least one individual in the received media stream discussed about an event likely to be unfamiliar with users associated with the target language. For example, the event may be a historic event well known in a country associated with the media stream, but less known in countries that speak the target language. Disclosed embodiments include determining that the at least one individual in the received media stream discussed about a public figure likely to be unfamiliar with users associated with the target language. For example, the public figure may be a politician well known in a country associated with the media stream, but less known in countries that speak the target language. Disclosed embodiments include determining that at least one individual in the received media stream said a name of a person (or a place) that has meaning in the origin language. For example, the names "Luke Skywalker" and "Han Solo" convey information that users should know about the characters. The processing device may provide an explanation about the meaning of the name to users that speak the target language. In some embodiments, the determination that the at least one individual in the received media stream discussed about a subject likely to be unfamiliar with a particular user that the media stream is destined to may be based on an age of the particular user.

In other embodiments, the determination that the at least one individual in the received media stream discussed about a subject likely to be unfamiliar with a particular user that the media stream is destined to may be based on a nationality of the particular user. Consistent with the present disclosure, if the media stream is an audio stream, the explanation may be included in the translated transcript and provided audibly. In some examples, the voice of the at least one individual speaking the target language may provide the explanation. Consistent with the present disclosure, if the media stream is a video stream, the explanation may be included in a text message. In some examples, the text message may be provided after receiving an input from the user that he/she is interested in getting the explanation. Consistent with the present disclosure, the received media stream may be a real-time conversation (e.g., a phone call, a video conference, or a recorded physical conversation) between the at least one individual and a user. The media stream may be captured by a communication device of the user. In this embodiment, the processing device may provide the explanation via a pop-up text message on the display of the communication device.

Figure 16B:
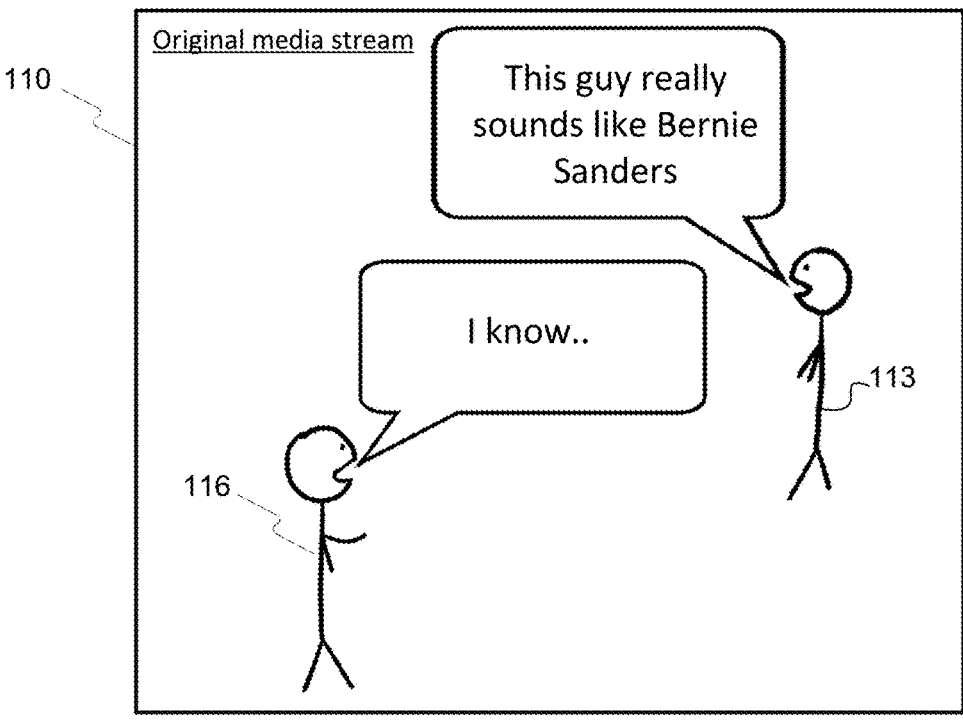
FIG. 16B is a schematic illustration depicting an example of revoicing a media stream using the method described in FIG. 16A.
Figure 16B:
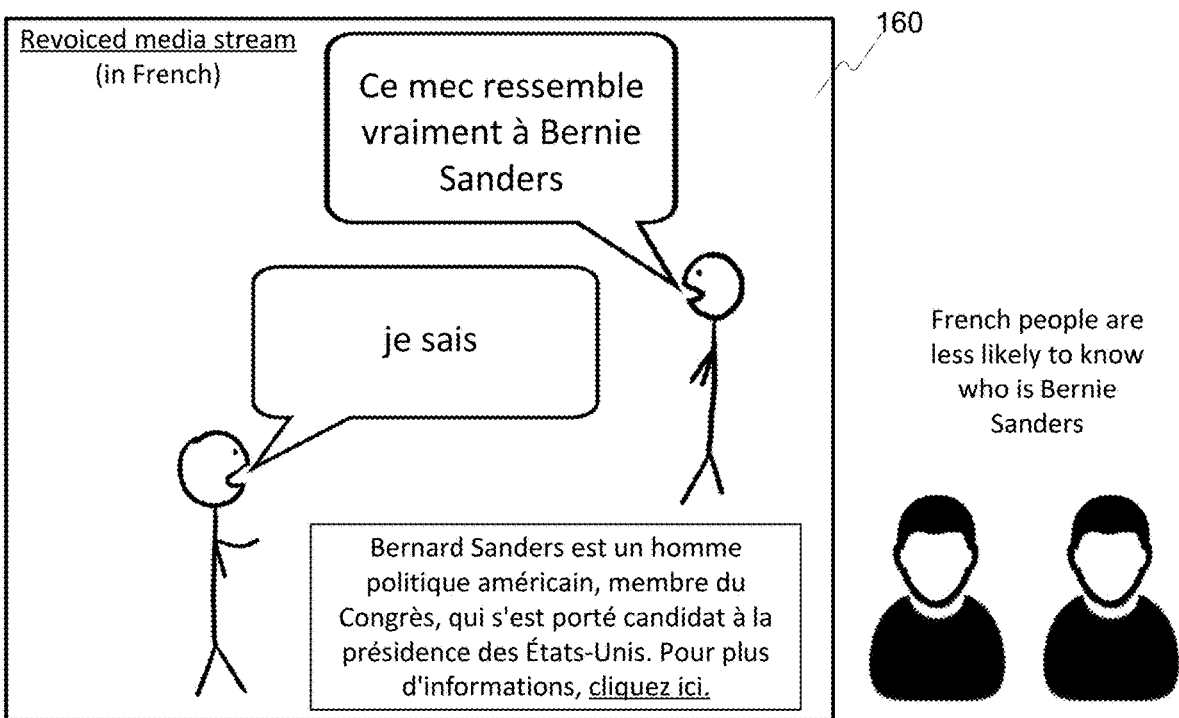

FIG. 16B is a schematic illustration depicting an implementation of method 1600. In the figure, original media stream 110 includes individual 113 and individual 116 that speak in English. Consistent with disclosed embodiments, the system may determine that an individual in the received media stream discussed a subject likely to be unfamiliar with users associated with the target language and cause an explanation to the subject to be provided in the target language. In this case, the system may artificially generate revoiced media stream 150 that is destined to a user in French. Since French people are less likely to know who Bernie Sanders is, the revoiced media stream includes and explanation in form of a message in French.

11. Providing Explanations in Revoiced Media Streams Based on User Profile

FIG. 17A is a flowchart of an example method 1700 for providing explanations in the revoiced media stream to something that was discussed in the original media stream the origin language but may not be familiar to a particular user that the revoiced media stream is destined to. Consistent with the present disclosure, method 1700 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 1700, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream destined to a particular user and a transcript of the media stream, wherein the media stream includes at least one individual speaking in an origin language. As described above, media receipt module 402 may receive a media stream from media owner 120 or a media stream captured by user 170. According to step 1702, the processing device may receive a media stream destined to a particular user and a transcript of the media stream, wherein the media stream includes at least one individual speaking in an origin language. For example, step 1702 may use step 432 and/or step 462 to receive the media stream. The disclosed embodiment may further include using information about the particular user to determine that the media stream needs to be revoiced to a target language. The information about the particular user may be obtained from communication device associated with the particular user or retrieved from a database by a processing device of the suggested system. According to step 1704, the processing device may use information about the particular user to determine that the media stream needs to be revoiced to a target language. For example, the information about the particular user may be obtained using step 436 and/or step 1206, may be read from memory, may be received from an external device, may be received from a user (the same user or a different user), and so forth. Some non-limiting examples of such information about the user may include images of the user, voice recordings of the user, demographic information of the user, information based on past behavior of the user, and so forth.

The disclosed embodiment may further include analyzing the transcript to determine that the at least one individual in the received media stream discussed a subject likely to be unfamiliar with the particular user. The subject likely to be unfamiliar with the particular user may be a name of a local food common in counties speaking the origin language, but less common in countries that speak the target language, an event likely to be unfamiliar with users at the age of the particular user, a public figure likely to be unfamiliar with users that lives where the particular user lives, and more. For example, the public figure may be a politician well known in a country associated with the media stream, but less known in the country that the particular user lives. According to step 1706, the processing device may analyze the transcript to determine that the at least one individual in the received media stream discussed a subject likely to be unfamiliar with the particular user. In one example, step 1706 may determine that the at least one individual in the received media stream discussed a subject likely to be unfamiliar with the particular user based on the information about the particular user. In one example, a machine learning model may be trained using training examples to determine whether subjects are likely to be unfamiliar with users based on information about the users, and step 1706 may use the trained machine learning model to analyze the transcript and/or the media stream obtained by step 1702 to determine that the at least one individual in the received media stream discussed a subject likely to be unfamiliar with the particular user based on the information about the particular user. An example of such training example may include information about a user, a transcript and/or a media stream, and a label indicating whether the transcript and/or the media stream include a subject likely to be unfamiliar with the user.

The disclosed embodiment may further include determining an explanation designed for the particular user to the subject discussed by the at least one individual in the origin language. As mentioned above, the processing device may determine the explanation using information available in database 360 or database 365. The explanation may be specific for the particular user and may include cultural explanations. According to step 1708, the processing device may determine an explanation designed for the particular user to the subject discussed by the at least one individual in the origin language. For example, step 1708 may use step 1608 to determine the explanation.

The disclosed embodiment may further include analyzing the media stream to determine at least one voice profile for the at least one individual. In one example, the voice profile may be determined based on an identified set of voice parameters associated with at least one individual. In another example, the voice profile may be determined using a machine learning algorithm without identifying the set of voice parameters. According to step 1710, the processing device may analyze the media stream to determine at least one voice profile for the at least one individual. Additionally or alternatively, step 1718 may obtain the voice profile for the individual in other ways, for example using step 442.

The disclosed embodiment may further include using the determined at least one voice profile and a translated version of the transcript to artificially generate a revoiced media stream for the particular user in which the at least one individual speaks in the target language, wherein the revoiced media stream provides the determined explanation to the subject discussed by the at least one individual in the origin language. In some cases, the explanation to the subject discussed by the at least one individual in the origin language may be provided in a text message. Alternatively, the explanation to the subject discussed by the at least one individual in the origin language may be included in the translated transcript and be audibly provided using the voice of the at least one individual. According to step 1712, the processing device may use the determined at least one voice profile and a translated version of the transcript to artificially generate a revoiced media stream for the particular user in which the at least one individual speaks in the target language, wherein the revoiced media stream provides the determined explanation to the subject discussed by the at least one individual in the origin language. For example, step 1712 may use steps 444 and/or 446 to determine the synthesized voice and generate the revoiced media stream.

Disclosed embodiments may include receiving the information about the particular user from a player device (e.g., communications device 160) associated with a particular user that the media stream is destined to. The information may be provided to the processing device without intervention of the particular user. For example, the indication may include information about the language of the operating software of the player device. Disclosed embodiments may include receiving the information about the particular user from a server storing profiles of a plurality of users (e.g., server 133). In other disclosed embodiments, the determination that the particular user is unlikely to be familiarized with the subject discussed by the at least one individual in the media stream is based on the information about the particular user. Specifically, in one embodiment, the determination that the particular user is unlikely to be familiarized with the subject discussed by the at least one individual in the media stream to may be based on an age of the particular user.

In addition, the determination that the particular user is unlikely to be familiarized with the subject discussed by the at least one individual in the media stream to may be based on a nationality of the particular user. In addition, the determination that the particular user is unlikely to be familiarized with the subject discussed by the at least one individual in the media stream to may be based on a technical background of the particular user. Disclosed embodiments include determining that the particular user is unlikely to be familiarized with an object discussed by the at least one individual in the media stream. For example, the object may be a name of a local food common in counties speaking the origin language, but less common in countries that speak the target language. Disclosed embodiments include determining that the particular user is unlikely to be familiarized with an event discussed by the at least one individual in the media stream. For example, the event may be a historic event well known in a country associated with the media stream, but less known in countries that speak the target language. Disclosed embodiments include determining that the particular user is unlikely to be familiarized with a public figure discussed by the at least one individual in the media stream. For example, the public figure may be a politician well known in a country associated with the media stream, but less known in countries that speak the target language.

Disclosed embodiments include determining that at least one individual in the received media stream said a name of a person (or a place) that has meaning in the origin language. For example, the names "Luke Skywalker" and "Han Solo" convey information that users should know about the characters. The processing device may provide an explanation about the meaning of the name to users that speak the target language. Consistent with the present disclosure, if the media stream is an audio stream, the explanation may be included in the translated transcript and provided audibly. In some examples, the voice of the at least one individual speaking the target language may provide the explanation. Consistent with the present disclosure, if the media stream is a video stream, the explanation may be included in a text message. In some examples, the text message may be provided after receiving an input from the user that he/she is interested in getting the explanation. Consistent with the present disclosure, the received media stream may be a real-time conversation (e.g., a phone call, a video conference, or a recorded physical conversation) between the at least one individual and the particular user. The media stream may be captured by a communication device of the user. In this embodiment, the processing device may provide the explanation via a pop-up text message on the display of the communication device associated with the particular user.

Figure 17B:
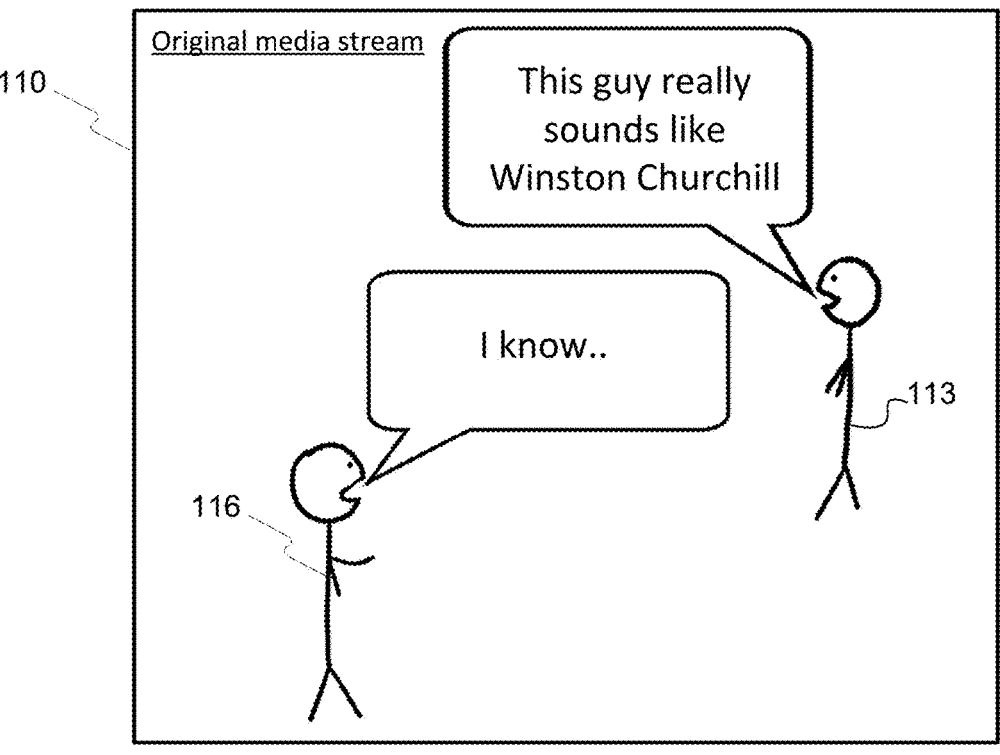
FIG. 17B is a schematic illustration depicting an example of revoicing a media stream using the method described in FIG. 17A.
Figure 17B:

FIG. 17B is a schematic illustration depicting an implementation of method 1700. In the figure, original media stream 110 destined to user 170 and includes individual 113 and individual 116 that speak in English. Consistent with disclosed embodiments, the system may determine individual in the received media stream discussed a subject likely to be unfamiliar with user 170 and cause an explanation to the subject to be provided in the target language. In this case, the system may artificially generate revoiced media stream 150 for a particular user under 6 years old unlikely to know who Winston Churchill is. Accordingly, the revoiced media stream includes and explanation in form of a message in Spanish.

12. Renaming Characters in Revoiced Media Streams

FIG. 18A is a flowchart of an example method 1800 for renaming characters in revoiced media streams upon determining that the name in the target language may cause antagonism. Consistent with the present disclosure, method 1800 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 1800, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream including a plurality of individuals speaking in an origin language, wherein the media stream is associated with a transcript in the origin language. As described above, media receipt module 402 may receive a media stream from media owner 120 or a media stream captured by user 180. According to step 1802, the processing device may receive a media stream including a plurality of individuals speaking in an origin language, wherein the media stream is associated with a transcript in the origin language. For example, step 1802 may use step 432 and/or step 462 to receive the media stream. The disclosed embodiment may further include obtaining an indication that the media stream is to be revoiced to a target language. As described above, the indication may be received from a particular user or determined by a processing device of the suggested system. According to step 1804, the processing device may obtain an indication that the media stream is to be revoiced to a target language.

The disclosed embodiment may further include analyzing the transcript to determine that an original name of a character in the received media stream is likely to cause antagonism with users that speak the target language. The name of the character in the received media stream may cause antagonism with users that speak the target language when the name is difficult to pronounce, when the name resembles to a name that has religious significant in the target language, when the name resembles to a name that has historical significant in the target language, when the name resembles to a name of a public figure, etc. According to step 1806, the processing device may analyze the transcript to determine that an original name of a character in the received media stream is likely to cause antagonism with users that speak the target language. For example, step 1806 may access a list of names that likely to cause antagonism with users that speak the target language to determine whether the original name is likely to cause antagonism with users that speak the target language.

The disclosed embodiment may further include translating the transcript to the target language using a substitute name for the character. As mentioned above, the translation may be implemented by transcript processing module 404. According to step 1808, the processing device may translate the transcript to the target language using a substitute name for the character. For example, step 1808 may use step 440 to translate or otherwise transform the transcript. In one example, step 1808 may translate or transformed speech directly from the media stream received by step 1802, for example as described above in relation to step 440.

The disclosed embodiment may further include analyzing the media stream to determine a voice profile for each of the plurality of individuals. In one example, the voice profile may be determined based on a separate set of voice parameters associated with each individual. In another example, the voice profile may be determined using a machine learning algorithm without identifying the set of voice parameters. The voice profile may describe the changes of the voice of the individual during the whole media stream. According to step 1810, the processing device may analyze the media stream to determine a voice profile for each of the plurality of individuals. Additionally or alternatively, step 1810 may obtain the voice profile for each of the plurality of individuals in other ways, for example using step 442.

The disclosed embodiment may further include using the determined voice profiles and the translated transcript to artificially generate a revoiced media stream in which the plurality of individuals speak in the target language and the character is named the substitute name. In some cases, processing device may determine to forego renaming the character. The processing device may evaluate the benefits of renaming (e.g., evaluating the risk of cause antagonism) compare to the risk of damaging the viewing experience. According to step 1812, the processing device may use the determined voice profiles and the translated transcript to artificially generate a revoiced media stream in which the plurality of individuals speak in the target language and the character is named the substitute name. For example, step 1812 may use steps 444 and/or 446 to generate the revoiced media stream.

In some embodiments, the determination that the name of the character is likely to cause antagonism with users that speak the target language, is because the original name of the character will be difficult to pronounce by users that speak the target language. Related embodiments may include determining a substitute name that will be easier to pronounce than the original name. For example, assuming the original media stream has a character named Milla Jovovich. When the media stream is revoiced to Japanese, the processing device may determine that the name is too hard to pronounce by user speaking Japanese and select a different name. In some embodiments, the determination that the name of the character is likely to cause antagonism with users that speak the target language, is because the original name of the character resembles a name that has religious significant to users that speak the target language. Related embodiments may include determining a substitute name that will be less resembled to the name that has religious significant in the target language. For example, assuming the original media stream has a cat named Mahmud. When revoicing the media stream to Arabic, the processing device may determine that the name is too resemble to the name of Muhammad and decide to call the cat Kamilah.

In some embodiments, the determination that the name of the character is likely to cause antagonism with users that speak the target language, is because the original name of the character resembles a name that has historic significant to users that speak the target language. Related embodiments may include determining a substitute name that will be less resemble to the name that has historic significant in the target language. For example, assuming the original media stream has a character named Wolf Hertal. When the media stream is revoiced to Hebrew, the processing device may determine that the name is too similar to Adolf Hitler and select a different name. In some embodiments, the determination that the name of the character is likely to cause antagonism with users that speak the target language, is because the original name of the character is similar to a name of a public figure in a country that speak the target language. Related embodiments may include determining a substitute name that will be other than the name of the public figure.

In one embodiment, the processing device may estimate an antagonism level associated with the name of the character and determine to rename the character when the antagonism level is greater than a first threshold. In a related one embodiment, the processing device may determine the importance level of keeping that the name of the charterer, and when the importance level is greater than a second threshold the processing device may decide to forego renaming the character. For example, when the name may convey a certain idea. In one embodiment, the processing device may determine to rename the character when the antagonism level is greater than the first threshold and the importance level is greater than the second threshold. In one embodiment, the processing device may determine to forego changing the name of the character when the antagonism level is greater than the first threshold and the importance level is greater than the second threshold. Disclosed embodiments include determining that the name of the character (or a place) that has meaning in the origin language. For example, the names "Luke Skywalker" and "Han Solo" convey information that users should know about the characters. The processing device may provide an explanation about the meaning of the name to users that speak the target language. Consistent with the present disclosure, the received media stream may be a real-time conversation (e.g., a phone call, a video conference, or a recorded physical conversation) between the plurality of individual. The media stream may be captured by a communication device of one of the individuals. In this embodiment, the processing device may determine that this is a real-time conversion and decide to forego renaming the character.

Figure 18B:
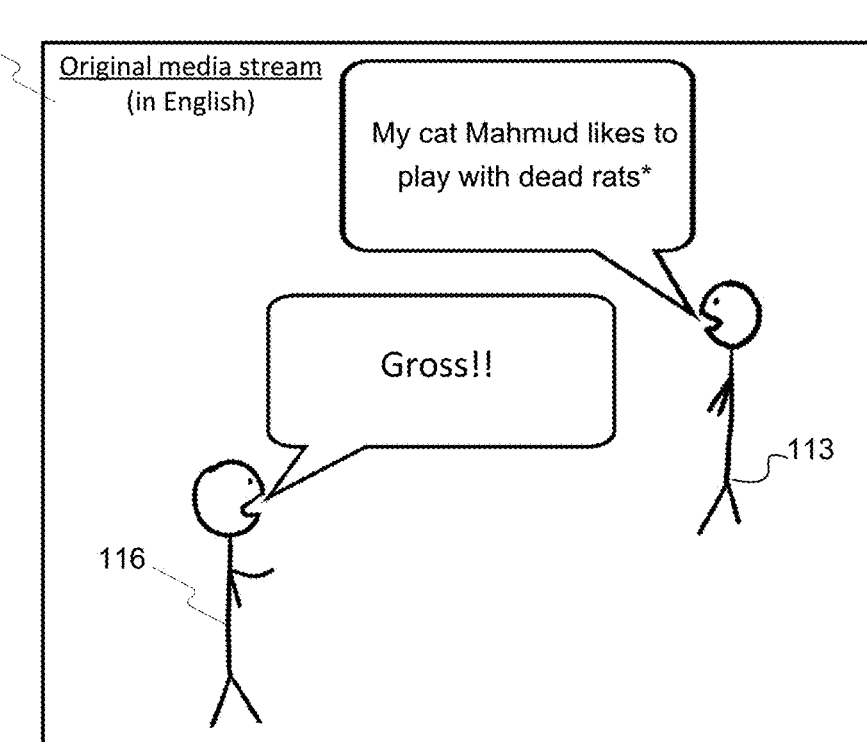
FIG. 18B is a schematic illustration depicting an example of revoicing a media stream using the method described in FIG. 18A.

FIG. 18B is a schematic illustration depicting an implementation of method 1800. In the figure, original media stream 110 includes individual 113 and individual 116 that speak in English. Consistent with disclosed embodiments, the system may determine that an original name of a character in the received media stream is likely to cause antagonism with users that speak the target language and translate the transcript to the target language using a substitute name for the character. In this case, the name "Mahmud" in the original media stream was changed to "Kamilah" because it resembles to the name of Muhammad and this may offend users that speak Arabic. The system may artificially generate revoiced media stream 150 in which the substitute name is used.

13. Revoicing Media Stream with Rhymes

Figure 19A:
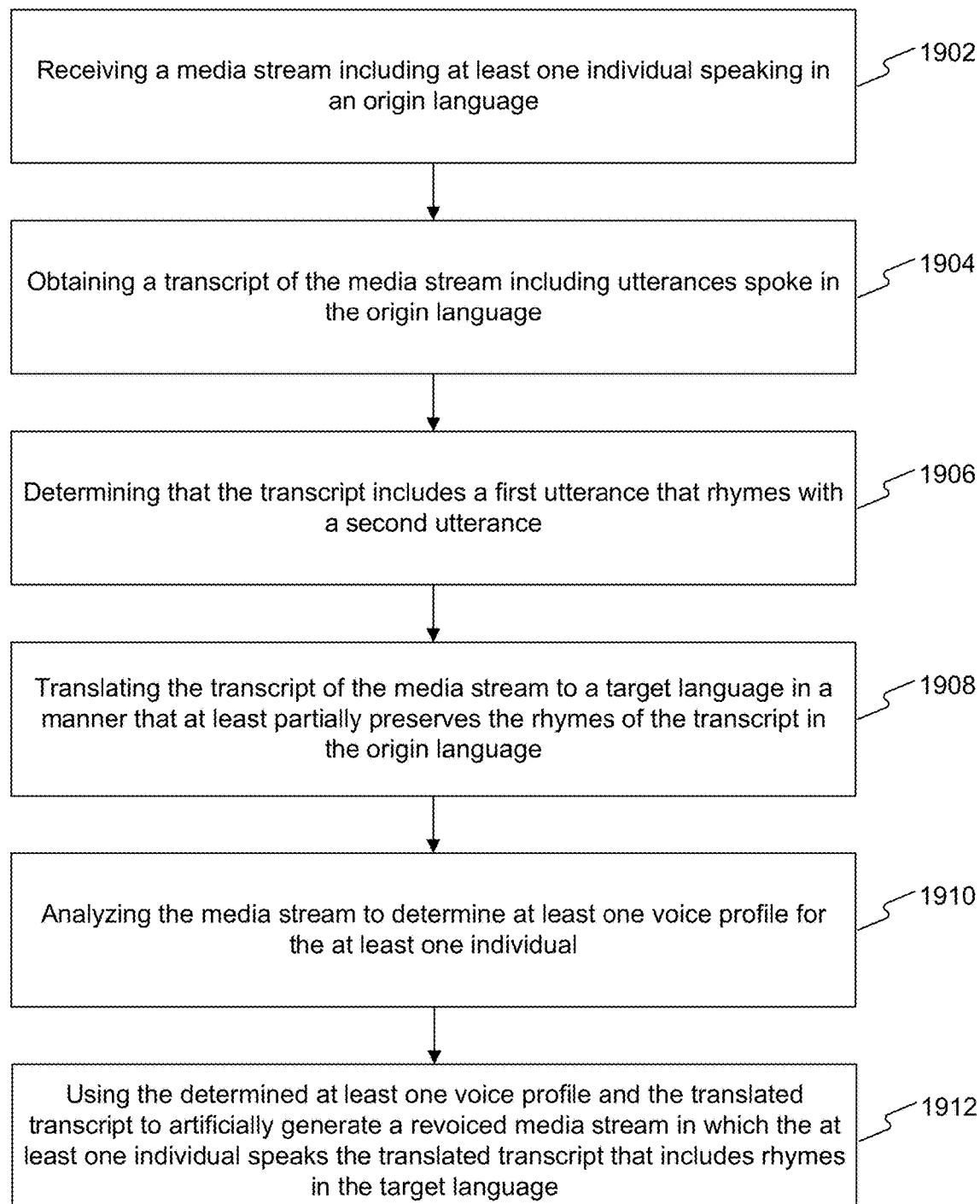
FIG. 19A is a flowchart of an example method for revoicing media stream with rhymes, in accordance with some embodiments of the disclosure.

FIG. 19A is a flowchart of an example method 1900 for artificially generating a revoiced media stream in a manner that at least partially preserves the rhymes of the transcript in the origin language. Consistent with the present disclosure, method 1900 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 1900, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream including at least one individual speaking in an origin language. As described above, media receipt module 402 may receive a media stream from media owner 120 or a media stream captured by user 190. According to step 1902, the processing device may receive a media stream including at least one individual speaking in an origin language. For example, step 1902 may use step 432 and/or step 462 to receive the media stream. The disclosed embodiment may further include obtaining a transcript of the media stream including utterances spoke in the origin language. As described above, transcript processing module 404 may receive the transcript from media owner 120 or determine the transcript of the received media stream using any suitable voice-to-text algorithm. According to step 1904, the processing device may obtain a transcript of the media stream including utterances spoke in the origin language.

The disclosed embodiment may further include determining that the transcript includes a first utterance that rhymes with a second utterance. Consistent with the present disclosure, transcript processing module 404 may include machine learning models to identify rhymes. According to step 1906, the processing device may determine that the transcript includes a first utterance that rhymes with a second utterance. For example, a machine learning model may be trained using training examples to determine whether pairs of utterances rhymes, and step 1906 may use the trained machine learning model to analyze the transcript and determine that the transcript includes a first utterance that rhymes with a second utterance. An example of such training example may include a pair of utterances, for example in textual format, together with a label indicating whether the pair of utterances rhymes. In another example, an artificial neural network (such as a recurrent neural network, a long short-term memory neural network, a deep neural network, etc.) may be configured to determine whether pairs of utterances rhymes, and step 1906 may use the artificial neural network to analyze the transcript and determine that the transcript includes a first utterance that rhymes with a second utterance. Additionally or alternatively, step 1906 may comprise determining that the media stream received by step 1902 includes a first utterance that rhymes with a second utterance. For example, a machine learning model may be trained using training examples to determine whether pairs of utterances rhymes, and step 1906 may use the trained machine learning model to analyze the media stream received by step 1902 and determine that the media stream includes a first utterance that rhymes with a second utterance. An example of such training example may include a pair of utterances, for example in an audio data, together with a label indicating whether the pair of utterances rhymes. In another example, an artificial neural network (such as a recurrent neural network, a long short-term memory neural network, a deep neural network, etc.) may be configured to determine whether pairs of utterances rhymes, and step 1906 may use the artificial neural network to analyze the media stream received by step 1902 and determine that the media stream includes a first utterance that rhymes with a second utterance.

The disclosed embodiment may further include translating the transcript of the media stream to a target language in a manner that at least partially preserves the rhymes of the transcript in the origin language. In one example, translating the transcript in a manner that at least partially preserves the rhymes of the transcript in the origin language may include translating the first sentence such that it ends with a first word in the target language, and translating the second sentence such that it ends with a second word in the target language, wherein the second word rhymes with the first word. According to step 1908, the processing device may translate the transcript of the media stream to a target language in a manner that at least partially preserves the rhymes of the transcript in the origin language. For example, step 1908 may use step 440 to translate or otherwise transform the transcript. In one example, step 1908 may translate or transformed speech directly from the media stream received by step 1902, for example as described above in relation to step 440

The disclosed embodiment may further include analyzing the media stream to determine at least one voice profile for the at least one individual. In one example, the voice profile may be determined using a machine learning algorithm and describes the changes of the voice of the individual during the whole media stream. According to step 1910, the processing device may analyze the media stream to determine at least one voice profile for the at least one individual. Additionally or alternatively, step 1910 may obtain the voice profile for the individual in other ways, for example using step 442.

The disclosed embodiment may further include using the determined at least one voice profile and the translated transcript to artificially generate a revoiced media stream in which the at least one individual speaks the translated transcript that includes rhymes in the target language. In some cases, processing device may artificially generate the revoiced media stream in a manner that at least partially preserves the rhymes of the transcript in the origin language. Specifically, the processing device may confirm that the translation of the first utterance is pronounced similarly to the translation of the second utterance. According to step 1912, the processing device may use the determined at least one voice profile and the translated transcript to artificially generate a revoiced media stream in which the at least one individual speaks the translated transcript that includes rhymes in the target language. For example, steps 1912 may use steps 444 and/or 446 to generate the revoiced media stream.

Consistent with embodiments of the present disclosure, translating the transcript of the media stream in a manner that at least partially preserves the rhymes of the transcript in the origin language includes: identifying a first plurality of words in the target language that corresponds with the first utterance in the origin language; identifying a second plurality of words in the target language that corresponds with the second utterance in the origin language; select one of first plurality of words in the target language and one of the second plurality of words in the target language, wherein the selected words rhyme with each other. Related embodiments include artificially generating the revoiced media stream in a manner that at least partially preserves the rhymes of the transcript in the origin language. Specifically, the processing device may confirm that the selected word out of the first plurality of words is pronounced similarly to the selected word out of the second plurality of words.

In some embodiments, the selected word out of the first plurality of words is the default word for translating the first utterance, and the processing device is configured to select a word out of the second plurality of words that rhymes with the selected word out of the first plurality of words. Specifically, the selected word out of the second plurality of words is other than a default word for translating the second utterance. In alterative embodiments, the selected word out of the first plurality of words is other than a default word for translating the first utterance, and the selected word out of the second plurality of words is also other than a default word for translating the second utterance. In some embodiments, the first utterance includes one or more words in the original language, and the processing device is configured to select a set of words that that corresponds with the first utterance in the origin language.

Consistent with embodiments of the present disclosure, translating the transcript of the media stream in a manner that at least partially preserves the rhymes of the transcript in the origin language includes: determining a meaning of a first sentence that ends with the first utterance in the origin language; determining a meaning of second sentence that ends with the second utterance in the origin language; translating the first sentence such that it ends with a first word in the target language; translating the second sentence such that it ends with a second word in the target language, wherein the second word rhymes with the first word. Related embodiments include artificially generating the revoiced media stream in a manner that at least partially preserves the rhymes of the transcript in the origin language. Specifically, the processing device may confirm that the first word is pronounced similarly to the second word.

In some embodiments, the processing device is configured to identify cases when translation in a manner that preserves a meaning of the transcript is more important than translation in a manner that at least partially preserves the rhymes of the transcript in the origin language. In these cases, the processing device may forego translating the transcript in a manner that at least partially preserves the rhymes of the transcript in the origin language. For example, when revoicing news. In some embodiments, the processing device is configured to identify cases when translation in a manner that preserves a meaning of the transcript is less important than translation in a manner that at least partially preserves the rhymes of the transcript in the origin language. In these cases, the processing device may translate the transcript in a manner that at least partially preserves the rhymes of the transcript in the origin language even when a quality of the translation damages. For example, when revoicing a kids show. Embodiments of the present disclosure include attempting to find a perfect rhyme for the translation of the first utterance and the second utterance. Upon, a failure to find a perfect rhyme, the processing device is configured to attempt to find a family rhyme. Upon, a failure to find a perfect rhyme, the processing device is configured to attempt to find a consonance rhyme. Consistent with the present disclosure, the received media stream may be a real-time conversation (e.g., a phone call, a video conference, or a recorded physical conversation) between the plurality of individual. The media stream may be captured by a communication device of one of the individuals. In this embodiment, the processing device may determine that this is a real-time conversion and decide to forego translating the transcript in a manner that at least partially preserves the rhymes of the transcript in the origin language.

Figure 19B:
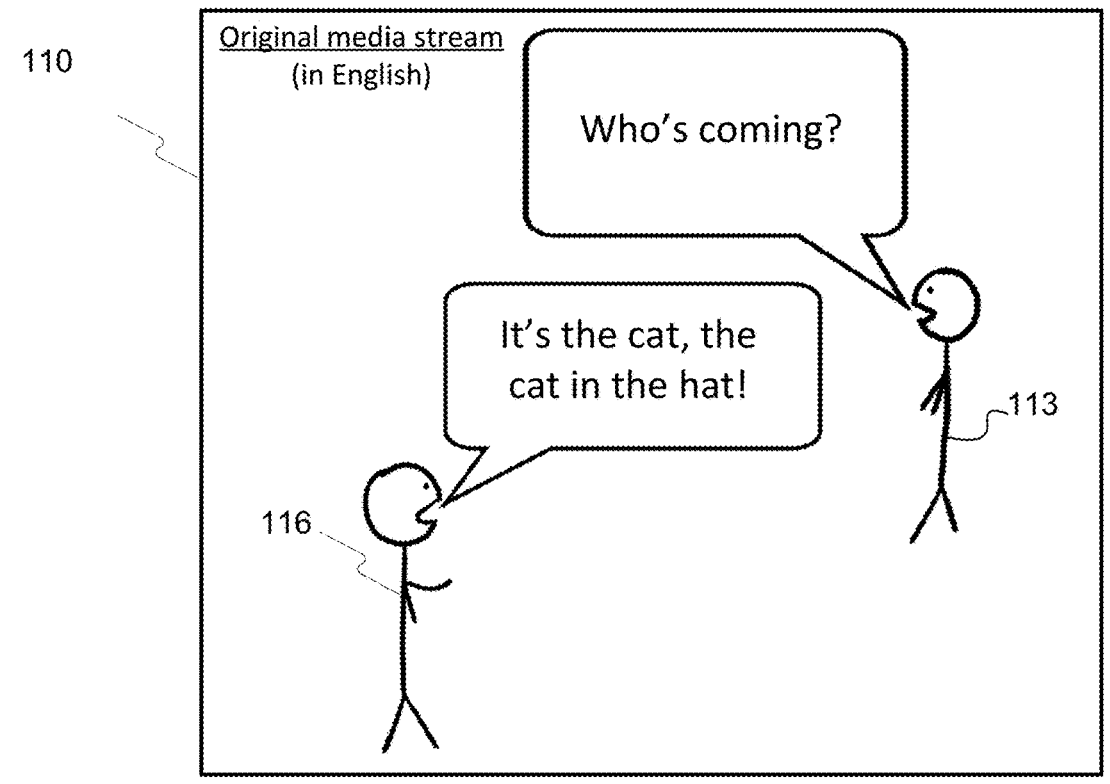
FIG. 19B is a schematic illustration depicting an example of revoicing a media stream using the method described in FIG. 19A.
Figure 19B:
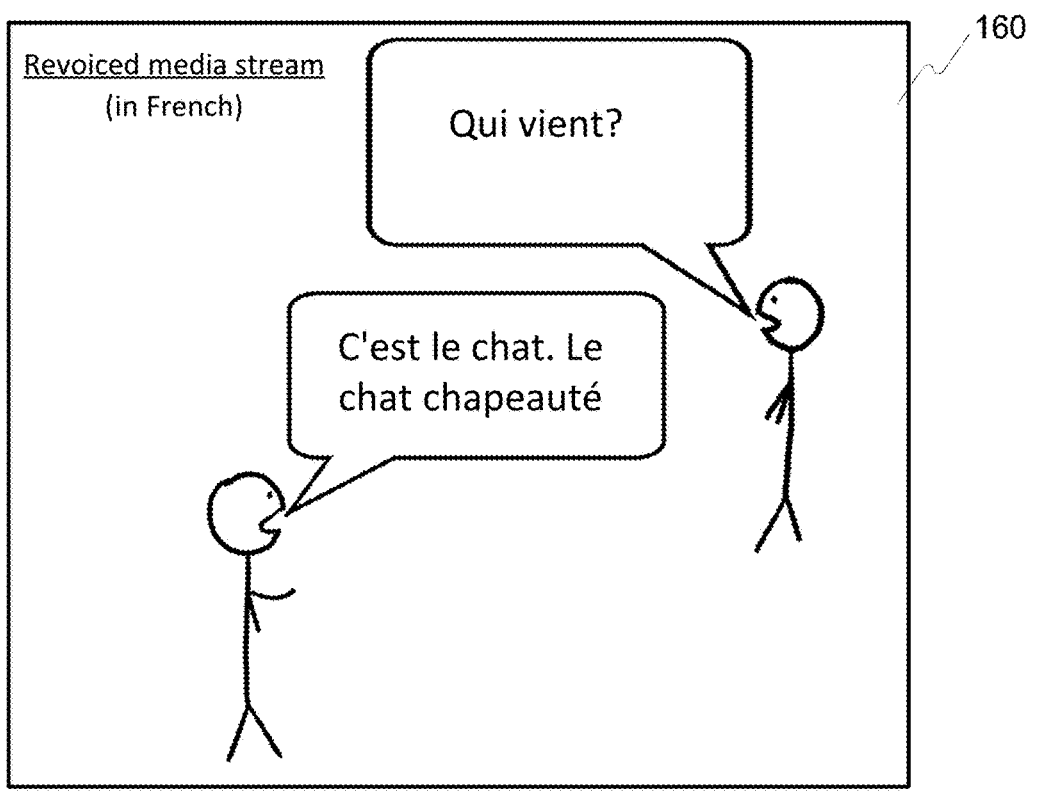

FIG. 19B is a schematic illustration depicting an implementation of method 1900. In the figure, original media stream 110 includes individual 113 and individual 116 that speak in English. Consistent with disclosed embodiments, the system may determine that the transcript includes a first utterance that rhymes with a second utterance (e.g., "cat" and "hat"). The system may translate the transcript of the media stream to a target language in a manner that at least partially preserves the rhymes of the transcript in the origin language. For example, the system may translate "the cat in the hat" to "le chat chapeauté" rather than "le chat dans le chapeau" because the first version at least partially preserves the rhymes of the transcript in the origin language. The system may artificially generate revoiced media stream 150 in which the accuracy of the translation is damaged in order to at least partially preserves the rhymes of the transcript in the origin language.

14. Maintaining Original Volume Changes of a Character in Revoiced Media Stream

FIG. 20A is a flowchart of an example method 2000 for artificially generating a revoiced media stream in which a ratio of the volume levels between translated utterances in the revoiced media stream is substantially identical to a ratio of volume levels between original utterances in the received media stream. Consistent with the present disclosure, method 2000 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 2000, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream including an individual speaking in an origin language. As described above, media receipt module 402 may receive a media stream from media owner 120 or a media stream captured by user 170. According to step 2002, the processing device may receive a media stream including an individual speaking in an origin language. For example, step 2002 may use step 432 and/or step 462 to receive the media stream. The disclosed embodiment may further include obtaining a transcript of the media stream including a first utterance and a second utterance spoke in the original language. As described above, transcript processing module 404 may receive the transcript from media owner 120 or determine the transcript of the received media stream using any suitable voice-to-text algorithm. According to step 2004, the processing device may obtain a transcript of the media stream including a first utterance and a second utterance spoke in the original language.

The disclosed embodiment may further include translating the transcript of the media stream to a target language, wherein the translated transcript includes a first set of words in the target language that corresponds with the first utterance and a second set of words in the target language that corresponds with the second utterance. As mentioned above, transcript processing module 404 may include instructions to translate the transcript of the received media stream to the target language using any suitable translation algorithm. Transcript processing module 404 may receive as an input the indication about language characteristics to translate the transcript of the media stream accordingly. According to step 2006, the processing device may translate the transcript of the media stream to a target language, wherein the translated transcript includes a first set of words in the target language that corresponds with the first utterance and a second set of words in the target language that corresponds with the second utterance. For example, step 2006 may use step 440 to translate or otherwise transform the transcript. In one example, step 2006 may translate or transformed speech directly from the media stream received by step 2002, for example as described above in relation to step 440. Additionally or alternatively, step 2006 may receive such translated transcript, for example by reading the translated transcript from memory, by receiving the translated transcript from an external device, by receiving the translated transcript from a user, and so forth.

The disclosed embodiment may further include analyzing the media stream to determine a voice profile for the individual, wherein the voice profile is indicative of a ratio of volume levels between the first and second utterances as they were spoken in the media stream. In other embodiments, the voice profile may be indicative of: intonation differences between the first and second utterances, pitch differences between the first and second utterances, accent differences between the first and second utterances. According to step 2008, the processing device may analyze the media stream to determine a voice profile for the individual, wherein the voice profile is indicative of a ratio of volume levels between the first and second utterances as they were spoken in the media stream. Additionally or alternatively, step 2008 may obtain the voice profile for the individual in other ways, for example using step 442.

The disclosed embodiment may further include determining metadata information for the translated transcript, wherein the metadata information includes desired volume levels for each of the first and second sets of words that correspond with the first and second utterances. The metadata information may include the desired level of intonation, pitch, accent, and more. According to step 2010, the processing device may determine metadata information for the translated transcript, wherein the metadata information includes desired volume levels for each of the first and second sets of words that correspond with the first and second utterances. For example, a machine learning model may be trained using training examples to determine desired volume levels (and/or desired levels of one or more of intonation, pitch, accent) for sets of words in transcripts, and step 2010 may use the trained machine learning model to analyze the translated transcript and determine the desired volume level (and/or desired levels of one or more of intonation, pitch, accent) for each of the first and second sets of words. An example of such training example may include a transcript including a set of words, together with an indication of the desired volume level (and/or desired levels of one or more of intonation, pitch, and accent) for the set of words. In another example, an artificial neural network (such as a recurrent neural network, a long short-term memory neural network, a deep neural network, etc.) may be configured to determine desired volume levels (and/or desired levels of one or more of intonation, pitch, accent) for sets of words in transcripts, and step 2010 may use the artificial neural network to analyze the translated transcript and determine the desired volume level (and/or desired levels of one or more of intonation, pitch, accent) for each of the first and second sets of words. Additionally or alternatively, step 2010 may comprise determining the metadata information directly from the media stream received by step 2002, wherein the metadata information includes desired volume levels for each of the first and second sets of words that correspond with the first and second utterances. For example, a machine learning model may be trained using training examples to determine desired volume levels (and/or desired levels of one or more of intonation, pitch, accent) for sets of words in media streams, and step 2010 may use the trained machine learning model to analyze the media stream received by step 2002 and determine the desired volume level (and/or desired levels of one or more of intonation, pitch, and accent) for each of the first and second sets of words. An example of such training example may include a media stream including a set of words, together with an indication of the desired volume level (and/or desired levels of one or more of intonation, pitch, and accent) for the set of words. In another example, an artificial neural network (such as a recurrent neural network, a long short-term memory neural network, a deep neural network, etc.) may be configured to determine desired volume levels (and/or desired levels of one or more of intonation, pitch, and accent) for sets of words in media streams, and step 2010 may use the artificial neural network to analyze the media stream received by step 2002 and determine the desired volume level (and/or desired levels of one or more of intonation, pitch, and accent) for each of the first and second sets of words.

The disclosed embodiment may further include using the determined voice profile, the translated transcript, and the metadata information to artificially generate a revoiced media stream in which the individual speaks the translated transcript, wherein a ratio of the volume levels between the first and second sets of words in the revoiced media stream is substantially identical to the ratio of volume levels between the first and second utterances in the received media stream. In certain cases, the processing device may decide to select different values for utterances in the revoiced media stream. For example, a particular user with hearing disability that had a limited vocal range will received a revoiced media stream that generated to address his or her hearing disability. According to step 2012, the processing device may use the determined voice profile, the translated transcript, and the metadata information to artificially generate a revoiced media stream in which the individual speaks the translated transcript, wherein a ratio of the volume levels between the first and second sets of words in the revoiced media stream is substantially identical to the ratio of volume levels between the first and second utterances in the received media stream. For example, steps 2012 may use steps 444 and/or 446 to generate the revoiced media stream.

In disclosed embodiments, the voice profile is further indicative of intonation differences between the first and second utterances as they were spoken in the media stream. The processing device may generate a revoiced media stream in which intonation differences between the first and second sets of words in the revoiced media stream is substantially identical to the intonation differences between the first and second utterances in the received media stream. For example, the processing device may determine that the first utterance was said as a question and the second utterance was said as a statement. The processing device may generate a revoiced media stream in which the first set of words are said as a question and the second set of words are said as a statement. In disclosed embodiments, the voice profile is further indicative of pitch differences between the first and second utterances as they were spoken in the media stream. The processing device may generate a revoiced media stream in which pitch differences between the first and second sets of words in the revoiced media stream is substantially identical to the pitch differences between the first and second utterances in the received media stream. In disclosed embodiments, the voice profile is further indicative of accent differences between the first and second utterances as they were spoken in the media stream. The processing device may generate a revoiced media stream in which accent differences between the first and second sets of words in the revoiced media stream is substantially identical to the accent differences between the first and second utterances in the received media stream.

Consistent with one example, the processing device is configured to identify that the individual shouted the first utterance and whispered the second utterance. Accordingly, in the revoiced media stream, the individual would shout the first set of words in the target language and whispered the second set of words in the target language. Consistent with one example, the processing device is configured to identify that the individual spoke the first utterance in a cynical voice and spoke the second utterance in a regular voice. Disclosed embodiments includes analyzing the media stream to determine volume levels for the first and second utterances as they were spoken in the media stream, and to generate a revoiced media stream in which the first and second sets of words are spoken in the target language at the determined levels of volume. Disclosed embodiments includes analyzing the media stream to determine volume levels for the first and second utterances as they were spoken in the media stream, and to generate a revoiced media stream in which the first and second sets of words are spoken in the target language at lower levels of volume than the determined level of volume. For example, in some cases the individual shouted the first utterance and the processing device may include settings defining maximum volume in the revoiced media stream.

Disclosed embodiments includes analyzing the media stream to determine volume levels for the first and second utterances as they were spoken in the media stream, and to generate a revoiced media stream in which the first and second sets of words are spoken in the target language at higher levels of volume than the determined level of volume. For example, in some cases the individual whispered the first utterance and the processing device may include settings defining minimum volume in the revoiced media stream. In some embodiment, the processing device is configured to access language settings associated with the target language and determine to deviate from the ratio of volume levels between the first and second utterances in the received media stream based on language settings. The language settings may reflect cultural norms. For example, apologizing in Japanese is said with different intonation as it is said in English. Consistent with the present disclosure, the received media stream may be a real-time conversation (e.g., a phone call, a video conference, or a recorded physical conversation) between the individual and a particular user. In some embodiments, the processing device may maintain the ratio of the volume levels between the first and second sets of words in the revoiced media stream substantially identical to the ratio of volume levels between the first and second utterances in the real-time conversation. In related embodiments, the processing device may recognize in real-time that the first utterance has no real meaning in the original language and determine to mute the first utterance. The first utterance may be sound such as: um, huh, mmmm, etc.

Figure 20B:
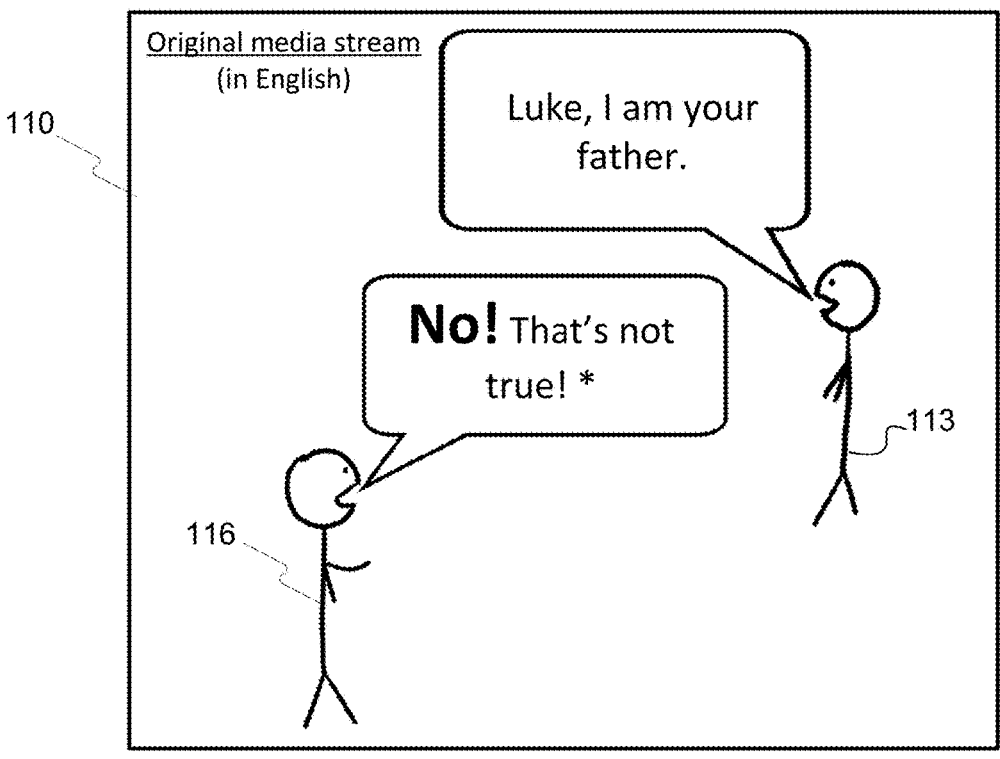
FIG. 20B is a schematic illustration depicting an example of revoicing a media stream using the method described in FIG. 20A.
Figure 20B:

FIG. 20B is a schematic illustration depicting an implementation of method 2000. In the figure, original media stream 110 includes individual 113 and individual 116 that speak in English. Consistent with disclosed embodiments, the system may determine that a voice profile for each of individual 113 and individual 116. The voice profile may be indicative of a ratio of volume levels between the first and second utterances as they were spoken in the media stream. In the depicted example, the font size illustrates the volume level. Specifically, the "No" is the loudest. The system may artificially generate a revoiced media stream in which the individual speaks the translated transcript. In revoiced media stream 150, the ratio of the volume levels between the first and second sets of words in the revoiced media stream is substantially identical to the ratio of volume levels between the first and second utterances in the received media stream.

15. Maintaining Original Volume Differences Between Characters in Revoiced Media Stream FIG. 21A is a flowchart of an example method 2100 for artificially generating a revoiced media stream in which a ratio of the volume levels between different characters in the revoiced media stream is substantially identical to a ratio of volume levels between the characters in the received media stream. Consistent with the present disclosure, method 2100 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 2100, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream including a first individual and a second individual speaking in at least one origin language. As described above, media receipt module 402 may receive a media stream from media owner 120 or a media stream captured by user 170.

According to step 2102, the processing device may receive a media stream including a first individual and a second individual speaking in at least one origin language. For example, step 2102 may use step 432 and/or step 462 to receive the media stream. The disclosed embodiment may further include obtaining a transcript of the media stream including a first utterance spoken by the first individual and a second utterance spoken by the second individual. As described above, transcript processing module 404 may receive the transcript from media owner 120 or determine the transcript of the received media stream using any suitable voice-to-text algorithm. According to step 2104, the processing device may obtain a transcript of the media stream including a first utterance spoken by the first individual and a second utterance spoken by the second individual.

The disclosed embodiment may further include translating the transcript of the media stream to a target language, wherein the translated transcript includes a first set of words in the target language that corresponds with the first utterance and a second set of words in the target language that corresponds with the second utterance. As mentioned above, transcript processing module 404 may include instructions to translate the transcript of the received media stream to the target language using any suitable translation algorithm. Transcript processing module 404 may receive as an input the indication about language characteristics to translate the transcript of the media stream accordingly. According to step 2106, the processing device may translate the transcript of the media stream to a target language, wherein the translated transcript includes a first set of words in the target language that corresponds with the first utterance and a second set of words in the target language that corresponds with the second utterance. For example, step 2106 may use step 440 to translate or otherwise transform the transcript. In one example, step 2106 may translate or transformed speech directly from the media stream received by step 2102, for example as described above in relation to step 440. Additionally or alternatively, step 2106 may receive such translated transcript, for example by reading the translated transcript from memory, by receiving the translated transcript from an external device, by receiving the translated transcript from a user, and so forth.

The disclosed embodiment may further include analyzing the media stream to determine voice profiles for the first individual and the second individual, wherein the voice profiles are indicative of a ratio of volume levels between the first and second utterances as they were spoken in the media stream. In other embodiments, the voice profiles may be indicative of: intonation differences between the first and second individuals, pitch differences between the first and second individuals, accent differences between the first and second individuals, and more. According to step 2108, the processing device may analyze the media stream to determine voice profiles for the first individual and the second individual, wherein the voice profiles are indicative of a ratio of volume levels between the first and second utterances as they were spoken in the media stream. Additionally or alternatively, step 2108 may obtain the voice profile for the individual in other ways, for example using step 442.

The disclosed embodiment may further include determining metadata information for the translated transcript, wherein the metadata information includes desired volume levels for each of the first and second sets of words that correspond with the first and second utterances. The metadata information may include the desired level of intonation, pitch, accent, and more for each individual. According to step 2110, the processing device may determine metadata information for the translated transcript, wherein the metadata information includes desired volume levels for each of the first and second sets of words that correspond with the first and second utterances. For example, step 2110 may analyze the media stream received by step 2102 to determine the volume levels (and/or desired levels of one or more of intonation, pitch, and accent) in the media stream for a segment of the media stream corresponding to the first set of words and for a segment of the media stream corresponding to the second set of words. Further, in some examples, step 2110 may determine the desired volume levels for each of the first and second sets of words based on the volume levels (and/or desired levels of one or more of intonation, pitch, and accent) in the media stream received by step 2102 for the corresponding segments. For example, the desired level may be a function of the level in the media stream. Some non-limiting examples of such function may include linear functions, non-linear functions, polynomial functions, functions determined using machine learning methods, and so forth.

The disclosed embodiment may further include using the determined voice profiles, the translated transcript, and the metadata information to artificially generate a revoiced media stream in which the first and second individual speak the translated transcript, wherein a ratio of the volume levels between the first and second sets of words in the revoiced media stream is substantially identical to the ratio of volume levels between the first and second utterances in the received media stream. In certain cases, the processing device may decide to select different values for utterances in the revoiced media stream. For example, a particular user with hearing disability that had a limited vocal range will received a revoiced media stream that generated to address his or her hearing disability. According to step 2112, the processing device may use the determined voice profiles, the translated transcript, and the metadata information to artificially generate a revoiced media stream in which the first and second individual speak the translated transcript, wherein a ratio of the volume levels between the first and second sets of words in the revoiced media stream is substantially identical to the ratio of volume levels between the first and second utterances in the received media stream. For example, steps 2112 may use steps 444 and/or 446 to determine the synthesized voice and generate the revoiced media stream.

In disclosed embodiments, the voice profiles are further indicative of intonation differences between the first utterance as it was spoken by the first individual and the second utterance as it was spoken by the second individual. The processing device may generate a revoiced media stream in which intonation differences between the first and second sets of words in the revoiced media stream is substantially identical to the intonation differences between the first and second utterances in the received media stream. For example, the processing device may determine that the first utterance was said by the first individual as a question and the second utterance was said by the second individual as an answer. The processing device may generate a revoiced media stream in which the first set of words are said as a question and the second set of words are said as an answer. In disclosed embodiments, the voice profiles are further indicative of pitch differences between the first utterance as it was spoken by the first individual and the second utterance as it was spoken by the second individual. The processing device may generate a revoiced media stream in which pitch differences between the first and second sets of words in the revoiced media stream is substantially identical to the pitch differences between the first and second utterances in the received media stream. For example, the first individual is a child and the second is a grown up.

In disclosed embodiments, the voice profile is further indicative of accent differences between the first utterance as it was spoken by the first individual and the second utterance as it was spoken by the second individual. The processing device may generate a revoiced media stream in which accent differences between the first and second sets of words in the revoiced media stream is substantially identical to the accent differences between the first and second utterances in the received media stream. For example, the first individual speaks English with a Russian accent and the second individual speaks English without accent. In a revoiced media stream the first individual may speak Spanish with a Russian accent and the second individual speak Spanish without accent. Consistent with one example, the processing device is configured to identify that the first individual generally speak louder than the second individual. Accordingly, in the revoiced media stream, the first individual would say the first set of words in the target language louder than the second individual would say the second set of words in the target language. Consistent with one example, the processing device is configured to identify that the first individual spoke the first utterance in a cynical voice and that the second individual spoke the second utterance in a regular voice.

Disclosed embodiments includes analyzing the media stream to determine volume levels for the first and second utterances as they were spoken in the media stream, and to generate a revoiced media stream in which the first and second sets of words are spoken in the target language at the determined levels of volume. Disclosed embodiments includes analyzing the media stream to determine volume levels for the first and second utterances as they spoke in the media stream, and to generate a revoiced media stream in which the first and second sets of words are spoken in the target language at lower levels of volume than the determined level of volume. For example, in some cases, the first individual shouted the first utterance and the processing device may include settings defining maximum volume in the revoiced media stream. Disclosed embodiments includes analyzing the media stream to determine volume levels for the first and second utterances as they were spoken in the media stream, and to generate a revoiced media stream in which the first and second sets of words are spoken in the target language at higher levels of volume than the determined level of volume. For example, in some cases the first individual whispered the first utterance and the processing device may include settings defining minimum volume in the revoiced media stream. Consistent with the present disclosure, the received media stream may be a real-time conversation (e.g., a phone call, a video conference, or a recorded physical conversation) between the first individual, the second individual, and a particular user.

In some embodiments, the processing device may maintain the ratio of the volume levels between the first and second sets of words in the revoiced media stream substantially identical to the ratio of volume levels between the first and second utterances in the real-time conversation. In related embodiments, the processing device may recognize in real-time that the first utterance has no real meaning in the original language and determine to mute the first utterance. The first utterance may be sound such as: um, huh, mmm, etc. In related embodiments, the processing device may recognize in real-time that the conversation is between the particular user and the first individual and that the utterances spoken by the second individual are background noises, and determine to translate the utterances by the first individual to the target language and to mute the second utterance.

Figure 21B:
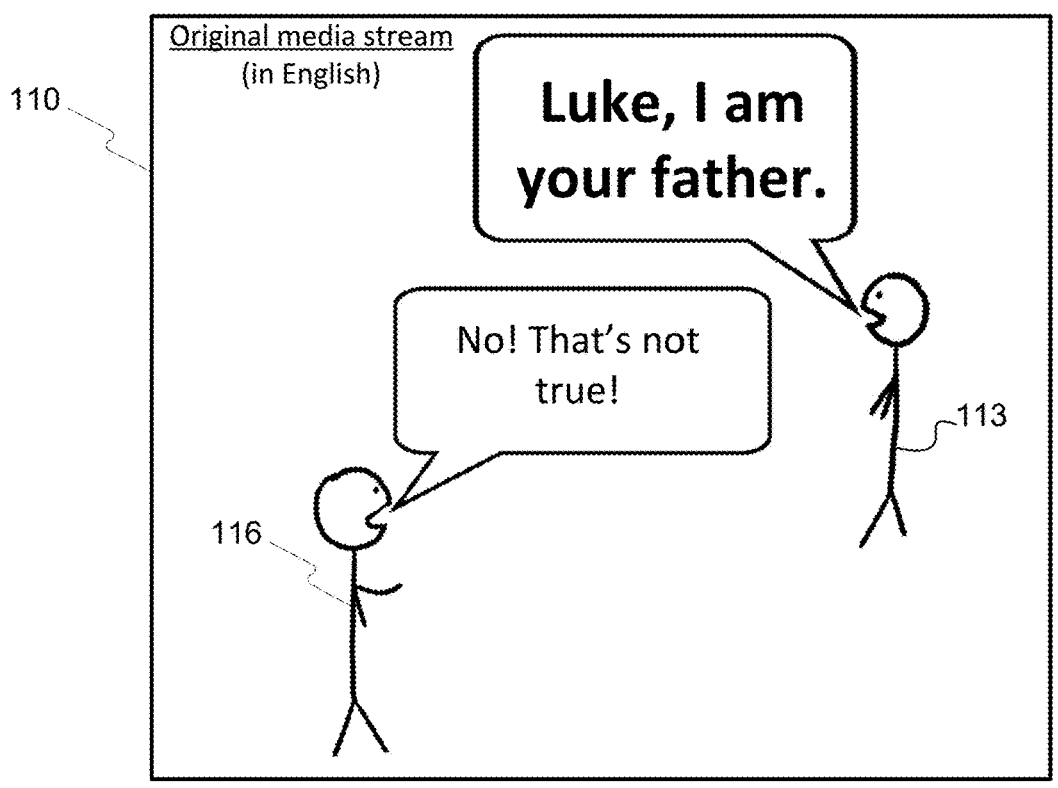
FIG. 21B is a schematic illustration depicting an example of revoicing a media stream using the method described in FIG. 21A.
Figure 21B:

FIG. 21B is a schematic illustration depicting an implementation of method 2100. In the figure, original media stream 110 includes individual 113 and individual 116 that speak in English. Consistent with disclosed embodiments, the system may determine that a voice profile for each of individual 113 and individual 116. The voice profile may be indicative of a ratio of volume levels between the utterances spoken by individual 113 and utterance spoken by individual 116 in the media stream. In the depicted example, the font size illustrates the volume level. Specifically, individual 113 speak loader than individual 116. The system may artificially generate a revoiced media stream in which the individual speaks the translated transcript. In revoiced media stream 150, the ratio of the volume levels between individual 113 and individual 116 in the revoiced media stream is substantially identical to the ratio of volume levels between the individual 113 and individual 116 in the original media stream.

16. Maintaining Original Volume Differences Between Characters and Background Noises in Revoiced Media Streams FIG. 22A is a flowchart of an example method 2200 for artificially generating a revoiced media stream in which a ratio of the volume levels between translated utterances and sounds of a sound-emanating object in the revoiced media stream is substantially identical to a ratio of volume levels between original utterances in the received media stream and the original sounds of the sound-emanating object. Consistent with the present disclosure, method 2200 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 2200, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream including an individual speaking in an origin language and sounds from a sound-emanating object. As described above, media receipt module 402 may receive a media stream from media owner 120 or a media stream captured by user 170. According to step 2202, the processing device may receive a media stream including an individual speaking in an origin language and sounds from a sound-emanating object. For example, step 2202 may use step 432 and/or step 462 to receive the media stream. The disclosed embodiment may further include obtaining a transcript of the media stream including utterances spoke in the original language. As described above, transcript processing module 404 may receive the transcript from media owner 120 or determine the transcript of the received media stream using any suitable voice-to-text algorithm. According to step 2204, the processing device may obtain a transcript of the media stream including utterances spoke in the original language.

The disclosed embodiment may further include translating the transcript of the media stream to a target language. As mentioned above, transcript processing module 404 may include instructions to translate the transcript of the received media stream to the target language using any suitable translation algorithm. Transcript processing module 404 may receive as an input the indication about language characteristics to translate the transcript of the media stream accordingly. According to step 2206, the processing device may translate the transcript of the media stream to a target language. For example, step 2206 may use step 440 to translate or otherwise transform the transcript. In one example, step 2206 may translate or transformed speech directly from the media stream received by step 2202, for example as described above in relation to step 440. Additionally or alternatively, step 2206 may receive such translated transcript, for example by reading the translated transcript from memory, by receiving the translated transcript from an external device, by receiving the translated transcript from a user, and so forth.

The disclosed embodiment may further include analyzing the media stream to determine a voice profile for the individual and an audio profile for the sound-emanating object. In some cases, where the sound-emanating object is an individual, the audio profile for the sound-emanating object may be a voice profile as described above. In other cases, where sound-emanating object is an inanimate object, the audio profile may be a sound spectrogram that may be a graph that shows a sound's frequency on the vertical axis and time on the horizontal axis. Different sounds from sound-emanating objects may create different shapes within the graph. Some other non-limiting examples of voice profiles are described above, for example in relation to step 442. According to step 2208, the processing device may analyze the media stream to determine a voice profile for the individual and an audio profile for the sound-emanating object. Additionally or alternatively, step 2208 may obtain the voice profile for the sound-emanating object in other ways, for example using step 442.

The disclosed embodiment may further include determining auditory relationship between the individual and the sound-emanating object based on the voice profile and the audio profile, wherein the auditory relationship is indicative of a ratio of volume levels between utterances spoken by the individual in the original language and sounds from the sound-emanating object as they are recorded in the media stream. The auditory relationship may describe the different sound characteristics relative to each other. According to step 2210, the processing device may determine auditory relationship between the individual and the sound-emanating object based on the voice profile and the audio profile, wherein the auditory relationship is indicative of a ratio of volume levels between utterances spoken by the individual in the original language and sounds from the sound-emanating object as they are recorded in the media stream.

The disclosed embodiment may further include using the determined voice profile, the translated transcript, and the auditory relationship to artificially generate a revoiced media stream in which the individual speaks the translated transcript, wherein a ratio of the volume levels between utterances spoken by the individual in the target language and sounds from the sound-emanating object substantially identical to the ratio of volume levels between utterances spoken in the original language and sounds from the sound-emanating object as they are recorded in the media stream. In certain cases, the processing device may decide to select different values for utterances in the revoiced media stream. For example, a particular user with hearing disability that had a limited vocal range will received a revoiced media stream that generated to address his or her hearing disability. According to step 2212, the processing device may use the determined voice profile, the translated transcript, and the auditory relationship to artificially generate a revoiced media stream in which the individual speaks the translated transcript, wherein a ratio of the volume levels between utterances spoken by the individual in the target language and sounds from the sound-emanating object substantially identical to the ratio of volume levels between utterances spoken in the original language and sounds from the sound-emanating object as they are recorded in the media stream. For example, steps 2212 may use steps 444 and/or 446 to determine the synthesized voice and generate the revoiced media stream.

Consistent with the present disclosure, the sound-emanating object is another individual speaking the original language. Or a different language. As used herein, the term "sound-emanating object" may refer to any object capable of generating sounds within a range of between 10 to 30,000 hertz (e.g., between 20 to 20,000 hertz). Examples of sound-emanating objects may include different inanimate things (e.g., fans, speakers, traffic, wind, rain, etc.) and animate beings (e.g., people, animals). In related embodiments, when the sound-emanating object is another individual, the processing device is configured to translate what the other individual says to the target language. Disclosed embodiment includes revoicing the sounds that the sound-emanating object produce based on the target language or cultural norms associated with the target language. For example, in English animated dogs may be dubbed to bark woof woof and in Arabic animated dogs should be dubbed to bark hau, hau. Alternatively, the sound-emanating object is an inanimate object emanating sounds associated with a frequency range. The processing device is configured to adjust the sounds produced by the inanimate object emanating sounds to make it more perceptible to users.

Consistent with the present disclosure, the auditory relationship may be indicative of a ratio of pitch levels between utterances spoken by the individual in the original language and sounds from the sound-emanating object as they are recorded in the media stream. The processing device may use the determined voice profile, the translated transcript, and the auditory relationship to artificially generate a revoiced media stream in which the individual speaks the translated transcript, wherein a ratio of the pitch level between utterances spoken by the individual in the target language and sounds from the sound-emanating object substantially identical to the ratio of pitch levels between utterances spoken in the original language and sounds from the sound-emanating object as they are recorded in the media stream. Disclosed embodiments include synchronizing the timing of sounds from the sound-emanating object to the timing of the translated transcript in the target language. For example, clapping of hands after a speech. A German version of the speech may be 3 second longer than the English version, and the clapping should start relative to the time the German version of the speech ends.

Consistent with one example, the processing device is configured to identify a category for type sound-emanating object. Related embodiments include reducing the volume level of a sound-emanating object from a first category, and increasing the volume level of a sound-emanating object from a second category. Disclosed embodiments includes analyzing the media stream to determine volume levels for sounds from the sound-emanating object as they were recorded in the media stream, and to generate a revoiced media stream in which the sounds from the sound-emanating object have the same determined levels of volume. Disclosed embodiments includes analyzing the media stream to determine volume levels for sounds from the sound-emanating object as they were recorded in the media stream, and to generate a revoiced media stream in which the sounds from the sound-emanating object are at lower levels of volume than the determined level of volume. For example, in some cases the sound-emanating object produce very loud voices and the processing device may include settings that define maximum volume in the revoiced media stream. Disclosed embodiments includes analyzing the media stream to identify sounds produced by the sound-emanating object that are known to cause discomfort to a particular user that the revoiced media stream is destined to and to reduce the volume level of the identified sounds. For example, reducing the sounds of gun shots to users that suffer from PTSD.

In some embodiments, the processing device may analyze the media stream to determine a set of audio profiles for a plurality of sound-emanating objects, and to: artificially generate a revoiced media stream in which a first ratio of the volume levels between utterances spoken by the individual in the target language and sounds from a first sound-emanating object is substantially identical to the ratio of volume levels between utterances spoken in the original language and sounds from the first sound-emanating object as they are recorded in the media stream, and a second ratio of the volume levels between utterances spoken by the individual in the target language and sounds from a second sound-emanating object is different from to the ratio of volume levels between utterances spoken in the original language and sounds from the second sound-emanating object as they are recorded in the media stream. Consistent with the present disclosure, the received media stream may be a real-time conversation (e.g., a phone call, a video conference, or a recorded physical conversation) between the individual and a particular user. In some embodiments, the processing device may maintain the ratio of the volume levels between utterances spoken by the individual in the original language and sounds from a sound-emanating object in the revoiced media stream substantially identical to the ratio of volume levels between the utterances spoken by the individual in the target language and sounds from a sound-emanating object in the real-time conversation.

Figure 22B:
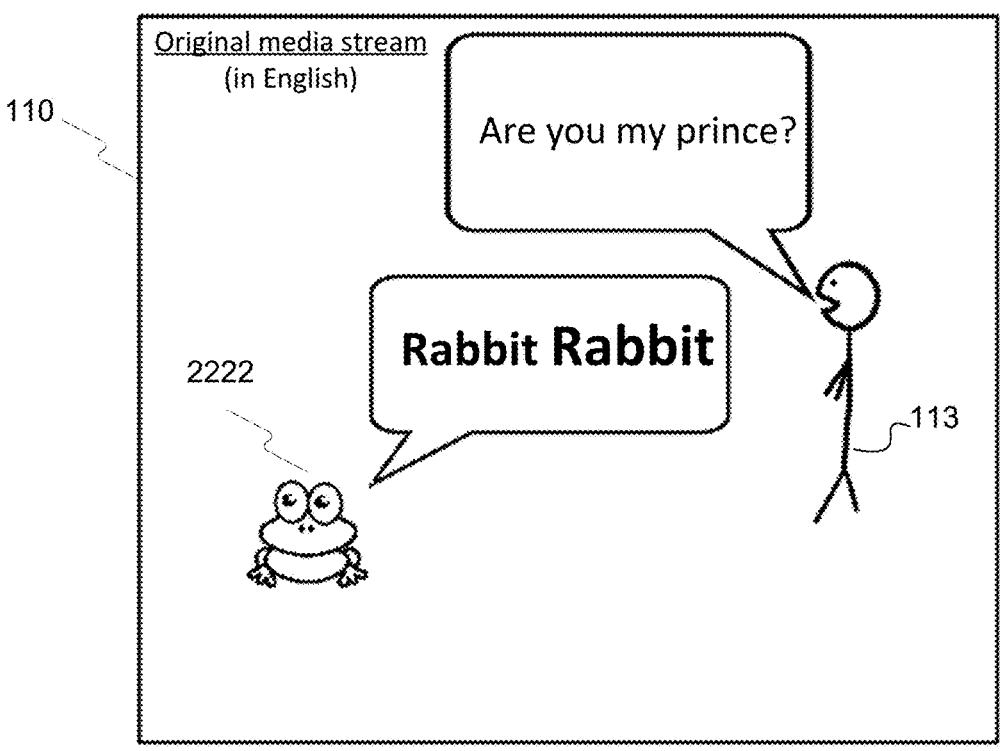
FIG. 22B is a schematic illustration depicting an example of revoicing a media stream using the method described in FIG. 22A.
Figure 22B:
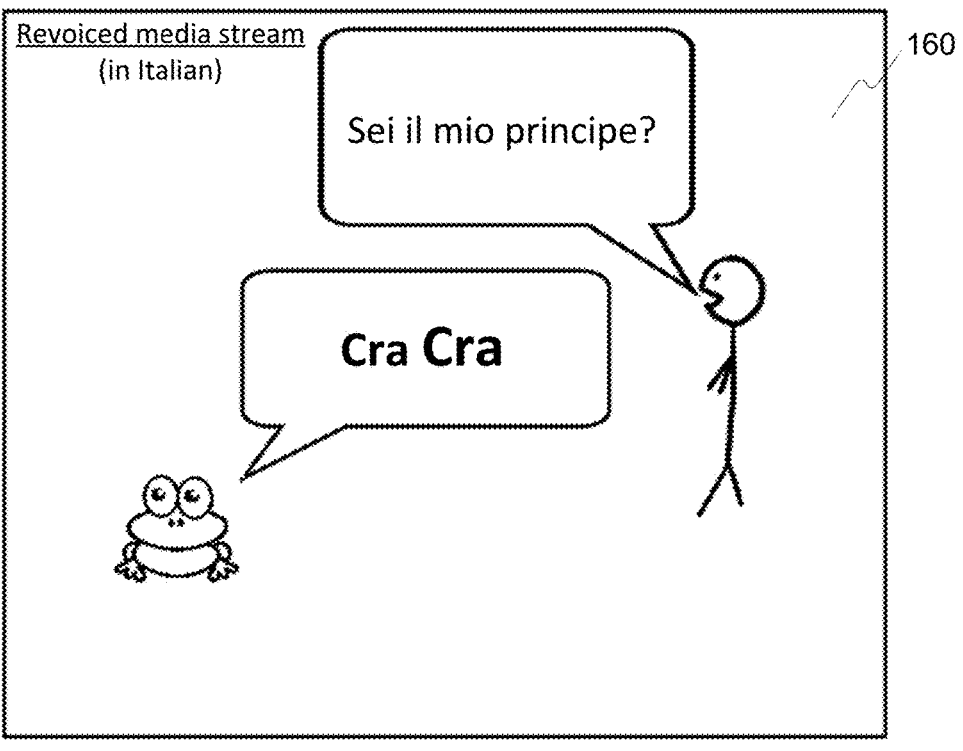

FIG. 22B is a schematic illustration depicting an implementation of method 2200. In the figure, original media stream 110 includes individual 113 that speak in English and sound-emanating object 2222. Consistent with disclosed embodiments, the system may determine that a voice profile for each of individual 113 and audio profile for sound-emanating object 2222. Thereafter, the system may determine auditory relationship between the individual and the sound-emanating object based on the voice profile and the audio profile, wherein the auditory relationship is indicative of a ratio of volume levels between utterances spoken by the individual in the original language and sounds from the sound-emanating object as they are recorded in the media stream. In the depicted example, the font size illustrates the volume level. Specifically, sound-emanating object 2222 emanates sounds loader than individual 113. The system may artificially generate a revoiced media stream in which the individual speaks the translated transcript. In revoiced media stream 150, the ratio of the volume levels between individual 113 and individual 116 in the revoiced media stream is substantially identical to the ratio of volume levels between utterances spoken in the original language spoken by individual 113 and sounds from sound-emanating object 2222 as they are recorded in the media stream. Also, sounds that the sound-emanating object produce may be translated based on the target language or cultural norms associated with the target language. For example, in English animated frogs may be dubbed to say Rabbit Rabbit and in Italian animated frogs should be dubbed to say Cra Cra.

17. Accounting for Timing Differences Between the Original Language and the Target Language FIG. 23A is a flowchart of an example method 2300 for artificially generating a revoiced media stream in which the timing of the gaps in the utterances spoke in the origin language is adjusted to account for the determined timing differences between the original language and the target language. Consistent with the present disclosure, method 2300 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 2300, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream including at least one individual speaking in an origin language. As described above, media receipt module 402 may receive a media stream from media owner 120 or a media stream captured by user 170. According to step 2302, the processing device may receive a media stream including at least one individual speaking in an origin language. For example, step 2302 may use step 432 and/or step 462 to receive the media stream. The disclosed embodiment may further include obtaining a transcript of the media stream including utterances spoke in the origin language. As described above, transcript processing module 404 may receive the transcript from media owner 120 or determine the transcript of the received media stream using any suitable voice-to-text algorithm. According to step 2304, the processing device may obtain a transcript of the media stream including utterances spoke in the origin language.

The disclosed embodiment may further include analyzing the media stream to determine metadata information corresponding with the transcript of the media stream, wherein the metadata information includes timing data for the utterances and for the gaps between the utterances in the media stream. The metadata information may include details on timing as recorded in the media stream when the at least one individual speaks the original language. The metadata information may include details on the timing of utterances spoken by a plurality of individuals. According to step 2306, the processing device may analyze the media stream to determine metadata information corresponding with the transcript of the media stream, wherein the metadata information includes timing data for the utterances and for the gaps between the utterances in the media stream.

The disclosed embodiment may further include determining timing differences between the original language and the target language, wherein the timing differences represent time discrepancy between saying the utterances in a target language and saying the utterances in the original language. In one example, saying a sentence in a target language takes more time than it takes to say the same sentence in the original language. In alternative example, saying a sentence in the target language takes less time than it takes to say the same sentence in the original language. According to step 2308, the processing device may determine timing differences between the original language and the target language, wherein the timing differences represent time discrepancy between saying the utterances in a target language and saying the utterances in the original language.

The disclosed embodiment may further include determining at least one voice profile for the at least one individual. The determination of the voice profile may include a desired speaking speed for the at least one individual while speaking the target language. According to step 2310, the processing device may determine at least one voice profile for the at least one individual. Additionally or alternatively, step 2310 may obtain the voice profile for the individual in other ways, for example using step 442.

The disclosed embodiment may further include using the determined at least one voice profile, a translated version of the transcript, and the metadata information to artificially generate a revoiced media stream in which the at least one individual speaks in the target language in a manner than accounts for the determined timing differences between the original language and the target language. In certain cases, accounting for the determined timing differences between the original language and the target language may include adjusting the gaps between words spoken in the target language, adjusting the gaps between sentences spoken in the target language, or adjusting the speaking speed. According to step 2312, the processing device may use the determined at least one voice profile, a translated version of the transcript, and the metadata information to artificially generate a revoiced media stream in which the at least one individual speaks in the target language in a manner than accounts for the determined timing differences between the original language and the target language. For example, steps 2312 may use steps 444 and/or 446 to determine the synthesized voice and generate the revoiced media stream.

In some embodiments, the processing device is configured to adjust the gaps between words spoken in the target language to account for the determined timing differences between the original language and the target language. For example, when dubbing a movie from a short duration language to a long duration language (e.g. an English movie dubbed to German) or from long to short (e.g. German to English), the target language speech audio usually needs to be time adjusted (stretched or shrunk) to fit in with the original movie's timing. In other embodiments, the processing device is configured to adjust the gaps between sentences spoken in the target language to account for the determined timing differences between the original language and the target language. In one example, the processing device is configured to shorten the at least one gap before artificially generate utterances in the target language in the voice of the first individual. The at least one gap may be a gap between two words in a sentence or a gap between to words. In another example, the processing device is configured to widen the at least one gap before artificially generate utterances in the target language in the voice of the at least one individual. The at least one gap may be a gap between two words in a sentence or a gap between to words.

Consisting with the present disclosure, the processing device may use the at least one voice profile to determine a default time duration for each word in the translated version of the transcript spoken in the target language. The default time duration may be associated with the voice characteristics of the at least one individual. One character may speak slowly and other character may speak fast. The processing device may determine based on the metadata information to change the default time duration for the at least one individual. For example, the character that speaks slowly may need to speak slower (or faster) and the character that speaks fast may need faster (or lower) to account for the determined timing differences between the original language and the target language. In related embodiments, the processing device may determine to artificially generate a first utterance in the target language using the voice of the at least one individual, wherein the first utterance is recorded in a time shorter than the default time duration associated with the first utterance. In related embodiments, the processing device may determine to artificially generate a first utterance in the target language using the voice of the at least one individual, wherein the first utterance is recorded in a time longer than the default time duration associated with the first utterance. Simple homogeneous time stretching or shrinking isn't usually good enough, and when squeezed or stretched to more than 20% from the revoiced media stream output, distortions and artifacts might appear in the resulting revoiced media stream. In order to minimize these distortions, the adjustments should not be homogeneous, but rather manipulate the gaps between words on a different scale than that used on the actual said utterance generated by the processing device. This can be done by directing the processing device to shorten or widen the gaps before pronouncing the sentence, and/or it can be done in the post process phase (by analyzing the resulting target language's audio track signal for segments with volume lower than −60 dB, and minimizing, eliminating or widening their length by a major factor, e.g. by 80%) and then time adjusting (stretching or shrinking) the resulting audio track by a lower factor (e.g. only 10%), because the overall audio now needs less squeezing in order to fit the available movie timing.

In disclosed embodiments, the at least one individual includes a plurality of individuals and the processing device is configured to artificially generate a revoiced media stream in a first individual speaks in the target language faster than desired a talking speed included in a voice profile of the first individual in order to provide a second individual more time to speak in the target language. In disclosed embodiments, the at least one individual includes a plurality of individuals and the processing device is configured synchronize the timing data associated with the plurality of individuals to prevent a case where the plurality of individuals talk on top of each other when they speak the target language in the revoiced media stream. In disclosed embodiments, the processing device is configured to artificially generate a revoiced media stream in which sounds emanating from an object are shortened compared to the sounds in the original media stream in order to provide the at least one individual more time to speak in the target language. In disclosed embodiments, the processing device is configured to artificially generate a revoiced media stream in which volume levels of sounds emanating from an object are reduced compared to the volume level of sounds in the original media stream in order to provide the at least one individual more time to speak in the target language. Consistent with the present disclosure, the received media stream may be a real-time conversation (e.g., a phone call, a video conference, or a recorded physical conversation) between a plurality of individuals and a particular user. In some embodiments, the processing device may synchronize the timing data associated with the plurality of individuals to prevent a case where the plurality of individuals talk on top of each other when they speak the target language in the revoiced media stream.

Figure 23B:
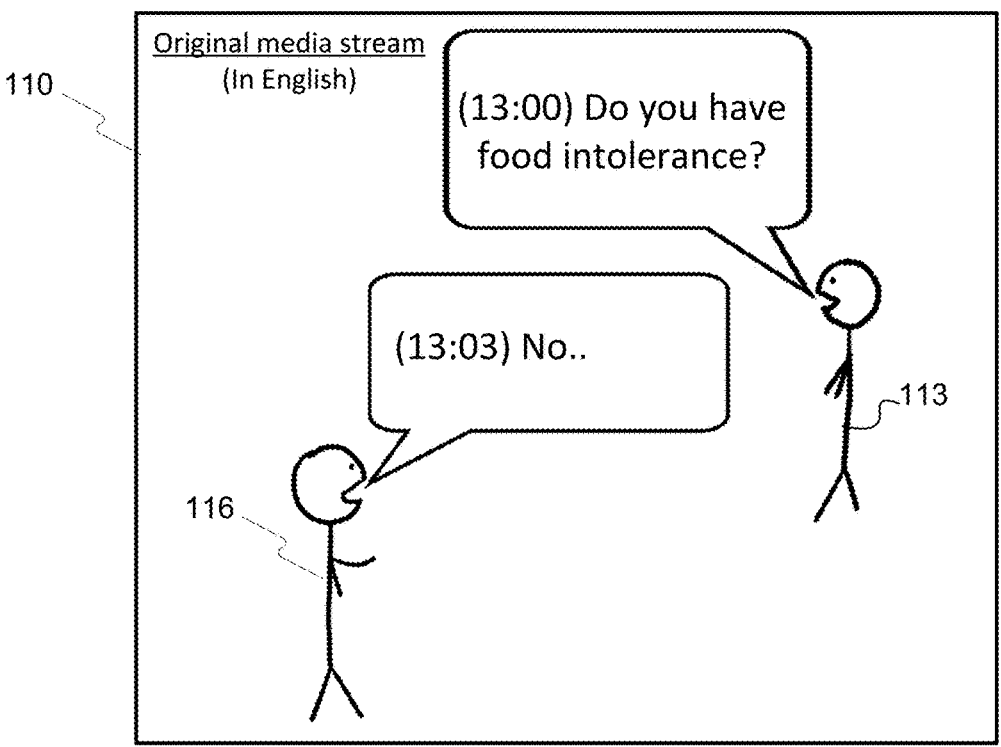
FIG. 23B is a schematic illustration depicting an example of revoicing a media stream using the method described in FIG. 23A.
Figure 23B:
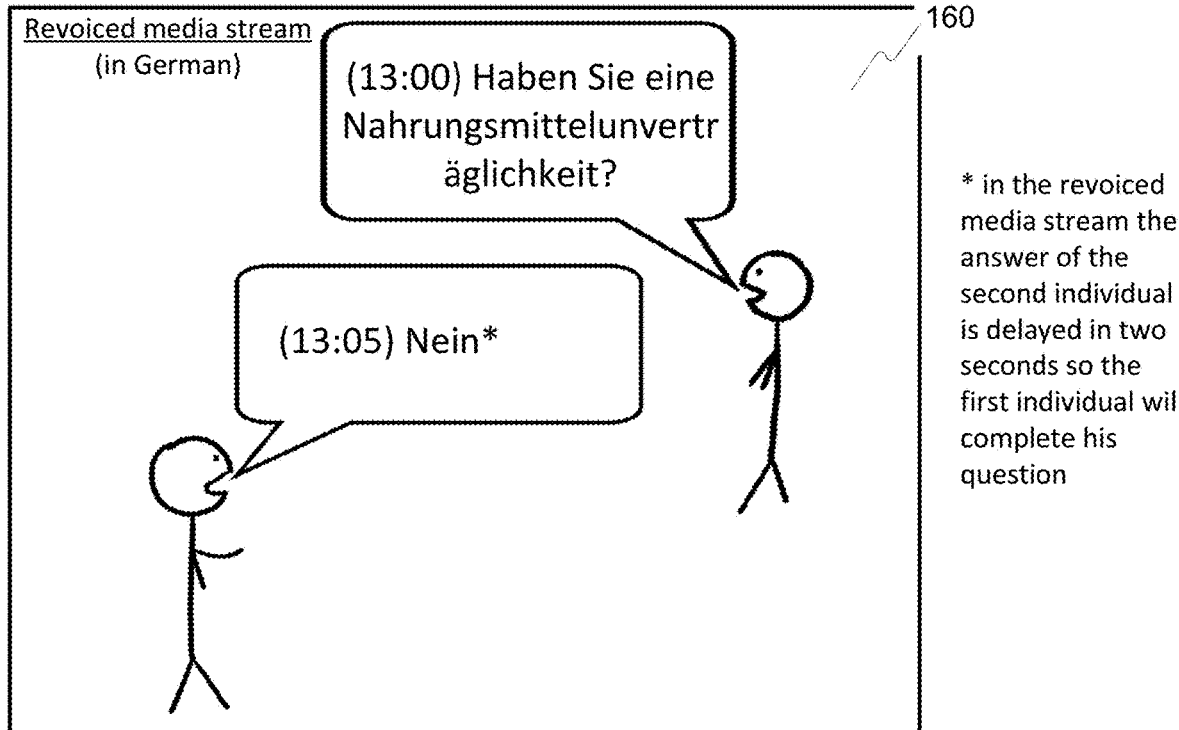

FIG. 23B is a schematic illustration depicting an implementation of method 2300. In the figure, original media stream 110 includes individual 113 and individual 116 that speak in English. Consistent with disclosed embodiments, the system may determine metadata information corresponding with the transcript of the media stream, wherein the metadata information includes timing data for the utterances and for the gaps between the utterances in the media stream. For example, the system may determine how much time it takes for individual 113 to say "[d]o you have food intolerance?" Thereafter, the system may determine how long it will take to say a translated version of the that sentence in German and artificially generate a revoiced media stream in which the individuals 113 and 116 speak in the target language in a manner than accounts for the determined timing differences between the original language and the target language. For example, individual 116 start talking in the revoiced media stream at 13:05 and not 13:03 (i.e., two seconds after the original time it starts in the original media stream).

18. Using Visual Data from Media Stream to Determine the Voice Profile of the Individual in the Media Stream FIG. 24A is a flowchart of an example method 2400 for artificially generating a revoiced media stream and using visual data derived from the original media stream for determining the voice profile of the individual in the media stream. Consistent with the present disclosure, method 2400 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 2400, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream including at least one individual speaking in an origin language. As described above, media receipt module 402 may receive a media stream from media owner 120 or a media stream captured by user 170. According to step 2402, the processing device may receive a media stream including at least one individual speaking in an origin language. For example, step 2402 may use step 432 and/or step 462 to receive the media stream. The disclosed embodiment may further include obtaining a transcript of the media stream including utterances spoke in the origin language. As described above, transcript processing module 404 may receive the transcript from media owner 120 or determine the transcript of the received media stream using any suitable voice-to-text algorithm. According to step 2404, the processing device may obtain a transcript of the media stream including utterances spoke in the origin language.

The disclosed embodiment may further include translating the transcript of the media stream to a target language. As mentioned above, transcript processing module 404 may include instructions to translate the transcript of the received media stream to the target language using any suitable translation algorithm. According to step 2406, the processing device may translate the transcript of the media stream to a target language. For example, step 2406 may use step 440 to translate or otherwise transform the transcript. In one example, step 2406 may translate or transformed speech directly from the media stream received by step 2402, for example as described above in relation to step 440. Additionally or alternatively, step 2406 may receive a translated version of the transcript, for example by reading the translated version from memory, by receiving the translated version from an external device, by receiving the translated version from a user, and so forth.

The disclosed embodiment may further include analyzing the media stream to determine a set of voice parameters of the at least one individual and visual data. The visual data may include characteristics of the at least one individual or characteristics of a person that the at least one individual is speaking to. Additionally, the visual data may include contextual information. According to step 2408, the processing device may analyze the media stream to determine a set of voice parameters of the at least one individual and visual data. The disclosed embodiment may further include determining determine at least one voice profile for the at least one individual based on the set of voice parameters and the visual data. The information from the visual data may affect the determination of the voice profile. For example, the contextual information may be used to determine emotional state of the at least one individual. Understanding the context of what the individual said will help translate the transcript more accurately and help generating a more authentic voice in the target language. According to step 2410, the processing device may determine at least one voice profile for the at least one individual based on the set of voice parameters and the visual data. In another example, step 2410 may use step 442 to generate voice profile for the at least one individual from the media stream and/or the visual data included in the media stream received by step 2402.

The disclosed embodiment may further include using the determined at least one voice profile and the translated transcript to artificially generate a revoiced media stream in which the at least one individual speaks in the target language. In some cases, the visual data may also assist in determining timing data needed for the generation of the revoiced media stream. According to step 2412, the processing device may use the determined at least one voice profile and the translated transcript to artificially generate a revoiced media stream in which the at least one individual speaks in the target language. For example, steps 2412 may use steps 444 and/or 446 to determine the synthesized voice and generate the revoiced media stream.

In some embodiments, the visual data may include characteristics of the at least one individual. The processing device is configured to use the characteristics to determine the age of the at least one individual and to artificially generate the voice of the at least one individual based on the determined age of the at least one individual. Additionally, the visual data may include characteristics of a person that the at least one individual is speaking to. The processing device is configured to use the characteristics to determine the age of the person that the at least one individual is speaking to and to artificially generate the voice of the at least one individual based on the determined age of the person that the at least one individual is speaking to. Consistent with some embodiments, the visual data may include characteristics of the at least one individual. The processing device is configured to use the characteristics to determine the gender of the at least one individual and to artificially generate the voice of the at least one individual based on the determined gender of the at least one individual. In addition, the visual data may include characteristics of a person that the at least one individual is speaking to. The processing device is configured to use the characteristics to determine the gender of the person that the at least one individual is speaking to and to artificially generate the voice of the at least one individual based on the determined gender of the person that the at least one individual is speaking to.

In one embodiment, the visual data may include characteristics of one or more people that the at least one individual is speaking to. The processing device is configured to use the characteristics to determine the number of people that the at least one individual is speaking to and to artificially generate the voice of the at least one individual based on the determined number of people that the at least one individual is speaking to. In disclosed embodiments, the visual data may include characteristics of the at least one individual. The processing device is configured to use the characteristics to determine language register of the at least one individual and to artificially generate the voice of the at least one individual based on the determined language register of the at least one individual. In some embodiments, the visual data may include contextual information. The processing device is configured to use the contextual information to understand a situation involving the at least one individual and to artificially generate the voice of the at least one individual based on the determined situation. In related embodiments, the processing device is configured to use the contextual information to determine whether the at least one individual is speaking on the phone or to a person standing next to him. The processing device is configured to artificially generate the voice of the at least one individual based on the determination. For example, in Chinese people say "Hello" differently to people the meet f2f and people on the phone.

Consistent with one example, the visual data may include a facial image of the at least one individual. The processing device is configured to use the facial image of the at least one individual to determine emotional state of the at least one individual and to artificially generate the voice of the at least one individual based on the determined emotional state of the at least one individual. For example, learning if the individual is afraid or cold. Consistent with another example, the visual data may include an image of an object in proximity to the at least one individual. The processing device is configured to use the image of the object of the at least one individual to determine emotional state of the at least one individual and to artificially generate the voice of the at least one individual based on the determined emotional state of the at least one individual. For example, learning if the someone offered a candy to the individual or a gun. In some embodiments, the received media stream includes a plurality of individuals speaking in the origin language. The processing device is configured to use the image data to identify a first individual that his (or her) voice needs to be dubbed to the target language and a second individual that his (or her) voice does not need to be dubbed. Accordingly, the processing device may avoid from generating a voice profile for the second individual. In some embodiments, the processing device is configured to use the image data to identify a sound-emanating object generating utterances in the original language, and to determine not to include a translation of the utterances from the sound-emanating object in the revoiced media stream. Consistent with the present disclosure, the received media stream may be a real-time conversation (e.g., a video conference, or a recorded physical conversation) between the at least one individual and a particular user. In some embodiments, the processing device may determine the gender of the at least one individual based on the image data and to artificially generate the voice of the at least one individual based on the determined gender of the at least one individual.

Figure 24B:
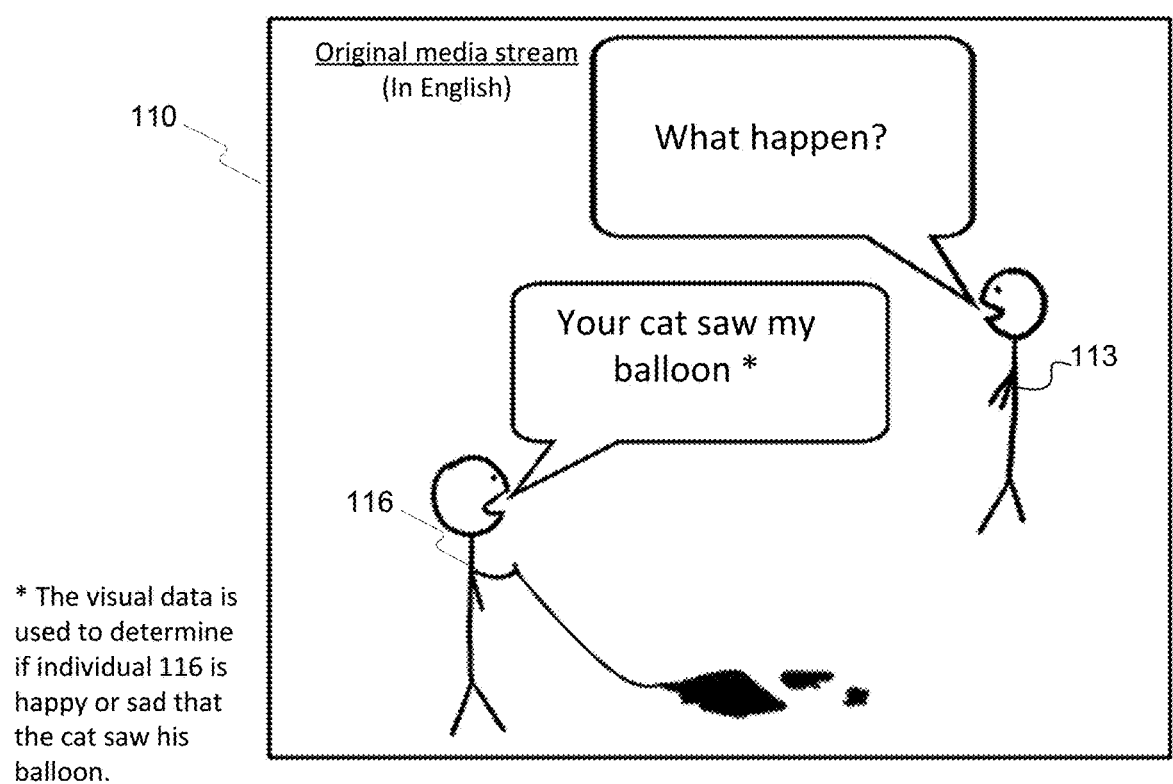
FIG. 24B is a schematic illustration depicting an example of revoicing a media stream using the method described in FIG. 24A.
Figure 24B:

FIG. 24B is a schematic illustration depicting an implementation of method 2400. In the figure, original media stream 110 includes individual 113 and individual 116 that speak in English. Consistent with disclosed embodiments, the system may analyze the media stream to determine a set of voice parameters of the at least one individual and visual data. For example, the visual data in this case would be an exploded balloon. In this case, the visual data is used to determine if individual 116 is happy or sad that the cat saw his balloon. The system may determine the voice profile for individual 116 based on the visual data and artificially generate a revoiced media stream in which the at least one individual speaks in the target language. In this case, the sentence "[j]e kat zag mijn ballon" is determined to be said in a sad manner.

19. Using Visual Data from Media Stream to Translate the Transcript to a Target Language FIG. 25A is a flowchart of an example method 2500 for artificially generating a revoiced media stream and using visual data derived from the original media stream for translating the transcript of the media stream to a target language. Consistent with the present disclosure, method 2500 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 2500, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream including at least one individual speaking in an origin language. As described above, media receipt module 402 may receive a media stream from media owner 120 or a media stream captured by user 170. According to step 2502, the processing device may receive a media stream including at least one individual speaking in an origin language. For example, step 2502 may use step 432 and/or step 462 to receive the media stream. The disclosed embodiment may further include obtaining a transcript of the media stream including utterances spoke in the origin language. As described above, transcript processing module 404 may receive the transcript from media owner 120 or determine the transcript of the received media stream using any suitable voice-to-text algorithm. According to step 2504, the processing device may obtain a transcript of the media stream including utterances spoke in the origin language.

The disclosed embodiment may further include analyzing the media stream to determine a set of voice parameters of the at least one individual and visual data. The visual data may include characteristics of the at least one individual or characteristics of a person that the at least one individual is speaking to. Additionally, the visual data may include contextual information. According to step 2506, the processing device may analyze the media stream to determine a set of voice parameters of the at least one individual and visual data.

The disclosed embodiment may further include using the visual data to translate the transcript of the media stream to a target language. As mentioned above, transcript processing module 404 may include instructions to translate the transcript of the received media stream to the target language using any suitable translation algorithm and use the information derived from the visual data to understand the situation and to resolve ambiguities in the transcript. According to step 2508, the processing device may use the visual data to translate the transcript of the media stream to a target language. For example, step 2508 may use step 440 to translate or otherwise transform the transcript. In one example, a machine learning model may be trained using training examples to generate translated transcripts based on source transcripts and visual data, and step 2508 may use the trained machine learning model to analyze the visual data and translate the transcript. An example of such training example may include textual information and visual data, together with a desired translation of the textual information. In another example, a first artificial neural network (such as convolutional neural network, deep neural network, etc.) may be configured to analyze the visual data and generate a set of values, and a second artificial neural network (such as a recurrent neural network, a long short-term memory neural network, a deep neural network, etc.) may be configured to receive the set of values generated by the first artificial neural network and translate the transcript based on the received set of values. In one example, step 2508 may translate or transformed speech directly from the media stream received by step 2502, for example as described above in relation to step 440. Additionally or alternatively, step 2508 may receive such translated transcript, for example by reading the translated transcript from memory, by receiving the translated transcript from an external device, by receiving the translated transcript from a user, and so forth. For example, step 2508 may select the translated transcript of a plurality of alternative translated transcripts based on the visual data.

The disclosed embodiment may further include determining at least one voice profile for the at least one individual. For example, using voice profile determination module 406 described above. According to step 2510, the processing device may determine at least one voice profile for the at least one individual based on the set of voice parameters and the visual data. Additionally or alternatively, step 2510 may obtain the voice profile for the individual in other ways, for example using step 442. The disclosed embodiment may further include using the determined at least one voice profile and the translated transcript to artificially generate a revoiced media stream in which the at least one individual speaks in the target language. In some cases, the visual data may also assist in determining timing data needed for the generation of the revoiced media stream. According to step 2512, the processing device may use the determined at least one voice profile and the translated transcript to artificially generate a revoiced media stream in which the at least one individual speaks in the target language. For example, steps 2512 may use steps 444 and/or 446 to determine the synthesized voice and generate the revoiced media stream.

In some embodiments, the visual data may include characteristics of the at least one individual. The processing device is configured to use the characteristics to determine the age of the at least one individual and to translate the transcript of the media stream to the target language based on the determined age of the at least one individual. Additionally, the visual data may include characteristics of a person that the at least one individual is speaking to. The processing device is configured to use the characteristics to determine the age of the person that the at least one individual is speaking to and to translate the transcript of the media stream to the target language based on the determined age of the person that the at least one individual is speaking to. Consistent with some embodiments, the visual data may include characteristics of the at least one individual. The processing device is configured to use the characteristics to determine the gender of the at least one individual and to translate the transcript of the media stream to the target language based on the determined gender of the at least one individual. In addition, the visual data may include characteristics of a person that the at least one individual is speaking to. The processing device is configured to use the characteristics to determine the gender of the person that the at least one individual is speaking to and to translate the transcript of the media stream to the target language based on the determined gender of the person that the at least one individual is speaking to.

In one embodiment, the visual data may include characteristics of one or more people that the at least one individual is speaking to. The processing device is configured to use the characteristics to determine the number of people that the at least one individual is speaking to and to translate the transcript of the media stream to the target language based on the determined number of people that the at least one individual is speaking to. In disclosed embodiments, the visual data may include characteristics of the at least one individual. The processing device is configured to use the characteristics to determine language register of the at least one individual and to translate the transcript of the media stream to the target language based on the determined language register of the at least one individual. In some embodiments, the visual data may include contextual information. The processing device is configured to use the contextual information to understand a situation involving the at least one individual and to translate the transcript of the media stream to the target language based on the determined situation. In related embodiments, the processing device is configured to use the contextual information to determine whether the at least one individual is speaking on the phone or to a person standing next to him. The processing device is configured to artificially generate the voice of the at least one individual based on the determination. For example, in Chinese people say "Hello" differently to people the meet f2f and people on the phone.

Consistent with one example, the visual data may include a facial image of the at least one individual. The processing device is configured to use the facial image of the at least one individual to determine emotional state of the at least one individual and to translate the transcript of the media stream to the target language based on the determined emotional state of the at least one individual. For example, learning if the individual is afraid or cold. Consistent with another example, the visual data may include an image of an object in proximity to the at least one individual. The processing device is configured to use the image of the object of the at least one individual to determine emotional state of the at least one individual and to translate the transcript of the media stream to the target language based on the determined emotional state of the at least one individual. For example, learning if the someone offered a candy to the individual or a gun. In some embodiments, the received media stream includes a plurality of individuals speaking in the origin language. The processing device is configured to use the image data to identify a first individual that his (or her) voice needs to be dubbed to the target language and a second individual that his (or her) voice does not need to be dubbed. Accordingly, the processing device may avoid from translating utterances from the second individual.

In some embodiments, the processing device is configured to use the image data to identify a sound-emanating object generating utterances in the original language, and to determine not to include a translation of the utterances from the sound-emanating object in the revoiced media stream. Consistent with the present disclosure, the received media stream may be a real-time conversation (e.g., a video conference, or a recorded physical conversation) between the at least one individual and a particular user. In some embodiments, the processing device may determine the gender of the at least one individual based on the image data and to translate the transcript of the media stream to the target language based on the determined gender of the at least one individual.

Figure 25B:
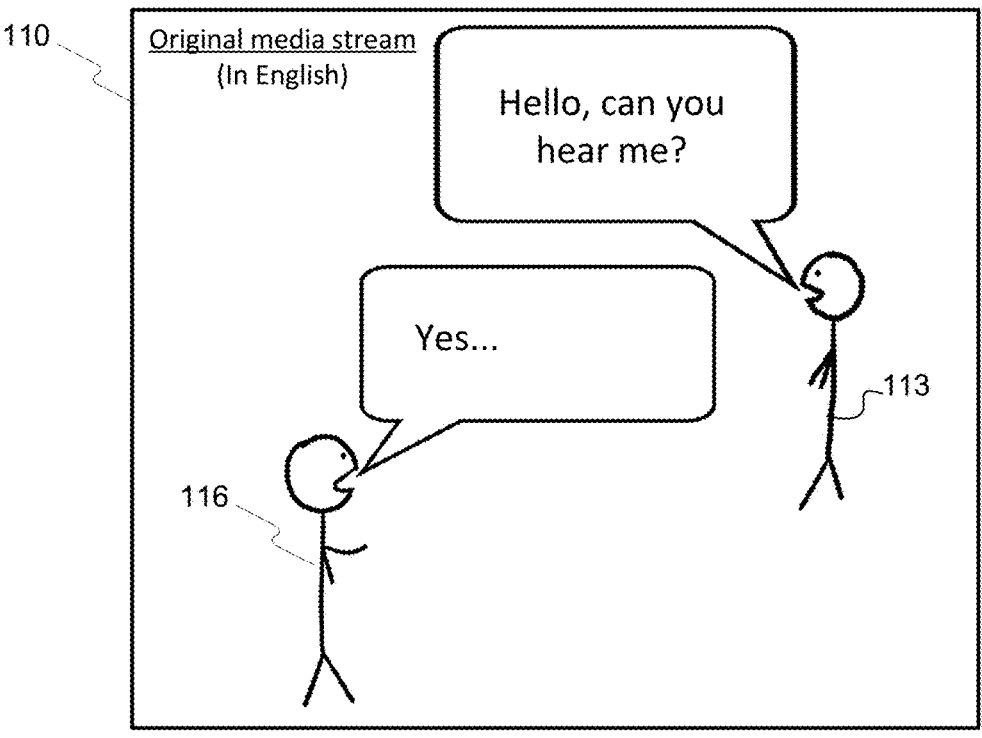
FIG. 25B is a schematic illustration depicting an example of revoicing a media stream using the method described in FIG. 25A.
Figure 25B:
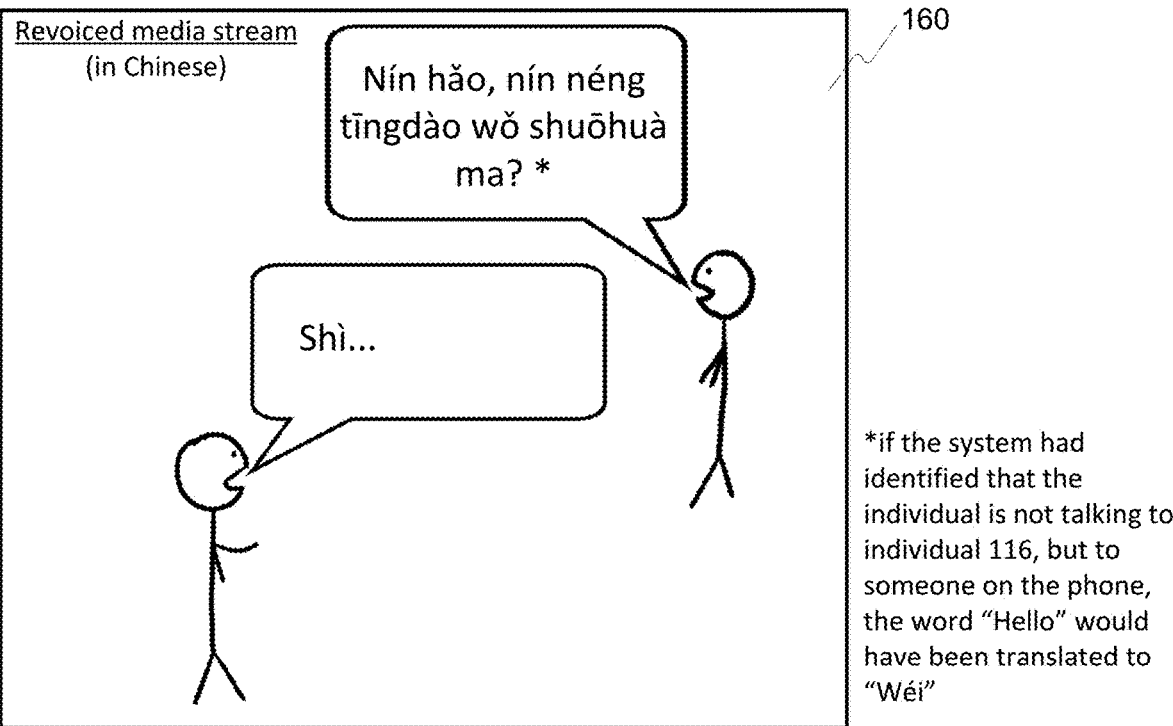

FIG. 25B is a schematic illustration depicting an implementation of method 2500. In the figure, original media stream 110 includes individual 113 and individual 116 that speak in English. Consistent with disclosed embodiments, the system may analyze the media stream to determine a set of voice parameters of the at least one individual and visual data. Thereafter, the system may use visual data to translate the transcript of the media stream to a target language. For example, if the system had identified that the individual is not talking to individual 116, but to someone on the phone, the word "Hello" would have been translated to "Wei" In this case, the visual data is used to determine if individual 116 is happy or sad that the cat saw his balloon. The system may artificially generate a revoiced media stream in which the at least one individual speaks the translated transcript in the target language.

20. Providing Translation in Revoiced Media Streams to Text Written in the Origin Language FIG. 26A is a flowchart of an example method 2600 for artificially generating a revoiced media stream and that provide translation to text written in the at least one origin language. The text may be written on signs, letters, walls, etc. Consistent with the present disclosure, method 2600 may be executed by a processing device of system 100. The processing device of system 100 may include a processor within a mobile communications device (e.g., mobile communications device 160) or a processor within a server (e.g., server 133) located remotely from the mobile communications device. Consistent with disclosed embodiments, a non-transitory computer-readable storage media is also provided. The non-transitory computer-readable storage media may store program instructions that when executed by a processing device of the disclosed system cause the processing device to perform method 2600, as described herein. For purposes of illustration, in the following description reference is made to certain components of system 100, system 500, system 600, and certain software modules in memory 400. It will be appreciated, however, that other implementations are possible and that any combination of components or devices may be utilized to implement the exemplary method. It will also be readily appreciated that the illustrated method can be altered to modify the order of steps, delete steps, add steps, or to further include any detail described in the specification with reference to any other method disclosed herein.

A disclosed embodiment may include receiving a media stream including at least one individual speaking in at least one origin language. As described above, media receipt module 402 may receive a media stream from media owner 120 or a media stream captured by user 170. According to step 2602, the processing device may receive a media stream including at least one individual speaking in at least one origin language. For example, step 2602 may use step 432 and/or step 462 to receive the media stream. The disclosed embodiment may further include obtaining a transcript of the media stream including utterances spoke in the at least one origin language. As described above, transcript processing module 404 may receive the transcript from media owner 120 or determine the transcript of the received media stream using any suitable voice-to-text algorithm. According to step 2604, the processing device may obtain a transcript of the media stream including utterances spoke in the at least one origin language.

The disclosed embodiment may further include translating the transcript of the media stream to a target language. As mentioned above, transcript processing module 404 may include instructions to translate the transcript of the received media stream to the target language using any suitable translation algorithm. According to step 2606, the processing device may translate the transcript of the media stream to a target language. For example, step 2606 may use step 440 to translate or otherwise transform the transcript. In one example, step 2606 may translate or transformed speech directly from the media stream received by step 2602, for example as described above in relation to step 440. Additionally or alternatively, step 2606 may receive a translated transcript, for example by reading the translated transcript from memory, by receiving the translated transcript from an external device, by receiving the translated transcript from a user, and so forth.

The disclosed embodiment may further include analyzing the media stream to determine a set of voice parameters of the at least one individual and visual data that includes text written in the at least one origin language. The text written in the at least one origin language may be printed or handwritten and the processing device in configured to identify the text using text recognition techniques. According to step 2608, the processing device may analyze the media stream to determine a set of voice parameters of the at least one individual and visual data that includes text written in the at least one origin language.

The disclosed embodiment may further include determining at least one voice profile for the at least one individual based on the set of voice parameters. For example, using voice profile determination module 406 described above. According to step 2610, the processing device may determine at least one voice profile for the at least one individual based on the set of voice parameters. Additionally or alternatively, step 2610 may obtain the voice profile for the individual in other ways, for example using step 442.

The disclosed embodiment may further include using the determined at least one voice profile and the translated transcript to artificially generate a revoiced media stream in which the at least one individual speaks in the target language, wherein the revoiced media stream provides a translation to the text written in the at least one origin language. In some cases, providing the translation of the text written in the at least one origin language in the revoiced media stream may include revising the transcript of the media stream to include the identified text and generating a revoiced media stream that includes audibly reading the identified text in the target language. For example, using the artificially generated voice of the at least one individual. According to step 2612, the processing device may use the determined at least one voice profile and the translated transcript to artificially generate a revoiced media stream in which the at least one individual speaks in the target language, wherein the revoiced media stream provides a translation to the text written in the at least one origin language. For example, steps 2612 may use steps 444 and/or 446 to generate the revoiced media stream.

Consistent with the present disclosure, providing the translation of the text written in the at least one origin language in the revoiced media stream may include revising the transcript of the media stream to include the identified text and generating a revoiced media stream that includes audibly reading the identified text in the target language. Related embodiments include using the voice of the at least one individual to audibly read the identified text in the target language. In other embodiments, providing the translation of the text written in the at least one origin language in the revoiced media stream may include using an image alteration algorithm to such that the text in the revoiced media stream will be in the target language. In other embodiments, providing the translation of the text written in the at least one origin language in the revoiced media stream may include providing a text message with a translation to the identified text. In some embodiments, the processing device is configured to use the text written in the at least one origin language for understanding a situation involving the at least one individual and to translate the transcript of the media stream to the target language based on the determined situation. In one case, the at least one individual in the received media stream speaking in a first origin language and the identified text is written in a second origin language. In this case, the processing device avoid from providing a translation to the identified text.

Discloses embodiments includes determining an importance level for the identified text written in the at least one origin language. The processing device is configured to provide a translation for the identified text when the determined level of importance is greater than a threshold. The text may be considered important when it relevant for understanding the media stream. Additionally, the processing device may determine an importance level for the identified text written in the at least one origin language. The processing device is configured to avoid from providing a translation to the identified text when the determined level of importance is less than a threshold. Discloses embodiments includes keep track on a number of time the identified text written in the at least one origin language appears in the media stream. The processing device is configured to provide a translation for the identified text when the identified text appears for the first time. Discloses embodiments includes keep track on a number of time the identified text written in the at least one origin language appears in the media stream. The processing device is configured to avoid from providing a translation to the identified text when the identified text appears for after the first time.

In some embodiments, the media stream is destined to a particular user and the processing device may determine whether the content of the identified text is appropriate for the particular user. The processing device is configured to provide a translation for the identified text when the content of the identified text is appropriate for the particular user. In some embodiments, the media stream is destined to a particular user and the processing device may determine whether the content of the identified text is appropriate for the particular user. The processing device is configured to avoid from providing a translation to the identified text when the content of the identified text is inappropriate for the particular user. Consistent with the present disclosure, the received media stream may be a real-time conversation (e.g., a video conference, or a recorded physical conversation) between the at least one individual and a particular user. In some embodiments, the processing device may determine a relevancy of the identified text to the particular user and to provide a translation for the identified text when the content of the identified text is determined to be relevant.

Figure 26B:
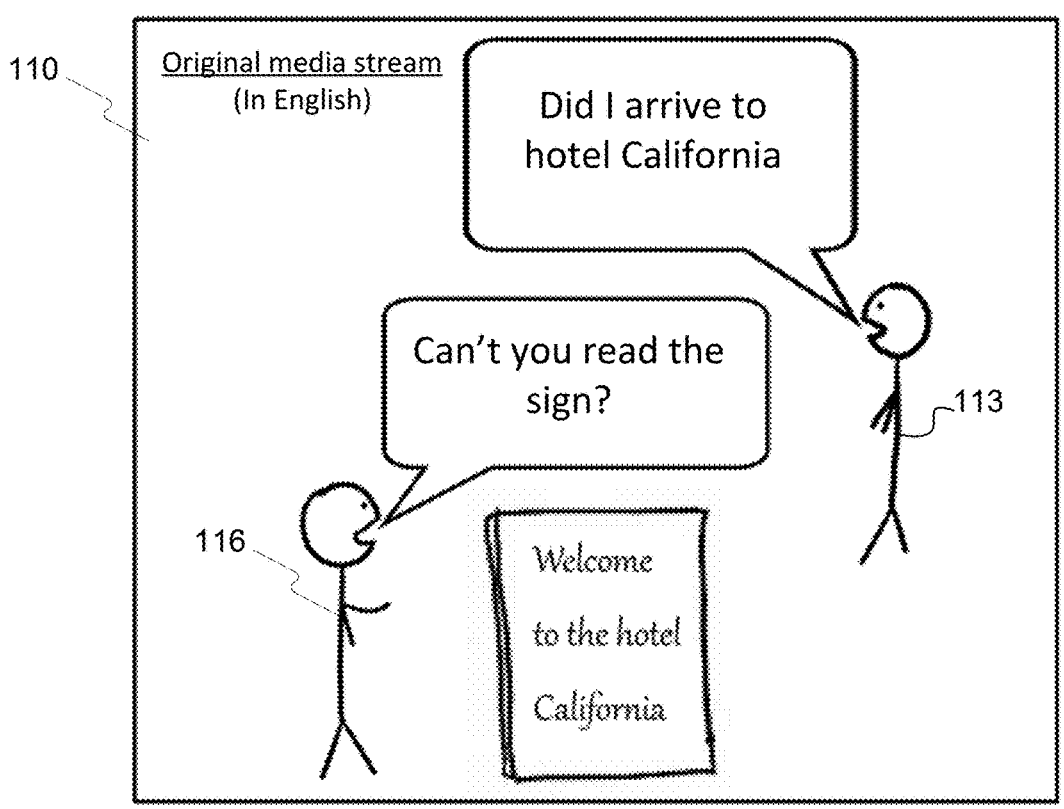
FIG. 26B is a schematic illustration depicting an example of revoicing a media stream using the method described in FIG. 26A.
Figure 26B:
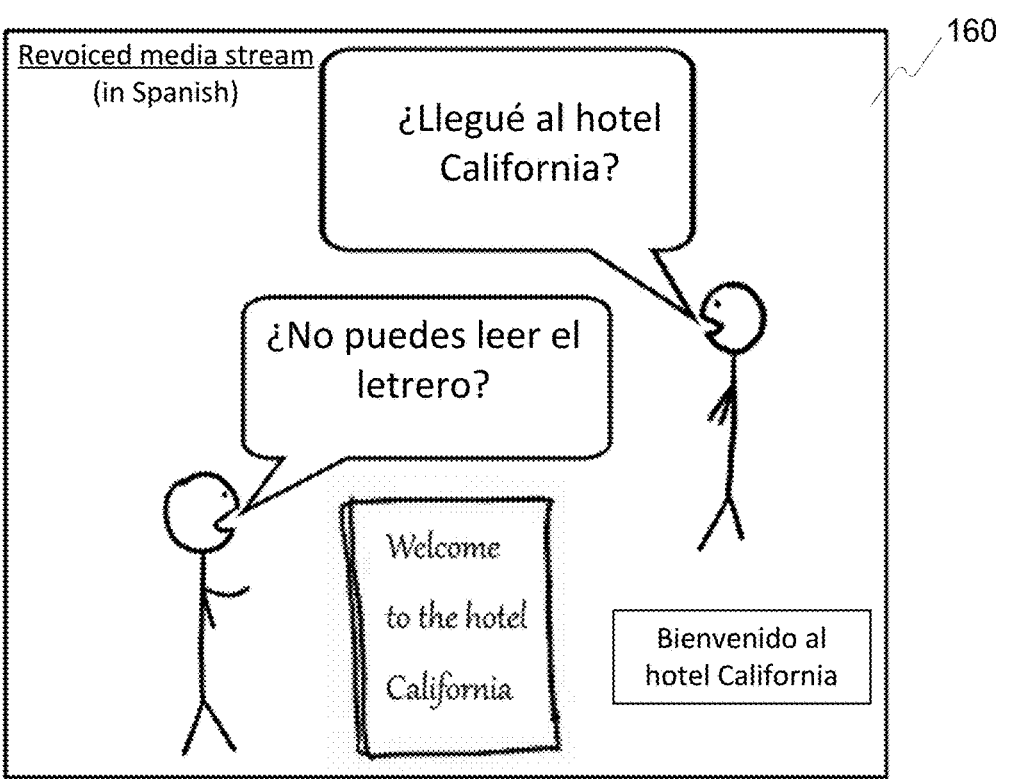

FIG. 26B is a schematic illustration depicting an implementation of method 2600. In the figure, original media stream 110 includes individual 113 and individual 116 that speak in English. Consistent with disclosed embodiments, the system may analyze the media stream to determine a set of voice parameters of the at least one individual and visual data that includes text written in the at least one origin language. In the illustrated example, the original media stream includes a sign saying: "welcome to the hotel California". Thereafter, the system may generate a revoiced media stream in which at least one of the individuals 113 and 113 speaks in the target language (e.g., Spanish). The revoiced media stream may provide a translation to the text written in the at least one origin language. In the depicted example, the translation to the text written on the sign is provided in a notice or a massage box.

21. Generating Personalized Videos

Figure 27A:
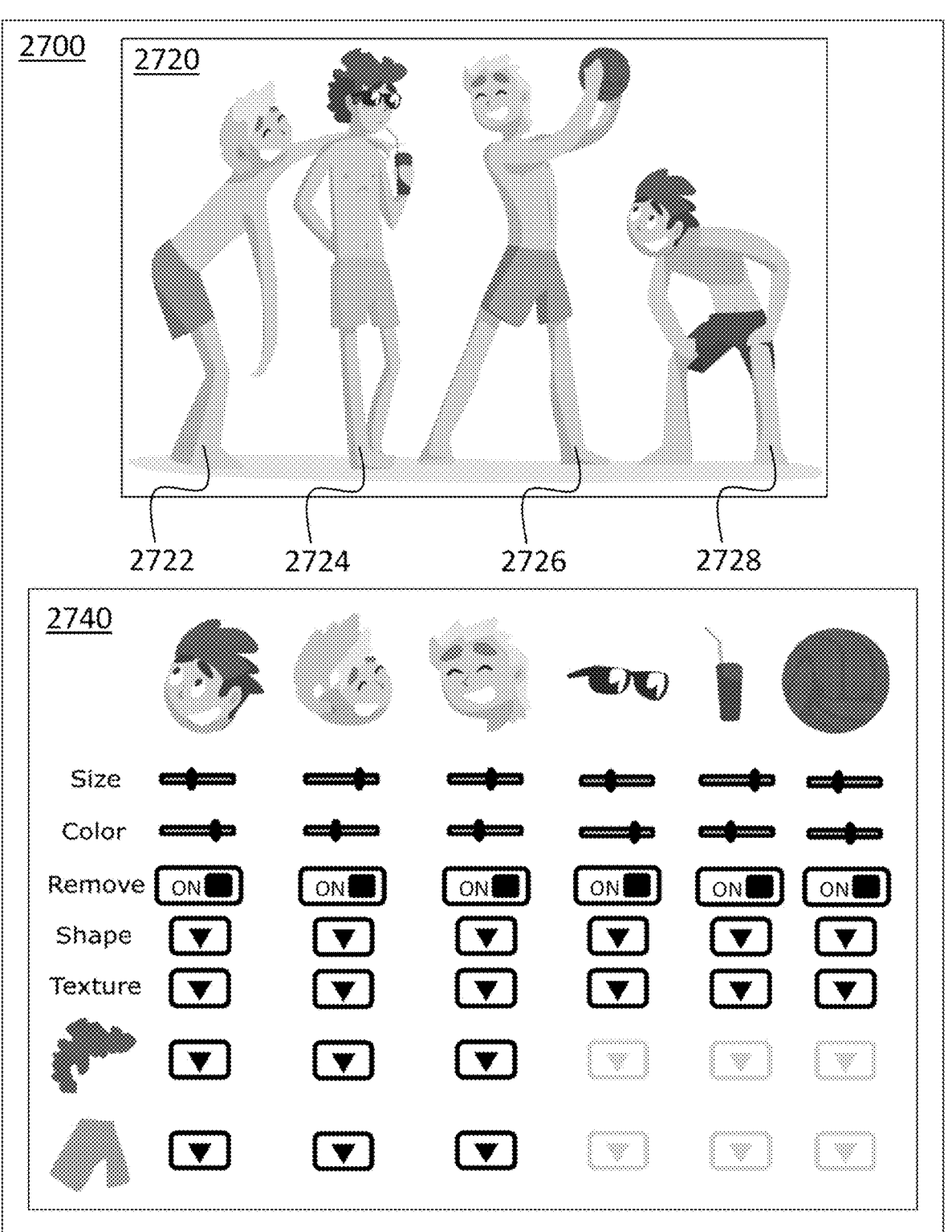
FIG. 27A is a schematic illustration of a user interface consistent with an embodiment of the present disclosure.

FIG. 27A is a schematic illustration of user interface 2700 consistent with an embodiment of the present disclosure. In this example, user interface 2700 comprises a presentation of at least part of a video, in this example video frame 2720 depicting individual 2722, individual 2724 wearing sunglasses and holding a cup, individual 2726 holding a ball, and individual 2726. Further in this example, user interface 2700 also comprises controls 2740 to enable users to manipulate the video. For example, in this example controls 2740 comprise a plurality of controls that may enable the user to selectively manipulate depictions of items in the video and/or to selectively manipulate voices in the video and/or to selectively present videos with manipulated depictions of items and/or to selectively present videos with manipulated voices. In this example, the controls are arranged in a matrix, where each column corresponds to an item in the video and each row corresponds to an aspect of the items. It is also to be understood that this arrangement is exemplary only, and that any other arrangement of the controls may be used. In this example, controls that may enable the user to selectively control the appearance of the items (in this example, size, colors, shape and texture of the items) are presented. Further in this example, controls that may enable the user to selectively add and/or remove items from the manipulated video are presented. Further in this example, controls that may enable the user to selectively control the hairstyle and clothing items of the individuals depicted in the video are presented. It is also to be understood that some of the controls listed above may be excluded from controls 2740, while additional controls may be included in controls 2740. Some examples of such additional controls may include controls that enable the user to selectively control the type of the item, controls that enable the user to selectively control the motion pattern of the item, controls that enable the user to selectively control the voices of one or more individuals in the video (for example, by controlling pitch, intensity, gender, accent, and so forth), and so forth. In this examples, three type of user interface controls are presented, including a slider control that enables the user to select a value from a spectrum or a group of values, an on-off control that enables the user to select a state of an item, and a drop-down control that enables the user to select an option from a list of alternative options. It is also to be understood that these controls are exemplary only, and that any other types of controls may be used, such as controls that enables the user to type and/or edit text and/or values, buttons, checkboxes, radio-buttons, combo-boxes, list-boxes, list-views, tree-views, hot-keys, group-boxes, tabs, voice based controls, gesture based controls, and so forth.

Figure 27B:
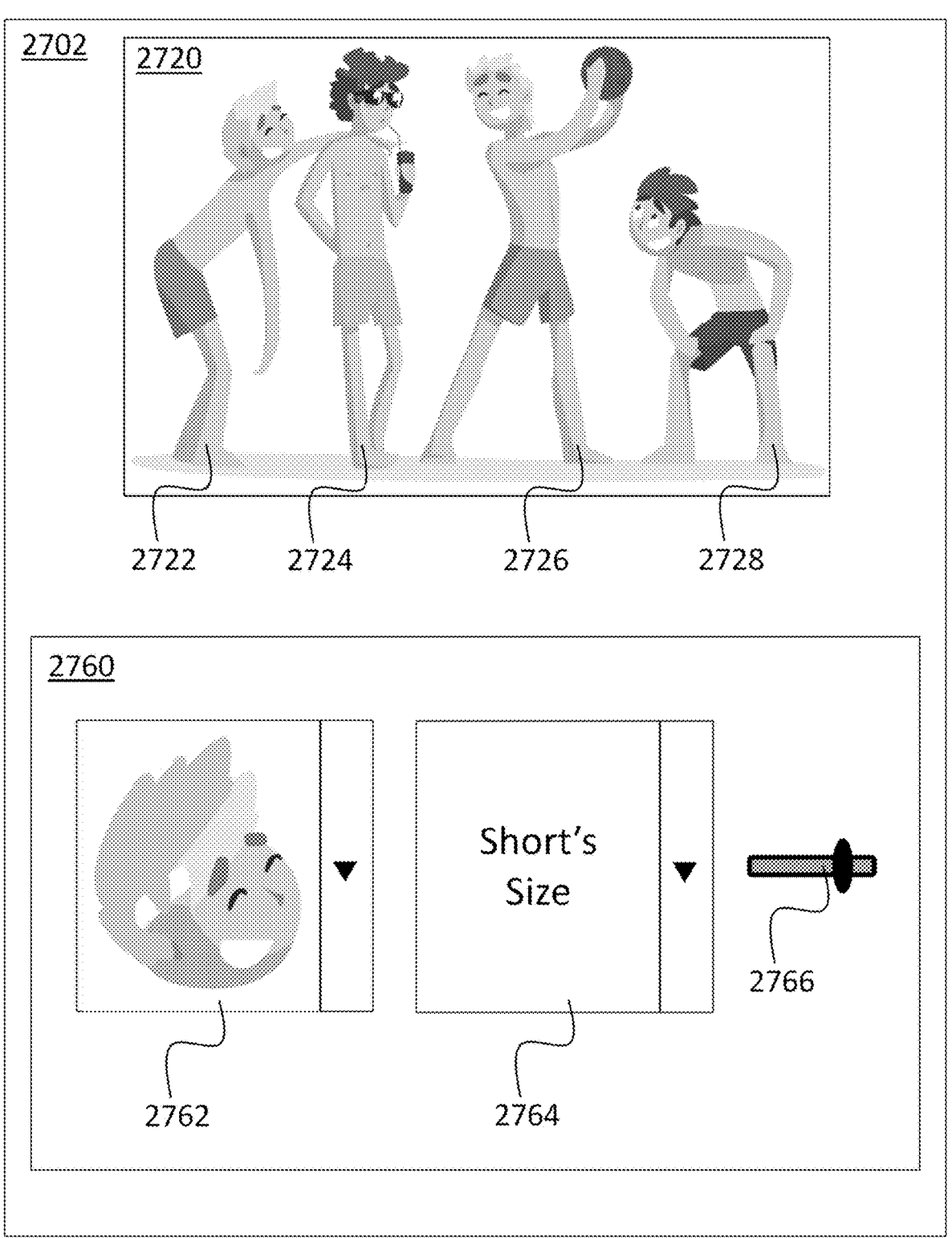
FIG. 27B is a schematic illustration of a user interface consistent with an embodiment of the present disclosure.

FIG. 27B is a schematic illustration of user interface 2702 consistent with an embodiment of the present disclosure. In this example, user interface 2700 comprises a presentation of at least part of a video, in this example video frame 2720 depicting individual 2722, individual 2724 wearing sunglasses and holding a cup, individual 2726 holding a ball, and individual 2726. Further in this example, user interface 2700 also comprises controls 2760 to enable users to manipulate the video (for example, enable the user to selectively manipulate depictions of items in the video and/or to selectively manipulate voices in the video and/or to selectively present videos with manipulated depictions of items and/or to selectively present videos with manipulated voices). For example, in this example controls 2760 comprise an item selection tool 2762, an aspect selection tool 2764, and a value selection tool 2766. It is also to be understood that this combination of tools is exemplary only, and that any other combinations of tools may be used. In this example, item selection tool 2762 may enable the user to select one or more items depicted in the video, such as a person, an object, an object held by a person, a part of a person, at least a part of a head, at least a part of a clothing item of a person, and so forth. Further in this example, aspect selection tool 2764 may enable the user to select an aspect (such as color scheme, texture, size, shape, type of the item, motion pattern of the item, pitch of voice, intensity of voice, voice gender, accent, and so forth) associated with the items selected by item selection tool 2762. Further in this example, value selection tool 2766 may enable the user to specify and/or select a value and/or state for the selected aspect of the selected items.

In some examples, a user may use a user interface (such as user interface 2700, user interface 2702, and so forth) to selectively manipulate depictions of items in the video and/or to selectively manipulate voices in the video and/or to selectively present videos with manipulated depictions of items and/or to selectively present videos with manipulated voices. For example, the user may use the user interface to cause the manipulation of the video and/or the presentation of a manipulated video. Some examples of such manipulated video frames are presented in FIGS. 28A, 28B, 28C, 28D, 28E and 28F.

Figure 28A:
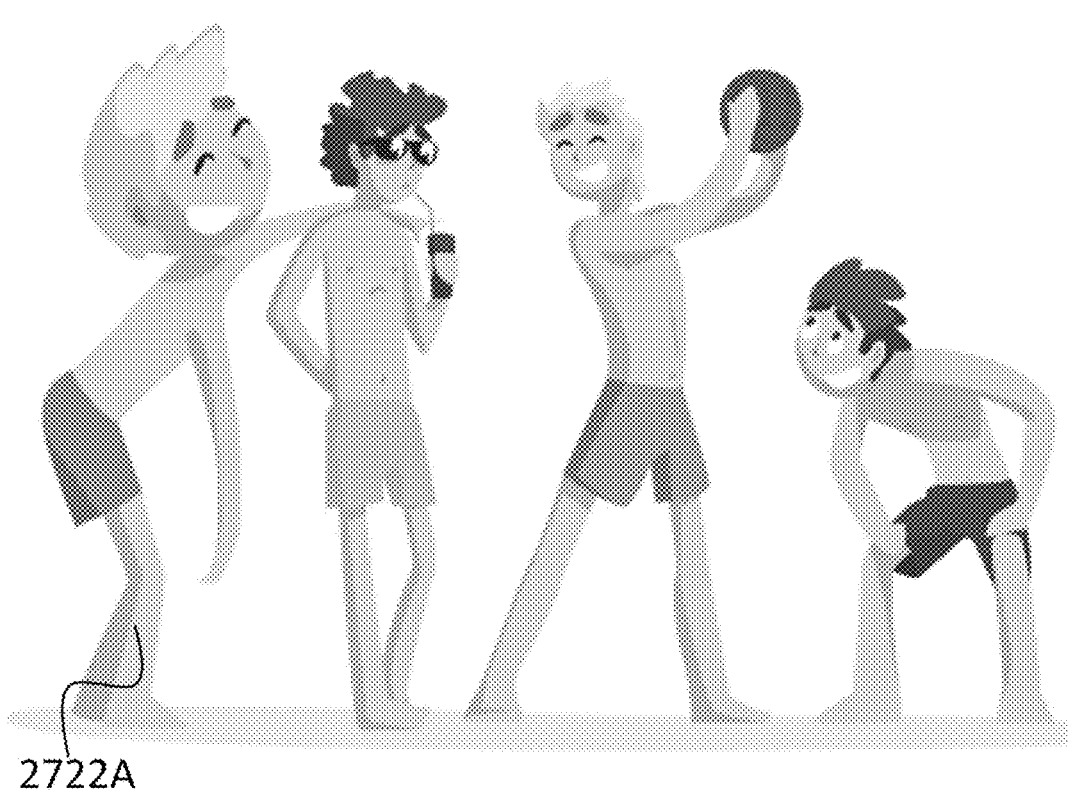
FIGS. 28A, 28B, 28C, 28D, 28E and 28F are schematic illustration of examples of manipulated video frames consistent with an embodiment of the present disclosure.
Figure 28B:
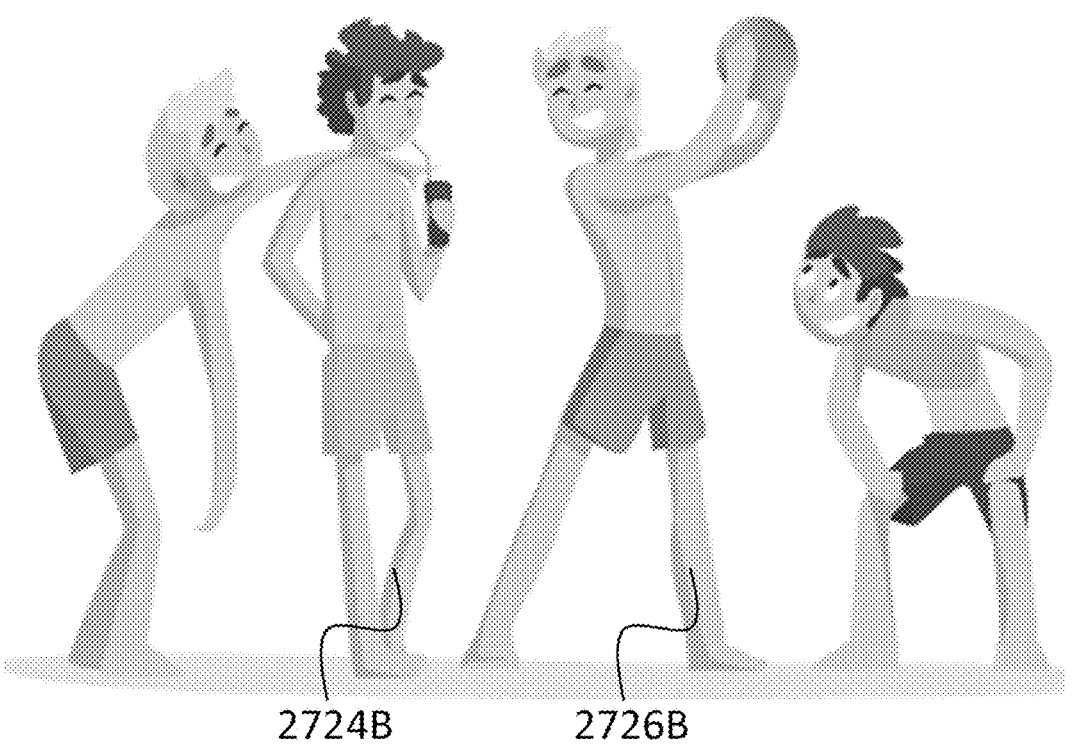
Figure 28C:
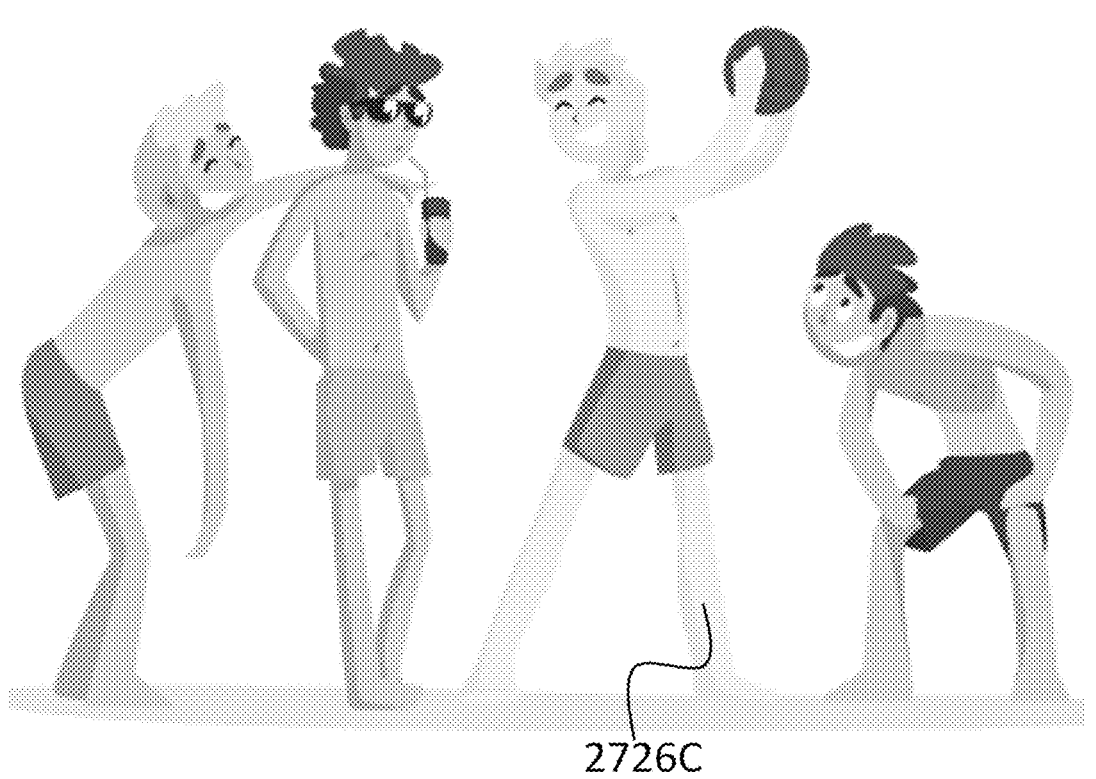
Figure 28D:
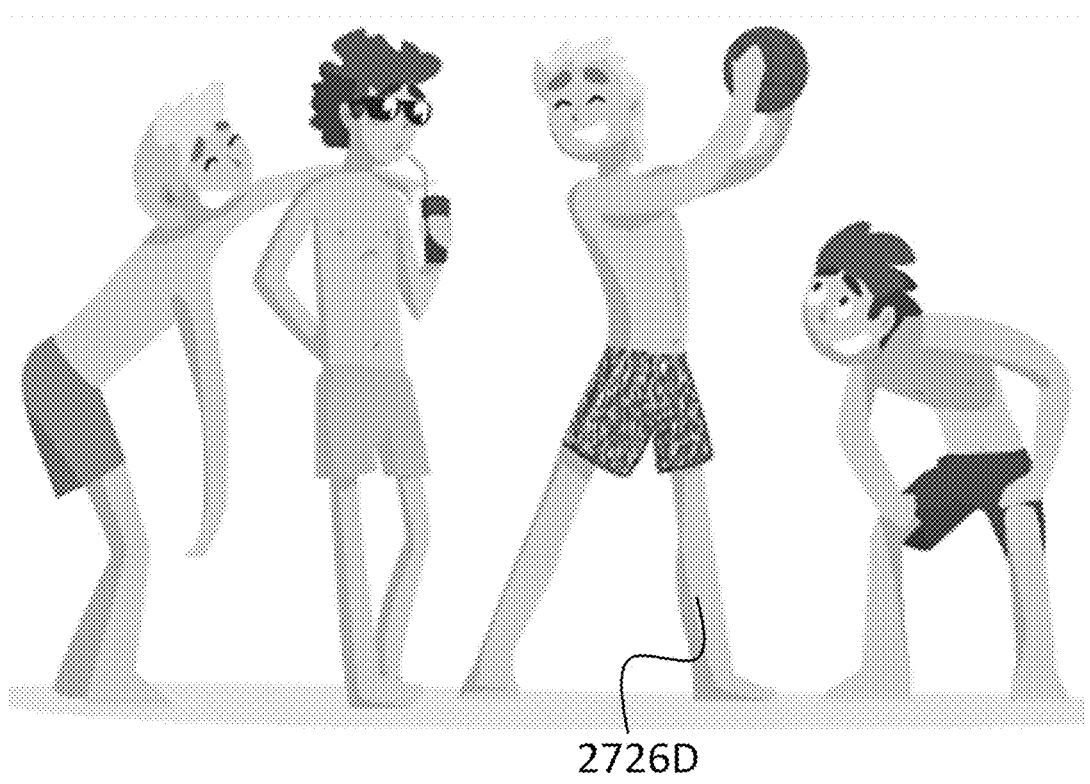
Figure 28E:
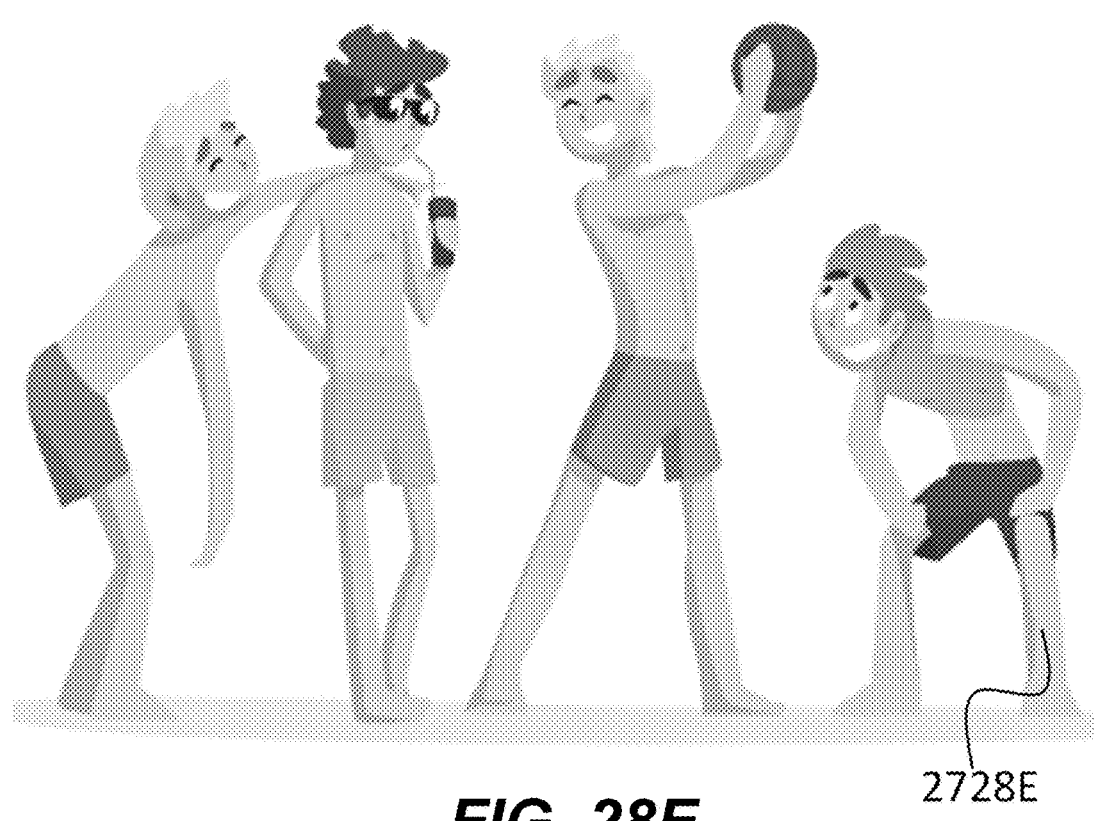
Figure 28E:
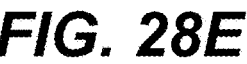
Figure 28F:

FIG. 28A is a schematic illustration of an example of a manipulated video frame consistent with an embodiment of the present disclosure. In this example, the manipulated video frame comprises a manipulated depiction 2722A of individual 2722 with a bigger head. FIG. 28B is a schematic illustration of an example of a manipulated video frame consistent with an embodiment of the present disclosure. In this example, the manipulated video frame comprises a manipulated depiction 2724B of individual 2724 without glasses and a manipulated depiction 2726B of individual 2726 holding a different ball. FIG. 28C is a schematic illustration of an example of a manipulated video frame consistent with an embodiment of the present disclosure. In this example, the manipulated video frame comprises a manipulated depiction 2726C of individual 2726 with a different skin color. FIG. 28D is a schematic illustration of an example of a manipulated video frame consistent with an embodiment of the present disclosure. In this example, the manipulated video frame comprises a manipulated depiction 2726D of individual 2726 with a different swimsuit. FIG. 28E is a schematic illustration of an example of a manipulated video frame consistent with an embodiment of the present disclosure. In this example, the manipulated video frame comprises a manipulated depiction 2728E of individual 2728 with a different hair color. FIG. 28F is a schematic illustration of an example of a manipulated video frame consistent with an embodiment of the present disclosure. In this example, the manipulated video frame comprises a manipulated depiction 2728F of individual 2728 with a different body hair.

In some embodiments, systems and methods for selective manipulation of depictions in videos are provided. In some embodiments, a video depicting at least a first item and a second item may be accessed. Further, in some examples, at least part of the video may be presented to a user. Further, in some examples, a user interface enabling the user to manipulate the video may be presented to a user. Further, in some examples, input may be received from the user. Further, in some examples, for example in response to the input received from the user, an aspect of a depiction of an item in the video may be manipulated. For example, in response to a first received input, a first aspect of a depiction of the first item in the video may be manipulated; in response to a second received input, a second aspect of a depiction of the first item in the video may be manipulated; and in response to a third received input, an aspect of a depiction of the second item in the video may be manipulated.

In some embodiments, systems and methods for selective manipulation of voices in videos are provided. In some embodiments, a video depicting at least a first person and a second person may be accessed. Further, in some examples, at least part of the video may be presented to a user. Further, in some examples, a user interface enabling the user to manipulate the video may be presented to a user. Further, in some examples, input may be received from the user. Further, in some examples, for example in response to the received input from the user, an aspect of a voice of a person in the video may be manipulated. For example, in response to a first received input, an aspect of a voice of the first person in the video may be manipulated; and in response to a second received input, an aspect of a voice of the second person in the video may be manipulated.

In some embodiments, systems and methods for selective presentation of videos with manipulated depictions of items are provided. In some embodiments, a video depicting at least a first item and a second item may be accessed. Further, in some examples, at least part of the video may be presented to a user. Further, in some examples, a user interface enabling the user to select a manipulation of the video. Further, in some examples, input may be received from the user. Further, in some examples, for example in response to the received input from the user, a manipulated version of the video with a manipulation to an aspect of a depiction of an item in the video may be presented to the user. For example, in response to a first received input, a manipulated version of the video with a manipulation to a first aspect of a depiction of the first item in the video may be presented to the user; in response to a second received input, a manipulated version of the video with a manipulation to a second aspect of a depiction of the first item in the video may be presented to the user; and in response to a third received input, a manipulated version of the video with a manipulation to an aspect of a depiction of the second item in the video may be presented to the user.

In some embodiments, systems and methods for selective presentation of videos with manipulated voices are provided. In some embodiments, a video depicting at least a first person and a second person may be accessed. Further, in some examples, at least part of the video may be presented to a user. Further, in some examples, a user interface enabling the user to select a manipulation of voices in the video may be presented to a user. Further, in some examples, input may be received from the user. Further, in some examples, for example in response to the received input from the user, a manipulated version of the video with a manipulation to an aspect of a voice of a person in the video may be presented to the user. For example, in response to a first received input, a manipulated version of the video with a manipulation to an aspect of a voice of the first person in the video may be presented to the user; and in response to a second received input, a manipulated version of the video with a manipulation to an aspect of a voice of the second person in the video may be presented to the user.

In some examples, a video may be accessed. For example, the accessed video may depict at least a first item and a second item. For example, the video may be obtained using step 462. In some examples, a user interface enabling the user to manipulate the video may be presented to a user. Some examples of such user interface may include user interface 2700, user interface 2702, and so forth. In some examples, a user interface enabling the user to select a manipulation of the video. Some examples of such user interface may include user interface 2700, user interface 2702, and so forth. In some examples, a user interface enabling the user to select a manipulation of voices in the video may be presented to a user. Some examples of such user interface may include user interface 2700, user interface 2702, and so forth. In some examples, input may be received from the user, for example using the presented user interface. In some examples, for example in response to an input received from the user, an aspect of a depiction of an item in the video may be manipulated, for example using method 460. In some examples, for example in response to the received input from the user, an aspect of a voice of a person in the video may be manipulated, for example using method 430. In some examples, for example in response to the received input from the user, a manipulated version of the video with a manipulation to an aspect of a depiction of an item in the video may be presented to the user. In some examples, for example in response to the received input from the user, a manipulated version of the video with a manipulation to an aspect of a voice of a person in the video may be presented to the user. Some examples of the first item and/or the second item may include a person, an object, an object held by a person, a part of a person, at least a part of a head, at least a part of a clothing item of a person, and so forth. Some examples of aspects of a depiction of an item (such as aspects of the depiction of the first item, aspects of the depiction of the second item, the first aspect of the depiction of the first item, the first aspect of the depiction of the first item, and so forth) may include a color scheme, a texture, a size, a shape, a type of the item, motion pattern of the item, and so forth. Some examples of aspects of the voice of a person may include pitch, intensity, gender, accent, and so forth. In some examples, an item (such as the first item, the second item, etc.) may comprise at least part of a person, and the aspect of a depiction of the item (such as aspects of the depiction of the first item, aspects of the depiction of the second item, the first aspect of the depiction of the first item, the first aspect of the depiction of the first item, and so forth) may comprise a skin color. In some examples, an item (such as the first item, the second item, etc.) may comprise at least part of a person, and the aspect of a depiction of the item (such as aspects of the depiction of the first item, aspects of the depiction of the second item, the first aspect of the depiction of the first item, the first aspect of the depiction of the first item, and so forth) may comprise a hair color. In some examples, an item (such as the first item, the second item, etc.) may comprise at least part of a person, and the aspect of a depiction of the item (such as aspects of the depiction of the first item, aspects of the depiction of the second item, the first aspect of the depiction of the first item, the first aspect of the depiction of the first item, and so forth) may comprise a hair style. In some examples, an item (such as the first item, the second item, etc.) may comprise at least part of a person, and the aspect of a depiction of the item (such as aspects of the depiction of the first item, aspects of the depiction of the second item, the first aspect of the depiction of the first item, the first aspect of the depiction of the first item, and so forth) may comprise clothing style. In some examples, an item (such as the first item, the second item, etc.) may comprise at least part of a person, and the aspect of a depiction of the item (such as aspects of the depiction of the first item, aspects of the depiction of the second item, the first aspect of the depiction of the first item, the first aspect of the depiction of the first item, and so forth) may comprise a size of a body part of the person. In some examples, an item (such as the first item, the second item, etc.) may comprise at least part of a person, and the aspect of a depiction of the item (such as aspects of the depiction of the first item, aspects of the depiction of the second item, the first aspect of the depiction of the first item, the first aspect of the depiction of the first item, and so forth) may comprise a shape of a body part of the person. In some examples, the at least part of the video presented to the user may not include a depiction of the first item and/or the second item, while in other examples, the at least part of the video presented to the user may include a depiction of at least part of the first item and/or at least part of the second item. In some examples, the manipulation of an aspect of the depiction may comprise a manipulation of at least one frame of the video not included in the at least part of the video presented to the user. In some examples, in response to the input received, an aspect of the detected at least part of the depiction of an item may be manipulated. In some examples, for example in response to the input received from the user, an aspect of the detected sounds produced by a person in the video may be manipulated. In some examples, the user interface presented to the user may be based on the identified first item and/or the identified second item. In some examples, at least part of the manipulated video may be presented to the user. In some examples, the at least part of the manipulated video presented to the user may comprise at least one frame not included in the at least part of the video presented to the user.

In some examples, the video may be analyzed to detect at least part of the depiction of the first item and/or to detect at least part of the depiction of the second item. Further, in some examples, in response to the input received, an aspect of the detected at least part of the depiction of an item may be manipulated. For example, in response to a first received input, a first aspect of the detected at least part of the depiction of the first item may be manipulated; in response to a second received input, a second aspect of the detected at least part of the depiction of the first item may be manipulated; and in response to a third received input, an aspect of the detected at least part of the depiction of the first item may be manipulated.

In some examples, the video may be analyzed to detect at least part of the depiction of the first item and/or to detect at least part of the depiction of the second item. For example, a machine learning model may be trained using training examples to detect parts of depictions of items (of selected type) in images and/or videos, and the trained machine learning model may be used to detect the at least part of the depiction of the first item and/or to detect at least part of the depiction of the second item in the video. In another example, an artificial neural network may be configured to detect parts of depictions of items (of selected type) in images and/or videos, and the artificial neural network may be used to detect the at least part of the depiction of the first item and/or to detect at least part of the depiction of the second item in the video. In yet another example, object detectors and/or person detectors and/or face detectors may be used to detect the at least part of the depiction of the first item and/or to detect at least part of the depiction of the second item in the video.

In some examples, the video may be analyzed to detect sounds produced by the first person and/or to detect sounds produced by the second person. Further, in some examples, for example in response to the input received from the user, an aspect of the detected sounds produced by a person in the video may be manipulated. For example, in response to a first received input, an aspect of the detected sounds produced by the first person may be manipulated, and in response to a second received input, an aspect of the detected sounds produced by the second person may be manipulated.

In some examples, the video may be analyzed to detect sounds produced by the first person and/or to detect sounds produced by the second person. For example, a machine learning model may be trained using training examples to detect sounds and/or speech produced by specific persons in audio data and/or videos, and the trained machine learning model may be used to analyze the video to detect sounds produced by the first person and/or to detect sounds produced by the second person. In another example, an artificial neural network may be configured to detect sounds and/or speech produced by specific persons in audio data and/or videos, and the artificial neural network may be used to analyze the video to detect sounds produced by the first person and/or to detect sounds produced by the second person. In yet another example, the video may be analyzed using speaker diarization algorithms to detect sounds produced by the first person and/or to detect sounds produced by the second person.

In some examples, the video may be analyzed to identify the first item and/or to identify the second item. Further, in some examples, the user interface presented to the user may be based on the identified first item and/or the identified second item.

In some examples, the video may be analyzed to identify the first item and/or to identify the second item. For example, a machine learning model may be trained using training examples to identify items from images and/or videos, and the trained machine learning model may be used to analyze the video and identify the first item and/or to identify the second item. In another example, an artificial neural network may be configured to identify items from images and/or videos, and the artificial neural network may be used to analyze the video and identify the first item and/or to identify the second item. In yet another example, object recognition algorithms and/or face recognition algorithms and/or person recognition algorithms may be used to analyze the video and identify the first item and/or to identify the second item.

In some embodiments, methods and systems for generating videos with personalized avatars are provided. In some embodiments, input video including at least a depiction of a person may be obtained. Further, a personalized profile associated with a user may be obtained. The personalized profile may be used to select at least one characteristic of an avatar. Further, an output video may be generated using the selected at least one characteristic of an avatar by replacing at least part of the depiction of the person in the input video with a depiction of an avatar, wherein the depiction of the avatar is according to the selected at least one characteristic. For example, the user may be a photographer of at least part of the input video, may be an editor of at least part of the input video, may be a photographer that captured the input video, and so forth.

In some examples, the output video may be displayed to the user, may be stored in memory, may be transmitted over a communication network using a communication device, may be provided to an external device, may be posted on a blockchain, may be posted on a website, and so forth. In some examples, input video including at least a depiction of a person may be obtained. For example, the input video may be read from memory, received through a communication network using a communication device, captured using one or more image sensors, received from an external device, generated (for example, as described by various methods herein), and so forth. In some examples, a personalized profile associated with a user may be obtained. For example, the personalized profile may be read from memory, received through a communication network using a communication device, received from an external device, generated (for example, based on past actions of the user, based on observed properties of the user, etc.), and so forth.

In some examples, the personalized profile may be used to select at least one characteristic of an avatar. For example, a machine learning model may be trained using training examples to select characteristics of avatars based on profiles, and the trained machine learning model may be used to select the at least one characteristic of the avatar based on the personalized profile. In another example, an artificial neural network may be configured to select characteristics of avatars based on profiles, and the artificial neural network may be used to select the at least one characteristic of the avatar based on the personalized profile. In yet another example, indications of preferences of the user included in the personalized profile may be used to select the at least one characteristic of the avatar, for example selecting an hair style for the avatar according to a preferred hair style of the user indicated in the personalized profile, or in another example, selecting a measurement of the avatar according to a preferred measurements of the user indicated in the personalized profile. For example, past preferences and/or actions of the user may be used to generate the indications of preferences of the user included in the personalized profile. In another example, demographic information related to the user may be used to generate indications of preferences of the user included in the personalized profile, for example according to statistical data correlating demographic information with common preferences of users.

In some examples, an output video may be generated using the selected at least one characteristic of an avatar by replacing at least part of the depiction of the person in the input video with a depiction of an avatar, wherein the depiction of the avatar is according to the selected at least one characteristic. For example, the depiction of the avatar may include parts of the depiction of the person (for example, at most 80%, at most 60%, at most 40%, at most 20%, at most 10%, at most 5%, at most 1%, at least 5%, at least 10%, at least 20%, at least 40%, at least 60%, at least 80%, and so forth). For example, a segment of the input video depicting the at least part of the depiction of the person may be identified (for example using video segmentation algorithms, using a machine learning model trained to detect segments of images and/or videos depicting persons in images and/or videos, using an artificial neural network configured to detect segments of images and/or videos depicting persons in images and/or videos, and so forth), and the identified segment may be removed from the input video and replaced with a depiction of the avatar (for example, using image and/or video stitching algorithms, using image and/or video matting algorithms, and so forth) to generate the output video.

In some examples, the avatar may be realistic avatar, semi-realistic avatar, non-realistic avatar, and so forth. For example, the at least one characteristic of the avatar may comprise a level of realism of the avatar. In some examples, the at least one characteristic of the avatar may comprise a selection of at least a part of the avatar (for example, of a plurality of alternative parts). Examples of such part may include clothing item, hair, head, eyes, skin, hands, legs, torso, and so forth. In some examples, the at least one characteristic of the avatar may comprise a selection of the avatar of a plurality of alternative avatars. In some examples, the at least one characteristic of the avatar may comprise a color scheme of at least part of the avatar, such as a color scheme of the entire avatar, a color scheme of a clothing item of the avatar, a color scheme of the hair of the avatar, a color scheme of the skin of the avatar, a color scheme of the eyes of the avatar, a color scheme of a selected portion of the avatar, and so forth. In some examples, the at least one characteristic of the avatar may comprise a size of at least part of the avatar, such as size of a body part of the avatar (such as head, eyes, hands, torso, legs, hair, etc.), size of the entire avatar, size of a selected portion of an avatar, size of a clothing item of the avatar, and so forth. In some examples, the at least one characteristic of the avatar may comprise a texture of at least part of the avatar, such as a texture of the entire avatar, a texture of a clothing item of the avatar, a texture of the hair of the avatar, a texture of the skin of the avatar, a texture of the eyes of the avatar, a texture of a selected portion of the avatar, and so forth. In some examples, the at least one characteristic of the avatar may comprise a gender of the avatar. In some examples, the at least one characteristic of the avatar may comprise a species of the avatar. In some examples, the at least one characteristic of the avatar may comprise a shape of at least part of the avatar, such as a shape of the entire avatar, shape of a clothing item of the avatar, shape of the hair of the avatar, shape of the skin of the avatar, shape of the eyes of the avatar, shape of a selected portion of the avatar, and so forth. In some examples, the at least one characteristic of the avatar may comprise a characteristic of a voice of the avatar. Some examples of such characteristic of the voice of the avatar may include pitch (such as pitch range), prosody, register, gender of the voice, a selection of the voice of a plurality of alternative voices, and so forth. In some examples, the at least one characteristic of the avatar may comprise a characteristic of an age of the avatar, such as an exact age, an age range, "young", "old", "child", "teenager", "young adult", "adult", "elderly", "middle age", and so forth. In some examples, the at least one characteristic of the avatar may comprise a temporal era, such as a year, a range of years, "1920's", "1930's", "1940's", "1950's", "1960's", "1970's", "1980's", "1990's", "2000's", "2010's", "2020's", "nowadays", "ancient", "modern", "futuristic", and so forth. In some examples, the at least one characteristic of the avatar may comprise modesty level, such as "casual", "flirty", an indication of an amount of skin revealed, an indication of how revealing the avatar outfit is, "TV-Y", "TV-Y7", "TV-G", "TV-PG", "TV-14" or "TV-MA", an indication of how violence the avatar should present, an indication of the level of coarse language the avatar should use, and so forth. In some examples, the at least one characteristic of the avatar may comprise an emotional state, such as "joyful", "grieving", "fearful", "angry", "flirty", "friendly", and so forth. In some examples, the replaced at least part of the depiction of the person in the input video may comprise at least part of a depiction of a face of the person, may comprise at least part of a depiction of hairs of the person (and the at least one characteristic of the avatar may comprise, for example, a different hair style, a different hair color, etc.), may comprise at least part of a depiction of a limb of the person, may comprise at least part of a depiction of a clothing item of the person (and the at least one characteristic of the avatar may comprise, for example, a formal wear, a swimsuit, different clothing colors, etc.), and so forth. In some examples, the depiction of the avatar may include a depiction of an alternative person. For example, the at least one characteristic of the avatar may be used to select the alternative person of a plurality of alternative persons. For example, the alternative person may be a person known to the user, may be a family member of the user, may be unknown to the user, and so forth. Some examples of the person depicted in the input video may include a news anchor, a weatherperson, an actor, a person known to the user, a family member of the user, and so forth.

In some examples, the personalized profile may be based, at least in part, on a geographical location associated with the user, and the selection of at least one characteristic of the avatar may be based, at least in part, on the geographical location associated with the user. For example, statistical data correlating geographical locations with common preferences of users regarding characteristics of avatars may be used to select characteristics of avatars that are likely to be preferred by the user. For example, the geographical location associated with the user may include a location of the user, a destination of the user, a location that the user showed interest in, a location of the home of the user, a hometown of the user, a work location of the user, a location frequent by the user, and so forth. In some examples, a machine learning model may be trained using training examples to select characteristic of avatars based on geographical locations, and the trained machine learning model may be used to select the at least one characteristic of the avatar based on the geographical location associated with the user. In some examples, an artificial neural network may be configured to select characteristic of avatars based on geographical locations, and the artificial neural network may be used to select the at least one characteristic of the avatar based on the geographical location associated with the user.

In some examples, the personalized profile may be based, at least in part, on a cultural association of the user, and the selection of at least one characteristic of the avatar may be based, at least in part, on the cultural association of the user. For example, statistical data correlating cultural association with common preferences of users regarding characteristics of avatars may be used to select characteristics of avatars that are likely to be preferred by the user. In some examples, a machine learning model may be trained using training examples to select characteristic of avatars based on cultural associations of users, and the trained machine learning model may be used to select the at least one characteristic of the avatar based on the cultural association of the user. In some examples, an artificial neural network may be configured to select characteristic of avatars based on cultural associations of users, and the artificial neural network may be used to select the at least one characteristic of the avatar based on the cultural association of the user.

In some examples, the personalized profile may comprise information based, at least in part, on past behavior of the user, and the selection of at least one characteristic of the avatar may be based, at least in part, on the past behavior of the user. For example, statistical data correlating past behavior of users with common preferences of users regarding characteristics of avatars may be used to select characteristics of avatars that are likely to be preferred by the user. In one example, a past behavior of a user may include a selection of an avatar with a specific characteristic, and in response, the at least one characteristic of the avatar may be selected to include the specific characteristic. In another example, a past behavior of a user may include avoiding avatars with a specific characteristic, and in response, the at least one characteristic of the avatar may be selected to not include the specific characteristic. In some examples, a machine learning model may be trained using training examples to select characteristic of avatars based on past behavior of users, and the trained machine learning model may be used to select the at least one characteristic of the avatar based on the past behavior of the user. In some examples, an artificial neural network may be configured to select characteristic of avatars based on past behavior of users, and the artificial neural network may be used to select the at least one characteristic of the avatar based on the past behavior of the user.

In some examples, the personalized profile may comprise information based, at least in part, on an age of the user, and the selection of at least one characteristic of the avatar may be based, at least in part, on the age of the user. Some examples of indication of age may include exact age, an age range, "young", "old", "child", "teenager", "young adult", "adult", "elderly", "middle age", and so forth. For example, statistical data correlating age with common preferences of users regarding characteristics of avatars may be used to select characteristics of avatars that are likely to be preferred by the user. In some examples, a machine learning model may be trained using training examples to select characteristic of avatars based on ages of users, and the trained machine learning model may be used to select the at least one characteristic of the avatar based on the age of the user. In some examples, an artificial neural network may be configured to select characteristic of avatars based on ages of users, and the artificial neural network may be used to select the at least one characteristic of the avatar based on the age of the user.

In some examples, the personalized profile may comprise information based, at least in part, on an emotional state of the user, and the selection of at least one characteristic of the avatar may be based, at least in part, on the emotional state of the user. Some examples of indication of emotional state of the user may comprise "happy", "sad", "excited", "tender", "scared", "angry", and so forth. For example, statistical data correlating emotional state with common preferences of users regarding characteristics of avatars may be used to select characteristics of avatars that are likely to be preferred by the user. In some examples, a machine learning model may be trained using training examples to select characteristic of avatars based on emotional states the users, and the trained machine learning model may be used to select the at least one characteristic of the avatar based on the emotional state of the user. In some examples, an artificial neural network may be configured to select characteristic of avatars based on emotional states the users, and the artificial neural network may be used to select the at least one characteristic of the avatar based on the emotional state of the user.

In some embodiments, systems and methods for generating personalized videos with selective replacement of characters with avatars are provided. In some embodiments, input video including at least a depiction of two or more persons may be obtained. Moreover, a personalized profile associated with a user may be obtained. The input video may be analyzed to determine at least one property for each person of a group of at least two persons comprising at least part of the two or more persons depicted in the input video. The personalized profile and/or the determined properties may be used to select a first person of the group of at least two persons, where the group of at least two persons may also include a second person. Further, in response to the selection of the first person, the input video may be used to generate an output video including the depiction of the second person and a depiction of an avatar replacing at least part of the depiction of the first person. For example, the user may be a prospective viewer of the output video, may be a photographer of at least part of the input video, may be an editor of at least part of the input video, and so forth.

In some examples, the output video may be displayed to the user, may be stored in memory, may be transmitted over a communication network using a communication device, may be provided to an external device, may be posted on a blockchain, may be posted on a website, and so forth. In some examples, input video including at least a depiction of two or more persons may be obtained. For example, the input video may be obtained as described above. In some examples, a personalized profile associated with a user may be obtained. For example, the personalized profile may be obtained as described above.

In some examples, the input video may be analyzed to determine at least one property for each person of a group of at least two persons comprising at least part of the two or more persons depicted in the input video. For example, a machine learning model may be trained to determine properties of persons from images and/or videos, and the trained machine learning model may be used to determine the at least one property for each of the persons from the input video. In another example, an artificial neural network may be configured to determine properties of persons from images and/or videos, and the artificial neural network may be used to determine the at least one property for each of the persons from the input video.

In some examples, the personalized profile and/or the determined properties may be used to select a first person of the group of at least two persons. For example, a machine learning model may be trained using training examples to select one or more persons out of group of persons based on user profiles and/or properties of the persons in the group, and the trained machine learning model may be used to select the first person of the group of at least two persons based on the personalized profile and/or the determined properties. In another example, an artificial neural network may be configured to select one or more persons out of group of persons based on user profiles and/or properties of the persons in the group, and the artificial neural network may be used to select the first person of the group of at least two persons based on the personalized profile and/or the determined properties.

In some examples, in response to the selection of the first person, the input video may be used to generate an output video including the depiction of the second person and a depiction of an avatar replacing at least part of the depiction of the first person. For example, the methods and/or systems described above may be used to generate the output video including the depiction of the second person and the depiction of the avatar replacing at least part of the depiction of the first person. In another example, a segment of the input video depicting the first person may be identified (for example using video segmentation algorithms, using a machine learning model trained to detect segments of images and/or videos depicting persons in images and/or videos, using an artificial neural network configured to detect segments of images and/or videos depicting persons in images and/or videos, and so forth), and the identified segment may be removed from the input video and replaced with a depiction of the avatar (for example, using image and/or video stitching algorithms, using image and/or video matting algorithms, and so forth) to generate the output video.

In some examples, the at least one property of the first person and/or the at least one property of the second person may comprise a color, such as a hair color, skin color, clothing colors, eyes color, and so forth. For example, one person may be associated with a first color and another person may be associated with a second color, and based on the first color and/or the second person, the person associated with the first color may be selected.

In some examples, the at least one property of the first person and/or the at least one property of the second person may comprise a size of at least part of the depiction of the person. Some examples of such size may include height, area of the depiction of the person in an image, volume, size of a body part (such as length of a leg, length of a hand, area of a head in a picture, etc.), length in pixels, area in pixels, and so forth. For example, one person may be associated with a first size and another person may be associated with a second size, and based on the first size and/or the second size, the person associated with the first size may be selected.

In some examples, the at least one property of the first person and/or the at least one property of the second person may comprise texture of at least part of the depiction of the person. For example, the texture may include a texture of at least part of the depiction of the person, such as a texture of the entire depiction of the person, a texture of a clothing item of the person, a texture of the hair of the person, a texture of the skin of the person, a texture of the eyes of the person, a texture of a selected portion of the person, and so forth. For example, one person may be associated with a first texture and another person may be associated with a second texture, and based on the first texture and/or the second texture, the person associated with the first texture may be selected.

In some examples, the at least one property of the first person and/or the at least one property of the second person may comprise a gender of the person. For example, one person may be associated with a first gender and another person may be associated with a second gender, and based on the first gender and/or the second gender, the person associated with the first gender may be selected.

In some examples, the at least one property of the first person and/or the at least one property of the second person may comprise a shape of at least part of the depiction of the person. For example, such shape may comprise a shape of at least part of the person, such as a shape of the entire person, shape of a clothing item of the person, shape of the hair of the person, shape of the skin of the person, shape of the eyes of the person, shape of a selected portion of the person, and so forth. For example, one person may be associated with a first shape and another person may be associated with a second shape, and based on the first shape and/or the second shape, the person associated with the first shape may be selected.

In some examples, the at least one property of the first person and/or the at least one property of the second person may comprise a property of the voice of the person. Some examples of such property of the voice of the person may include pitch (such as pitch range), prosody, gender of the voice, a classification of the voice to one of a plurality of predetermined classes, and so forth. For example, one person may be associated with a first property of voice and another person may be associated with a second property of voice, and based on the first property of voice and/or the second property of voice, the person associated with the first property of voice may be selected.

In some examples, the at least one property of the first person and/or the at least one property of the second person may comprise an age of the person. For example, the age of the person may be characterized by an exact age, an age range, year of birth, "young", "old", "child", "teenager", "young adult", "adult", "elderly", "middle age", and so forth. For example, one person may be associated with a first age and another person may be associated with a second age, and based on the first age and/or the second age, the person associated with the first property of voice may be selected.

In some examples, the at least one property of the first person and/or the at least one property of the second person may comprise an identity of the person. For example, the identity of the person may be specified as a name, an identifier, a relation to the user ("brother", "sister", "mother", "father", "son", "daughter", "friend", "boss", "coworker", "associate", and so forth), an identification of the person as a person observed in another context, and so forth.

In some examples, the at least one property of the first person and/or the at least one property of the second person may comprise a property of a face of the person. Some examples of such properties of a face may comprise colors (such as eyes color, hair color, skin color, etc.), shape (shape of face, shape of a part of the face, etc.), measurement of lengths related to the face, and so forth. For example, one person may be associated with a first property of a face and another person may be associated with a second property of a face, and based on the first property of a face and/or the second property of a face, the person associated with the first property of a face may be selected.

In some examples, the at least one property of the first person and/or the at least one property of the second person may comprise a property of a face of the person. Some examples of such properties of a face may comprise colors (such as eyes color, hair color, skin color, etc.), shape (shape of face, shape of a part of the face, etc.), measurement of lengths related to the face, and so forth. For example, one person may be associated with a first property of a face and another person may be associated with a second property of a face, and based on the first property of a face and/or the second property of a face, the person associated with the first property of a face may be selected.

In some examples, the at least one property of the first person and/or the at least one property of the second person may comprise information related to a modesty level of the person. For example, one person may be associated with a first modesty level of the person and another person may be associated with a second modesty level of the person, and based on the first modesty level of the person and/or the second modesty level of the person, the person associated with the first modesty level of the person may be selected.

In some examples, the at least one property of the first person and the at least one property of the second person may comprise information related to an emotional state of the person. Some examples of indication of emotional state of the person may comprise "happy", "sad", "excited", "tender", "scared", "angry", and so forth. For example, one person may be associated with information related to an emotional state of the person and another person may be associated with information related to an emotional state of the person, and based on the first information related to an emotional state of the person and/or the second information related to an emotional state of the person, the person associated with the first information related to an emotional state of the person may be selected.

In some embodiments, systems and methods for generating personalized videos with selective replacement of text are provided. In some embodiments, input video including at least a depiction of a text may be obtained. Further, a personalized profile associated with a user may be obtained. The input video may be analyzed to determine at least one property of the depiction of the text. Further, the personalized profile and/or the at least one property of the depiction of the text may be used to modify the text in the input video and generate an output video. For example, the user may be a prospective viewer of the output video, may be a photographer of at least part of the input video, may be an editor of at least part of the input video, and so forth.

In some examples, the output video may be displayed to the user, may be stored in memory, may be transmitted over a communication network using a communication device, may be provided to an external device, may be posted on a blockchain, may be posted on a website, and so forth. In some examples, input video including at least a depiction of a text may be obtained. For example, the input video may be obtained as described above. In some examples, a personalized profile associated with a user may be obtained. For example, the personalized profile may be obtained as described above.

In some examples, the input video may be analyzed to determine at least one property of the depiction of the text. For example, a machine learning model may be trained using training examples to determine properties of depictions of text from images and/or videos, and the trained machine learning model may be used to determine the at least one property of the depiction of the text from the input video. In another example, an artificial neural network may be configured to determine properties of depictions of text from images and/or videos, and the artificial neural network may be used to determine the at least one property of the depiction of the text from the input video. In yet another example, an OCR algorithm may be used to obtain the depicted textual information, and the textual information may be analyzed, for example using NLP algorithms, to determine the at least one property of the depiction of the text from the input video.

In some examples, the personalized profile and/or the at least one property of the depiction of the text may be used to modify the text in the input video and generate an output video. For example, the generated output video may include a depiction of a modified text. In another example, the generated output video may include no depiction of the text. In some examples, the modified text may include parts of the text (for example, at most 80% of the text, at most 60% of the text, at most 40% of the text, at most 20% of the text, at most 10% of the text, at most 5% of the text, at most 1% of the text, at least 10% of the text, at least 20% of the text, at least 40% of the text, at least 60% of the text, at least 80% of the text, any combination of the above, and so forth). For example, a segment of the input video depicting the text may be identified (for example using video segmentation algorithms, using a machine learning model trained to detect segments of images and/or videos depicting the text in images and/or videos, using an artificial neural network configured to detect segments of images and/or videos depicting the text in images and/or videos, and so forth). Further, in some examples, the identified segment may be removed from the input video and inpainted (for example, using images and/or videos inpainting algorithms) to generate the output video. In another example, the identified segment may be modified and/or replaced with a different depiction of text.

In some examples, the at least one property of the depiction of the text comprises color of at least part of the depiction of the text. Further, in some examples, the modified text may include at least part of the text in a different color. In another example, in response to a first color the generated output video may comprise a depiction of a modified text, while in response to a second color the generated output video may comprise a depiction of the original text. In another example, in response to a first color the generated output video may comprise a depiction of the original text or a modified text, while in response to a second color the generated output video may comprise no depiction of the text. In yet another example, in response to a first color the generated output video may comprise a depiction of a first modified text, while in response to a second color the generated output video may comprise a depiction of a second modified text (where the second modified text differs from the first modified text).

In some examples, the at least one property of the depiction of the text comprises background color of at least part of the depiction of the text. In another example, in response to a first background color the generated output video may comprise a depiction of a modified text, while in response to a second background color the generated output video may comprise a depiction of the original text. In another example, in response to a first background color the generated output video may comprise a depiction of the original text or a modified text, while in response to a second background color the generated output video may comprise no depiction of the text. In yet another example, in response to a first background color the generated output video may comprise a depiction of a first modified text, while in response to a second background color the generated output video may comprise a depiction of a second modified text (where the second modified text differs from the first modified text).

In some examples, the at least one property of the depiction of the text comprises size of at least part of the depiction of the text. Further, in some examples, the modified text may include at least part of the text in a different size. In another example, in response to a first size the generated output video may comprise a depiction of a modified text, while in response to a second size the generated output video may comprise a depiction of the original text. In another example, in response to a first size the generated output video may comprise a depiction of the original text or a modified text, while in response to a second size the generated output video may comprise no depiction of the text. In yet another example, in response to a first size the generated output video may comprise a depiction of a first modified text, while in response to a second size the generated output video may comprise a depiction of a second modified text (where the second modified text differs from the first modified text).

In some examples, the at least one property of the depiction of the text comprises font of at least part of the depiction of the text. Further, in some examples, the modified text may include at least part of the text in a different font. In another example, in response to a first font the generated output video may comprise a depiction of a modified text, while in response to a second font the generated output video may comprise a depiction of the original text. In another example, in response to a first font the generated output video may comprise a depiction of the original text or a modified text, while in response to a second font the generated output video may comprise no depiction of the text. In yet another example, in response to a first font the generated output video may comprise a depiction of a first modified text, while in response to a second font the generated output video may comprise a depiction of a second modified text (where the second modified text differs from the first modified text).

In some examples, the at least one property of the depiction of the text comprises texture of the least part of the depiction of the text. Further, in some examples, the modified text may include at least part of the text in a different texture. In another example, in response to a first texture the generated output video may comprise a depiction of a modified text, while in response to a second texture the generated output video may comprise a depiction of the original text. In another example, in response to a first texture the generated output video may comprise a depiction of the original text or a modified text, while in response to a second texture the generated output video may comprise no depiction of the text. In yet another example, in response to a first texture the generated output video may comprise a depiction of a first modified text, while in response to a second texture the generated output video may comprise a depiction of a second modified text (where the second modified text differs from the first modified text).

In some examples, the at least one property of the depiction of the text comprises background texture of at least part of the depiction of the text. Further, in some examples, the modified text may include at least part of the text in a different background texture. In another example, in response to a first background texture the generated output video may comprise a depiction of a modified text, while in response to a second background texture the generated output video may comprise a depiction of the original text. In another example, in response to a first background texture the generated output video may comprise a depiction of the original text or a modified text, while in response to a second background texture the generated output video may comprise no depiction of the text. In yet another example, in response to a first background texture the generated output video may comprise a depiction of a first modified text, while in response to a second background texture the generated output video may comprise a depiction of a second modified text (where the second modified text differs from the first modified text).

In some examples, the at least one property of the depiction of the text comprises a property of a contour associated with at least part of the depiction of the text. Further, in some examples, the modified text may include at least part of the text with a different contour. In another example, in response to a first contour the generated output video may comprise a depiction of a modified text, while in response to a second contour the generated output video may comprise a depiction of the original text. In another example, in response to a first contour the generated output video may comprise a depiction of the original text or a modified text, while in response to a second contour the generated output video may comprise no depiction of the text. In yet another example, in response to a first contour the generated output video may comprise a depiction of a first modified text, while in response to a second contour the generated output video may comprise a depiction of a second modified text (where the second modified text differs from the first modified text).

In some examples, the at least one property of the depiction of the text comprises textual information included in the text. Further, in some examples, the modified text may include at least part of the text with different textual information. In another example, in response to first textual information the generated output video may comprise a depiction of a modified text, while in response to second textual information the generated output video may comprise a depiction of the original text. In another example, in response to first textual information the generated output video may comprise a depiction of the original text or a modified text, while in response to second textual information the generated output video may comprise no depiction of the text. In yet another example, in response to first textual information the generated output video may comprise a depiction of a first modified text, while in response to second textual information the generated output video may comprise a depiction of a second modified text (where the second modified text differs from the first modified text).

In some examples, the at least one property of the depiction of the text comprises a language register of the text. Further, in some examples, the modified text may include at least part of the text at a different language register. In another example, in response to a first language register the generated output video may comprise a depiction of a modified text, while in response to a second language register the generated output video may comprise a depiction of the original text. In another example, in response to a first language register the generated output video may comprise a depiction of the original text or a modified text, while in response to a second language register the generated output video may comprise no depiction of the text. In yet another example, in response to a first language register the generated output video may comprise a depiction of a first modified text, while in response to a second language register the generated output video may comprise a depiction of a second modified text (where the second modified text differs from the first modified text).

In some examples, the at least one property of the depiction of the text comprises a language of the text. Further, in some examples, the modified text may include at least part of the text in a different language. In another example, in response to a first language the generated output video may comprise a depiction of a modified text, while in response to a second language the generated output video may comprise a depiction of the original text. In another example, in response to a first language the generated output video may comprise a depiction of the original text or a modified text, while in response to a second language the generated output video may comprise no depiction of the text. In yet another example, in response to a first language the generated output video may comprise a depiction of a first modified text, while in response to a second language the generated output video may comprise a depiction of a second modified text (where the second modified text differs from the first modified text).

In some examples, the at least one property of the depiction of the text comprises a name included in the text, and the modification of the text may comprise modifying the name (for example, to a name associated with the user). In another example, in response to a first name the generated output video may comprise a depiction of a modified text, while in response to a second name the generated output video may comprise a depiction of the original text. In another example, in response to a first name the generated output video may comprise a depiction of the original text or a modified text, while in response to a second name the generated output video may comprise no depiction of the text. In yet another example, in response to a first name the generated output video may comprise a depiction of a first modified text, while in response to a second name the generated output video may comprise a depiction of a second modified text (where the second modified text differs from the first modified text).

In some examples, the personalized profile may be based, at least in part, on a geographical location associated with the user, and the modification to the text may be based, at least in part, on the geographical location associated with the user. For example, a language for the modified text may be selected according to the geographical location. In another example, a name in the modified text may be selected according to the geographical location. In yet another example, a language register in the modified text may be selected according to the geographical location. In an additional example, a color and/or a background color and/or a texture and/or a background texture and/or a size of the modified text may be selected according to the geographical location. In another example, in response to a first geographical location the generated output video may comprise a depiction of a modified text, while in response to a second geographical location the generated output video may comprise a depiction of the original text. In another example, in response to a first geographical location the generated output video may comprise a depiction of the original text or a modified text, while in response to a second geographical location the generated output video may comprise no depiction of the text. In yet another example, in response to a first geographical location the generated output video may comprise a depiction of a first modified text, while in response to a second geographical location the generated output video may comprise a depiction of a second modified text (where the second modified text differs from the first modified text).

In some examples, the personalized profile may be based, at least in part, on a cultural association of the user, and the modification to the text may be based, at least in part, on the cultural association of the user. For example, a language for the modified text may be selected according to the cultural association of the user. In another example, a name in the modified text may be selected according to the cultural association of the user. In yet another example, a language register in the modified text may be selected according to the cultural association of the user. In an additional example, a color and/or a background color and/or a texture and/or a background texture and/or a size of the modified text may be selected according to the cultural association of the user. In another example, in response to a first cultural association of the user the generated output video may comprise a depiction of a modified text, while in response to a second cultural association of the user the generated output video may comprise a depiction of the original text. In another example, in response to a first cultural association of the user the generated output video may comprise a depiction of the original text or a modified text, while in response to a second cultural association of the user the generated output video may comprise no depiction of the text. In yet another example, in response to a first cultural association of the user the generated output video may comprise a depiction of a first modified text, while in response to a second cultural association of the user the generated output video may comprise a depiction of a second modified text (where the second modified text differs from the first modified text).

In some examples, the personalized profile may be based, at least in part, on an age of the user, and the modification to the text may be based, at least in part, on the age of the user. For example, the age of the user may be characterized by an exact age, an age range, year of birth, "young", "old", "child", "teenager", "young adult", "adult", "elderly", "middle age", and so forth. For example, a language for the modified text may be selected according to the age. In another example, a name in the modified text may be selected according to the age. In yet another example, a language register in the modified text may be selected according to the age. In an additional example, a color and/or a background color and/or a texture and/or a background texture and/or a size of the modified text may be selected according to the age. In another example, in response to a first age the generated output video may comprise a depiction of a modified text, while in response to a second age the generated output video may comprise a depiction of the original text. In another example, in response to a first age the generated output video may comprise a depiction of the original text or a modified text, while in response to a second age the generated output video may comprise no depiction of the text. In yet another example, in response to a first age the generated output video may comprise a depiction of a first modified text, while in response to a second age the generated output video may comprise a depiction of a second modified text (where the second modified text differs from the first modified text).

In some examples, the personalized profile may be based, at least in part, on an emotional state of the user, and the modification to the text may be based, at least in part, on the emotional state of the user. Some examples of indication of emotional state of the user may comprise "happy", "sad", "excited", "tender", "scared", "angry", and so forth. For example, a language for the modified text may be selected according to the emotional state. In another example, a name in the modified text may be selected according to the emotional state. In yet another example, a language register in the modified text may be selected according to the emotional state. In an additional example, a color and/or a background color and/or a texture and/or a background texture and/or a size of the modified text may be selected according to the emotional state. In another example, in response to a first emotional state the generated output video may comprise a depiction of a modified text, while in response to a second emotional state the generated output video may comprise a depiction of the original text. In another example, in response to a first emotional state the generated output video may comprise a depiction of the original text or a modified text, while in response to a second emotional state the generated output video may comprise no depiction of the text. In yet another example, in response to a first emotional state the generated output video may comprise a depiction of a first modified text, while in response to a second emotional state the generated output video may comprise a depiction of a second modified text (where the second modified text differs from the first modified text).

In some embodiments, systems and methods for generating personalized videos with selective background modification are provided. In some embodiments, input video including at least a background may be obtained. Further, a personalized profile associated with a user may be obtained. Further, the input video may be analyzed to identify a portion of the input video depicting the background. Further, the personalized profile may be used to select a modification of the background. Further, the selected modification of the background and/or the identified portion of the input video may be used to modify a depiction of the background in the input video to generate an output video. For example, the user may be a prospective viewer of the output video, may be a photographer of at least part of the input video, may be an editor of at least part of the input video, and so forth.

In some examples, the output video may be displayed to the user, may be stored in memory, may be transmitted over a communication network using a communication device, may be provided to an external device, may be posted on a blockchain, may be posted on a website, and so forth. In some examples, input video including at least a background may be obtained. For example, the input video may be obtained as described above. In some examples, a personalized profile associated with a user may be obtained. For example, the personalized profile may be obtained as described above.

In some examples, the input video may be analyzed to identify a portion of the input video depicting the background. For example, a machine learning model may be trained using training examples to identify background portions of images and/or videos, and the trained machine learning model may be used to identify the portion of the input video depicting the background. In another example, an artificial neural network may be configured to identify background portions of images and/or videos, and the artificial neural network may be used to identify the portion of the input video depicting the background.

In some examples, the personalized profile may be used to select a modification of the background. For example, a machine learning model may be trained using training examples to select modifications to backgrounds based on user profiles, and the trained machine learning model may be used to select the modification of the background based on the personalized profile. In another example, an artificial neural network may be configured to select modifications to backgrounds based on user profiles, and the artificial neural network may be used to select the modification of the background based on the personalized profile.

In some examples, the selected modification of the background and/or the identified portion of the input video may be used to modify a depiction of the background in the input video to generate an output video. In some examples, the modification of the depiction of the background may include a modification to a part of the identified background of the input video (for example, replacing the part of the identified background with a different background, modifying the part of the identified background as described below, and so forth). For example, the modified part may be at most 80% of the identified background, at most 60% of the identified background, at most 40% of the identified background, at most 20% of the identified background, at most 10% of the identified background, at most 5% of the identified background, at most 1% of the identified background, at least 10% of the identified background, at least 20% of the identified background, at least 40% of the identified background, at least 60% of the identified background, at least 80%, and so forth. In some examples, the modification of the depiction of the background may include a modification of a color scheme of at least part of the identified portion of the input video.

In some examples, modifying the depiction of the background may include replacing at least part of the background with a depiction of a room related to the user and selected according to the personalized profile. Some examples of such room may include an office of the user, a room from the home of the user, a childhood room of the user, and so forth.

In some examples, modifying the depiction of the background may include replacing at least part of the background with a depiction associated with a geographical location selected according to the personalized profile. Some example of such geographical location may include a home country, a country the user wishes to visit, a location of the user, a destination of the user, a location that the user showed interest in, a location of the home of the user, a hometown of the user, a work location of the user, a location frequent by the user, and so forth.

In some examples, modifying the depiction of the background may include replacing at least part of the background with a depiction associated with a temporal era selected according to the personalized profile. Some example of such temporal era may include a specific year, a range of years, "1920's", "1930's", "1940's", "1950's", "1960's", "1970's", "1980's", "1990's", "2000's", "2010's", "2020's", "nowadays", "ancient", "modern", "futuristic", and so forth.

In some examples, modifying the depiction of the background may include modifying the background to correspond to a different time of day. Some examples of such time of day may include day time, night time, midday, morning, evening, afternoon, sunrise, sunset, and so forth. For example, the background may be modified to represent different lighting conditions, different location of the sun, and so forth. In another example, a clock depicted in the background may be modified according to the different time.

In some examples, modifying the depiction of the background may include modifying the background to correspond to a different weather. Some examples of such weather may include cloudy, sunny, rainy, snowy, tropic, polar, and so forth. In some examples, modifying the depiction of the background may include modifying the background to correspond to a different season. Some examples of such season may include winter, spring, summer and fall.

In some embodiments, systems and methods for generating personalized videos with selective modifications are presented. In some embodiments, input video including two or more parts of frame may be obtained. Further, in some examples, personalized profile associated with a user may be obtained. Further, in some examples, the input video may be analyzed to determine at least one property of each part of frame of a group of at least two parts of frame comprising the two or more parts of frame. Further, in some examples, the personalized profile and/or the determined properties may be used to select a first part of frame of the group of at least two parts of frame, where the group of at least two parts of frame also includes a second part of frame. Further, in some examples, the personalized profile may be used to generate a modified version of a depiction from the first part of frame from the input video. Further, in some examples, in response to the selection of the first part of frame, an output video including an original depiction from the second part of frame from the input video and the generated modified version from the depiction of the first part of frame may be generated. For example, the user may be a prospective viewer of the output video, may be a photographer of at least part of the input video, may be an editor of at least part of the input video, and so forth.

In some examples, the output video may be displayed to the user, may be stored in memory, may be transmitted over a communication network using a communication device, may be provided to an external device, may be posted on a blockchain, may be posted on a website, and so forth. In some examples, input video including two or more parts of frame may be obtained. For example, the input video may be obtained as described above. In some examples, personalized profile associated with a user may be obtained. For example, the personalized profile may be obtained as described above.

In some examples, the input video may be analyzed to determine at least one property of each part of frame of a group of at least two parts of frame comprising the two or more parts of frame. For example, a machine learning model may be trained using training examples to determine properties of parts of frames from images and/or videos, and the trained machine learning model may be used to determine the at least one property of each part of frame from the input video. In another example, an artificial neural network may be configured to determine properties of parts of frames from images and/or videos, and the artificial neural network may be used to determine the at least one property of each part of frame from the input video.

In some examples, the personalized profile and/or the determined properties may be used to select a first part of frame of the group of at least two parts of frame. For example, a machine learning model may be trained using training examples to select part of frame based on user profiles and/or properties of parts of frames, and the trained machine learning model may be used to select the first part of frame of the group of at least two parts of frame based on the personalized profile and/or the determined properties. In another example, an artificial neural network may be configured to select part of frame based on user profiles and/or properties of parts of frames, and the artificial neural network may be used to select the first part of frame of the group of at least two parts of frame based on the personalized profile and/or the determined properties.

In some examples, the personalized profile may be used to generate a modified version of a depiction from the first part of frame from the input video. For example, a machine learning model may be trained using training examples to modify a depiction in a part of a frame based on user profiles, and the trained machine learning model may be used to generate the modified version of the depiction from the first part of frame from the input video based on the personalized profile. In another example, an artificial neural network may be configured to modify a depiction in a part of a frame based on user profiles, and the artificial neural network may be used to generate the modified version of the depiction from the first part of frame from the input video based on the personalized profile.

In some examples, in response to the selection of the first part of frame, an output video including an original depiction from the second part of frame from the input video and the generated modified version from the depiction of the first part of frame may be generated.

In some examples, the at least one property of first part of frame and/or the at least one property of the second part of frame may comprise information related to colors depicted in the part of frame. Further, a part of the frame may be selected of the first part and the second part based, at least in part, on the information related to the colors depicted in the parts of the frames.

In some examples, the at least one property of first part of frame and/or the at least one property of the second part of frame may comprise information related to size of an object depicted in the part of frame. Further, a part of the frame may be selected of the first part and the second part based, at least in part, on the information related to the size of the object depicted in the part of frame.

In some examples, the at least one property of first part of frame and/or the at least one property of the second part of frame may comprise information related to a type of an object depicted in the part of frame. Further, a part of the frame may be selected of the first part and the second part based, at least in part, on the information related to the type of the object depicted in the part of frame.

In some examples, the at least one property of first part of frame and/or the at least one property of the second part of frame may comprise information related to a shape of an object depicted in the part of frame. Further, a part of the frame may be selected of the first part and the second part based, at least in part, on the information related to the shape of the object depicted in the part of frame.

In some examples, the at least one property of first part of frame and/or the at least one property of the second part of frame may comprise information related to a property of an object depicted in the part of frame. Further, a part of the frame may be selected of the first part and the second part based, at least in part, on the information related to the property of the object depicted in the part of frame.

In some examples, the at least one property of first part of frame and/or the at least one property of the second part of frame may comprise information related to texture depicted in the part of frame. Further, a part of the frame may be selected of the first part and the second part based, at least in part, on the information related to the texture depicted in the part of frame.

In some examples, a summary of changes between the input video and the output video may be generated. For example, the generated summary includes visual depiction of at least some of the changes. In another example, the generated summary includes textual description of at least some of the changes.

In some embodiments, systems and methods for selectively removing people from videos are provided. In some embodiments, input video including at least a depiction of a first person and a depiction of a second person may be obtained. Further, in some examples, the input video may be analyzed to identify the first person and the second person. Further, in some examples, one person may be selected of the first person and the second person, for example based on the identity of the first person and the identity of the second person. Further, in some examples, for example in response to the selection of the one person, an output video including a depiction of the person not selected of the first person and the second person and not including a depiction of the selected person may be generated. In some examples, input video including at least a depiction of a first person and a depiction of a second person may be obtained. For example, the input video may be obtained as described above.

In some examples, the input video may be analyzed to identify the first person and the second person. For example, face recognition algorithms may be used to identify the first person and/or the second person from the input video. In another example, a machine learning model may be trained using training examples to identify persons from images and/or videos, and the trained machine learning model may be used to identify the first person and/or the second person from the input video. In yet another example, an artificial neural network may be configured to identify persons from images and/or videos, and the artificial neural network may be used to identify the first person and/or the second person from the input video.

In some examples, one person may be selected of the first person and the second person, for example based on the identity of the first person and the identity of the second person. For example, a machine learning model may be trained using training examples to select a person of a group of persons based on the identity of at least part of the persons, and the trained machine learning model may be used to select the person of the first person and the second person. In another example, an artificial neural network may be configured to select a person of a group of persons based on the identity of at least part of the persons, and the artificial neural network may be used to select the person of the first person and the second person.

In some examples, for example in response to the selection of the one person, an output video including a depiction of the person not selected of the first person and the second person and substantially not including a depiction of the selected person may be generated. Equivalently, for example in response to the selection of the one person, an output video including a depiction of the selected person and substantially not including a depiction of the person not selected of the first person and the second person may be generated. For example, a segment of the input video depicting the person not to be included in the output video may be identified (for example using video segmentation algorithms, using a machine learning model trained to detect segments of images and/or videos depicting persons in images and/or videos, using an artificial neural network configured to detect segments of images and/or videos depicting persons in images and/or videos, and so forth), and the identified segment may be removed from the input video and inpainted (for example, using images and/or videos inpainting algorithms) to generate the output video.

In some embodiments, information on a group of persons may be accessed, and the accessed information may be used to determine that the first person is in the group and that the second person is not in the group. In one example, in response to the determination that the first person is in the group and that the second person is not in the group, it may be determined that the selected one person is the first person. In another example, in response to the determination that the first person is in the group and that the second person is not in the group, it may be determined that the selected one person is the second person. In some examples, the accessed information may include a list of people in the group. In another example, the accessed information may include properties of people in the group. In some examples, the group of persons may include family members of a user, may include associates of a user, may include friends of a user, may include known celebrities, may include people of a selected age group, may include people of a select gender, and so forth.

In some embodiments, systems and methods for selectively removing objects from videos are provided. In some embodiments, input video including at least a depiction of a first object and a depiction of a second object may be obtained. Further, in some examples, the input video may be analyzed to identify the first object and the second object. Further, in some examples, one object may be selected of the first object and the second object, for example based on the identity of the first object and the identity of the second object. Further, in some examples, an output video including a depiction of the object not selected of the first object and the second object and not including a depiction of the selected object may be generated, for example in response to the selection of the one object. In some examples, input video including at least a depiction of a first object and a depiction of a second object may be obtained. For example, the input video may be obtained as described above.

In some examples, the input video may be analyzed to identify the first object and the second object. For example, object recognition algorithms may be used to identify the first object and/or the second object from the input video. In another example, a machine learning model may be trained using training examples to identify objects from images and/or videos, and the trained machine learning model may be used to identify the first object and/or the second object from the input video. In yet another example, an artificial neural network may be configured to identify objects from images and/or videos, and the artificial neural network may be used to identify the first object and/or the second object from the input video.

In some examples, one object may be selected of the first object and the second object, for example based on the identity of the first object and the identity of the second object. For example, a machine learning model may be trained using training examples to select an object of a group of objects based on the identity of at least part of the objects, and the trained machine learning model may be used to select the object of the first object and the second object. In another example, an artificial neural network may be configured to select an object of a group of objects based on the identity of at least part of the objects, and the artificial neural network may be used to select the object of the first object and the second object.

In some examples, for example in response to the selection of the one object, an output video including a depiction of the object not selected of the first object and the second object and substantially not including a depiction of the selected object may be generated. Equivalently, for example in response to the selection of the one object, an output video including a depiction of the selected object and substantially not including a depiction of the object not selected of the first object and the second object may be generated. For example, a segment of the input video depicting the object not to be included in the output video may be identified (for example using video segmentation algorithms, using a machine learning model trained to detect segments of images and/or videos depicting objects in images and/or videos, using an artificial neural network configured to detect segments of images and/or videos depicting objects in images and/or videos, and so forth), and the identified segment may be removed from the input video and inpainted (for example, using images and/or videos inpainting algorithms) to generate the output video.

In some embodiments, information on a group of objects may be accessed, and the accessed information may be used to determine that the first object is in the group and that the second object is not in the group. In one example, in response to the determination that the first object is in the group and that the second object is not in the group, it may be determined that the selected one object is the first object. In another example, in response to the determination that the first object is in the group and that the second object is not in the group, it may be determined that the selected one object is the second object. For example, the accessed information may include a list of objects in the group. In another example, the accessed information may include types of objects in the group. In yet another example, the accessed information may include properties of objects in the group.

In some embodiments, systems and methods for generating personalized videos from textual information are provided. In some embodiments, textual information may be obtained. Further, in some examples, a personalized profile associated with a user may be obtained. Further, in some examples, the personalized profile may be used to select at least one characteristic of a character. Further, in some examples, the textual information may be used to generate an output video using the selected at least one characteristic of the character. For example, the user may be a prospective viewer of the output video, may be a photographer of at least part of the input video, may be an editor of at least part of the input video, and so forth.

In some examples, the output video may be displayed to the user, may be stored in memory, may be transmitted over a communication network using a communication device, may be provided to an external device, may be posted on a blockchain, may be posted on a website, and so forth. In some examples, textual information may be obtained. For examples, the textual information may be read from memory, received through a communication network using a communication device, received from an external device, generated, and so forth. In some examples, a personalized profile associated with a user may be obtained. For example, the personalized profile may be obtained as described above.

In some examples, the personalized profile may be used to select at least one characteristic of a character. For example, a machine learning model may be trained using training examples to select characteristics of a characters based on user profiles, and the trained machine learning model may be used to select the at least one characteristic of a character based on the personalized profile. In another example, an artificial neural network may be configured to select characteristics of a characters based on user profiles, and the artificial neural network may be used to select the at least one characteristic of a character based on the personalized profile.

In some examples, the textual information may be used to generate an output video using the selected at least one characteristic of the character. For example, a machine learning model may be trained using training examples to generate videos from textual information and/or characteristics of characters, and the trained machine learning model may be used to generate the output video from the textual information and/or the selected at least one characteristic of the character. In another example, an artificial neural network may be configured to generate videos from textual information and/or characteristics of characters, and the artificial neural network may be used to generate the output video from the textual information and/or the selected at least one characteristic of the character.

In some examples, the textual information may comprise at least a text to be spoken by the character, and the generated output video may depict the character with the selected at least one characteristic saying the text.

In some examples, the textual information may comprise at least a dialog between two characters, the personalized profile may be used to select at least one characteristic of the second character (for example, as described above with relation to the at least one characteristic of the first character), and the output video may be generated to depict the character with the selected at least one characteristic of the character speaking with the second character with the selected at least one characteristic of the second character according to the dialog.

In some examples, the textual information may comprise at least a description of an action of the character, and the generated output video may depict the character with the selected at least one characteristic performing the described action.

In some examples, the textual information may comprise at least a description of a location of the character, and the generated output video may depict the character with the selected at least one characteristic at the described location.

In some examples, the personalized profile may be used to select a background, and the output video may be generated to depict the character with the selected at least one characteristic over the selected background.

In some examples, the personalized profile may be used to select an object, and the output video may be generated to depict the character with the selected at least one characteristic with the selected object.

Figure 29:
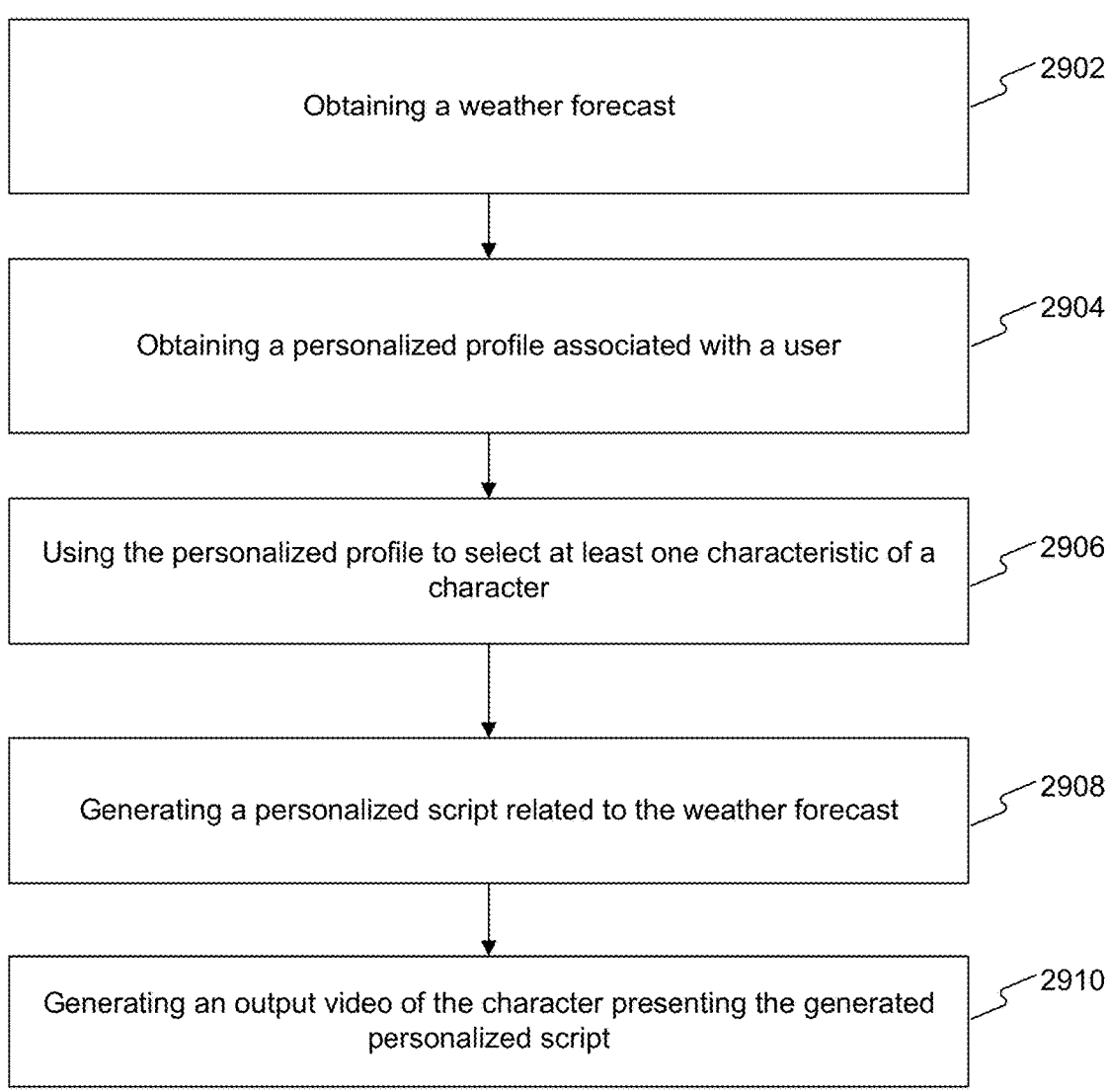
FIG. 29 is a flowchart of an example method for generating personalized weather forecast videos, in accordance with some embodiments of the disclosure.

FIG. 29 is a flowchart of an example method 2900 for generating personalized weather forecast videos. In this example, method 2900 may comprise: obtaining a weather forecast (step 2902); obtaining a personalized profile associated with a user (step 2904); using the personalized profile to select at least one characteristic of a character (step 2906); generating a personalized script related to the weather forecast (step 2908); and generating an output video of the character presenting the generated personalized script (step 2910). For example, the user may be a prospective viewer of the output video, may be a photographer of at least part of an input video, may be an editor of at least part of the output video, and so forth. In some implementations, method 2900 may comprise one or more additional steps, while some of the steps listed above may be modified or excluded. In some implementations, one or more steps illustrated in FIG. 29 may be executed in a different order and/or one or more groups of steps may be executed simultaneously and vice versa.

In some examples, step 2902 may comprise obtaining a weather forecast. For example, Step 2902 may read the weather forecast from memory, may receive the weather forecast through a communication network using a communication device, may receive the weather forecast from an external device, may receive the weather forecast from a user, may generate the weather forecast (for example, based on satellite images, based on weather radar images, etc.), and so forth.

In some examples, step 2904 may comprise obtaining a personalized profile associated with a user. For example, step 2904 may read the personalized profile from memory, may receive the personalized profile through a communication network using a communication device, may receive the personalized profile from an external device, may receive the personalized profile from a user, and so forth. For example, the personalized profile may be based on past behavior of the user, on a type of the user, on demographic characteristics of the user, on socio-economical characteristics of the user, on a location of the user, and so forth.

In some examples, step 2906 may comprise using the personalized profile to select at least one characteristic of a character. For example, a machine learning model may be trained using training examples to select characteristics of a characters based on user profiles, and step 2906 may use the trained machine learning model to select the at least one characteristic of a character based on the personalized profile. An example of such training example may include a user profile, together with a desired selection of characteristics. In another example, an artificial neural network may be configured to select characteristics of a characters based on user profiles, and step 2906 may use the artificial neural network to select the at least one characteristic of a character based on the personalized profile. For example, the personalized profile may include characteristics of past characters selected and/or liked by the user, and step 2906 may select the at least one characteristic of a character based on the characteristics of the past characters. In another example, users similar to the user may be identified based on a similarity function between the personalized profile of the user and personalized profiles of other users, and step 2906 may select the at least one characteristic of a character based on the identified users. In yet another example, a type of user may be determined based on the personalized profile, and step 2906 may select the at least one characteristic of a character based on the determined type of user. In one example, in response to a first personalized profile, step 2906 may select a first characteristic of a character, and in response to a second personalized profile, step 2906 may select a second characteristic of a character.

In some examples, the personalized profile obtained by step 2904 may be based, at least in part, on a geographical location associated with the user, and step 2906 may select of at least one characteristic of the character based, at least in part, on the geographical location associated with the user. For example, the personalized profile may include an indication of a geographical location associated with the user, such as a current location, a home address, a work address, a home country, a country the user wishes to visit, a destination of the user, a location that the user showed interest in, a hometown of the user, a location frequent by the user, and so forth. Further, in response to a first indication of a geographical location, step 2906 may select a first characteristic of the character, and in response to a second indication of a geographical location, step 2906 may select a second characteristic of the character, the second characteristic of the character may differ from the first characteristic of the character.

In some examples, the personalized profile obtained by step 2904 may be based, at least in part, on a cultural association of the user, and Step 2906 may select the at least one characteristic of the character based, at least in part, on the cultural association of the user. For example, in response to a first cultural association of the user, 2906 may select a first characteristic of the character, and in response to a second cultural association of the user, 2906 may select a second characteristic of the character, the second characteristic of the character may differ from the first characteristic of the character.

In some examples, the personalized profile obtained by step 2904 may be based, at least in part, on a past behavior of the user, and Step 2906 may select the at least one characteristic of the character based, at least in part, on the past behavior of the user. In some examples, the personalized profile obtained by step 2904 may be based, at least in part, on an age of the user, and Step 2906 may select the least one characteristic of the character based, at least in part, on the age of the user. In some examples, the personalized profile obtained by step 2904 may be based, at least in part, on an emotional state of the user, and Step 2906 may select the at least one characteristic of the character based, at least in part, on the emotional state of the user.

In some examples, step 2908 may comprise generating a personalized script related to the weather forecast, for example using the personalized profile obtained using step 2904 and the weather forecast obtained using step 2902. For example, a machine learning model may be trained using training examples to generate scripts from weather forecasts and/or user profiles, and step 2908 may use the trained machine learning model to generate the personalized script from the personalized profile and/or the weather forecast. An example of such training example may include a user profile and/or a weather forecast, together with a desired personalized script. In another example, an artificial neural network may be configured to generate scripts from weather forecasts and/or user profiles, and step 2908 may use the artificial neural network to generate the personalized script from the personalized profile and/or the weather forecast. In yet another example, step 2908 may use NLP algorithms to generate the personalized script from the personalized profile and/or the weather forecast.

In some examples, the personalized profile obtained by step 2904 may be based, at least in part, on a geographical location associated with the user, and the personalized script generated by step 2908 may be based, at least in part, on the geographical location associated with the user. For example, the personalized profile may include an indication of a geographical location associated with the user, such as a current location, a home address, a work address, a home country, a country the user wishes to visit, a destination of the user, a location that the user showed interest in, a hometown of the user, a location frequent by the user, and so forth. For example, Step 2908 may generate a personalized script corresponding to a weather forecast related to the geographical location. In another example, Step 2908 may generate a personalized script corresponding to a comparison of the weather forecast with a typical weather at the geographical location. In one example, in response to a first indication of a geographical location, step 2908 may generate a first personalized script, and in response to a second indication of a geographical location, step 2908 may generate a second personalized script, the second personalized script may differ from the first personalized script.

In some examples, the personalized profile obtained by step 2904 may be based, at least in part, on a cultural association of the user, and Step 2908 may generate a personalized script based, at least in part, on the cultural association of the user. For example, in response to a first cultural association, step 2908 may generate a first personalized script, and in response to a second cultural association, step 2908 may generate a second personalized script, the second personalized script may differ from the first personalized script.

In some examples, the personalized profile obtained by step 2904 may be based, at least in part, on a past behavior of the user, and Step 2908 may generate the personalized script based, at least in part, on the past behavior of the user. In some examples, the personalized profile obtained by step 2904 may be based on an age of the user, and Step 2908 may generate the personalized script based on the age of the user. In some examples, the personalized profile obtained by step 2904 may be based, at least in part, on an emotional state of the user, and Step 2908 may generate the personalized script based, at least in part, on the emotional state of the user.

In some examples, step 2910 may comprise generating a video of the character presenting the generated personalized script, for example using the at least one characteristic of a character selected by step 2906 and the generated personalized script generated by step 2908. For example, step 2910 may generate the video using step 470. In another example, a machine learning model may be trained using training examples to generate videos of characters presenting scripts from characteristics of characters and/or scripts, and step 2910 may use the trained machine learning model to generate the output video from the selected at least one characteristic of a character and/or the generated personalized script. An example of such training example may include characteristics of a character and a script, together with a corresponding desired video. In an additional example, an artificial neural network may be configured to generate videos of characters presenting scripts from characteristics of characters and/or scripts, and step 2910 may use the artificial neural network to generate the output video from the selected at least one characteristic of a character and/or the generated personalized script. In yet another example, step 2910 may stitch a depiction of the character with the at least one characteristic presenting the generated personalized script over a background (for example, using image and/or video stitching algorithms, using image and/or video matting algorithms, and so forth) to generate the output video. For example, the background may include a depiction of a newsroom, may include a depiction of a news studio, may include a depiction related to the weather forecast (for example, an image and/or a video of a location related to the weather forecast, a map related to the weather forecast, a graphical presentation of a weather forecast for a plurality of future days, a graphical summary related to the weather in past days, a graphic presentation of the current weather, and so forth). In another example, the background may be selected using any other technique, including the techniques described herein. For example, the background for the generated output video may be selected based on the personalized profile, based on a geographical location associated with the user, based on a cultural association of the user, based on a past behavior of the user, based on an age of the user, based on an indication of an emotional state of the user, and so forth.

In some examples, the at least one characteristic of the character selected by step 2906 may comprise a color scheme of at least part of the character, and step 2910 may use the color scheme to generate the output video. Some examples of such color scheme may include a color scheme of the entire character, a color scheme of a clothing item of the character, a color scheme of the hair of the character, a color scheme of the skin of the character, a color scheme of the eyes of the character, a color scheme of a selected portion of the character, and so forth. For example, the trained machine learning model described above may be further trained to generate the output video based on the color scheme. In another example, the artificial neural network described above may be further configured to generate the output video based on the color scheme.

In some examples, the at least one characteristic of the character selected by step 2906 may comprise a size of at least part of the character, and step 2910 may use the size to generate the output video. Some examples of such size may include size of a body part of the character (such as head, eyes, hands, torso, legs, hair, etc.), size of the entire character, size of a selected portion of the character, size of a clothing item of the character, and so forth. For example, the trained machine learning model described above may be further trained to generate the output video based on the size. In another example, the artificial neural network described above may be further configured to generate the output video based on the size.

In some examples, the at least one characteristic of the character selected by step 2906 may comprise a texture of at least part of the character, and step 2910 may use the texture to generate the output video. Some examples of such texture may include a texture of at least part of the character, such as a texture of the entire character, a texture of a clothing item of the character, a texture of the hair of the character, a texture of the skin of the character, a texture of the eyes of the character, a texture of a selected portion of the character, and so forth. For example, the trained machine learning model described above may be further trained to generate the output video based on the texture. In another example, the artificial neural network described above may be further configured to generate the output video based on the texture.

In some examples, the at least one characteristic of the character may comprise a gender of the character, and step 2910 may use the gender to generate the output video. For example, the trained machine learning model described above may be further trained to generate the output video based on the gender. In another example, the artificial neural network described above may be further configured to generate the output video based on the gender.

In some examples, the at least one characteristic of the character selected by step 2906 may comprise a species of the character, and step 2910 may use the species to generate the output video. For example, the trained machine learning model described above may be further trained to generate the output video based on the species. In another example, the artificial neural network described above may be further configured to generate the output video based on the species.

In some examples, the at least one characteristic of the character selected by step 2906 may comprise a shape of at least part of the character, and step 2910 may use the shape to generate the output video. Some examples of such shape may include a shape of at least part of the character, such as a shape of the entire character, shape of a clothing item of the character, shape of the hair of the character, shape of the skin of the character, shape of the eyes of the character, shape of a selected portion of the character, and so forth. For example, the trained machine learning model described above may be further trained to generate the output video based on the shape. In another example, the artificial neural network described above may be further configured to generate the output video based on the shape.

In some examples, the at least one characteristic of the character selected by step 2906 may comprise a characteristic of a voice of the character, and step 2910 may use the characteristic of the voice to generate the output video. Some examples of such characteristic of the voice of the character may include pitch (such as pitch range), prosody, register, gender of the voice, a selection of the voice of a plurality of alternative voices, and so forth. For example, the trained machine learning model described above may be further trained to generate the output video based on the characteristic of the voice. In another example, the artificial neural network described above may be further configured to generate the output video based on the characteristic of the voice.

In some examples, the at least one characteristic of the character selected by step 2906 may comprise a characteristic of an age of the character, and step 2910 may use the characteristic of the age to generate the output video. Some examples of such characteristic of the age of the character may include an exact age, an age range, "young", "old", "child", "teenager", "young adult", "adult", "elderly", "middle age", and so forth. For example, the trained machine learning model described above may be further trained to generate the output video based on the characteristic of the age. In another example, the artificial neural network described above may be further configured to generate the output video based on the characteristic of the age.

In some examples, the at least one characteristic of the character selected by step 2906 may comprise a temporal era, and step 2910 may use the temporal era to generate the output video. Some examples of the temporal era may include a year, a range of years, "1920's", "1930's", "1940's", "1950's", "1960's", "1970's", "1980's", "1990's", "2000's", "2010's", "2020's", "nowadays", "ancient", "modern", "futuristic", and so forth. For example, the trained machine learning model described above may be further trained to generate the output video based on the temporal era. In another example, the artificial neural network described above may be further configured to generate the output video based on the temporal era.

In some examples, the at least one characteristic of the character selected by step 2906 may comprise a modesty level, and step 2910 may use the modesty level to generate the output video. Some examples of such modesty level may include "casual", "flirty", an indication of an amount of skin revealed, an indication of how revealing the avatar outfit is, "TV-Y", "TV-Y7", "TV-G", "TV-PG", "TV-14" or "TV-MA", an indication of how violence the avatar should present, an indication of the level of coarse language the avatar should use, and so forth. For example, the trained machine learning model described above may be further trained to generate the output video based on the modesty level. In another example, the artificial neural network described above may be further configured to generate the output video based on the modesty level.

In some examples, the at least one characteristic of the character selected by step 2906 may comprise an emotional state, and step 2910 may use the emotional state to generate the output video. Some examples of such emotional state may include "joyful", "grieving", "fearful", "angry", "flirty", "friendly", and so forth. For example, the trained machine learning model described above may be further trained to generate the output video based on the emotional state. In another example, the artificial neural network described above may be further configured to generate the output video based on the emotional state.

In some examples, the at least one characteristic of the character selected by step 2906 may comprise a characteristic of a hair style of the character, and step 2910 may use the characteristic of the hair style to generate the output video. For example, the trained machine learning model described above may be further trained to generate the output video based on the characteristic of the hair style. In another example, the artificial neural network described above may be further configured to generate the output video based on the characteristic of the hair style.

In some examples, the at least one characteristic of the character selected by step 2906 may comprise a characteristic of at least one clothing item of the character, and step 2910 may use the characteristic of the at least one clothing item to generate the output video. For example, the trained machine learning model described above may be further trained to generate the output video based on the characteristic of the at least one clothing item. In another example, the artificial neural network described above may be further configured to generate the output video based on the characteristic of the at least one clothing item.

In some examples, step 2910 may use the at least one characteristic of the character selected by step 2906 to select a person of a plurality of alternative persons. For example, the selected person may be a person known to the user, the selected person may be a family member of the user, and so forth. Further, step 2910 may generate the output video to depict the selected person presenting the generated personalized script.

In some examples, method 2900 may further include providing the output video generated by step 2910. For example, the output video generated by step 2910 may be displayed to the user, may be stored in memory, may be transmitted over a communication network using a communication device, may be provided to an external device, may be posted on a blockchain, may be posted on a website, and so forth.

In some embodiments, systems and methods for generating personalized news videos are provided. In some embodiments, news information may be obtained. Further, in some examples, a personalized profile associated with a user may be obtained. Further, in some examples, the personalized profile may be used to select at least one characteristic of a character. Further, in some examples, the personalized profile and/or the news information may be used to generate a personalized script related to the news information. Further, in some examples, the selected at least one characteristic of a character and/or the generated personalized script may be used to generate an output video of the character presenting the generated personalized script. For example, the user may be a prospective viewer of the output video, may be a photographer of at least part of an input video, may be an editor of at least part of the output video, and so forth.

In some examples, the generated output video may be displayed to the user, may be stored in memory, may be transmitted over a communication network using a communication device, may be provided to an external device, may be posted on a blockchain, may be posted on a website, and so forth. In some examples, news information may be obtained. For example, news information may be read from memory, received through a communication network using a communication device, received from an external device, generated, and so forth. In some examples, a personalized profile associated with a user may be obtained. For example, the personalized profile may be obtained as described above.

In some examples, the personalized profile may be used to select at least one characteristic of a character. For example, a machine learning model may be trained using training examples to select characteristics of characters based on user profiles, and the trained machine learning model may be used to select the at least one characteristic of the character based on the personalized profile. In another example, an artificial neural network may be configured to select characteristics of characters based on user profiles, and the artificial neural network may be used to select the at least one characteristic of the character based on the personalized profile.

In some examples, the personalized profile and/or the news information may be used to generate a personalized script related to the news information. For example, a machine learning model may be trained using training examples to generate scripts from user profiles and/or news information, and the trained machine learning model may be used to generate the personalized script related to the news information from the personalized profile and/or the news information. In another example, an artificial neural network may be configured to generate scripts from user profiles and/or news information, and the artificial neural network may be used to generate the personalized script related to the news information from the personalized profile and/or the news information.

In some examples, the selected at least one characteristic of a character and/or the generated personalized script may be used to generate an output video of the character presenting the generated personalized script. For example, a machine learning model may be trained using training examples to generate videos of characters presenting scripts from characteristics of characters and/or scripts, and the trained machine learning model may be used to generate the output video of the character presenting the generated personalized script from the selected at least one characteristic of the character and/or the generated personalized script. In another example, an artificial neural network may be configured to generate videos of characters presenting scripts from characteristics of characters and/or scripts, and the artificial neural network may be used to generate the output video of the character presenting the generated personalized script from the selected at least one characteristic of the character and/or the generated personalized script. In yet another example, a depiction of the character with the at least one characteristic presenting the generated personalized script may be stitched over a background (for example, using image and/or video stitching algorithms, using image and/or video matting algorithms, and so forth) to generate the output video. For example, the background may include a depiction of a newsroom, may include a depiction of a news studio, may include a depiction related to the news information (for example, an image and/or a video of a person related to the news information, an image and/or a video of a location related to the news information, an image and/or a video related to the subject of the news information, a map related to the news information, a graph related to the news information, and so forth). In another example, the background may be selected as described herein.

In some examples, the at least one characteristic of the character may comprise a color scheme of at least part of the character, and the color scheme may be used to generate the output video. In some examples, the at least one characteristic of the character may comprise a size of at least part of the character, and the size may be used to generate the output video. In some examples, the at least one characteristic of the character may comprise a texture of at least part of the character, and the texture may be used to generate the output video. In some examples, the at least one characteristic of the character may comprise a gender of the character, and the gender may be used to generate the output video. In some examples, the at least one characteristic of the character may comprise a species of the character, and the species may be used to generate the output video. In some examples, the at least one characteristic of the character may comprise a shape of at least part of the character, and the shape may be used to generate the output video. In some examples, the at least one characteristic of the character may comprise a characteristic of a voice of the character, and the characteristic of the voice may be used to generate the output video.

In some examples, the at least one characteristic of the character may comprise a characteristic of an age of the character, and the characteristic of the age may be used to generate the output video. In some examples, the at least one characteristic of the character may comprise a temporal era, and the temporal era may be used to generate the output video. In some examples, the at least one characteristic of the character may comprise a modesty level, and the modesty level may be used to generate the output video. In some examples, the at least one characteristic of the character may comprise an emotional state, and the emotional state may be used to generate the output video. In some examples, the at least one characteristic of the character may comprise a characteristic of a hair style of the character, and the characteristic of the hair style may be used to generate the output video. In some examples, the at least one characteristic of the character may comprise a characteristic of at least one clothing item of the character, and the characteristic of the at least one clothing item may be used to generate the output video. In some examples, the at least one characteristic of the character may be used to select a person of a plurality of alternative persons. For example, the selected person may be a person known to the user, the selected person may be a family member of the user, and so forth. Further, the output video may be generated to depict the selected person presenting the generated personalized script.

In some examples, the personalized profile may be based, at least in part, on a geographical location associated with the user, and the selection of the at least one characteristic of the character may be based, at least in part, on the geographical location associated with the user. In some examples, the personalized profile may be based, at least in part, on a geographical location associated with the user, and the generated personalized script may be based, at least in part, on the geographical location associated with the user. In some examples, the personalized profile may be based, at least in part, on a cultural association of the user, and the selection of at least one characteristic of the character may be based, at least in part, on the cultural association of the user. In some examples, the personalized profile may be based, at least in part, on a cultural association of the user, and the generated personalized script may be based, at least in part, on the cultural association of the user. In some examples, the personalized profile may be based, at least in part, on a past behavior of the user, and the selection of at least one characteristic of the character may be based, at least in part, on the past behavior of the user. In some examples, the personalized profile may be based, at least in part, on a past behavior of the user, and the generated personalized script may be based, at least in part, on the past behavior of the user. In some examples, the personalized profile may be based, at least in part, on an age of the user, and the selection of at least one characteristic of the character may be based, at least in part, on the age of the user. In some examples, the personalized profile may be based, at least in part, on an age of the user, and the generated personalized script may be based, at least in part, on the age of the user. In some examples, the personalized profile may be based, at least in part, on an emotional state of the user, and the selection of at least one characteristic of the character may be based, at least in part, on the emotional state of the user. In some examples, the personalized profile may be based, at least in part, on an emotional state of the user, and the generated personalized script may be based, at least in part, on the emotional state of the user. In some examples, the personalized profile may be used to select a background for the generated output video. In some examples, a geographical location associated with the user may be used to select a background for the generated output video.

In some examples, a cultural association of the user may be used to select a background for the generated output video. In some examples, a past behavior of the user may be used to select a background for the generated output video. In some examples, an age of the user may be used to select a background for the generated output video. In some examples, an indication of an emotional state of the user may be used to select a background for the generated output video.

In some embodiments, systems and methods for generating videos with a character indicating a region of an image are provided. In some embodiments, an image containing a first region of the image may be obtained. Further, in some examples, at least one characteristic of a character may be obtained. Further, in some examples, a script containing a first segment of the script may be obtained, and the first segment of the script may be related to the first region of the image. Further, in some examples, the selected at least one characteristic of a character and/or the script may be used to generate an output video of the character presenting the script and at least part of the image, where the character visually indicates the first region of the image while presenting the first segment of the script.

In some examples, an image containing a first region of the image may be obtained. For example, the image may be read from memory, received through a communication network using a communication device, received from an external device, obtained from a website, obtained from an encyclopedia, generated, and so forth.

In some examples, at least one characteristic of a character may be obtained. For example, the at least one characteristic may be selected and/or determined and/or generated as described above (for example, based on a personalized profile as described above), may be read from memory, received through a communication network using a communication device, received from an external device, obtained from a website, obtained from an encyclopedia, and so forth.

In some examples, a script containing a first segment of the script may be obtained, and the first segment of the script may be related to the first region of the image. For example, the script may be selected and/or determined and/or generated as described above (for example, based on a personalized profile and/or a weather forecast and/or news information as described herein), may be read from memory, received through a communication network using a communication device, received from an external device, and so forth.

In some examples, the selected at least one characteristic of a character and/or the script may be used to generate an output video of the character presenting the script and at least part of the image, where the character visually indicates the first region of the image while presenting the first segment of the script. In yet another example, a depiction of the character presenting the first segment of the script and pointing to a first region of the image may be stitched over a background (for example, using image and/or video stitching algorithms, using image and/or video matting algorithms, and so forth) to generate the output video. For example, the background may be selected as described herein.

In some examples, a personalized profile associated with a user may be obtained, for example as described above.

In some examples, information from a calendar of the user may be obtained. For example, the information from the calendar of the user may be read from memory, received through a communication network using a communication device, received from an external device, obtained from a website, obtained from a blockchain, and so forth. In some examples, the image may comprise at least a graphic presentation of a first calendar event and a graphic presentation of a second calendar event, the first segment of the script may comprise a reference to the first calendar event, and the first region of the image may comprise the graphic presentation of the first calendar event.

In some examples, information about past events related to the user (for example, from a log of past events related to the user) may be obtained. For example, the information about the past events related to the user may be read from memory, received through a communication network using a communication device, received from an external device, obtained from a website, obtained from a blockchain, and so forth. For example, such past events may comprise past phone calls, may comprise past financial transactions, may comprise past meetings, may comprise past calendar events, may comprise past conversations, may comprise past actions of the user, and so forth. In some examples, the image may comprise a graphic presentation of at least a first past event and a graphic presentation of a second past event, the first segment of the script may comprise a reference to the first past event, and the first region of the image may comprise the graphic presentation of the first past event.

In some examples, textual information associated with the image may be obtained. For example, the textual information may be obtained as described above. In another example, the textual information and/or the image may be obtained from an encyclopedia and may relate to an entry of the encyclopedia, and the output video may comprise a presentation related to the entry. In yet another example, the textual information may comprise a weather forecast, the image may comprise a depiction of a map related to the weather forecast, and the first segment of the script may comprise information related to an object depicted in the first region of the map (some examples of such objects may include a cloud, high air pressure area, low air pressure area, and so forth). In an additional example, the textual information may comprise a weather forecast, the image may comprise at least a graphic presentation of a weather forecast for a first day and a graphic presentation of a weather forecast for a second day, the first segment of the script may comprise reference to the first day, and the first region of the image may comprise the graphic presentation of the weather forecast for the first day.

In some examples, the personalized profile and/or the script and/or the image and/or the textual information associated with the image and/or information from the calendar of the user and/or information about past events of the user may be used to select the at least one characteristic of the character. For example, the at least one characteristic of the character may be selected as described above. In another example, a machine learning model may be trained using training examples to select characteristics of characters based on user profiles and/or scripts and/or images and/or videos and/or textual information and/or information from a calendar and/or information about past events, and the trained machine learning model may be used to select the at least one characteristic of the character based on the personalized profile and/or the script and/or the image and/or the textual information associated with the image and/or information from the calendar of the user and/or information about past events of the user. In yet another example, an artificial neural network may be configured to select characteristics of characters based on user profiles and/or scripts and/or images and/or videos and/or textual information and/or information from a calendar and/or information about past events, and the artificial neural network may be used to select the at least one characteristic of the character based on the personalized profile and/or the script and/or the image and/or the textual information associated with the image and/or information from the calendar of the user and/or information about past events of the user.

In some examples, the personalized profile and/or the image and/or the textual information associated with the image and/or information from the calendar of the user and/or information about past events of the user may be used to generate the script. For example, the script may be generated as described above. In another example, a machine learning model may be trained using training examples to generate scripts from user profiles and/or images and/or videos and/or textual information and/or information from a calendar and/or information about past events, and the trained machine learning model may be used to generate the script from the personalized profile and/or the image and/or the textual information associated with the image and/or information from the calendar of the user and/or information about past events of the user. In yet another example, an artificial neural network may be configured to generate scripts from user profiles and/or images and/or videos and/or textual information and/or information from a calendar and/or information about past events, and the artificial neural network may be used to generate the script from the personalized profile and/or the image and/or the textual information associated with the image and/or information from the calendar of the user and/or information about past events of the user.

In some examples the personalized profile and/or the script and/or the image and/or the textual information associated with the image and/or information from the calendar of the user and/or information about past events of the user may be used to select the first region of the image. For example, a machine learning model may be trained using training examples to select regions of images based on user profiles and/or scripts and/or images and/or videos and/or textual information and/or information from a calendar and/or information about past events, and the trained machine learning model may be used to select the first region of the image based on the personalized profile and/or the script and/or the image and/or the textual information associated with the image and/or information from the calendar of the user and/or information about past events of the user. In another example, an artificial neural network may be configured to select regions of images based on user profiles and/or scripts and/or images and/or videos and/or textual information and/or information from a calendar and/or information about past events, and the artificial neural network may be used to select the first region of the image based on the personalized profile and/or the script and/or the image and/or the textual information associated with the image and/or information from the calendar of the user and/or information about past events of the user.

In some examples, the personalized profile and/or the script and/or the image and/or the textual information associated with the image and/or information from the calendar of the user and/or information about past events of the user may be used to select the first segment of the script. For example, a machine learning model may be trained using training examples to select segments of scripts based on user profiles and/or scripts and/or images and/or videos and/or textual information and/or information from a calendar and/or information about past events, and the trained machine learning model may be used to select the first segment of the script based on the personalized profile and/or the script and/or the image and/or the textual information associated with the image and/or information from the calendar of the user and/or information about past events of the user. In another example, an artificial neural network may be configured to select segments of scripts based on user profiles and/or scripts and/or images and/or videos and/or textual information and/or information from a calendar and/or information about past events, and the artificial neural network may be used to select the first segment of the script based on the personalized profile and/or the script and/or the image and/or the textual information associated with the image and/or information from the calendar of the user and/or information about past events of the user.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, e.g., hard disks or CD ROM, or other forms of RAM or ROM, USB media, DVD, Blu-ray, Ultra HD Blu-ray, or other optical drive media.

Computer programs based on the written description and disclosed methods are within the skills of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/ AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The examples are to be construed as non-exclusive. Furthermore, the steps of the disclosed methods may be modified in any manner, including by reordering steps and/or inserting or deleting steps. It is intended, therefore, that the specification and examples be considered as illustrative only.

What is claimed is:

1. A computer program product for artificially generating a revoiced media stream, the computer program product embodied in a non-transitory computer-readable medium and including instructions for causing at least one processor to execute a method comprising:

receiving a single media stream including utterances spoken in an origin language by an individual and sounds from a sound-emanating object, wherein the individual is associated with a particular voice;

analyzing the single media stream to identify a first word in which the individual spoke while being in a first emotional state and a second word in which the individual spoke while being in a second emotional state;

using a neural network to process the single media stream for determining a voice profile specific to the individual recorded in the single media stream, wherein the voice profile is indicative of a manner in which the first word and the second word spoken in the origin language are pronounced by the individual in the received single media stream, the voice profile includes first characteristics of the particular voice for a first speech segment associated with the first emotional state of the individual and second characteristics of the particular voice for a second speech segment associated with the second emotional state of the individual, the second characteristics differ from the first characteristics;

receiving an indication of a desired value of at least one characteristic in the voice profile specific to the individual recorded in the single media stream;

updating the voice profile specific to the individual recorded in the single media stream based on the received indication;

based on the updated voice profile, determining a synthesized voice for dubbing the first speech segment and the second speech segment to a target language, wherein the synthesized voice sounds like the particular voice;

generating an artificial dubbed version of the received single media stream, the artificial dubbed version includes a dubbed version of the first speech segment having the first characteristics associated with the first emotional state of the individual and a dubbed version of the second speech segment having the second characteristics associated with the second emotional state of the individual;

determining auditory relationship between the individual and the sound-emanating object, wherein the auditory relationship is indicative of a ratio of volume levels between the utterances spoken by the individual in the original language and the sounds from the sound-emanating object as they are recorded in the single media stream; and determining a category of the sound-emanating object; and wherein:

when the sound-emanating object is from a first category, a ratio of the volume levels between utterances spoken in the target language in the artificial dubbed version of the received single media stream and sounds from the sound-emanating object is maintained substantially identical to the ratio of volume levels between utterances spoken in the original language and sounds from the sound-emanating object as they are recorded in the single media stream; and when the sound-emanating object is from a second category, the ratio of the volume levels between utterances spoken in the target language in the artificial dubbed version of the received single media stream and sounds from the sound-emanating object is to be changed to reduce a relative volume level of the sound-emanating object.

2. The computer program product of claim 1, wherein the single media stream is a real-time conversation including at least one additional individual speaking a secondary language, and the method further includes:

identifying specific utterances spoken by the at least one additional individual as background chatter; and generating an artificial dubbed version of the received single media stream in which the individual speaks the target language using the synthesized voice and the at least one additional individual speaks the secondary language at a reduce volume.

3. The computer program product of claim 1, wherein the single media stream including at least one additional individual speaking a secondary language, and the method further includes:

receiving input indicative of user preferences indicating that utterances spoken in the secondary language should be dubbed; and based on the input indicative of user preferences, generating an artificial dubbed version of the received single media stream in which the individual and the at least one additional individual speak the target language using synthesized voices.

4. The computer program product of claim 1, wherein in the single media stream, the individual speaks first words with an accent in a second language and second words without accent in the second language, and the method further includes:

using the neural network to update the voice profile for indicating that the first words were pronounced with the accent in the second language while the second words were not pronounced with the accent; and using the synthesized voice to artificially generate the dubbed version of the received single media stream in which the individual speaks the first words in the target language with accent in the second language and speaks the second words in the target language without accent in the second language.

5. The computer program product of claim 1, further comprising:

obtaining a transcript of the single media stream;

using an artificial neural network to analyze the transcript and to determine whether dubbing of words is needed in different languages;

based on at least one rule for revising transcripts of media streams, automatically revising a first part of the transcript and avoid from revising a second part of the transcript; and generating the artificial dubbed version of the received single media stream using the synthesized voice that includes a dubbed version of the first and second parts of the transcript in the target language.

6. The computer program product of claim 1, wherein the single media stream is destined to a particular user, and the method further includes:

obtaining a transcript of the single media stream;

determining a user category indicative of a desired vocabulary based on demographic or behavioral data associated with the particular user;

based on the determined user category for the particular user, revising the transcript of the single media stream in accordance with the desired vocabulary associated with the user category; and using the synthesized voice and the revised transcript to artificially generate the artificial dubbed version of the received single media stream.

7. The computer program product of claim 1, wherein the single media stream is destined to a particular user, and the method further includes:

obtaining a transcript of the single media stream;

receiving preferred language characteristics associated with the particular user, the preferred language characteristics including at least one of a language register, dialect, style, or level of slang;

translating the transcript of the single media stream to the target language based on received preferred language characteristics associated with the particular user; and using the synthesized voice and the translated transcript to artificially generate the artificial dubbed version of the received single media stream.

8. The computer program product of claim 1, wherein the method further includes:

obtaining a transcript of the single media stream;

analyzing the transcript to determine that the transcript includes a subject likely to be unfamiliar with users associated with the target language, wherein the subject comprising at least one of a public figure, event, or cultural reference; and presenting in the artificial dubbed version of the received single media stream a visual explanation in the target language to the subject discussed in the origin language.

9. The computer program product of claim 1, wherein the method further includes:

obtaining a transcript of the single media stream;

analyzing the transcript to determine that an original name of a character in the received single media stream is likely to cause antagonism with users that speak the target language, wherein the determination is based on at least one of pronunciation difficulty, religious significance, historical association, or resemblance to a public figure; and wherein in the artificial dubbed version of the received single media stream the character has a substitute name.

10. The computer program product of claim 1, wherein the method further includes:

obtaining a transcript of the single media stream;

using a trained machine learning model to analyze the transcript and determine that the transcript includes a first sentence ending with a first utterance that rhymes with a second utterance that ends a second sentence; and translating the first sentence such that it ends with a first word in the target language, and translating the second sentence such that it ends with a second word in the target language, wherein the second word rhymes with the first word.

11. The computer program product of claim 1, wherein the voice profile is indicative of changes of voice intonation of the individual during the single media stream, and the method further includes:

determining that the first speech segment is a question and the second speech segment is a statement, and the artificial dubbed version of the received single media stream includes a dubbed version of the first speech segment having a question intonation of and a dubbed version of the second speech segment having a statement intonation.

12. The computer program product of claim 1, wherein the method further includes:

analyzing the received single media stream to determine visual data, wherein the visual data includes facial images of the individual; and using the visual data to determine the first emotional state and the second emotional state.

13. The computer program product of claim 1, wherein the method further includes:

obtaining a transcript of the single media stream;

analyzing the received single media stream to determine visual data indicative of a number of people the individual is speaking to; and translating the transcript to the target language based on the visual data using a language register appropriate for the number of people.

14. The computer program product of claim 1, wherein the method further includes analyzing the single media stream to determine visual data that includes text written in the origin language, determining an importance level for the text, wherein the artificial dubbed version of the received single media stream provides a visual translation in the target language to the text written in the origin language when the importance level exceeds a threshold.

15. A method for artificially generating a revoiced media stream, the method comprising:

receiving a single media stream including utterances spoken in an origin language by an individual and sounds from a sound-emanating object, wherein the individual is associated with a particular voice;

analyzing the single media stream to identify a first word in which the individual spoke while being in a first emotional state and a second word in which the individual spoke while being in a second emotional state;

using a neural network to process the single media stream for determining a voice profile specific to the individual recorded in the single media stream, wherein the voice profile is indicative of a manner in which the first word and the second word spoken in the origin language are pronounced by the individual in the received single media stream, the voice profile includes first characteristics of the particular voice for a first speech segment associated with the first emotional state of the individual and second characteristics of the particular voice for a second speech segment associated with the second emotional state of the individual, the second characteristics differ from the first characteristics;

receiving input indicative of user preferences about characteristics of the particular voice;

based on the voice profile and the received input, determining a synthesized voice for dubbing the first speech segment and the second speech segment in a target language, wherein the synthesized voice sounds like the particular voice;

generating an artificial dubbed version of the received single media stream, the artificial dubbed version includes a dubbed version of the first speech segment having the first characteristics associated with the first emotional state of the individual and a dubbed version of the second speech segment having the second characteristics associated with the second emotional state of the individual;

determining auditory relationship between the individual and the sound-emanating object, wherein the auditory relationship is indicative of a ratio of volume levels between the utterances spoken by the individual in the original language and the sounds from the sound-emanating object as they are recorded in the single media stream; and determining a category of the sound-emanating object; and wherein:

when the sound-emanating object is from a first category, a ratio of the volume levels between utterances spoken in the target language in the artificial dubbed version of the received single media stream and sounds from the sound-emanating object is maintained substantially identical to the ratio of volume levels between utterances spoken in the original language and sounds from the sound-emanating object as they are recorded in the single media stream; and when the sound-emanating object is from a second category, the ratio of the volume levels between utterances spoken in the target language in the artificial dubbed version of the received single media stream and sounds from the sound-emanating object is to be changed to reduce a relative volume level of the sound-emanating object.

16. A system for artificially generating a revoiced media stream, the system comprising:

at least one processing device configured to:

receive a single media stream including utterances spoken in an origin language by an individual and sounds from a sound-emanating object, wherein the individual is associated with a particular voice;

analyze the single media stream to identify a first word in which the individual spoke while being in a first emotional state and a second word in which the individual spoke while being in a second emotional state;

use a neural network to process the single media stream for determining a voice profile specific to the individual recorded in the single media stream, wherein the voice profile is indicative of a manner in which the first word and the second word spoken in the origin language are pronounced by the individual in the received single media stream, the voice profile includes first characteristics of the particular voice for a first speech segment associated with the first emotional state of the individual and second characteristics of the particular voice for a second speech segment associated with the second emotional state of the individual, the second characteristics differ from the first characteristics;

receive input indicative of user preferences about characteristics of the particular voice;

based on the voice profile and the received input, determine a synthesized voice for dubbing the first speech segment and the second speech segment in a target language, wherein the synthesized voice sounds like the particular voice;

generate an artificial dubbed version of the received single media stream, the artificial dubbed version includes a dubbed version of the first speech segment having the first characteristics associated with the first emotional state of the individual and a dubbed version of the second speech segment having the second characteristics associated with the second emotional state of the individual;

determine auditory relationship between the individual and the sound-emanating object, wherein the auditory relationship is indicative of a ratio of volume levels between the utterances spoken by the individual in the original language and the sounds from the sound-emanating object as they are recorded in the single media stream; and determine a category of the sound-emanating object; and wherein:

when the sound-emanating object is from a first category, a ratio of the volume levels between utterances spoken in the target language in the artificial dubbed version of the received single media stream and sounds from the sound-emanating object is maintained substantially identical to the ratio of volume levels between utterances spoken in the original language and sounds from the sound-emanating object as they are recorded in the single media stream; and when the sound-emanating object is from a second category, the ratio of the volume levels between utterances spoken in the target language in the artificial dubbed version of the received single media stream and sounds from the sound-emanating object is to be changed to reduce a relative volume level of the sound-emanating object.

17. The computer program product of claim 1, wherein determining the voice profile for the individual involves extracting from the received single media stream spectral features including at least one of: spectral centroid, spectral spread, spectral skewness, spectral kurtosis, spectral slope, spectral decrease, spectral roll-off, or spectral variation for each of the first speech segment and second speech segment, and using the neural network to generate the voice profile based on the extracted spectral features.

18. The computer program product of claim 1, wherein the voice profile is associated with a first vector representing explicit characteristics of the individual's voice in the first speech segment that includes loudness, rhythm pattern, or pitch and a second vector representing explicit characteristics of the individual's voice in the second speech segment that includes loudness, rhythm pattern, or pitch, wherein a first distance between the first vector and the second vector is smaller than a second distance between the first vector and another vector extracted from a voice of another individual.

19. The computer program product of claim 1, wherein the method further includes:

using a trained neural network model analyzing the received single media stream to identify contextual information based on visual data and audio data extracted from the received single media stream; and using the contextual information to determine the first emotional state and the second emotional state.

20. The computer program product of claim 1, wherein the voice profile includes a first set of characteristics of the particular voice for a first social activity and a second set of characteristics of the particular voice for a second social activity, the first set of characteristics differ from the second set of characteristics.

* * * * *